United States Patent [19]
Naden et al.

[11] Patent Number: 5,999,561
[45] Date of Patent: Dec. 7, 1999

[54] DIRECT SEQUENCE SPREAD SPECTRUM METHOD, COMPUTER-BASED PRODUCT, APPARATUS AND SYSTEM TOLERANT TO FREQUENCY REFERENCE OFFSET

[75] Inventors: Gary A. Naden, Mandeville; Robert E. Rouquette, Kenner; H. Britton Sanderford, Jr., New Orleans; Dale E. Reiser, New Orleans; Charles A. Hwang, New Orleans; Marc L. Reed, Mandeville, all of La.

[73] Assignee: Sanconix, Inc., New Orleans, La.

[21] Appl. No.: 08/929,891

[22] Filed: Sep. 15, 1997

Related U.S. Application Data

[60] Provisional application No. 60/047,128, May 20, 1997, and provisional application No. 60/051,922, Jul. 8, 1997.

[51] Int. Cl.⁶ .................................................. H04B 1/707
[52] U.S. Cl. ........................................ 375/206; 375/208
[58] Field of Search ................................. 375/206, 208, 375/209, 210; 370/320, 335, 342

[56] References Cited

U.S. PATENT DOCUMENTS

| | | |
|---|---|---|
| 4,581,606 | 4/1986 | Mallory . |
| 4,754,255 | 6/1988 | Sanders et al. . |
| 4,799,062 | 1/1989 | Sanderford, Jr. et al. . |
| 4,977,577 | 12/1990 | Arthur et al. . |
| 5,067,136 | 11/1991 | Arthur et al. . |
| 5,095,493 | 3/1992 | Arthur et al. . |
| 5,119,396 | 6/1992 | Snderford, Jr. . |
| 5,252,966 | 10/1993 | Lambropoulos et al. . |
| 5,265,120 | 11/1993 | Sanderford, Jr. . |
| 5,311,541 | 5/1994 | Sanderford, Jr. . |
| 5,377,222 | 12/1994 | Sanderford, Jr. . |
| 5,408,217 | 4/1995 | Sanderford, Jr. . |
| 5,457,713 | 10/1995 | Sanderford, Jr. et al. . |
| 5,598,427 | 1/1997 | Arthur et al. . |
| 5,610,939 | 3/1997 | Takahashi et al. ................. 375/206 |
| 5,625,338 | 4/1997 | Pildner et al. . |
| 5,625,639 | 4/1997 | Tomita et al. ....................... 375/206 |
| 5,627,856 | 5/1997 | Durrant et al. ..................... 375/206 |
| 5,638,362 | 6/1997 | Dohi et al. ......................... 375/206 |
| 5,652,592 | 7/1997 | Sanderford et al. . |
| 5,661,750 | 8/1997 | Fulton ................................. 375/206 |
| 5,687,190 | 11/1997 | Tsao ..................................... 375/206 |

OTHER PUBLICATIONS

Undersampling Applications, Walt Kester, Section 5, p. 1.
Compensating Frequency Drift in DPSK Systems via Baseband Signal Processing, Zae Yong Choi and Yong Hoon Lee, IEEE Transactions on Communications, vol. 45, No. 8, Aug. 1997.
Frerking M., "Digital Signal Processing and Communication Systems", Van Nostrand Reinhold, 1994, pp. 65–66, 193–199.

*Primary Examiner*—Don N. Vo
*Attorney, Agent, or Firm*—Oblon, Spivak, McClelland, Maier & Neustadt, P.C.

[57] ABSTRACT

A method, apparatus, computer-based product and system employs a digital receiver (or transceiver) to receive, digitize and process a direct sequence spread spectrum signal using efficient, low-cost digital signal processing components. A radio front end portion of the receiver receives and digitizes the signal, and a digital signal processing portion downconverts and despreads the signal by applying a pseudorandom noise (PN) code, used at a transmitter to spread a data signal contained in the direct sequence spread spectrum signal, to the received signal. In order to initially align, and maintain alignment of, the PN code with the direct sequence spread spectrum signal, a timing and state control mechanism is included that provides time reference correction information to the signal processing components of the receiver. This time reference correction information allows the receiver to be compatible with transmitters using inaccurate frequency references which impart a significant frequency ambiguity in the received signal. Additional features include computer-based synchronization methods and mechanisms suitable for use for low performance digital signal processors and employ power management mechanisms that enable long-term operation using battery power. The power management mechanisms enable the receiver to operate in a network setting, over the course of multiple years off battery power, with similar receivers, transmitters and transceiver that communicate with one another using direct sequence spread spectrum signals.

144 Claims, 74 Drawing Sheets

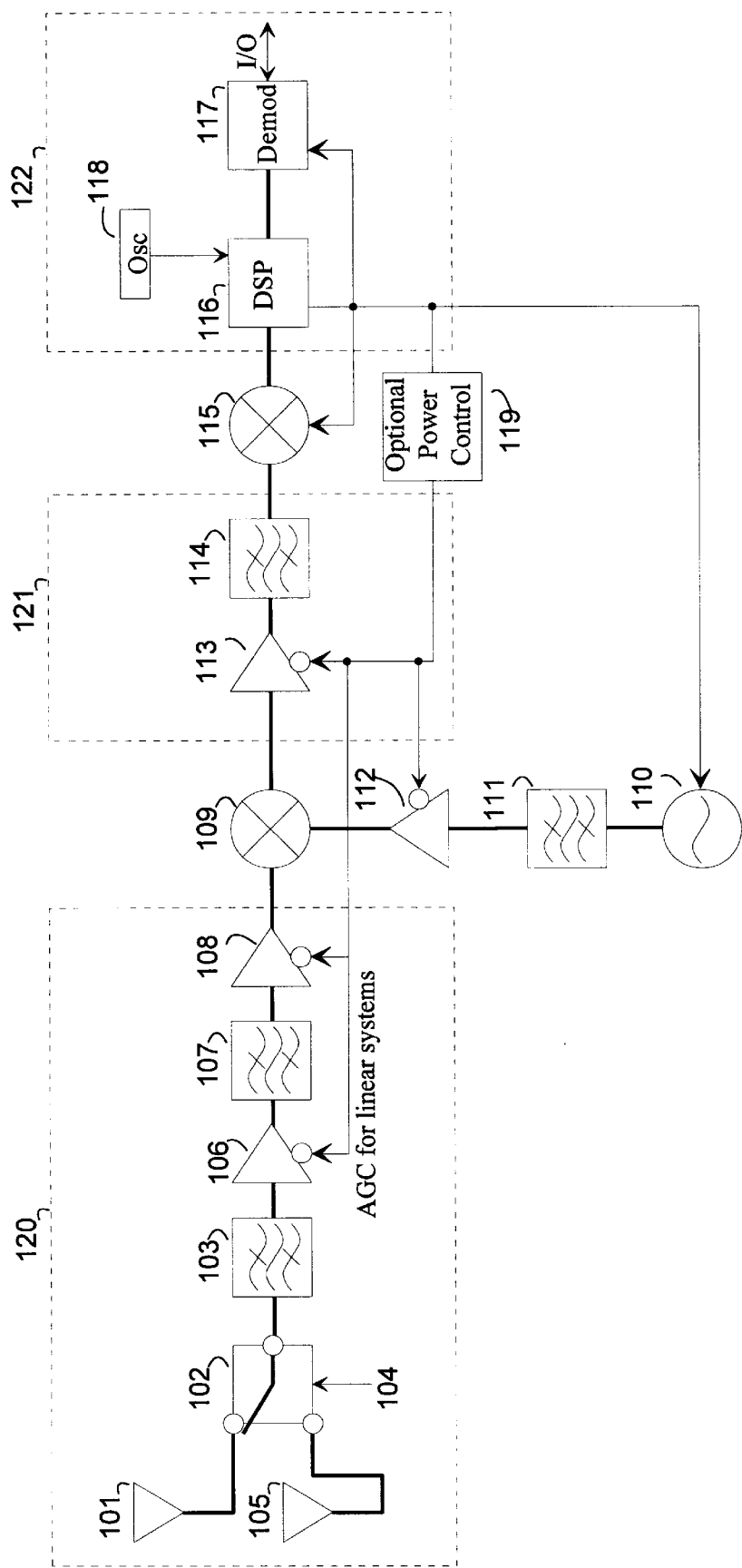
Prior Art
Figure 1

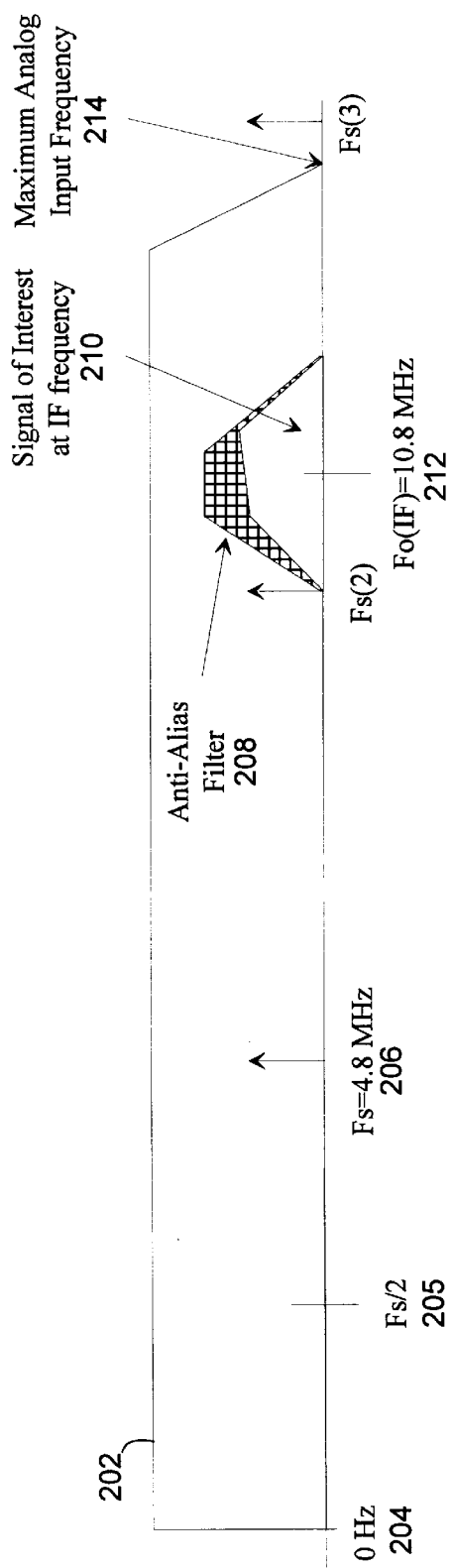
Prior Art
Figure 2
Prior Art
Figure 3

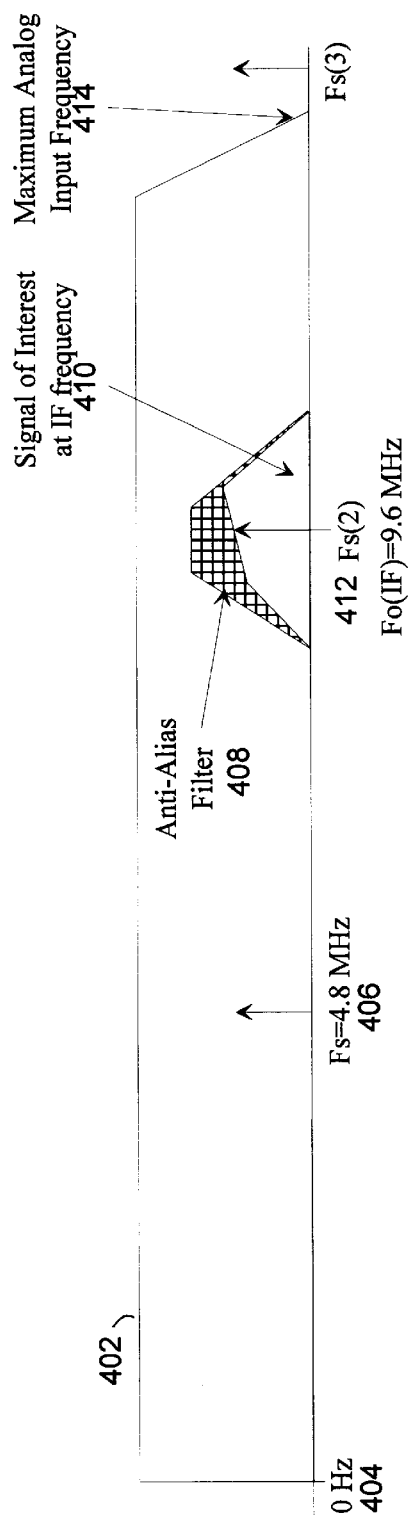
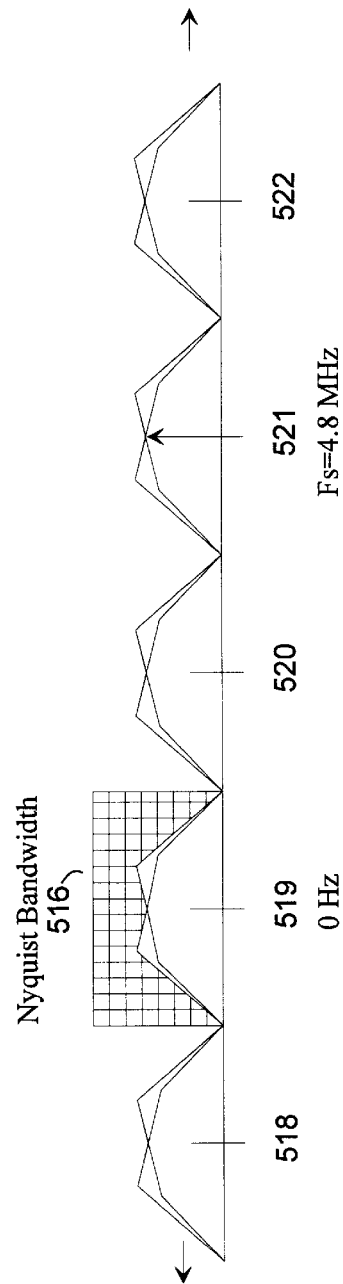
Prior Art
Figure 4
Prior Art
Figure 5

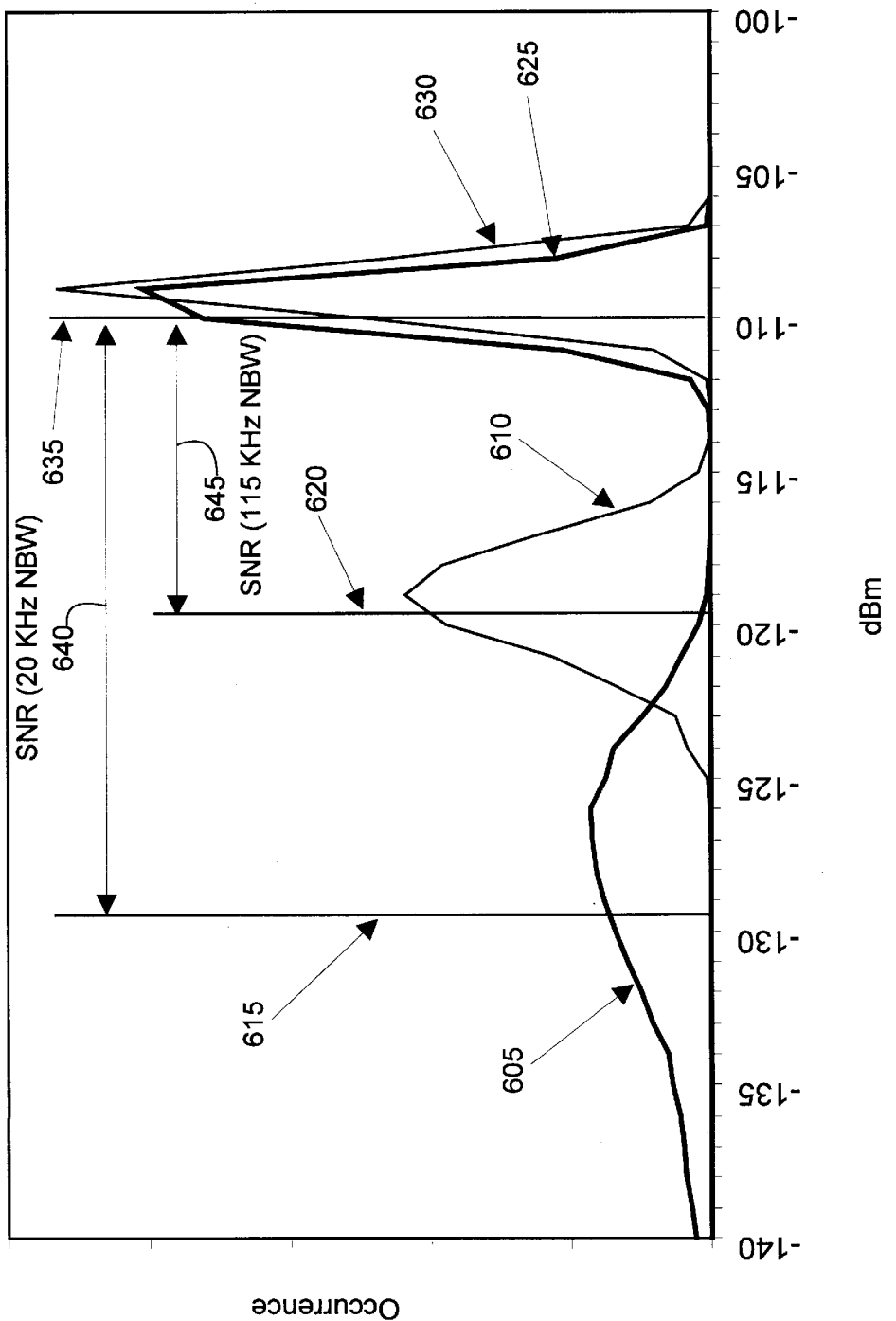
Prior Art
Figure 6

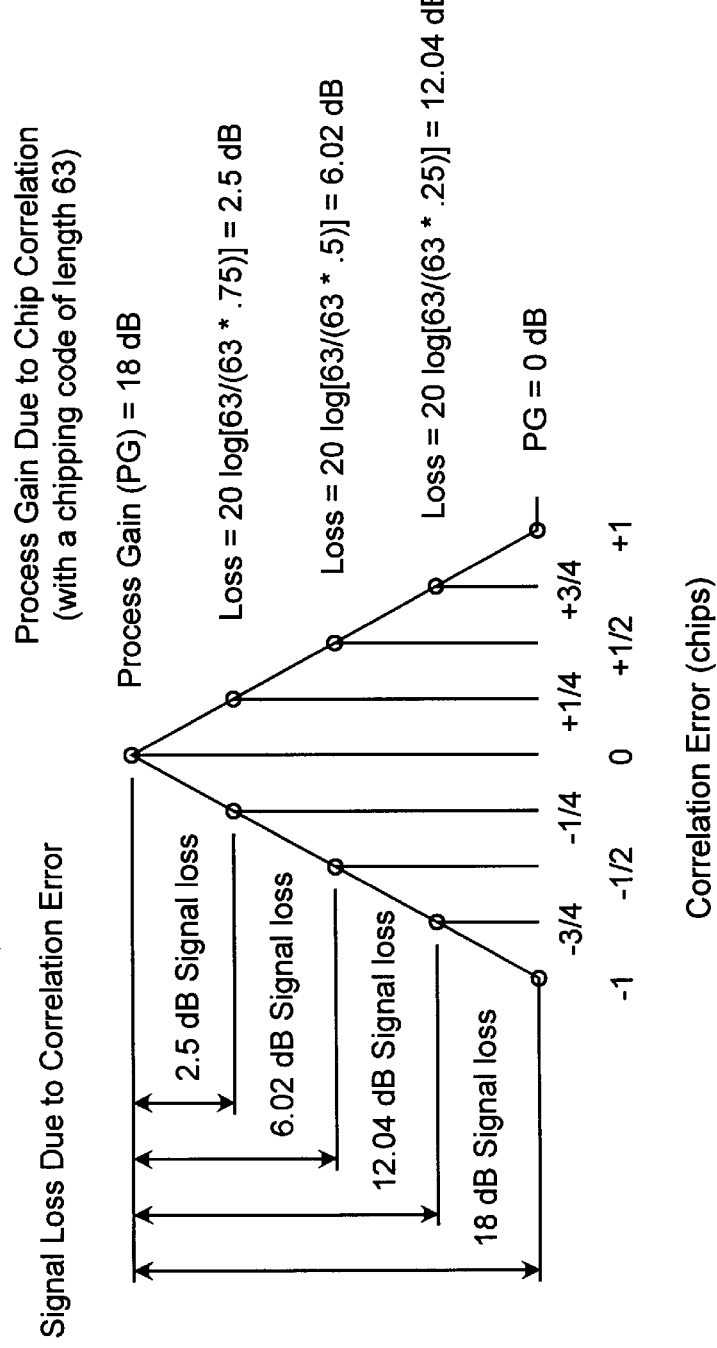
Prior Art
Figure 7

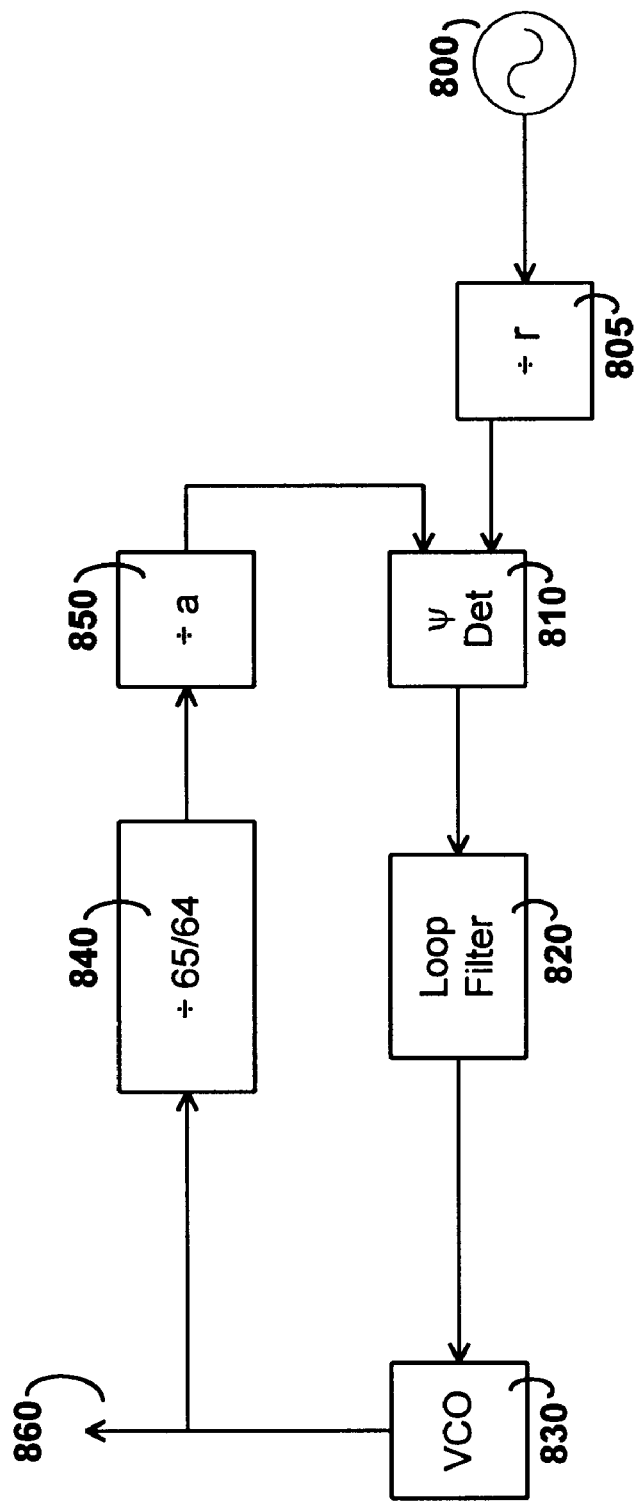
Prior Art
Figure 8

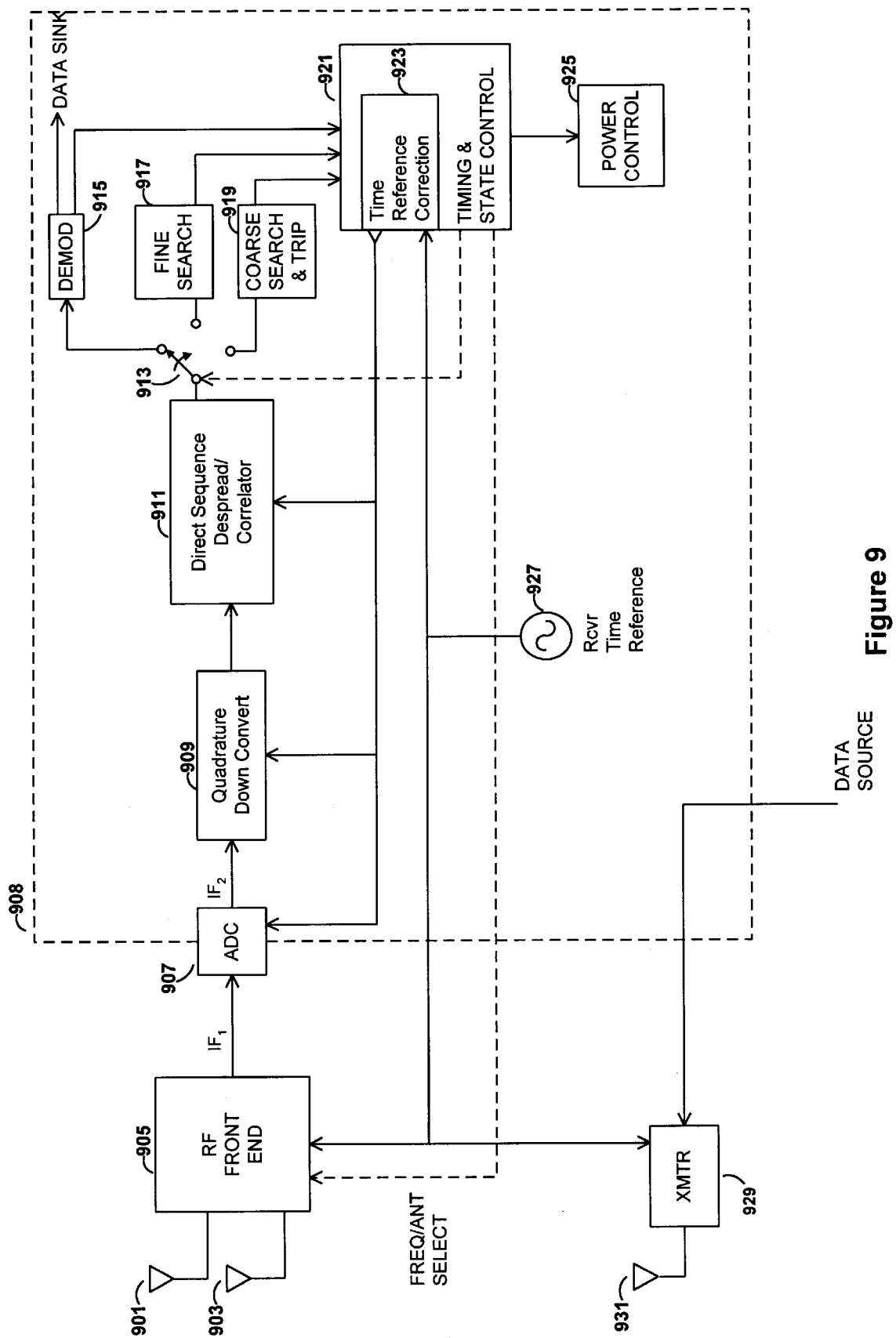
Figure 9

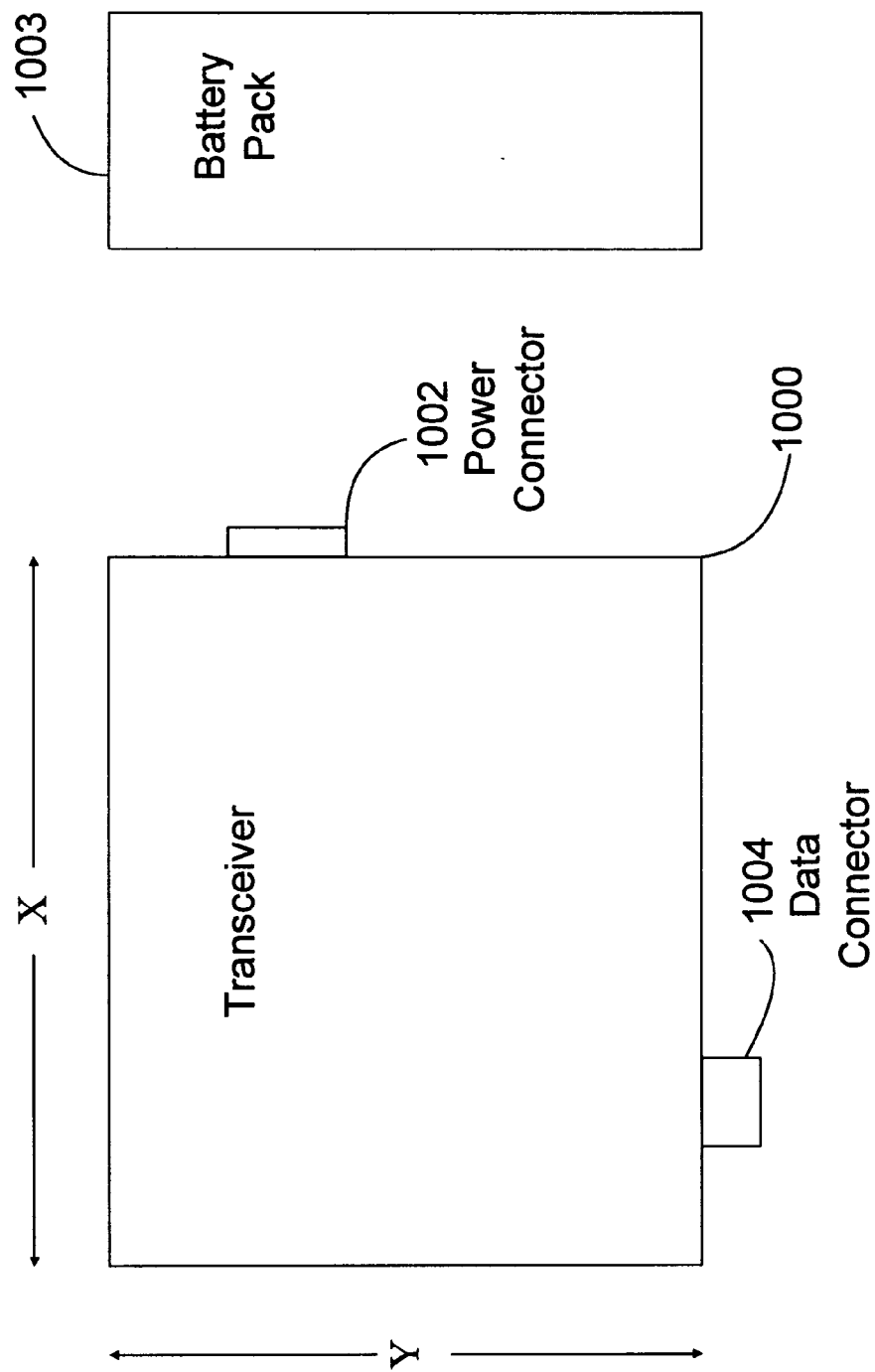
Figure 10

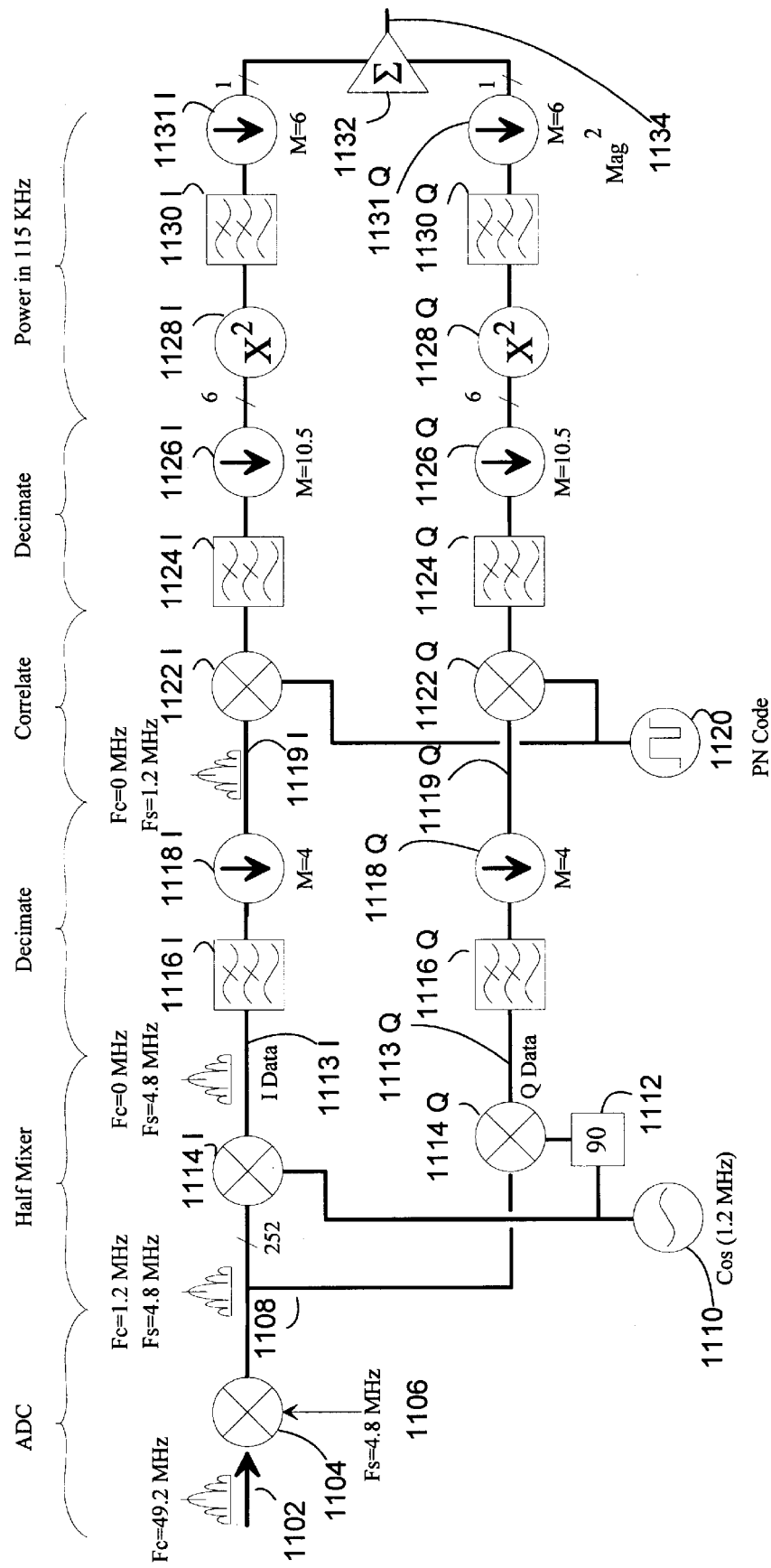
Figure 11

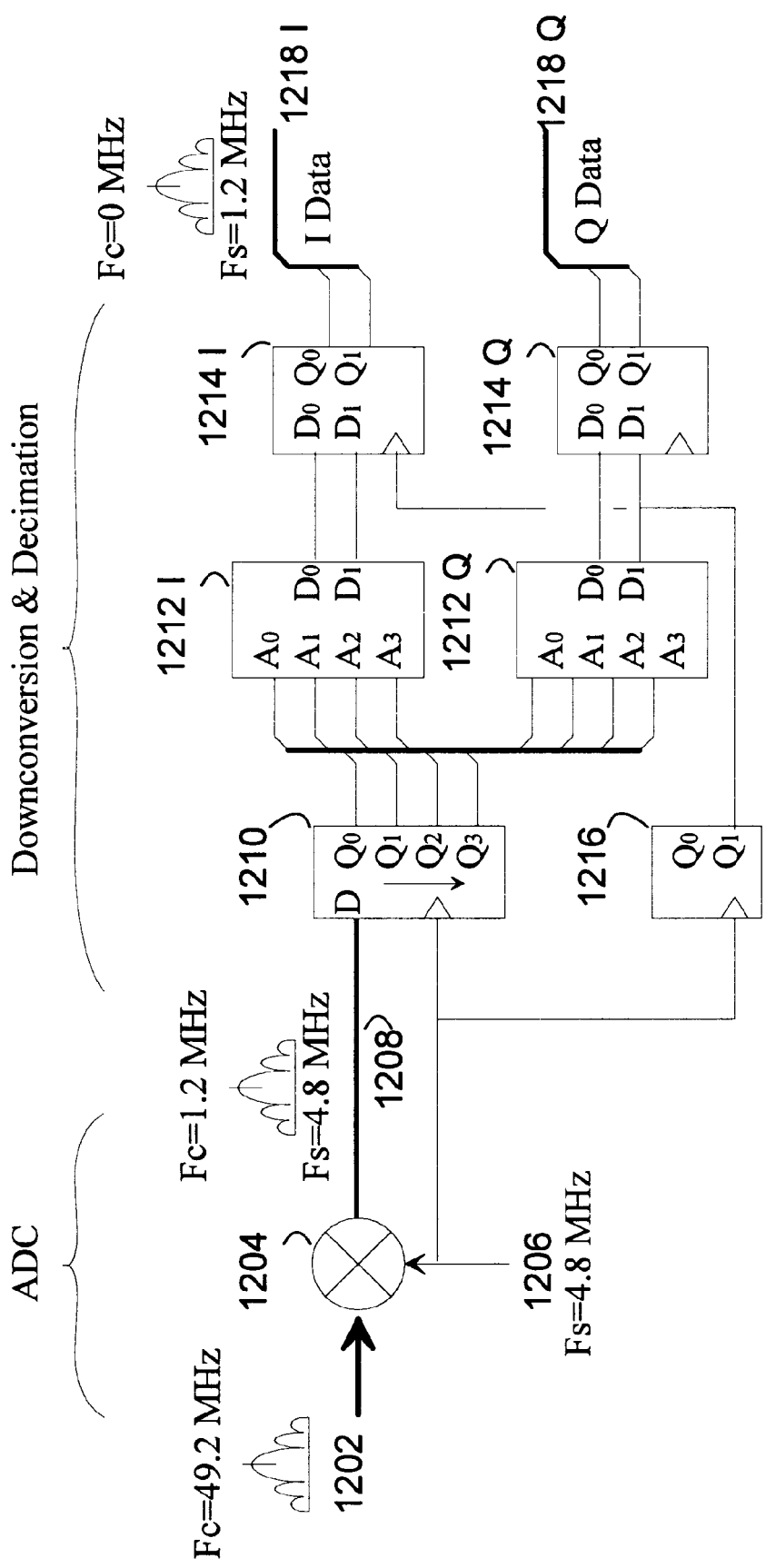
Figure 12

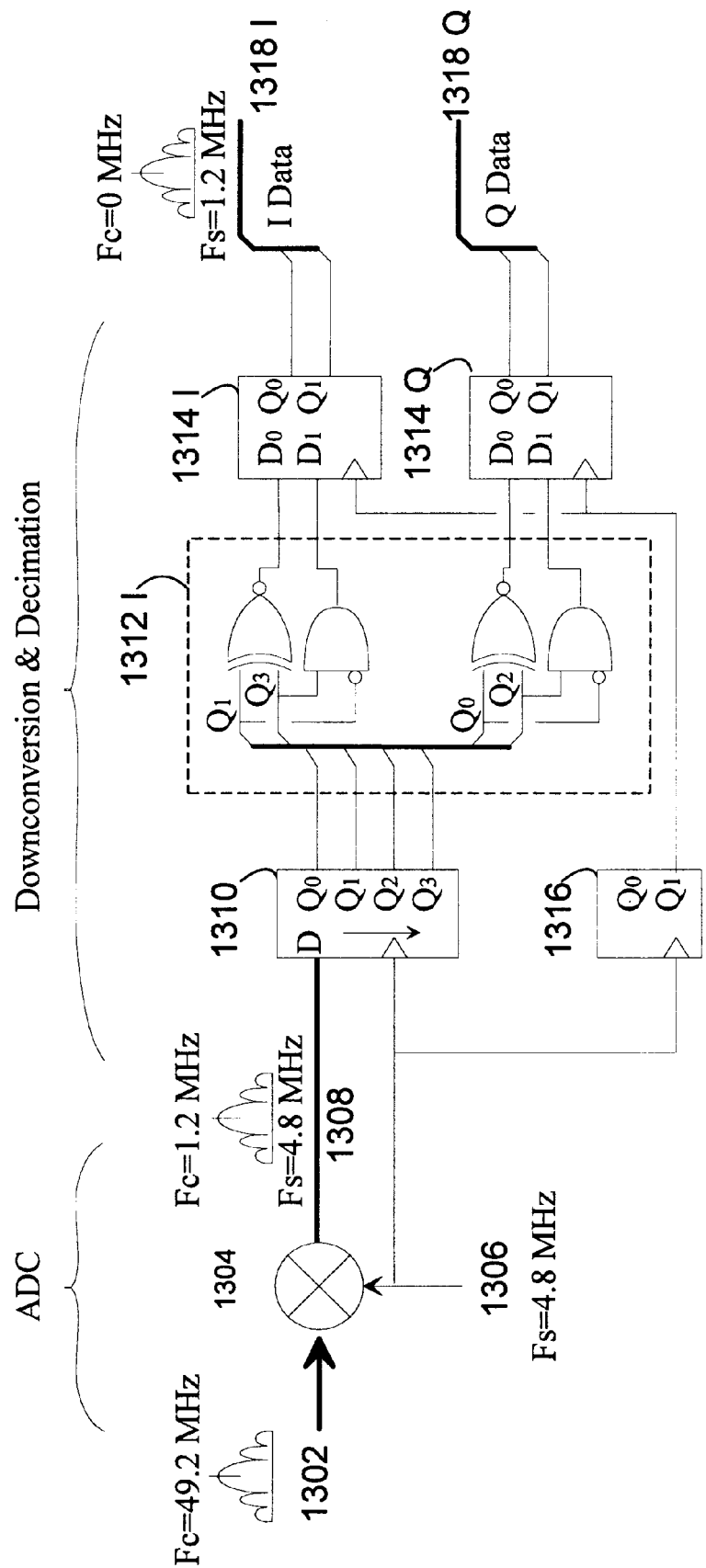
Figure 13

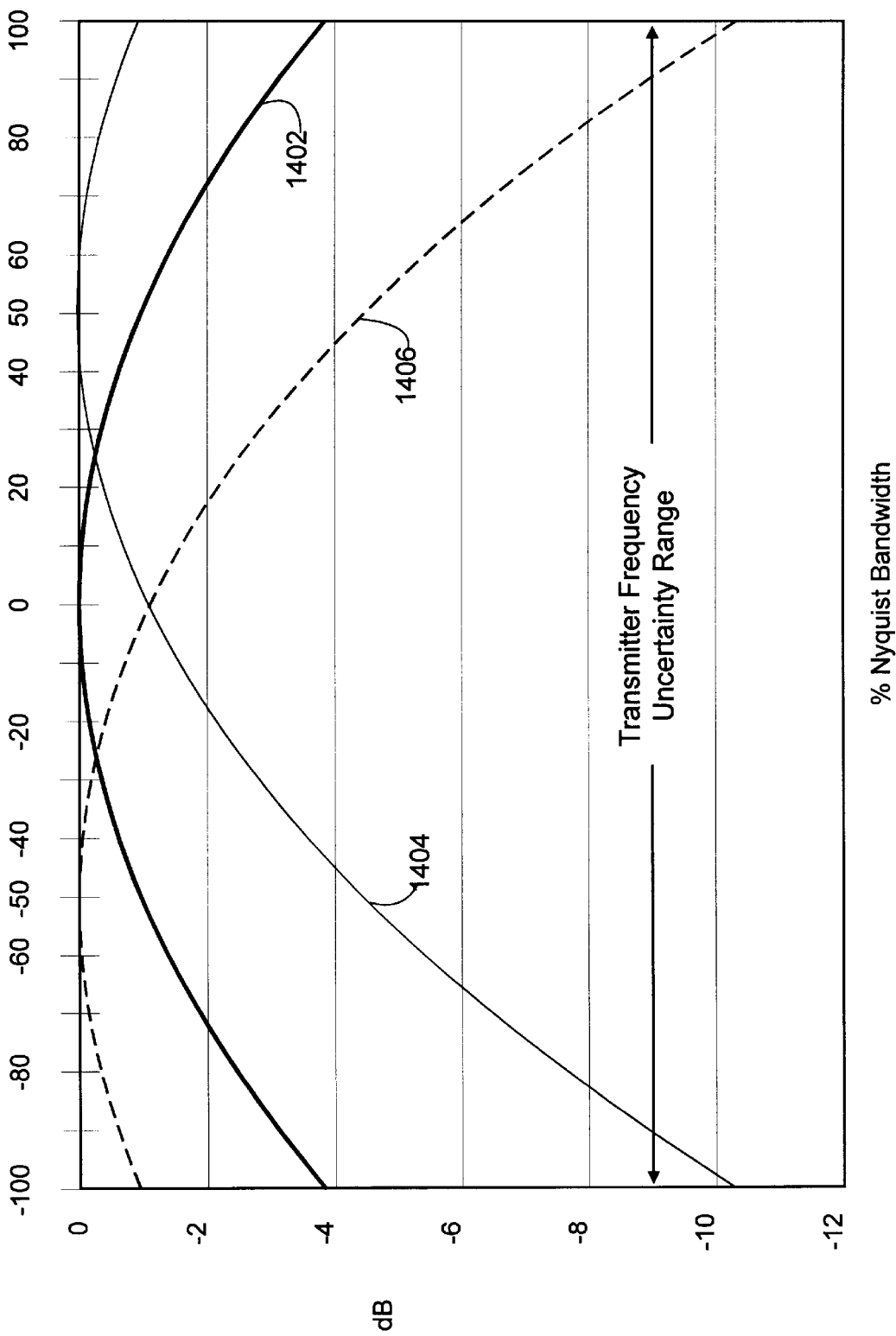
Figure 14

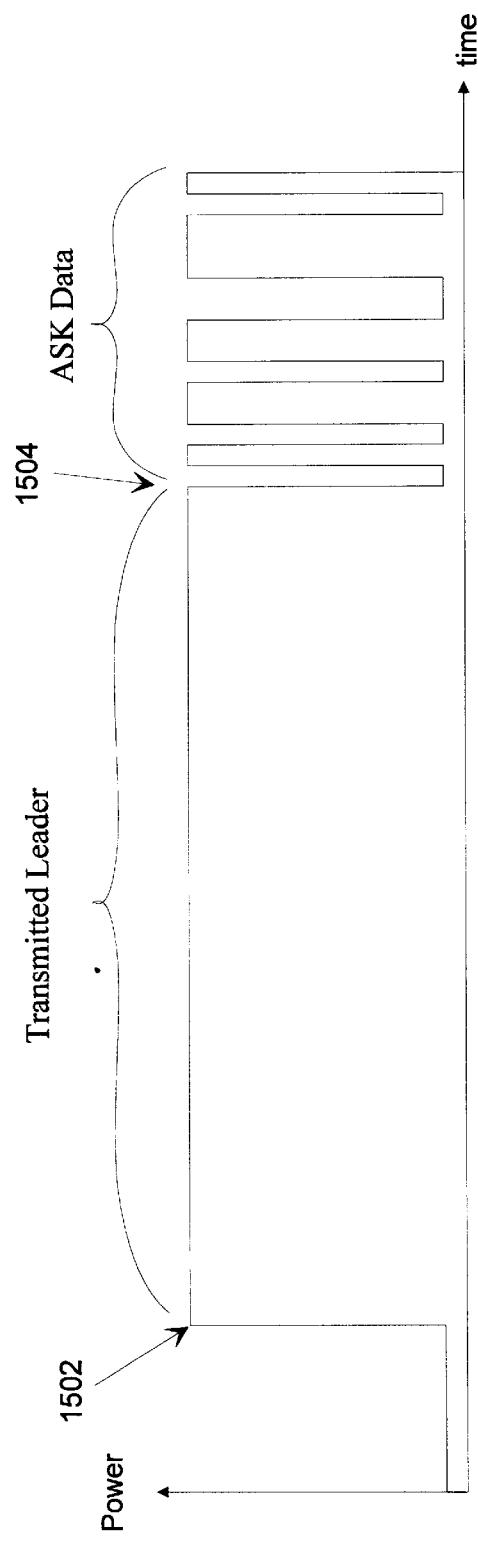
Figure 15A
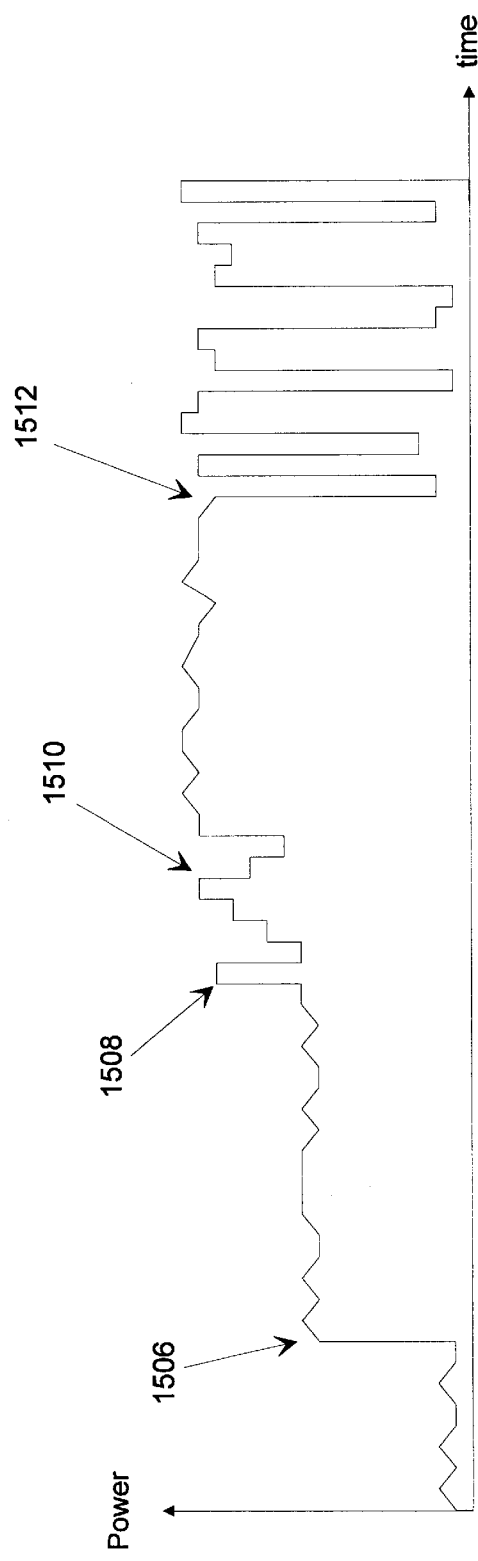
Figure 15B

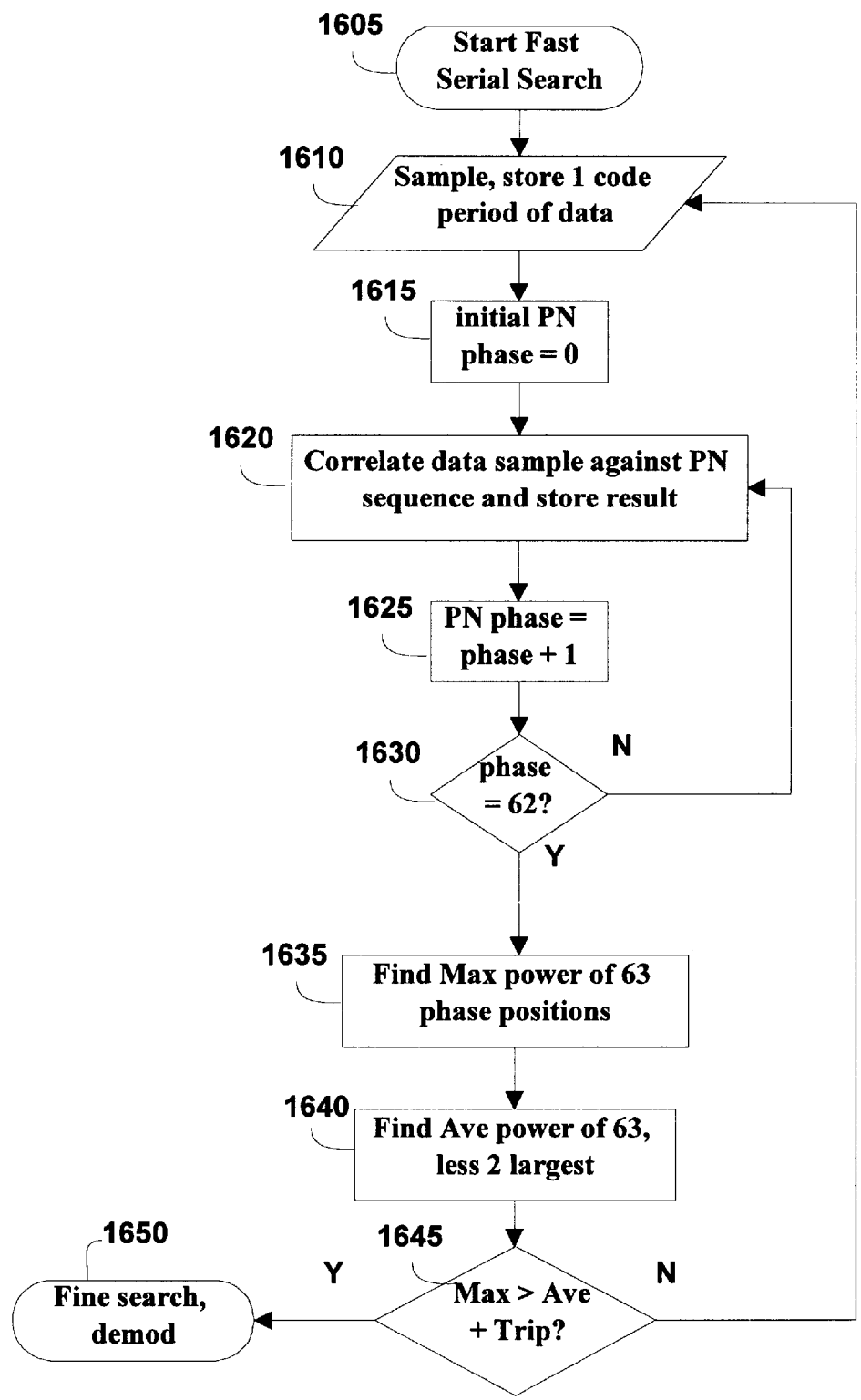
Figure 16

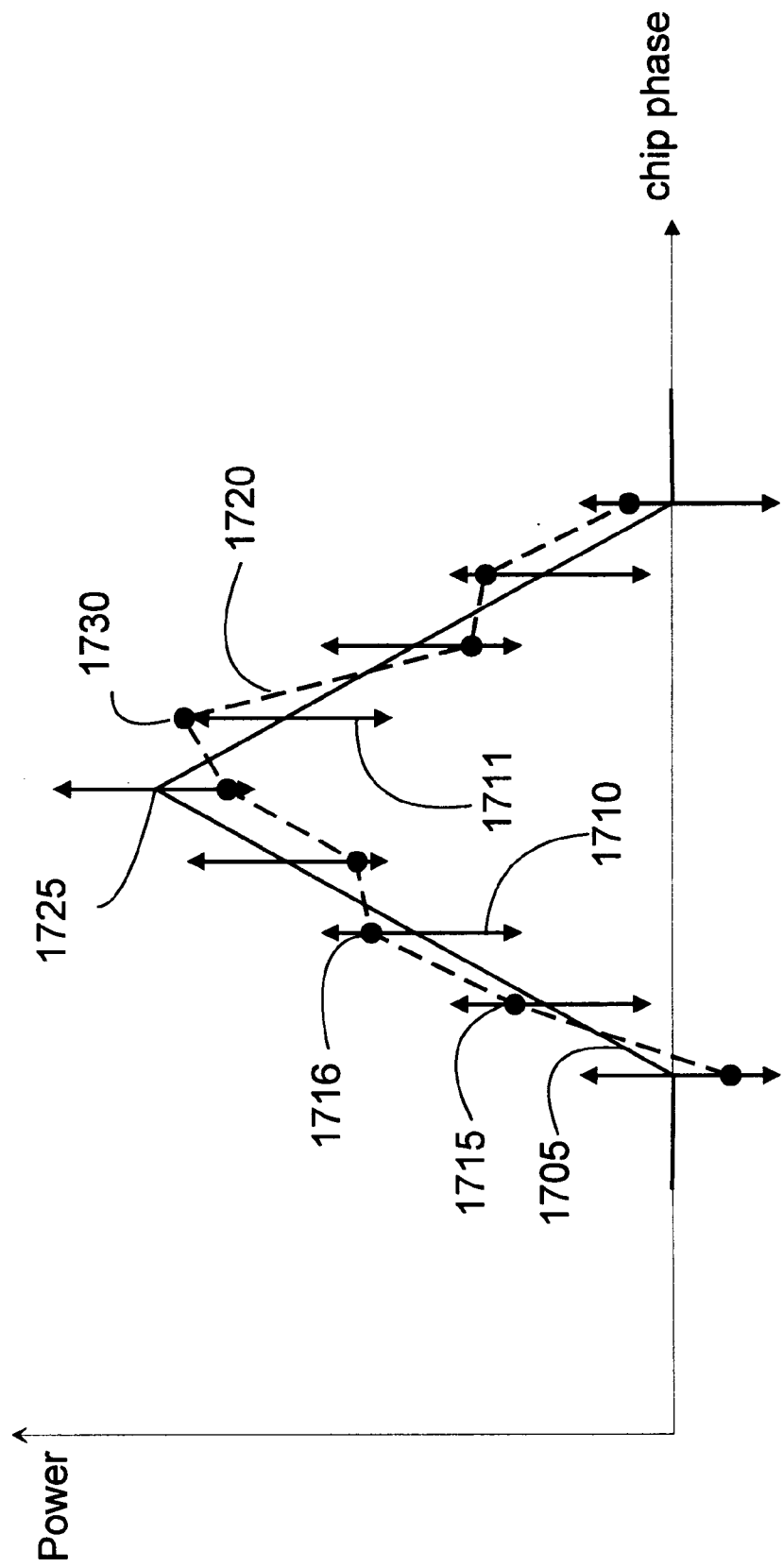
Figure 17

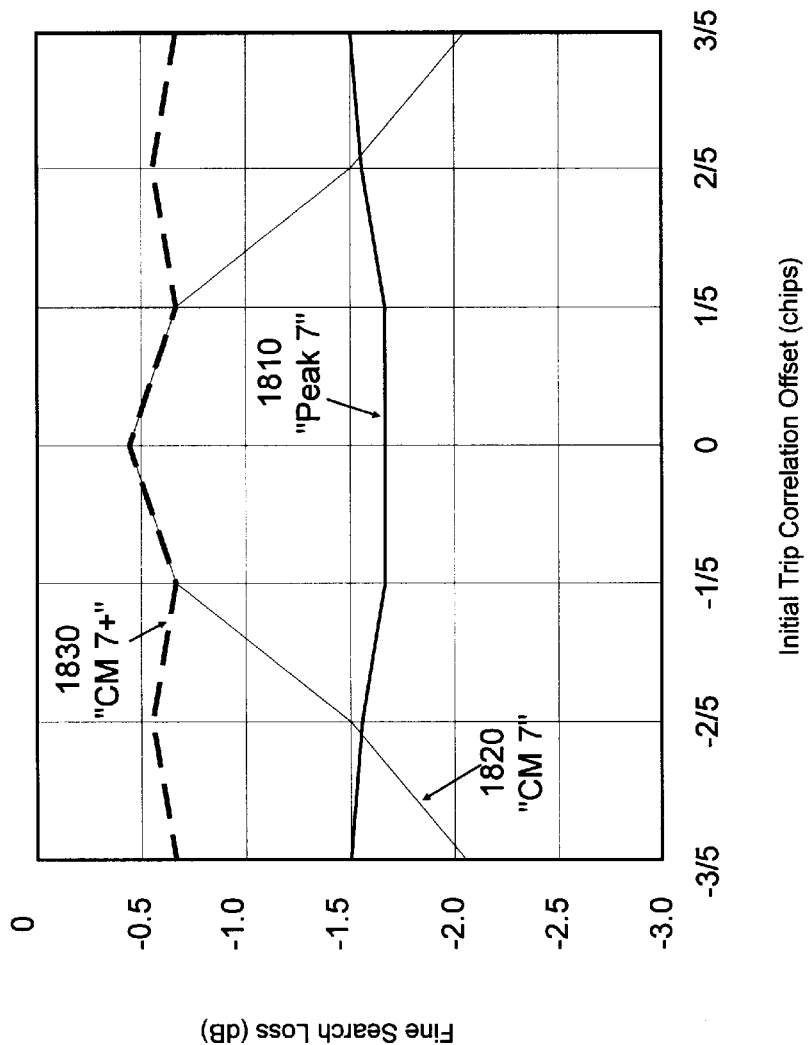
Figure 18

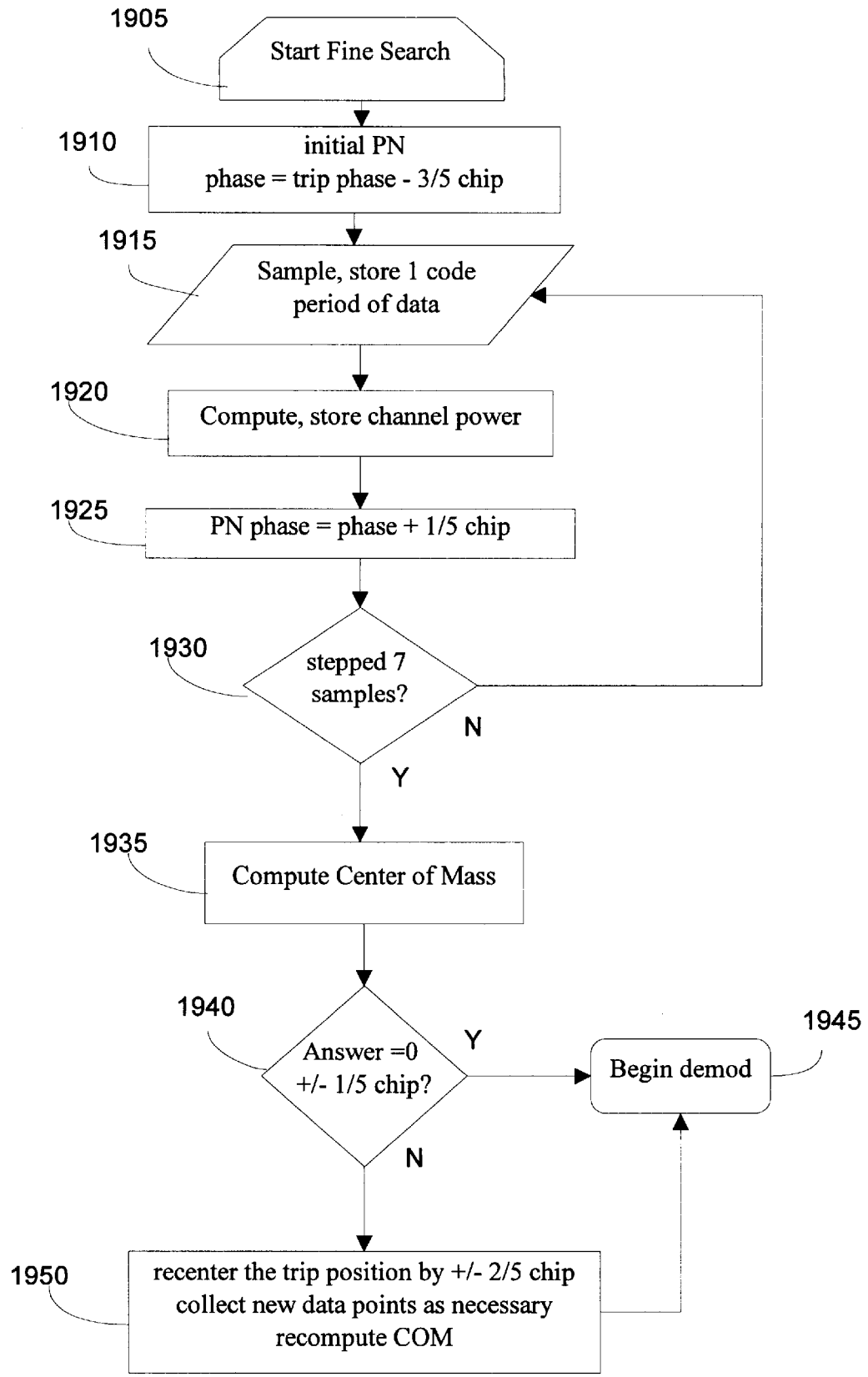
Figure 19

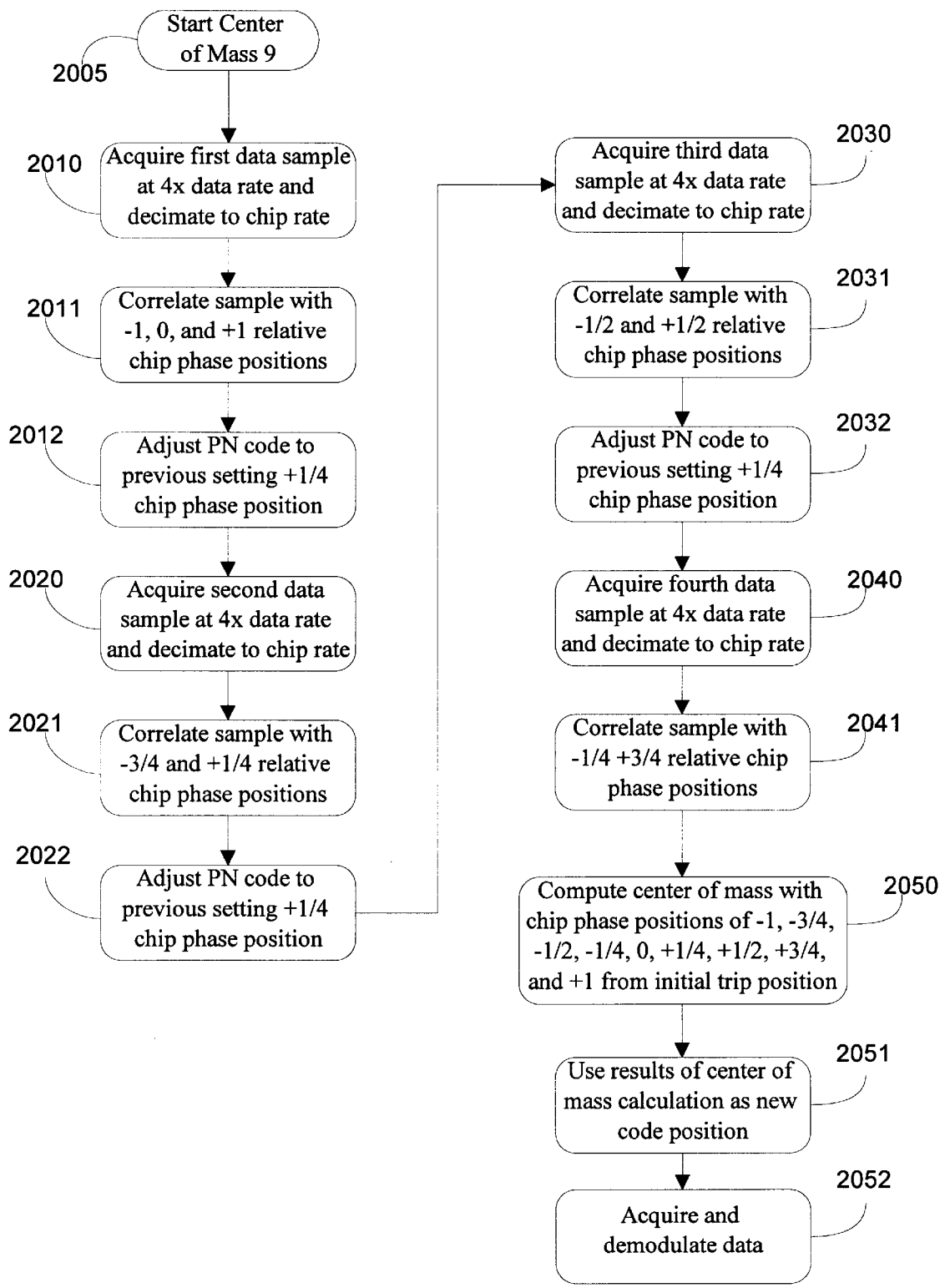
Figure 20

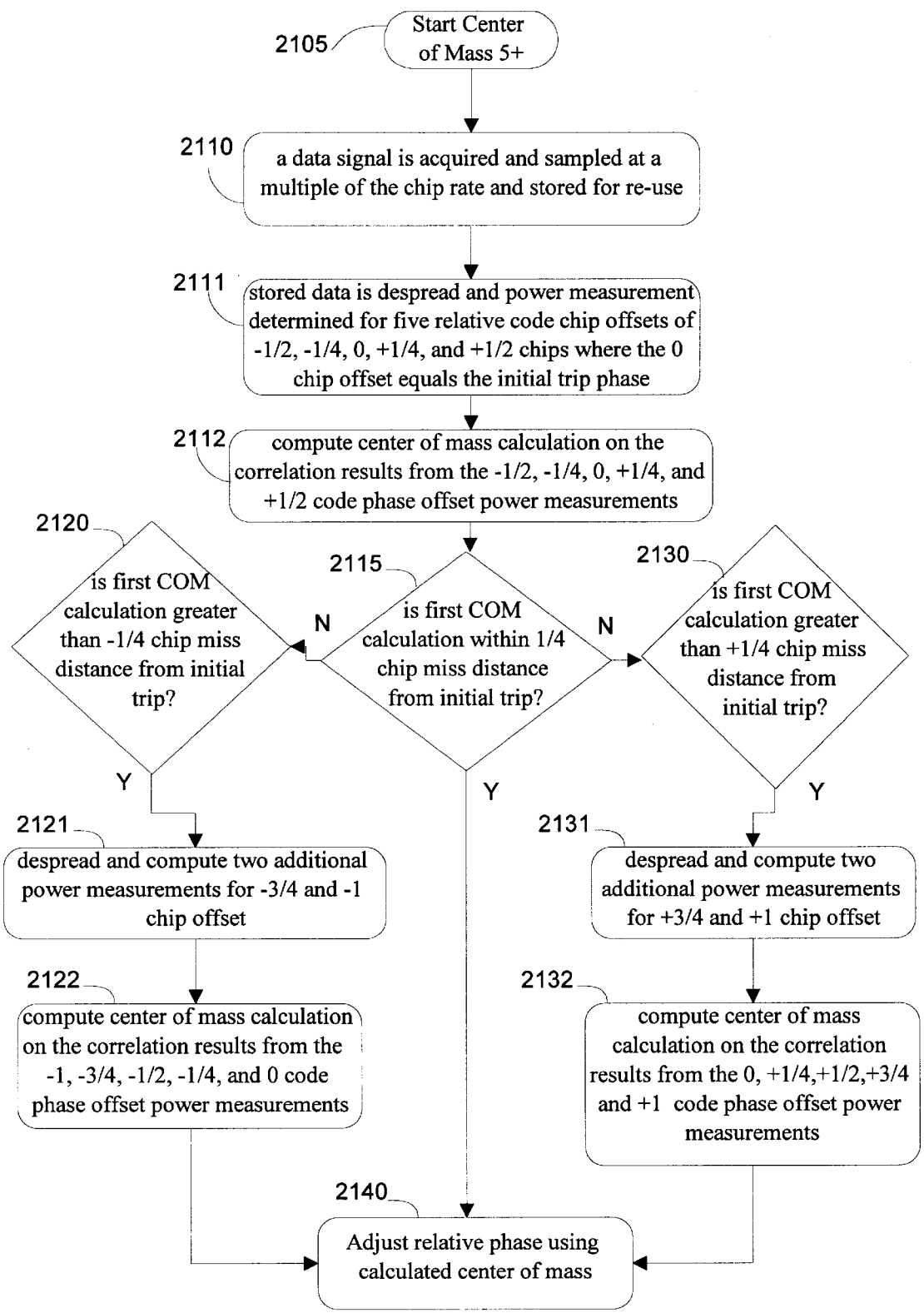
Figure 21

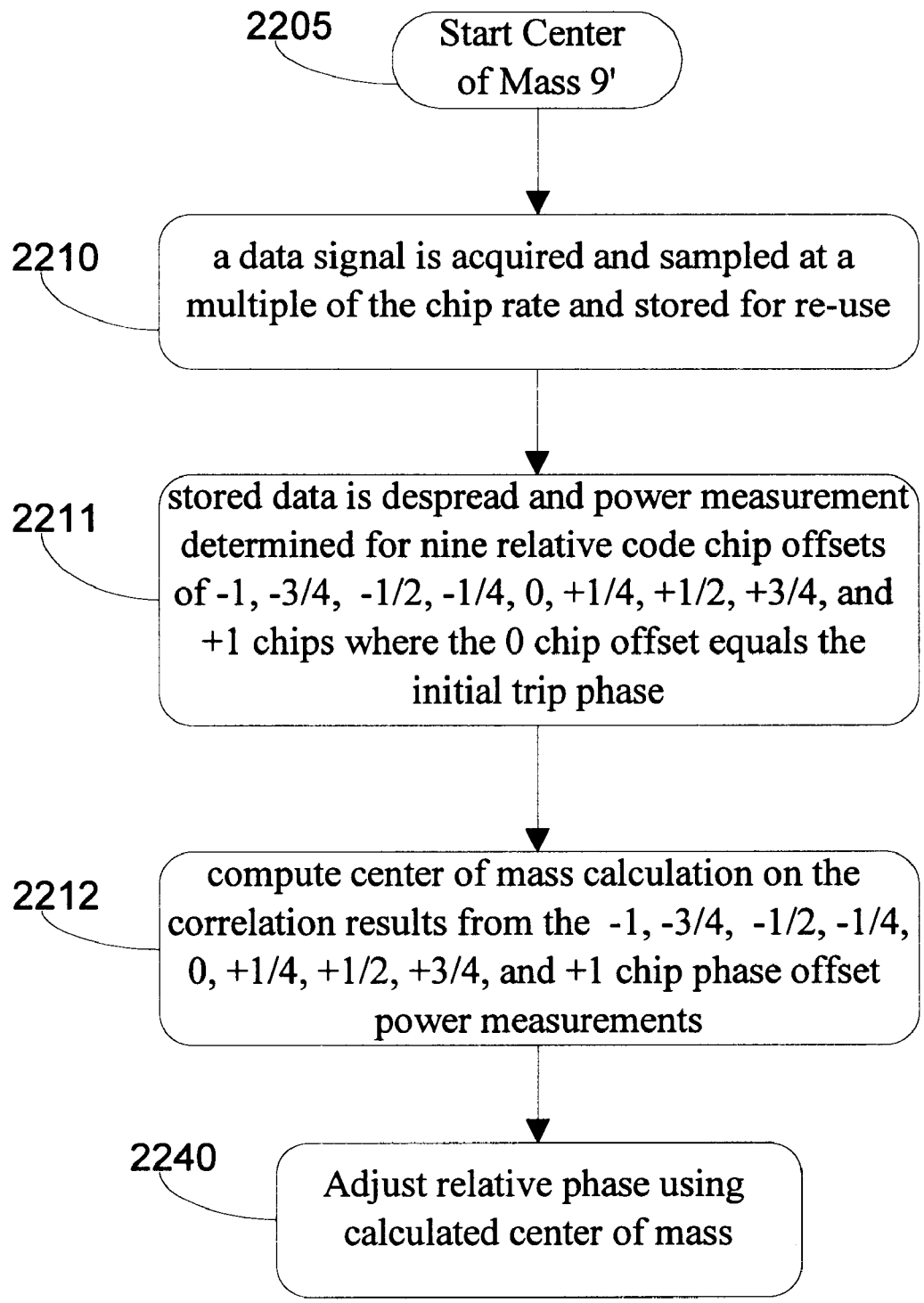
Figure 22

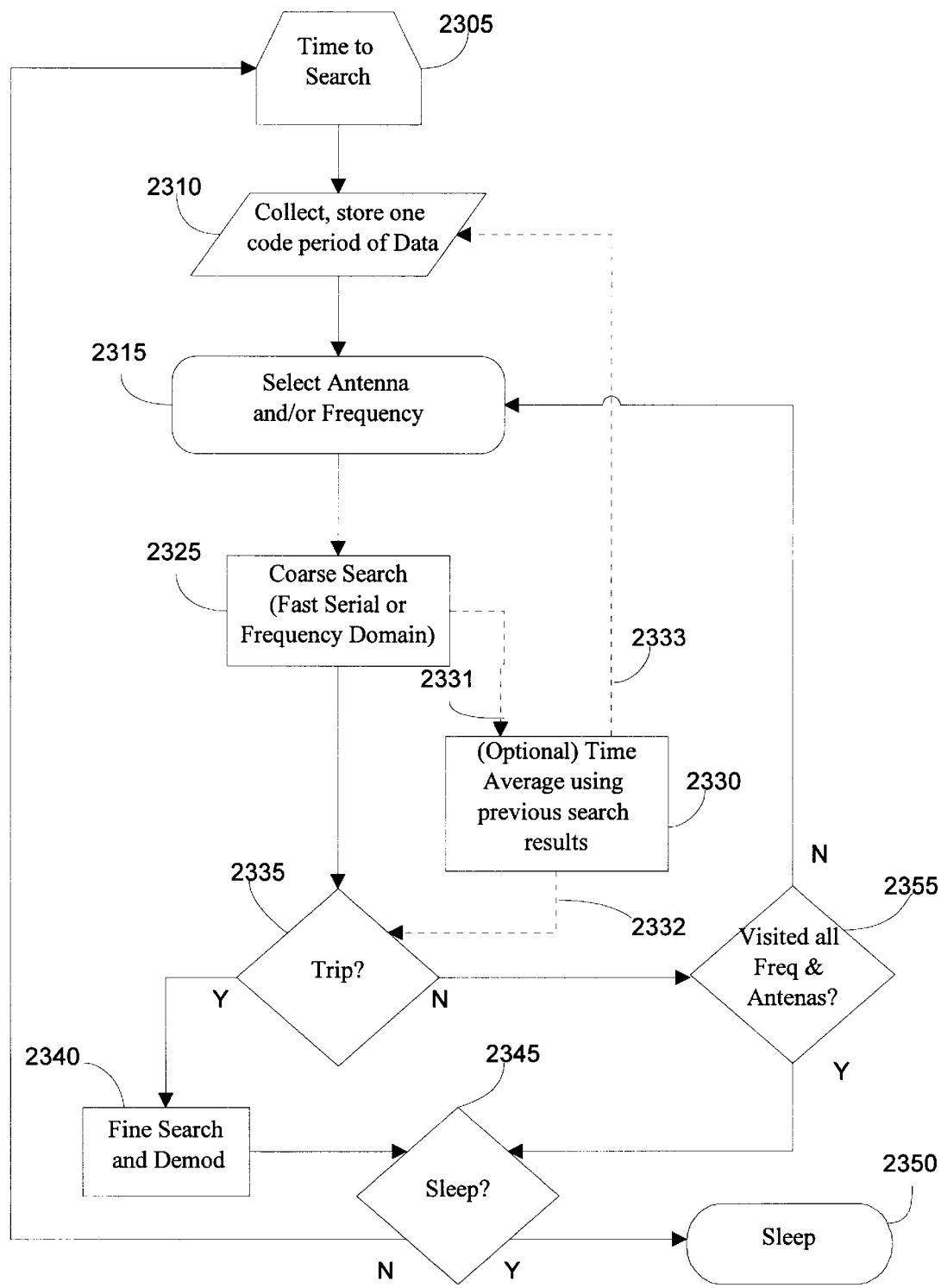
Figure 23

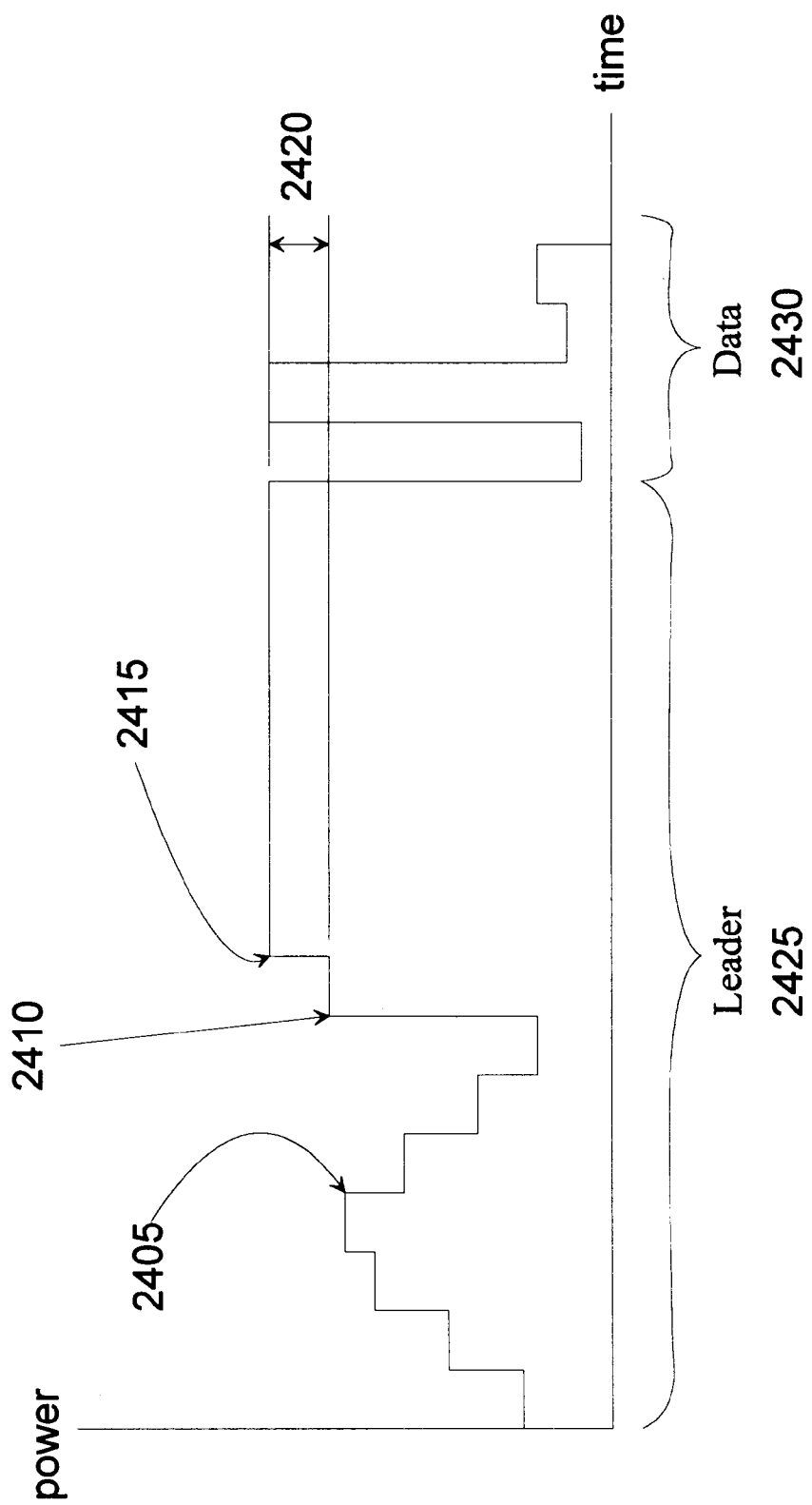
Figure 24

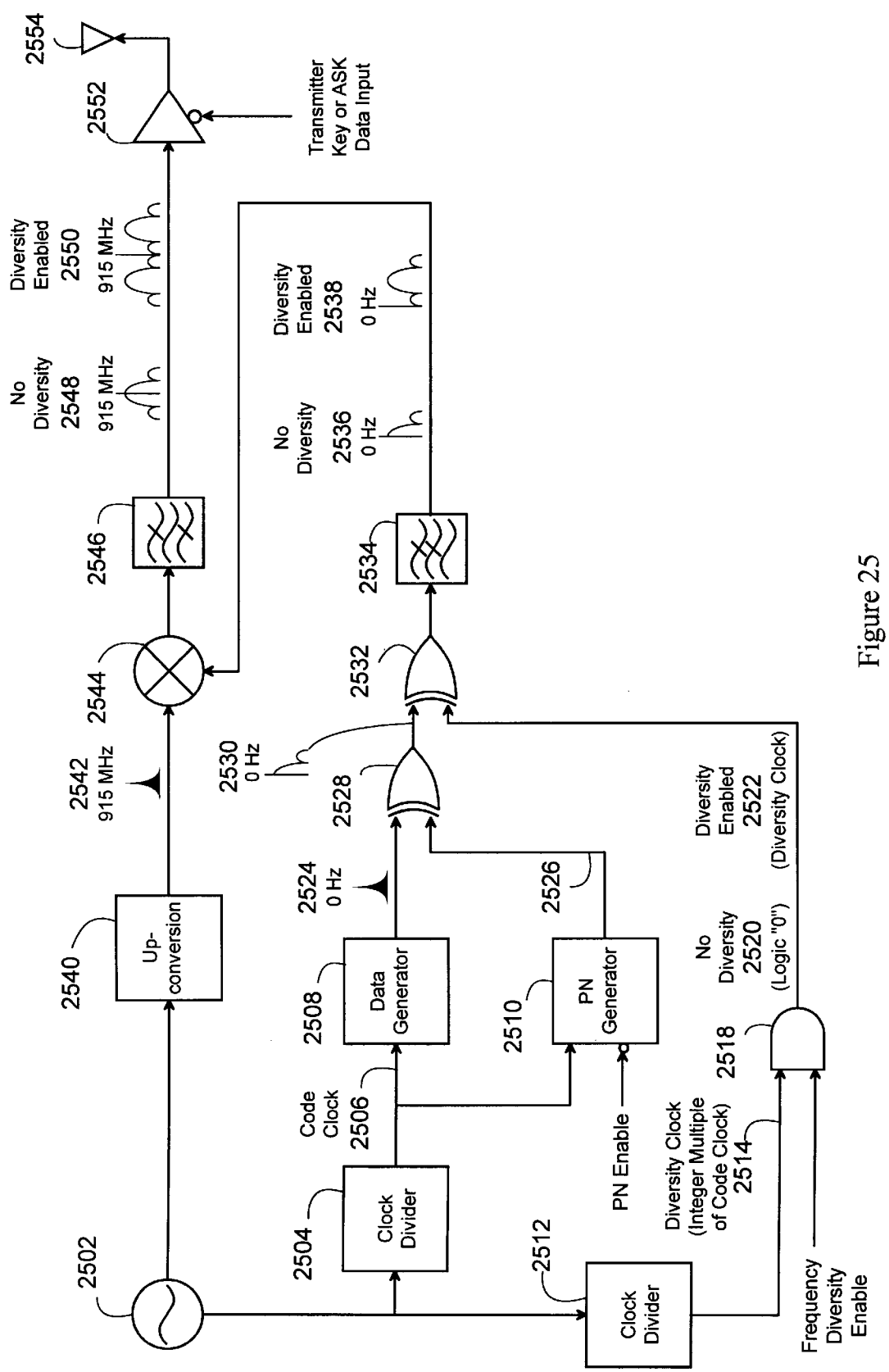
Figure 25

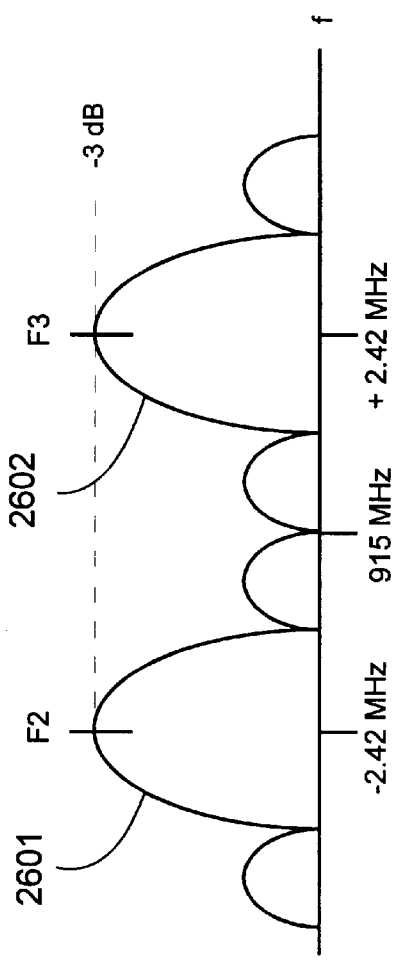
Figure 26B
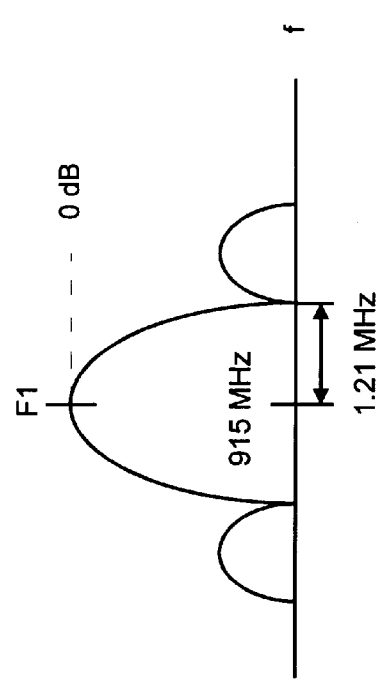
Figure 26A

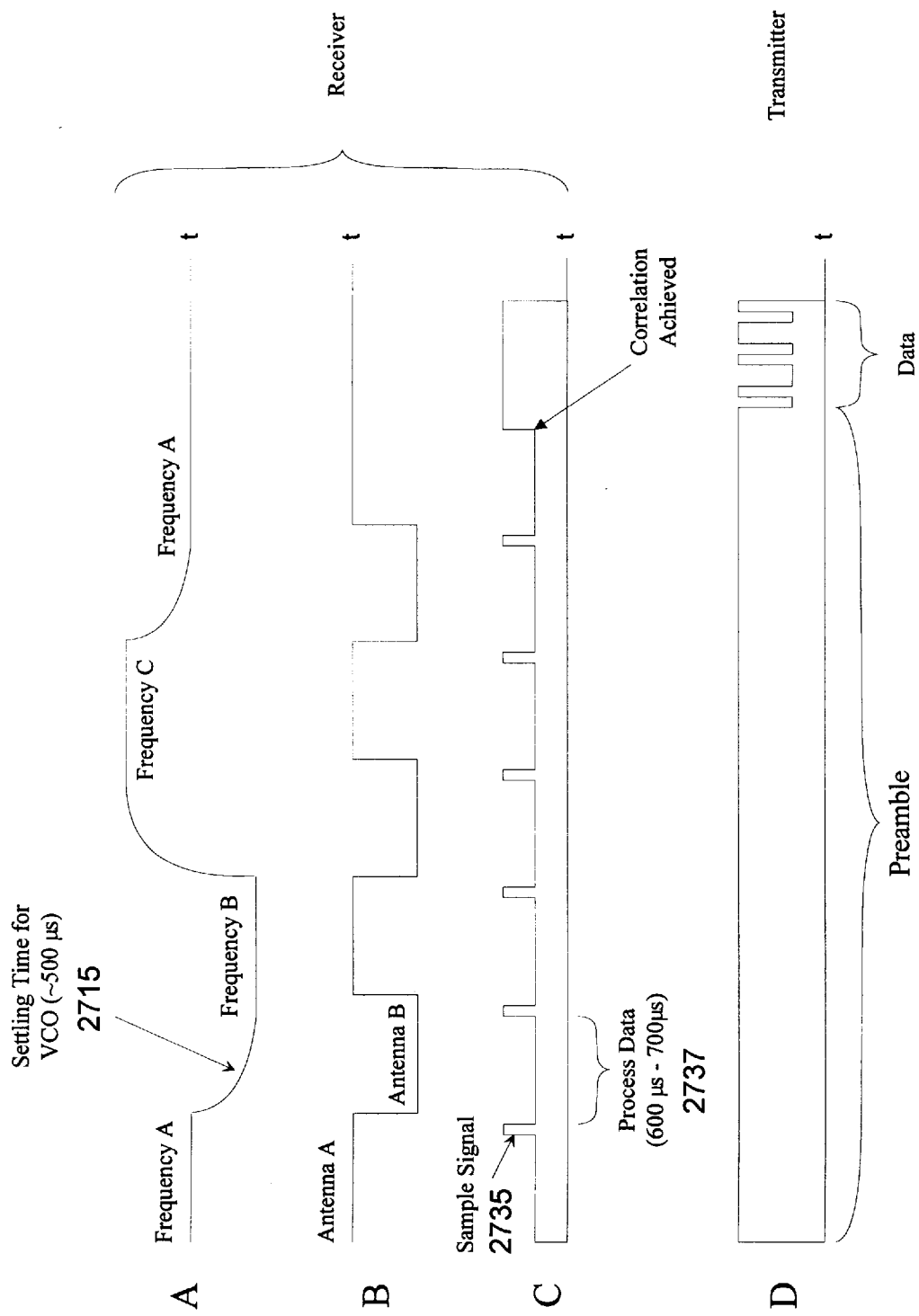
Figure 27

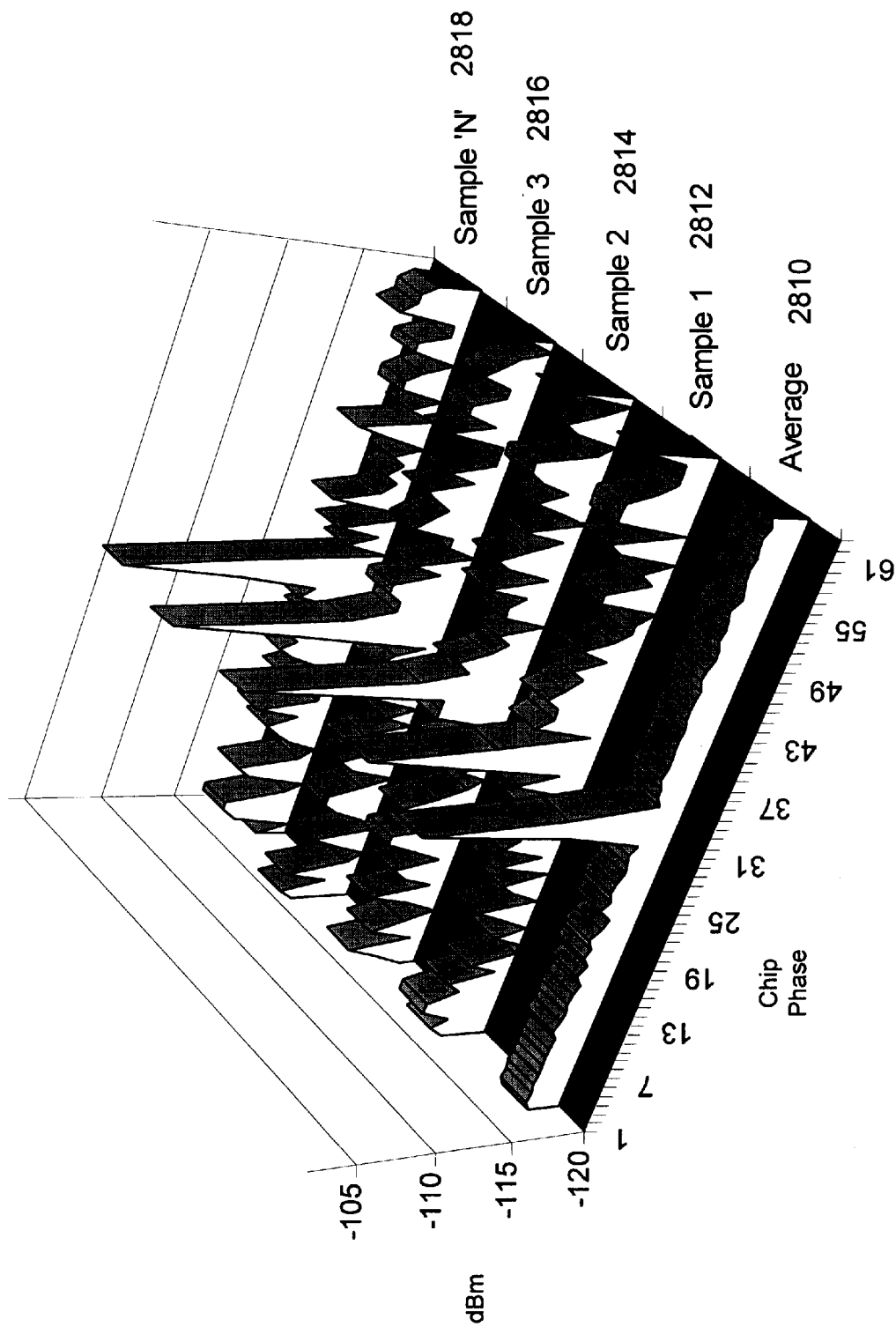
Figure 28

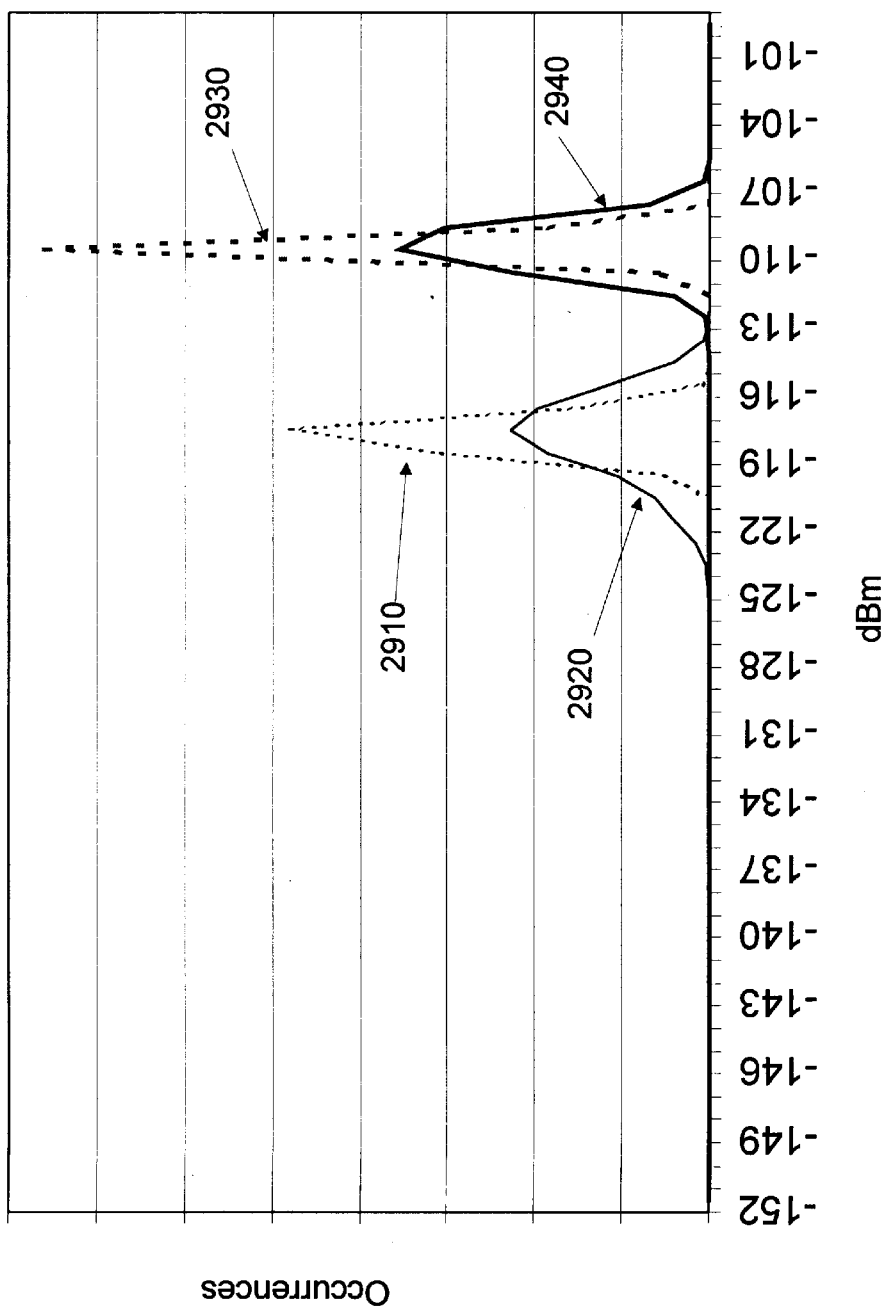
Figure 29

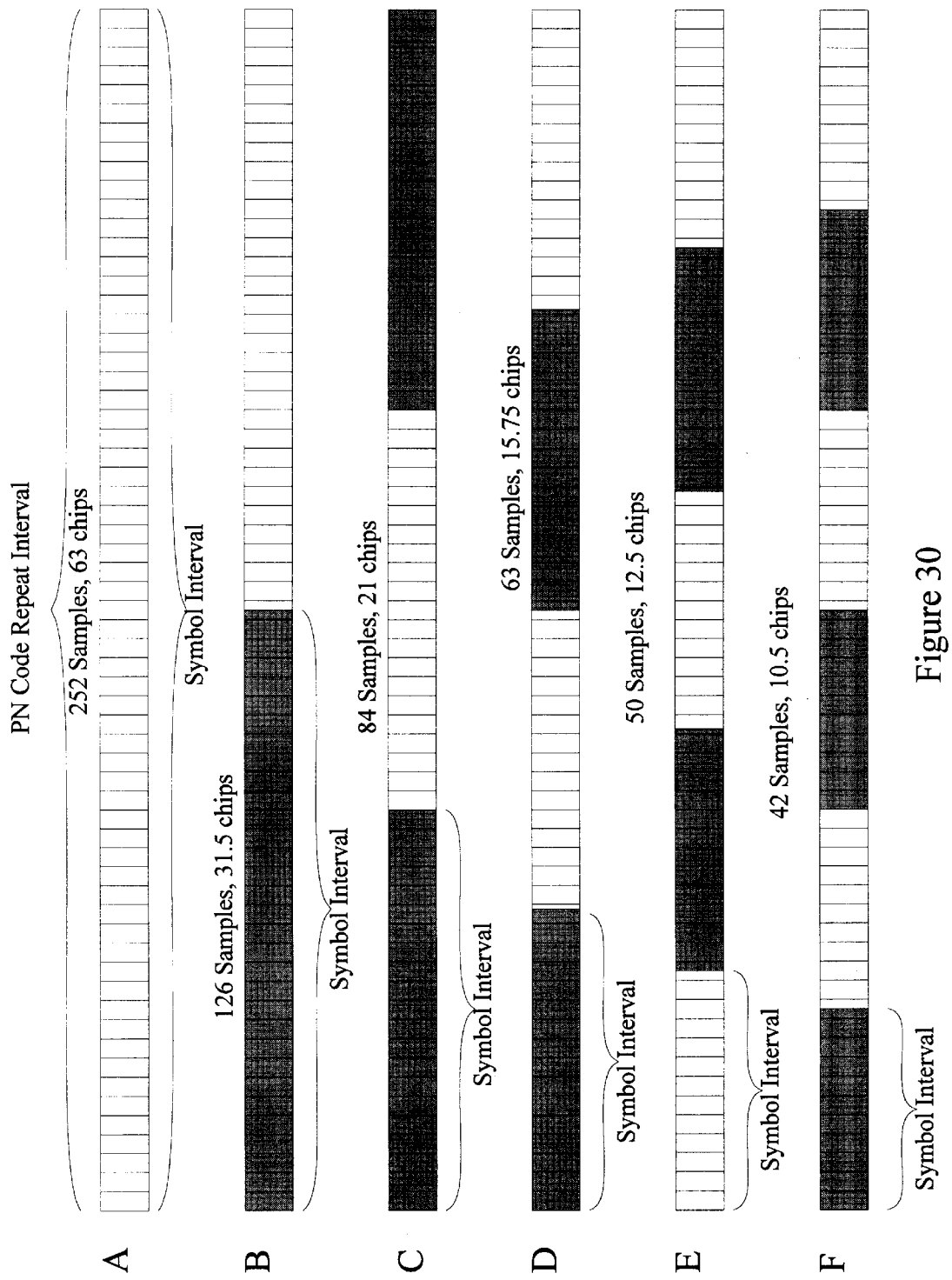
Figure 30

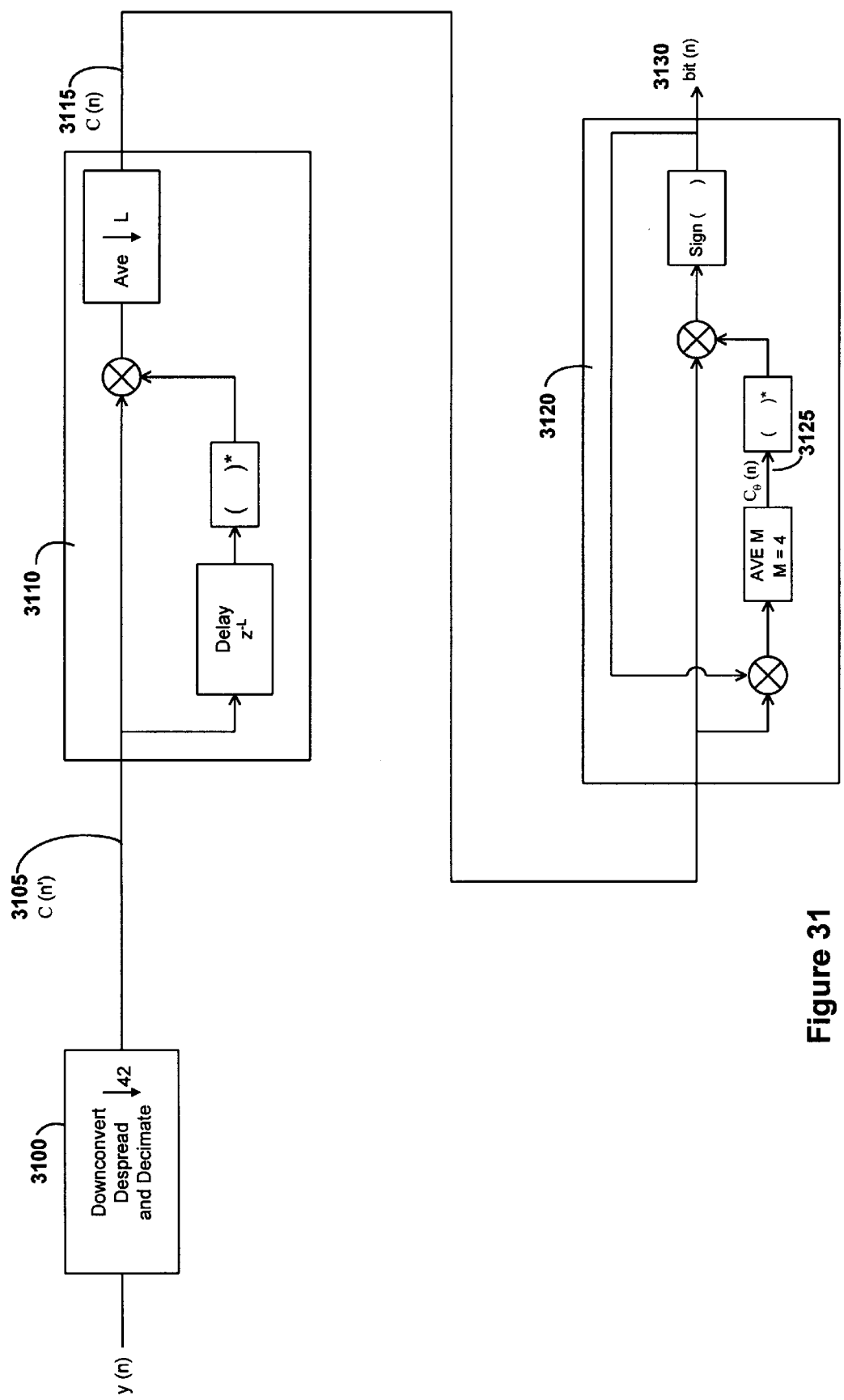
Figure 31

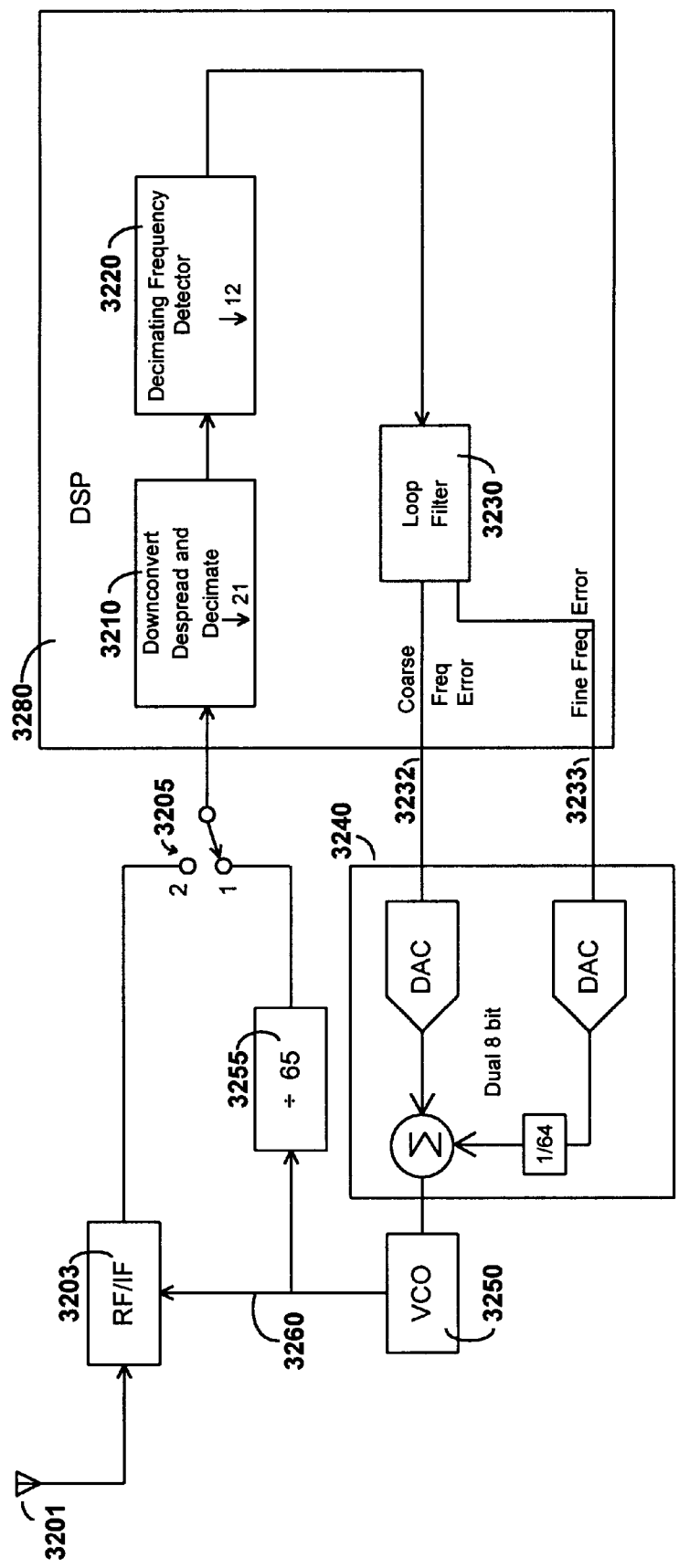
Figure 32

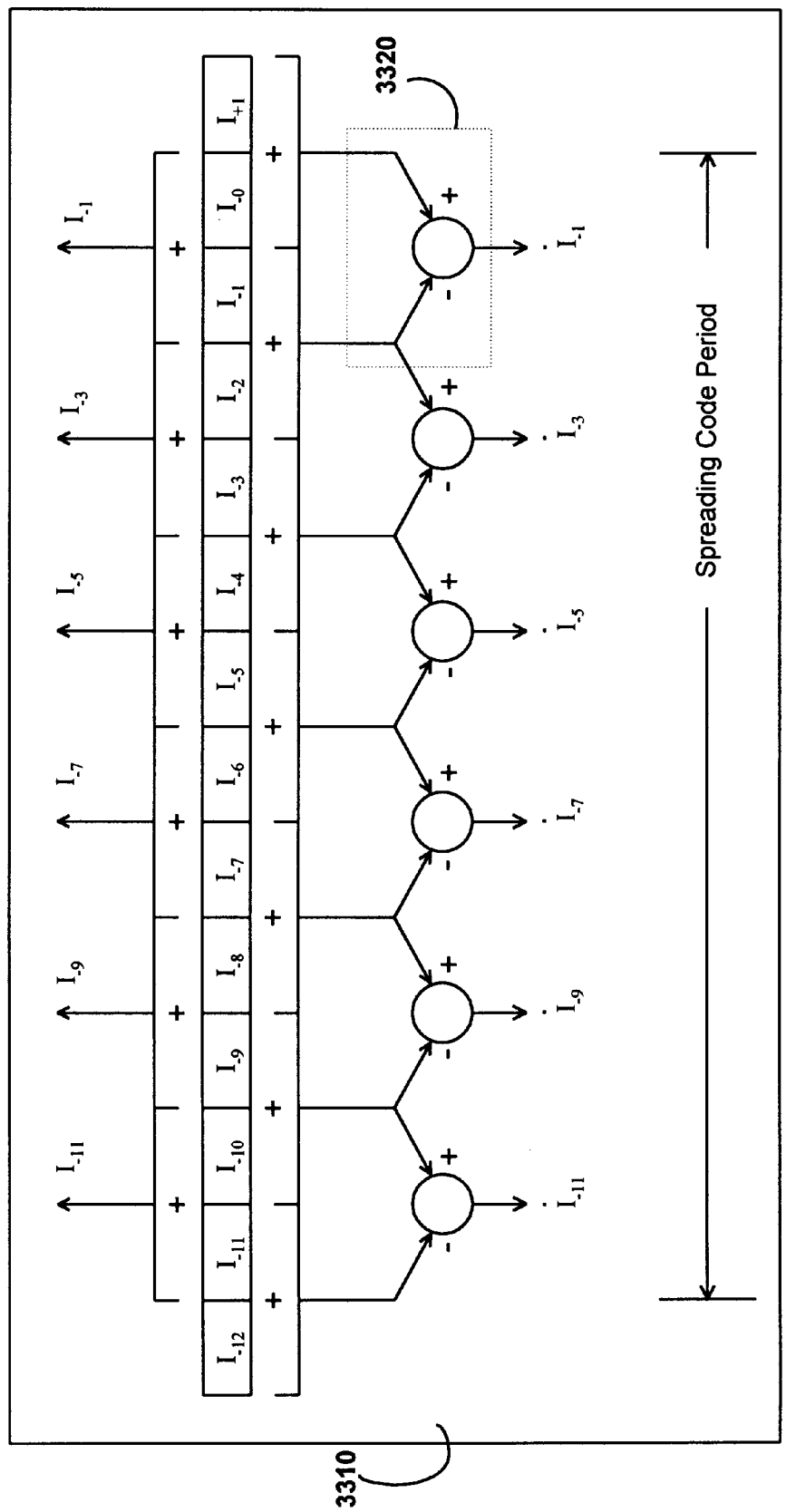
Figure 33

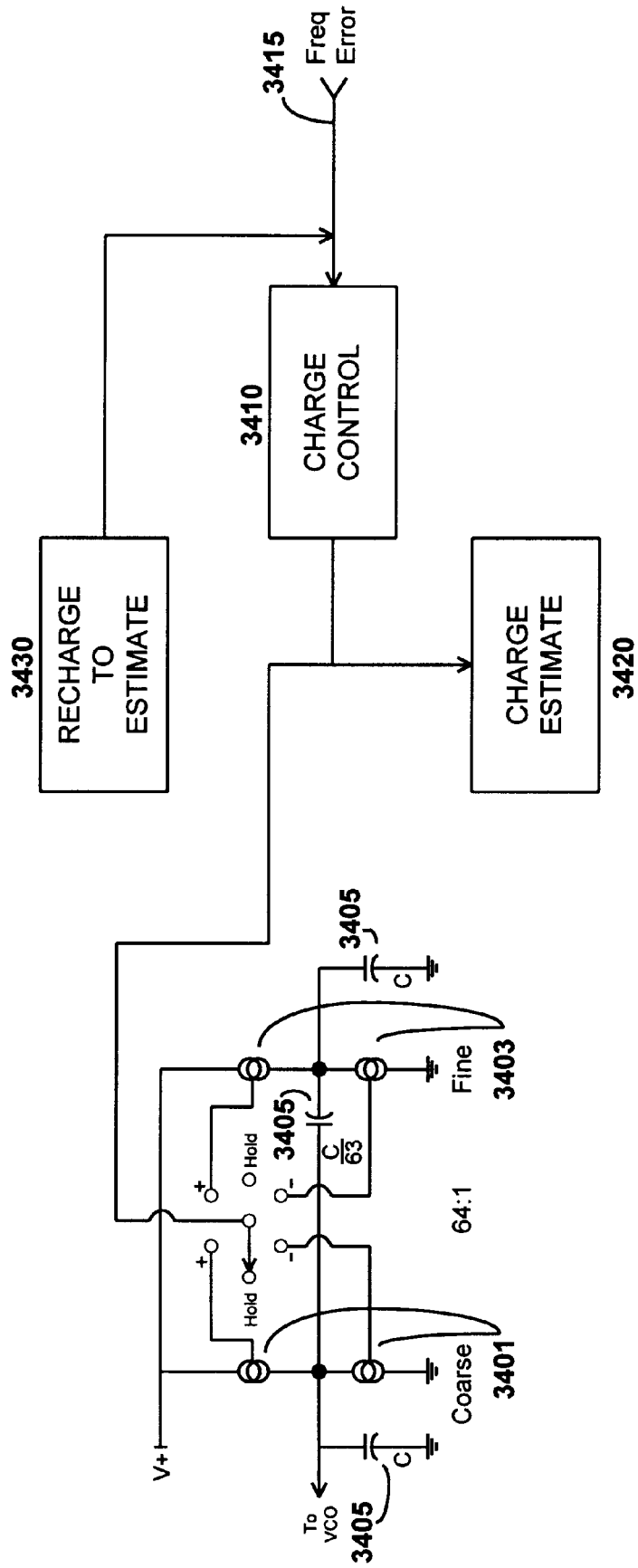
Figure 34

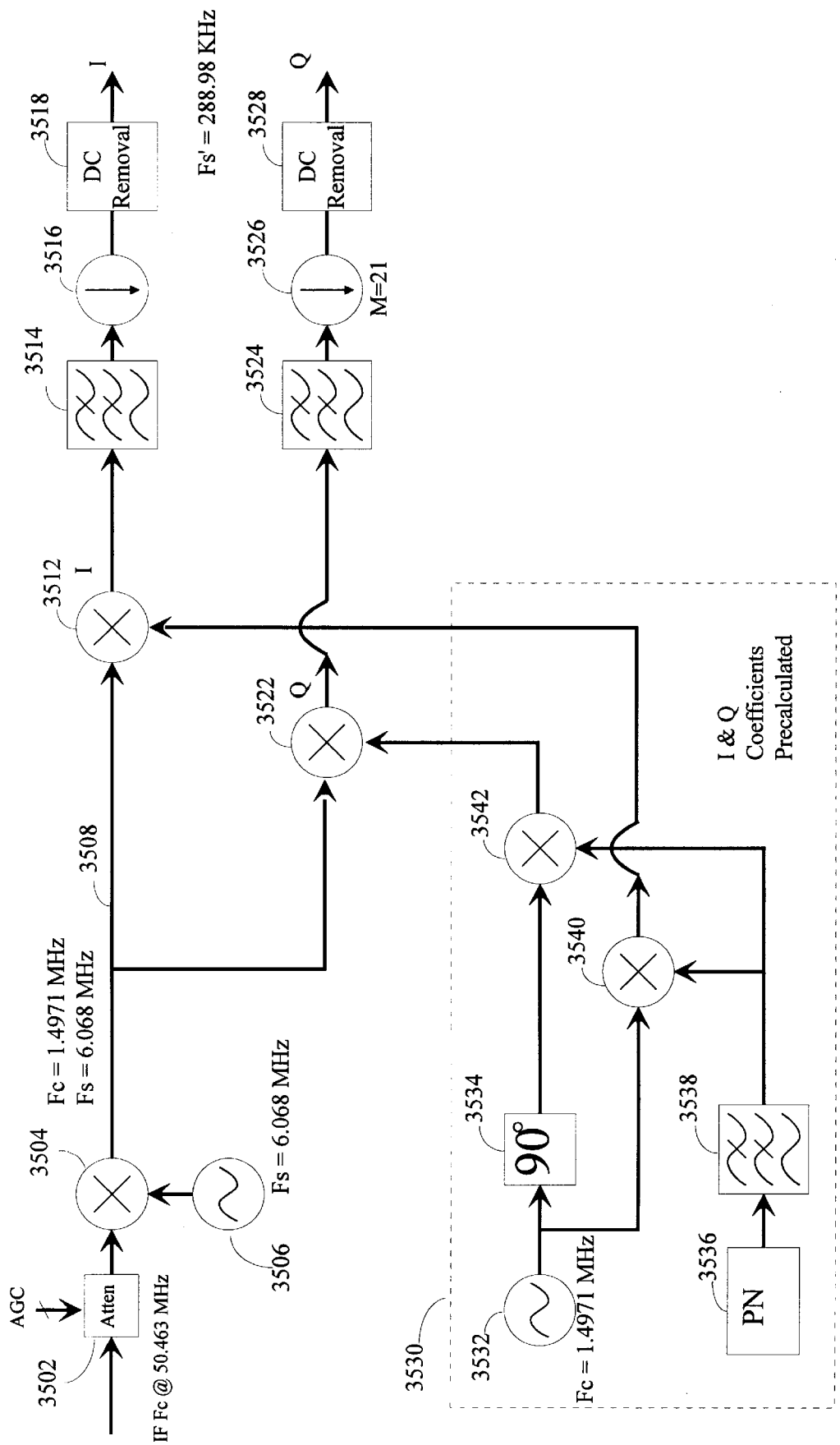
Figure 35

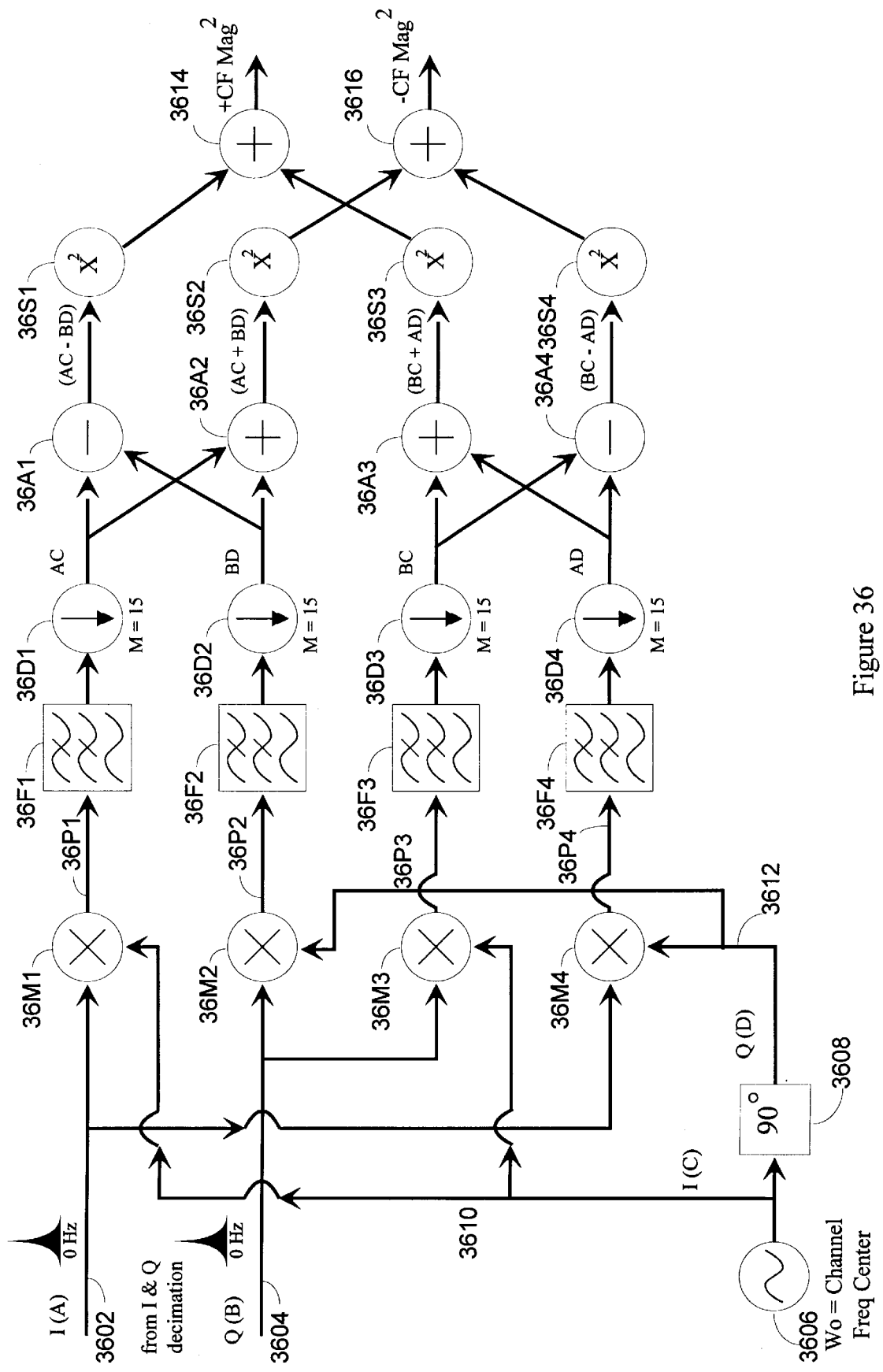
Figure 36

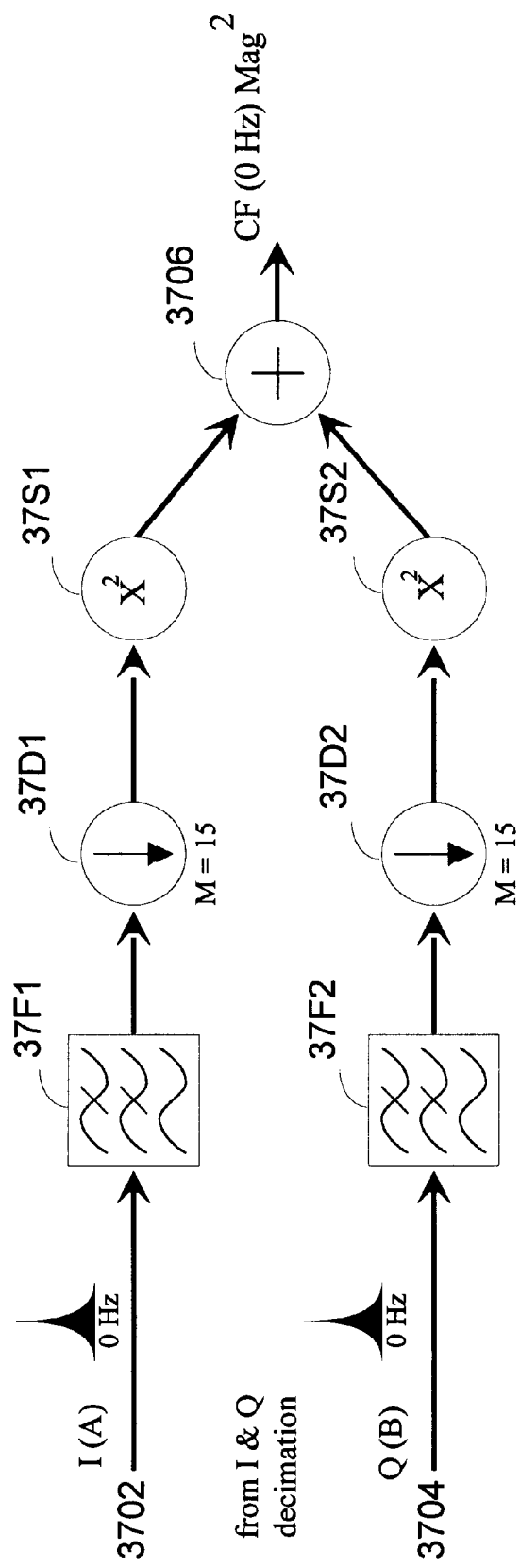
Figure 37

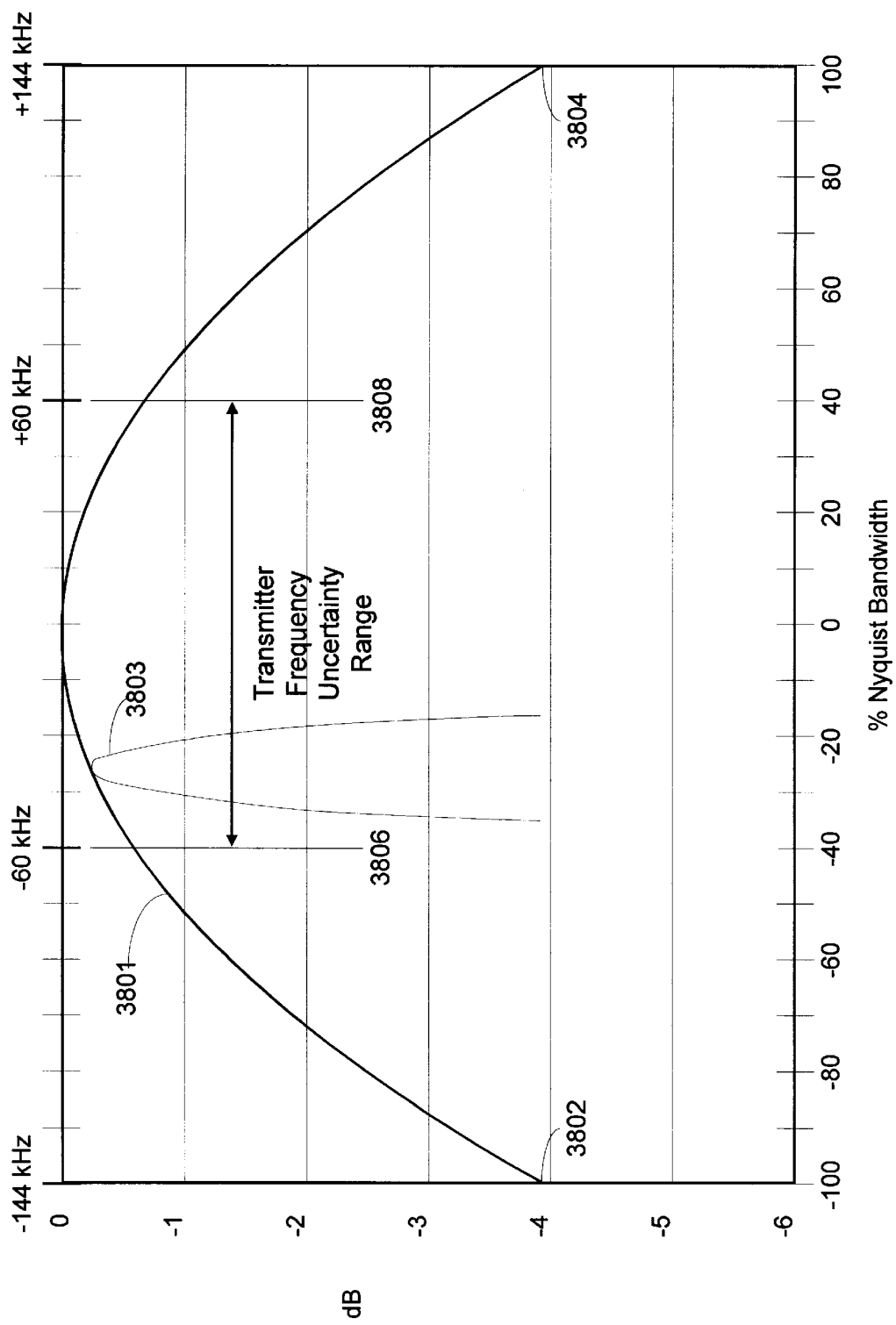
Figure 38

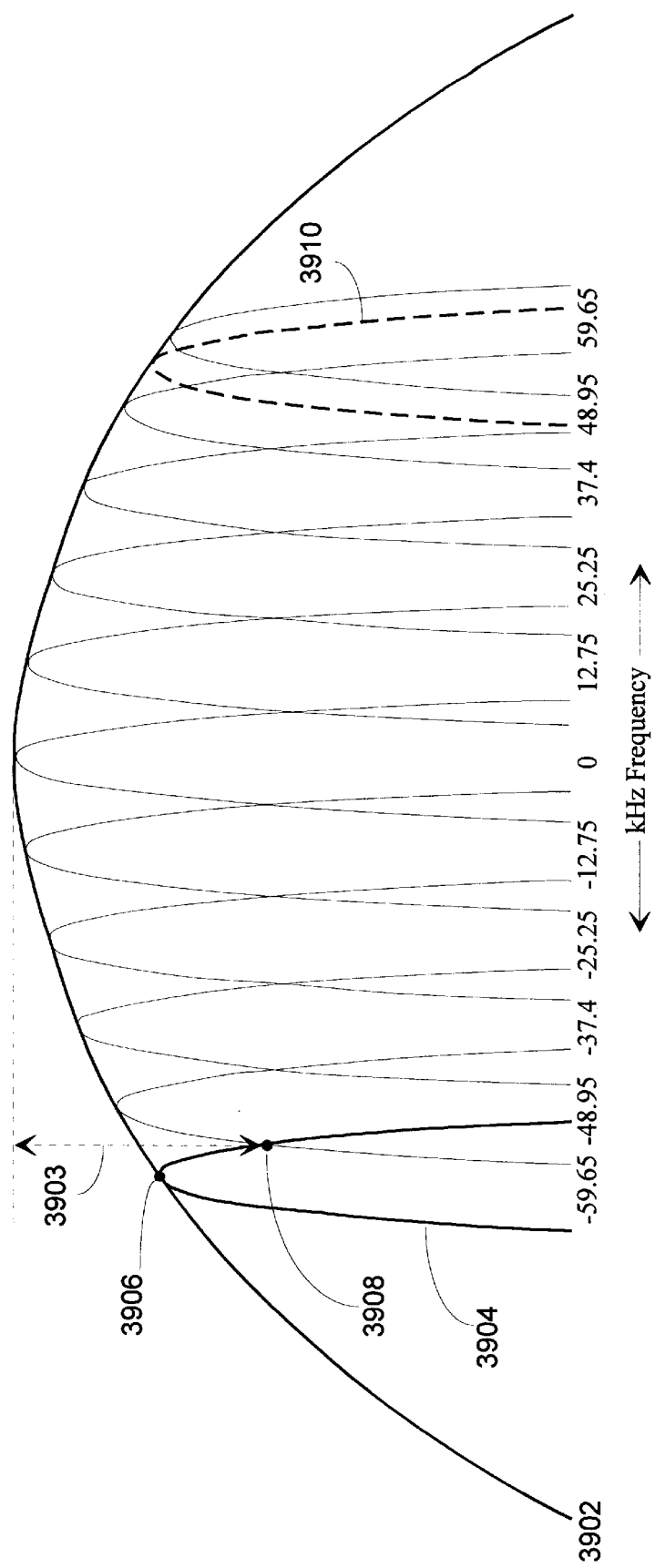
Figure 39

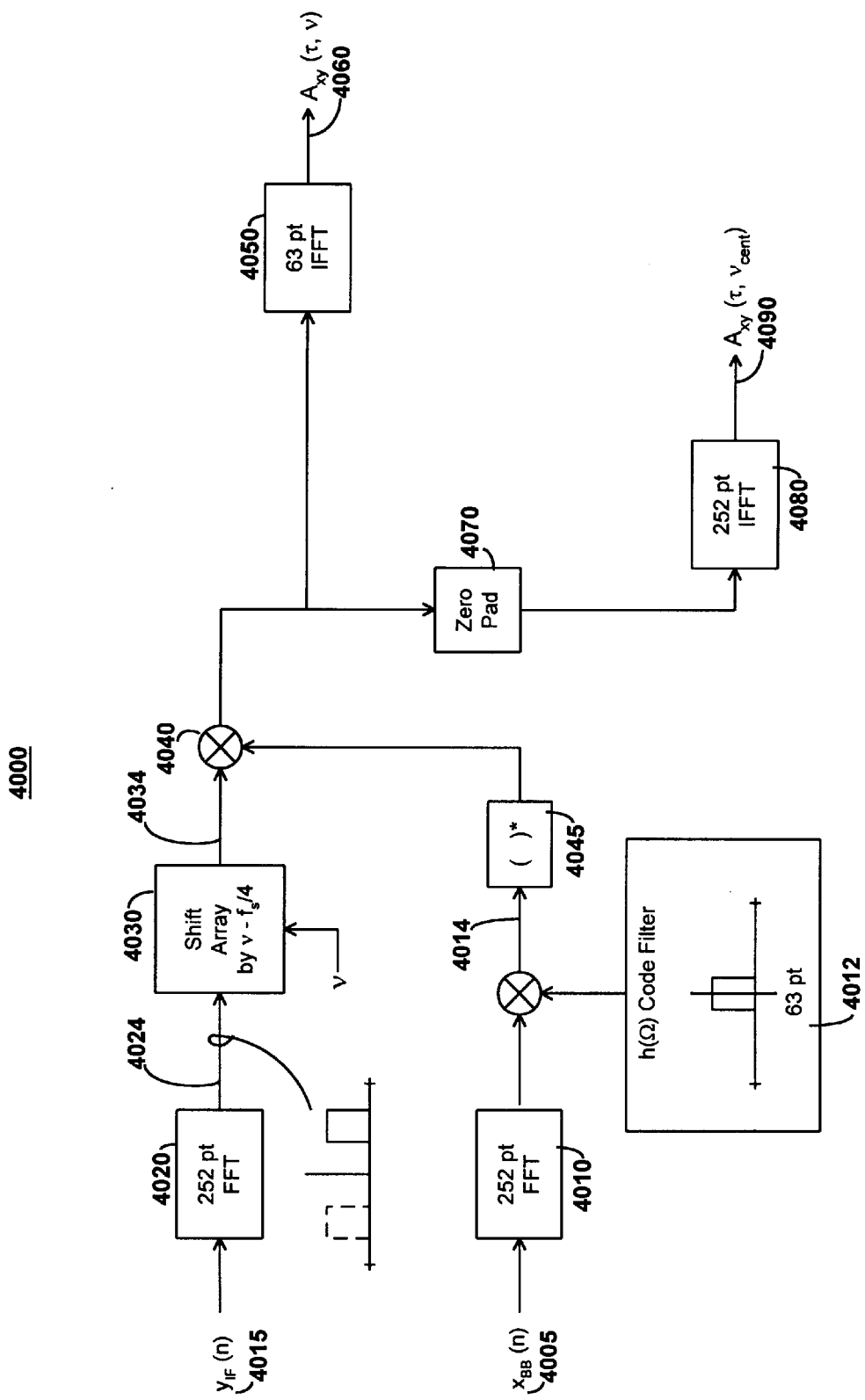
Figure 40

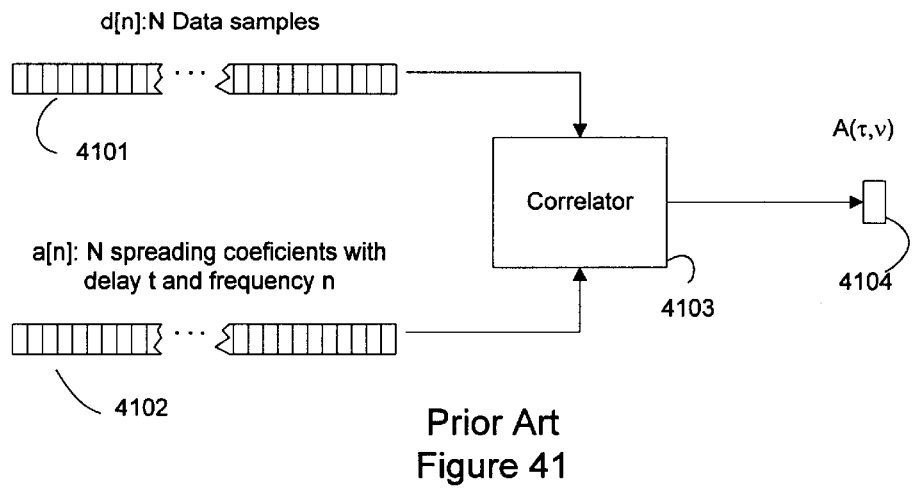
Prior Art
Figure 41
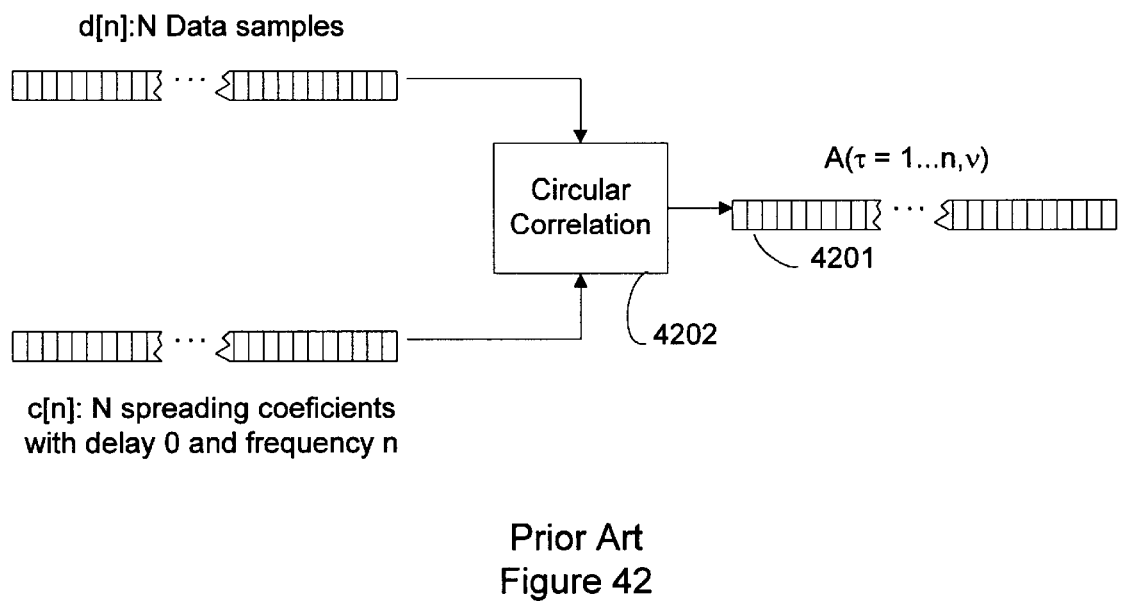
Prior Art
Figure 42

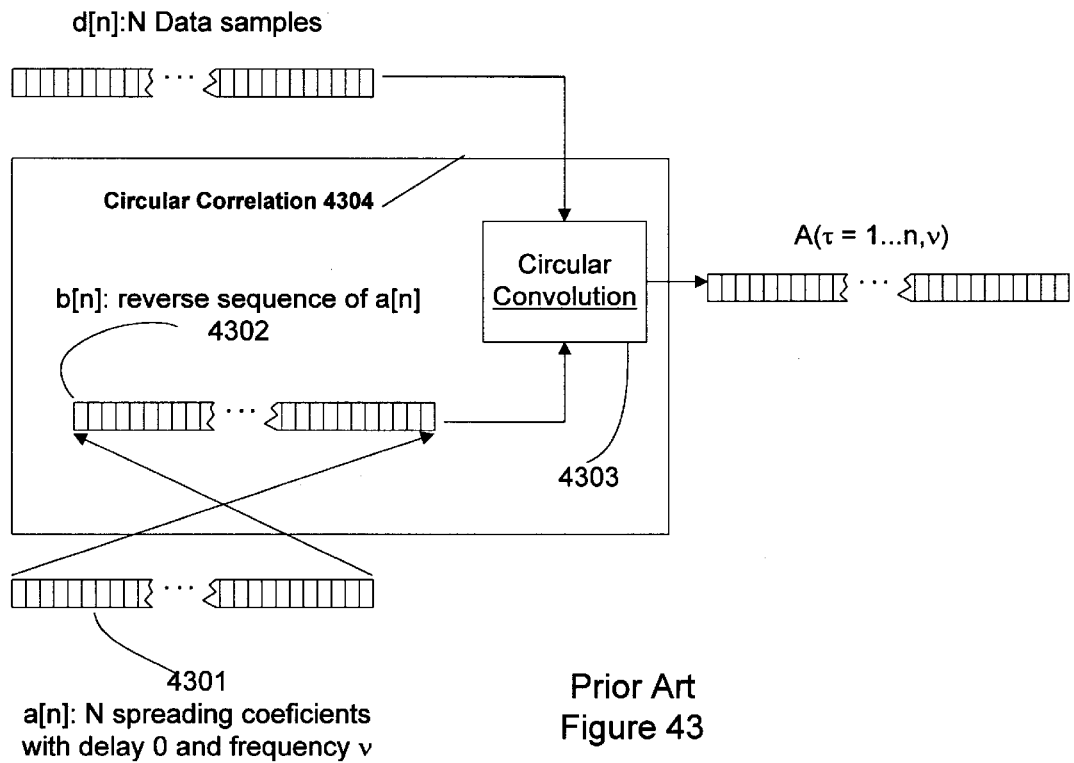
Prior Art
Figure 43
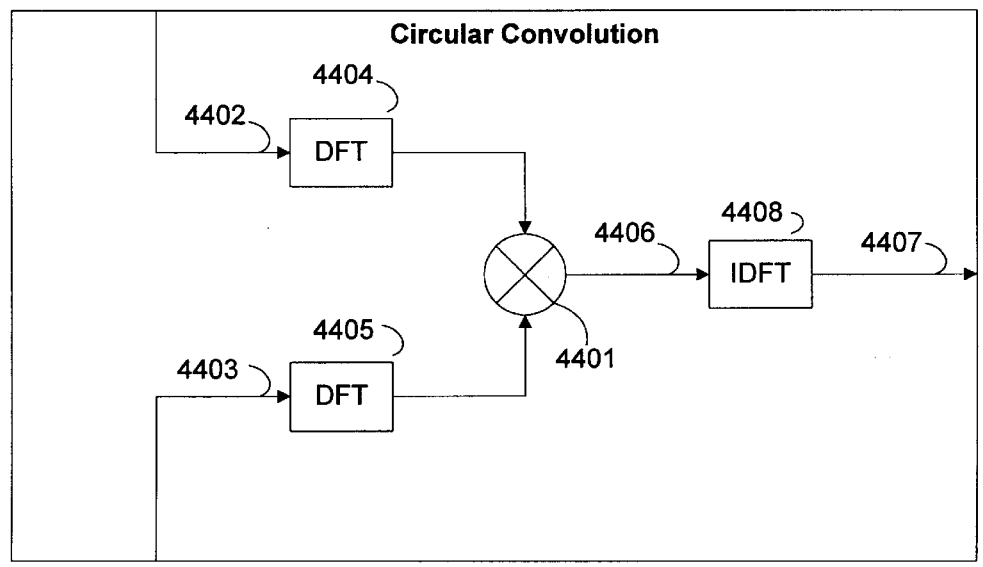
Prior Art
Figure 44

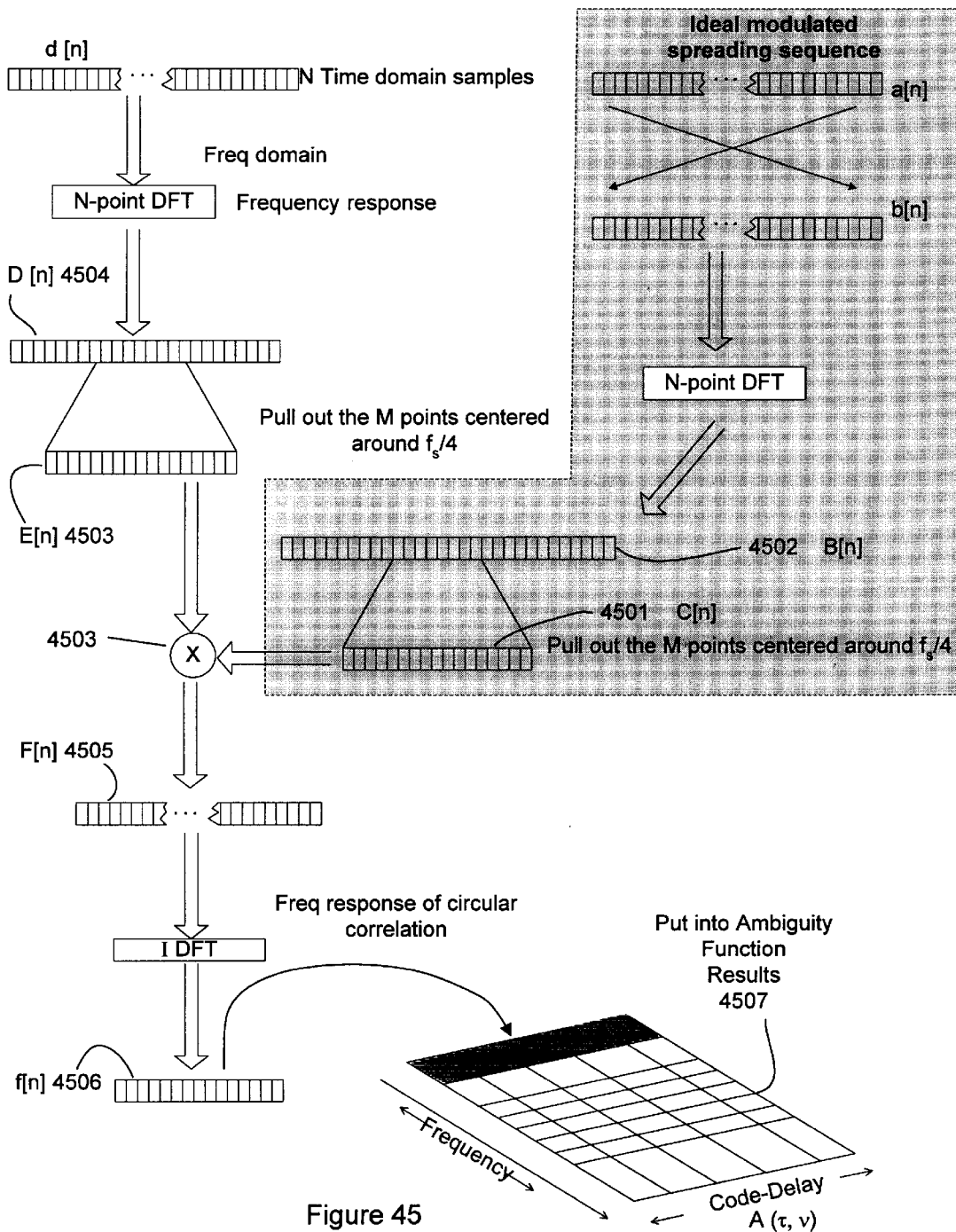
Figure 45

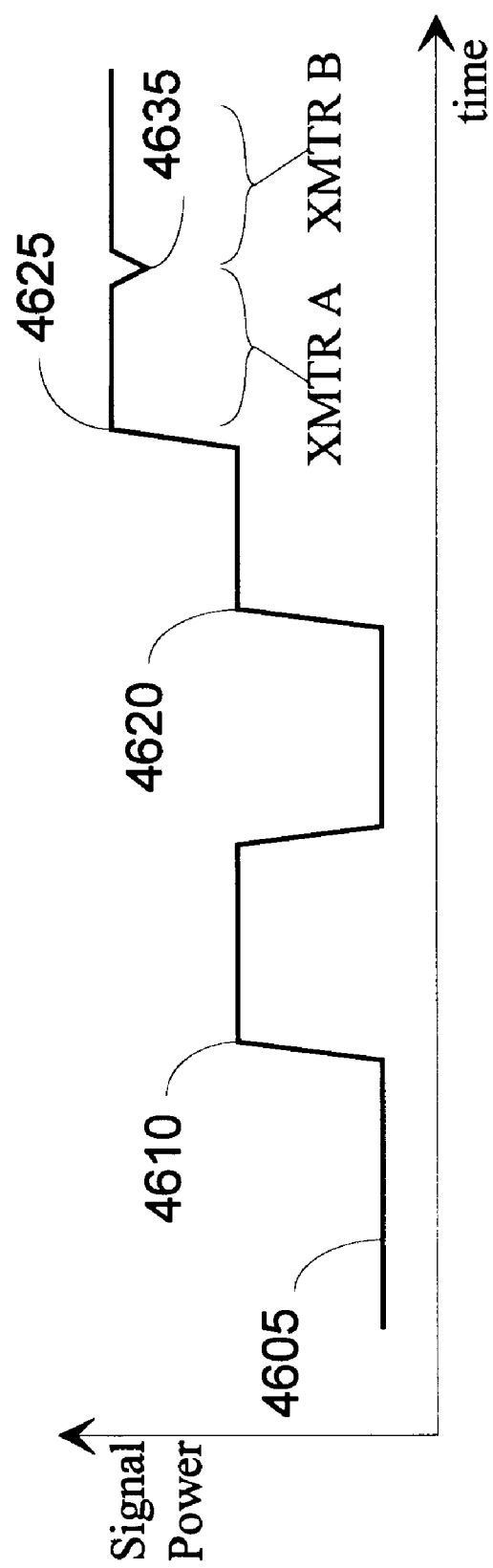
Figure 46

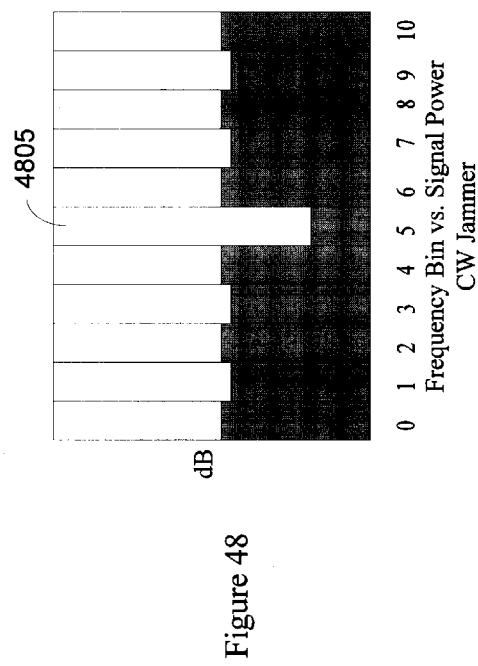
Figure 47
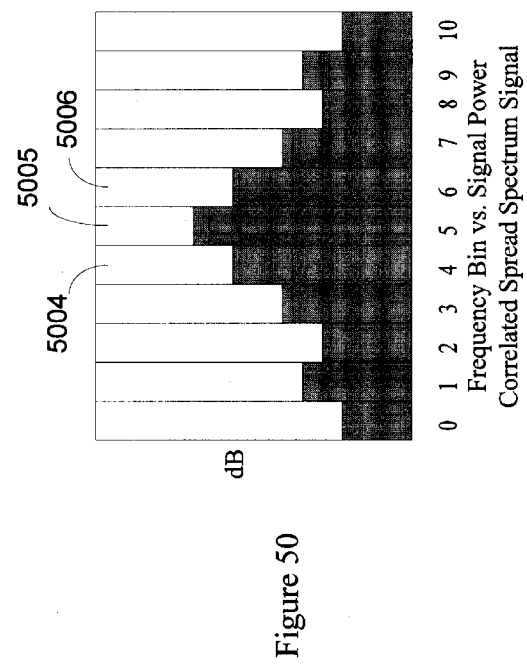
Figure 48
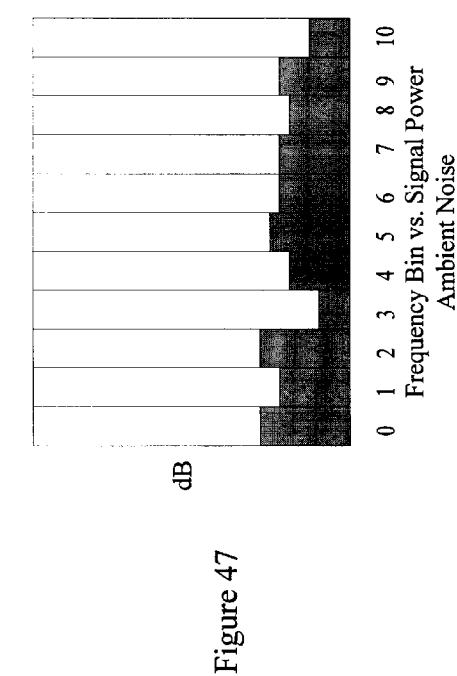
Figure 49
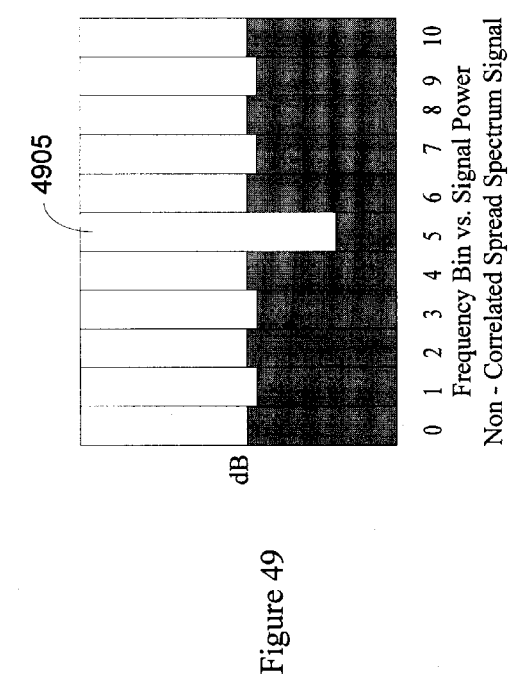
Figure 50

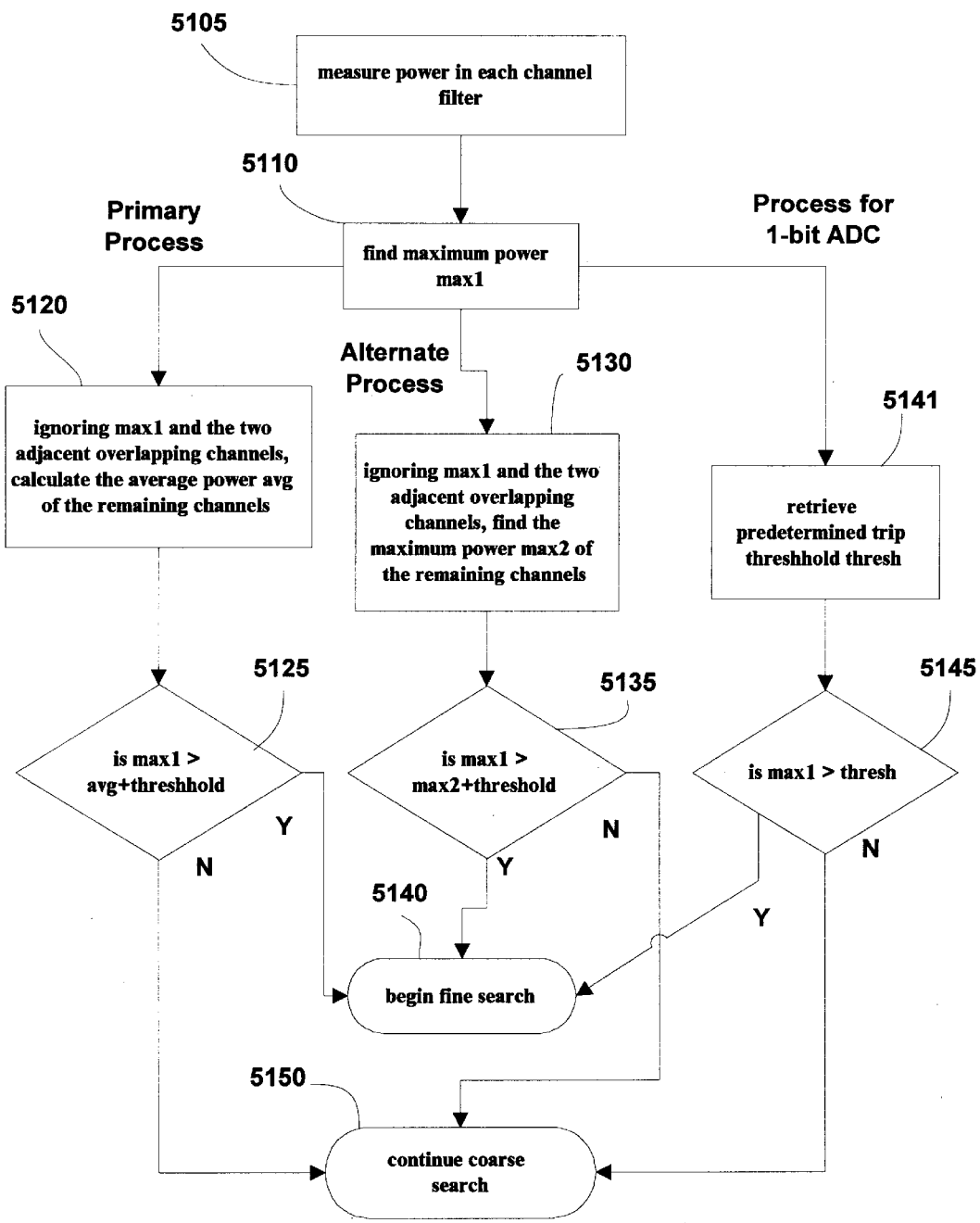
Figure 51

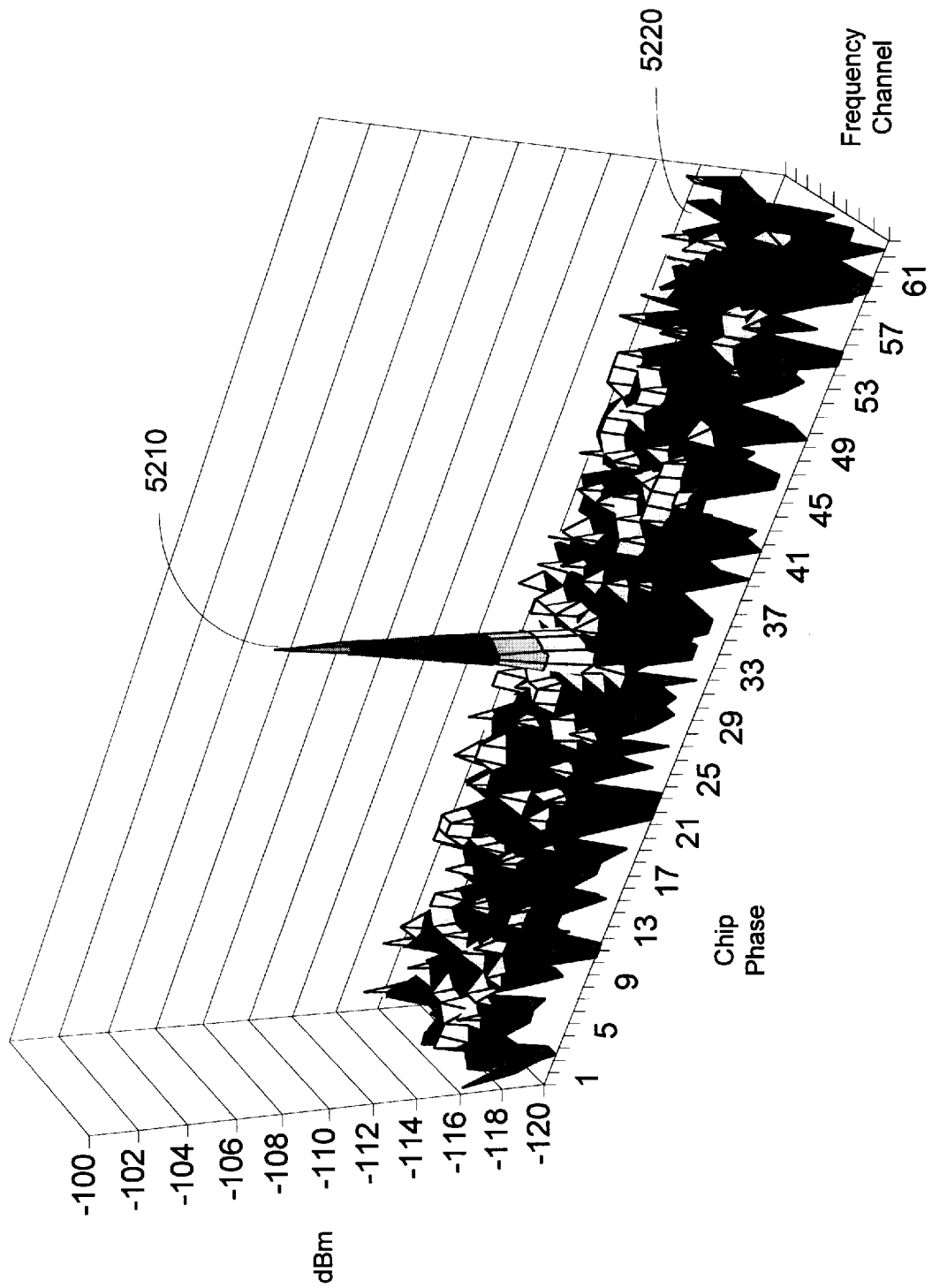
Figure 52

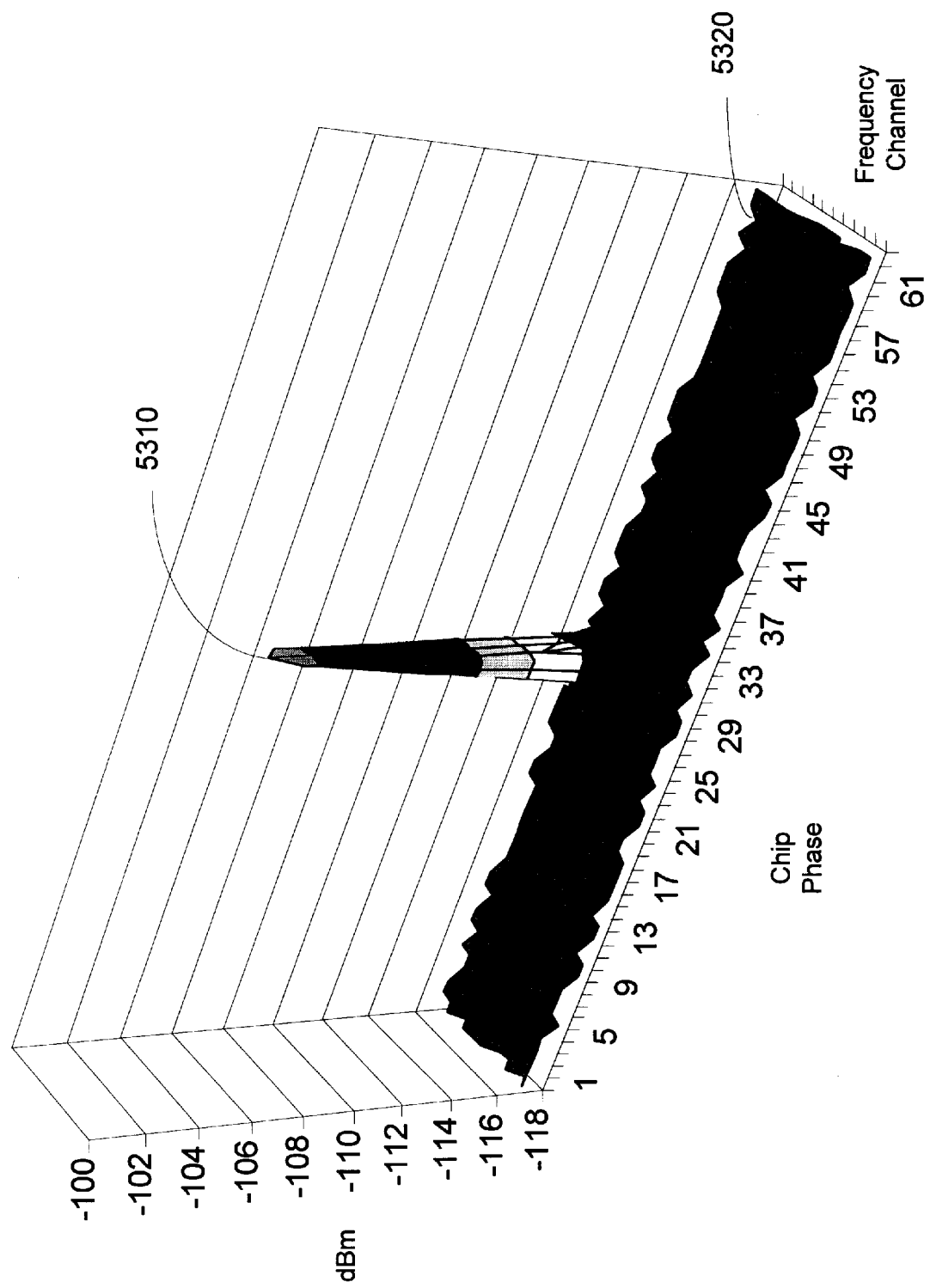
Figure 53

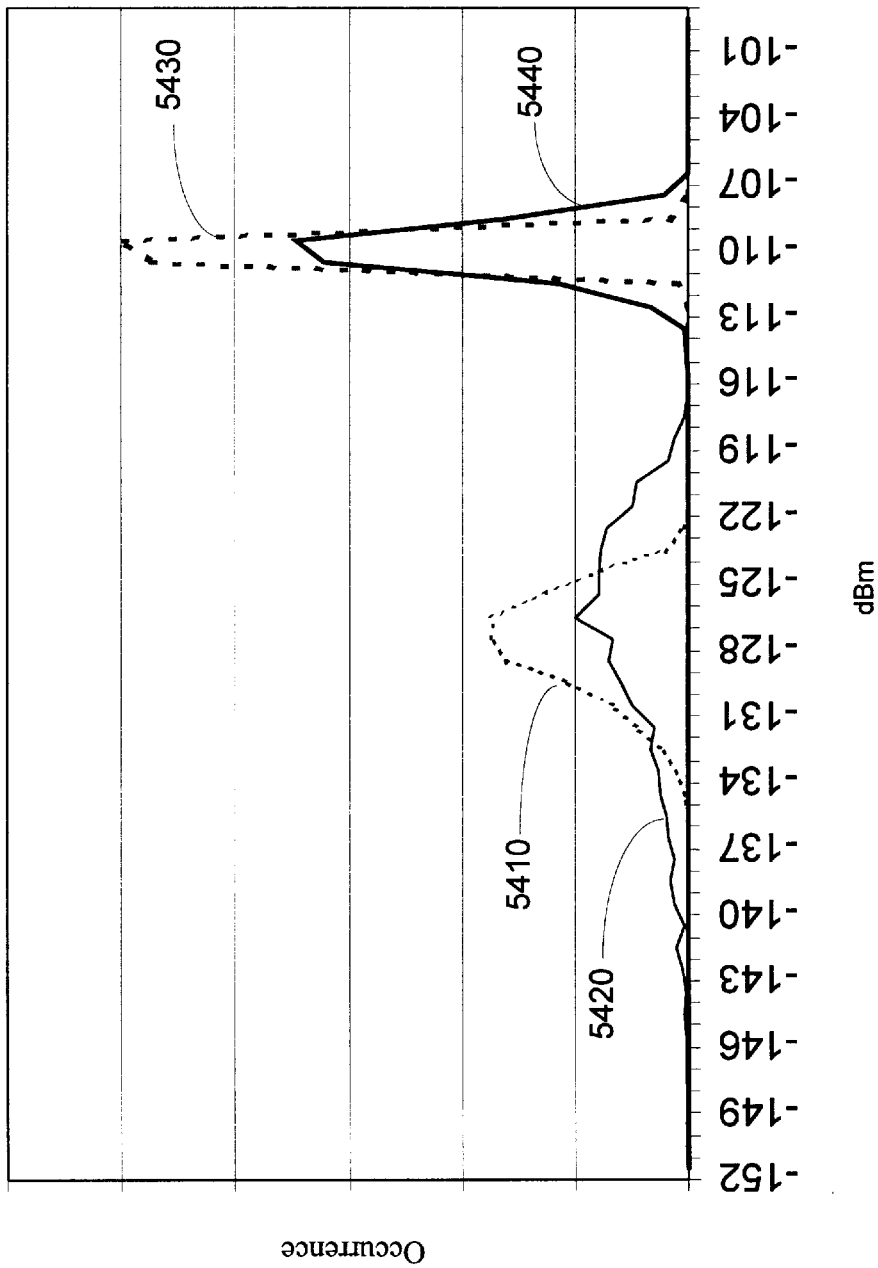
Figure 54

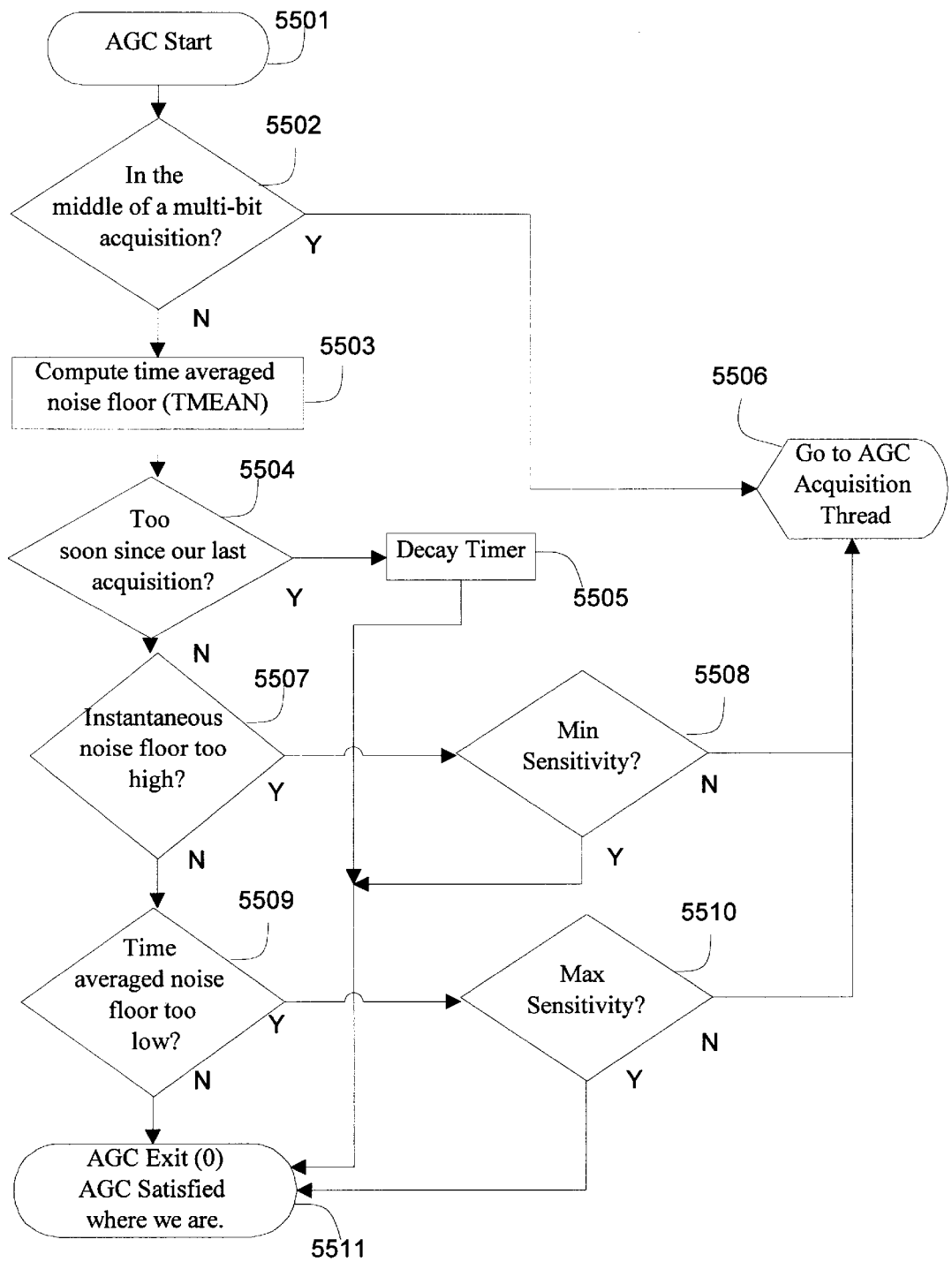
Figure 55

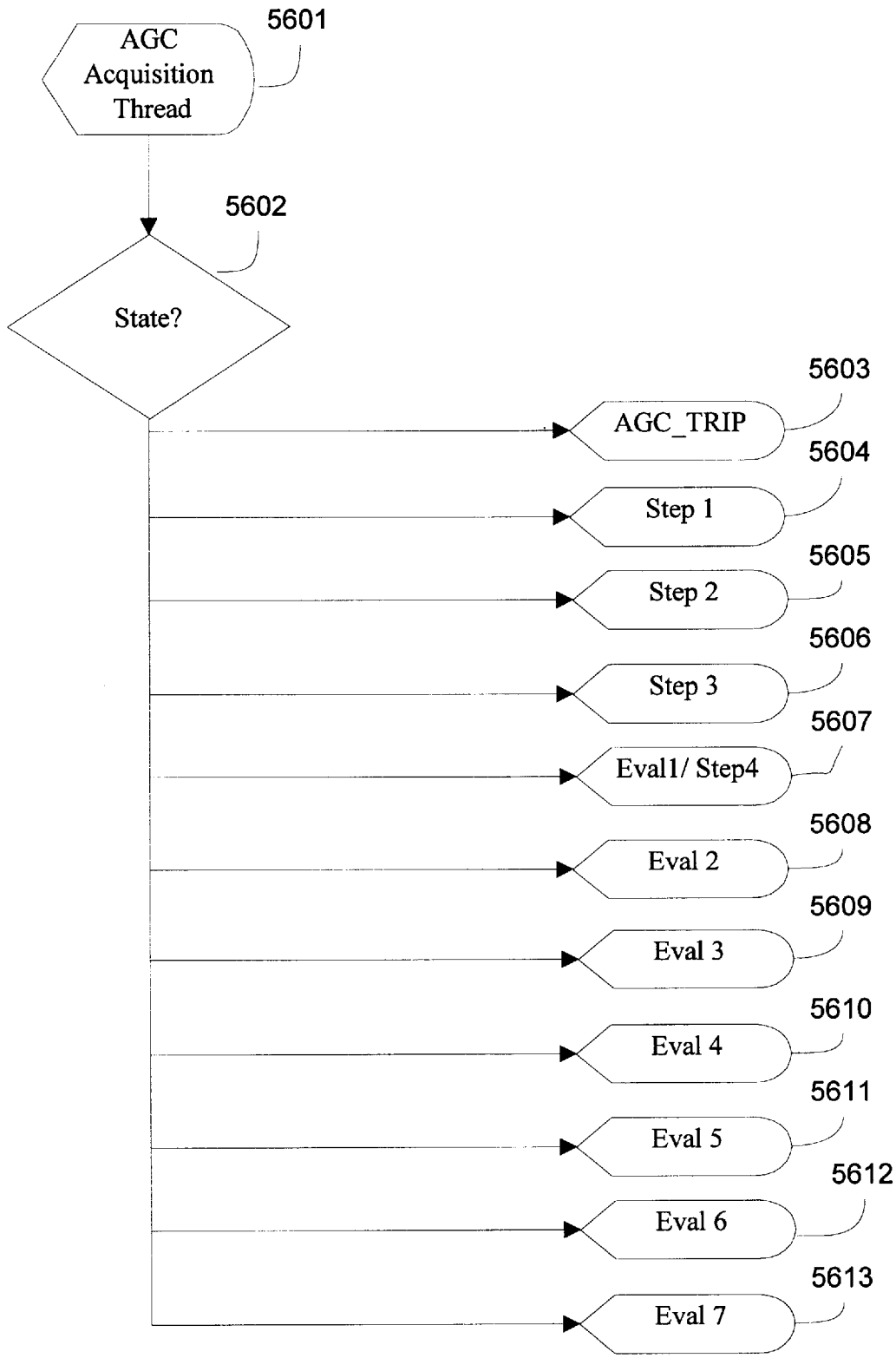
Figure 56

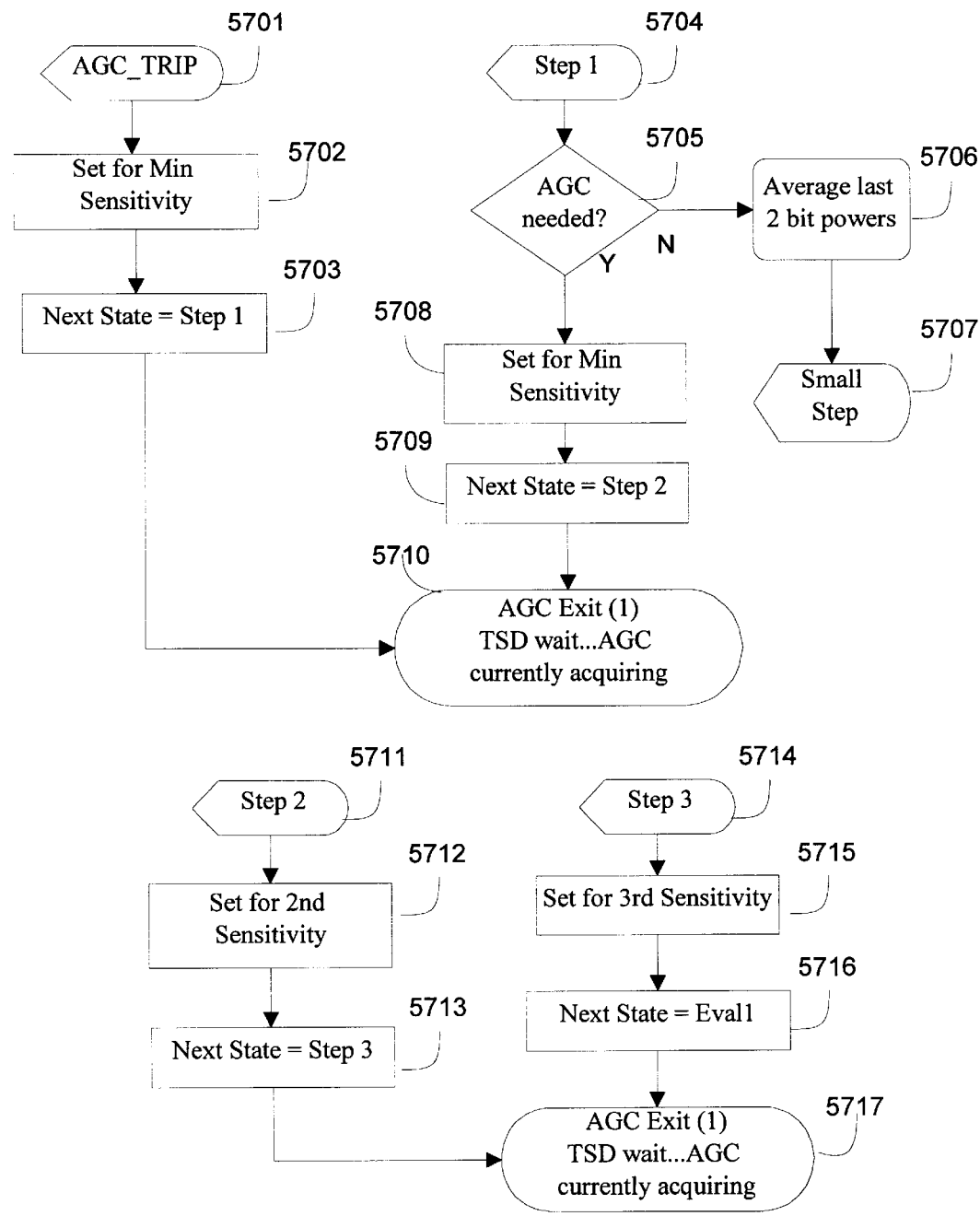
Figure 57

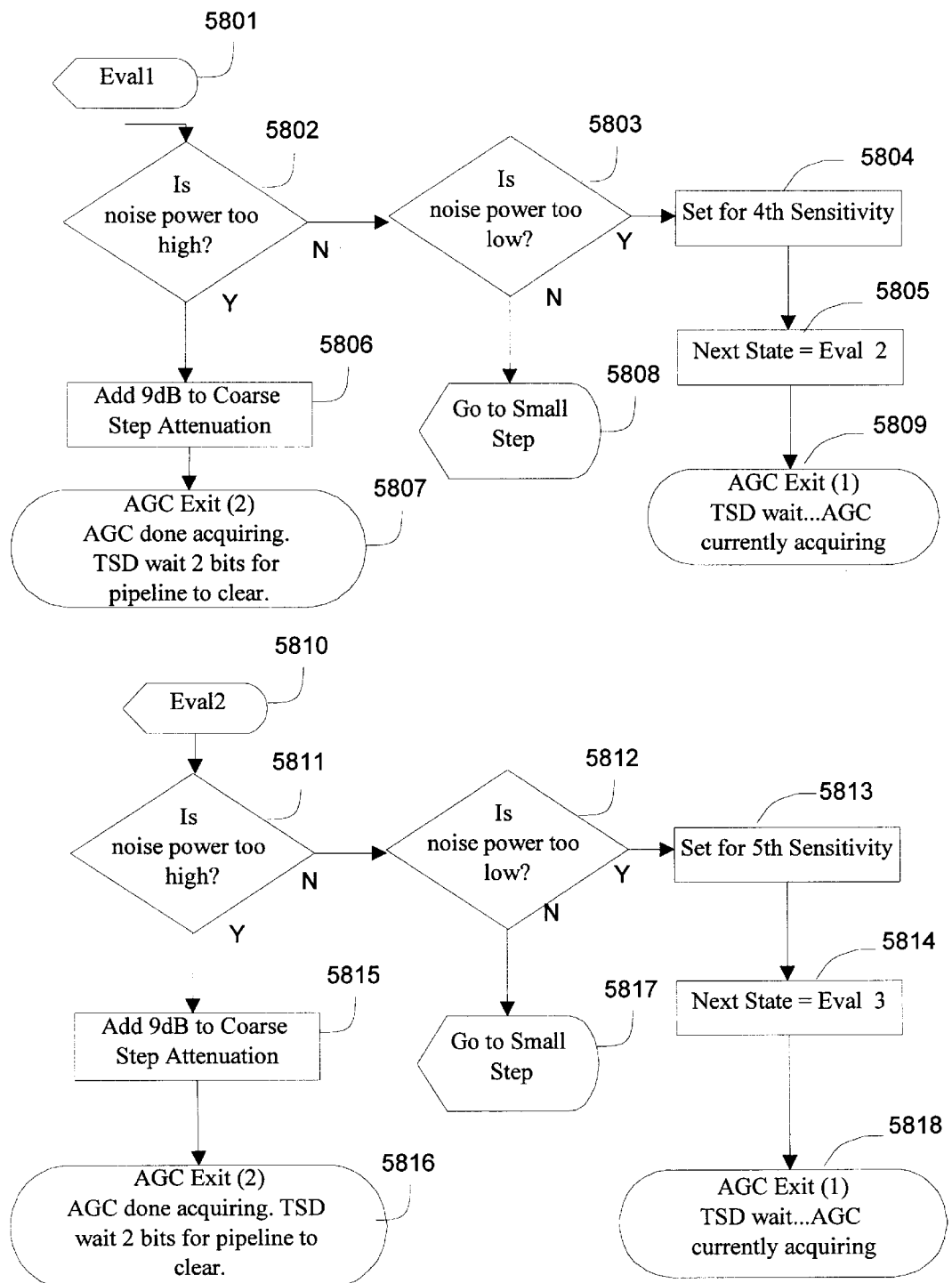
Figure 58

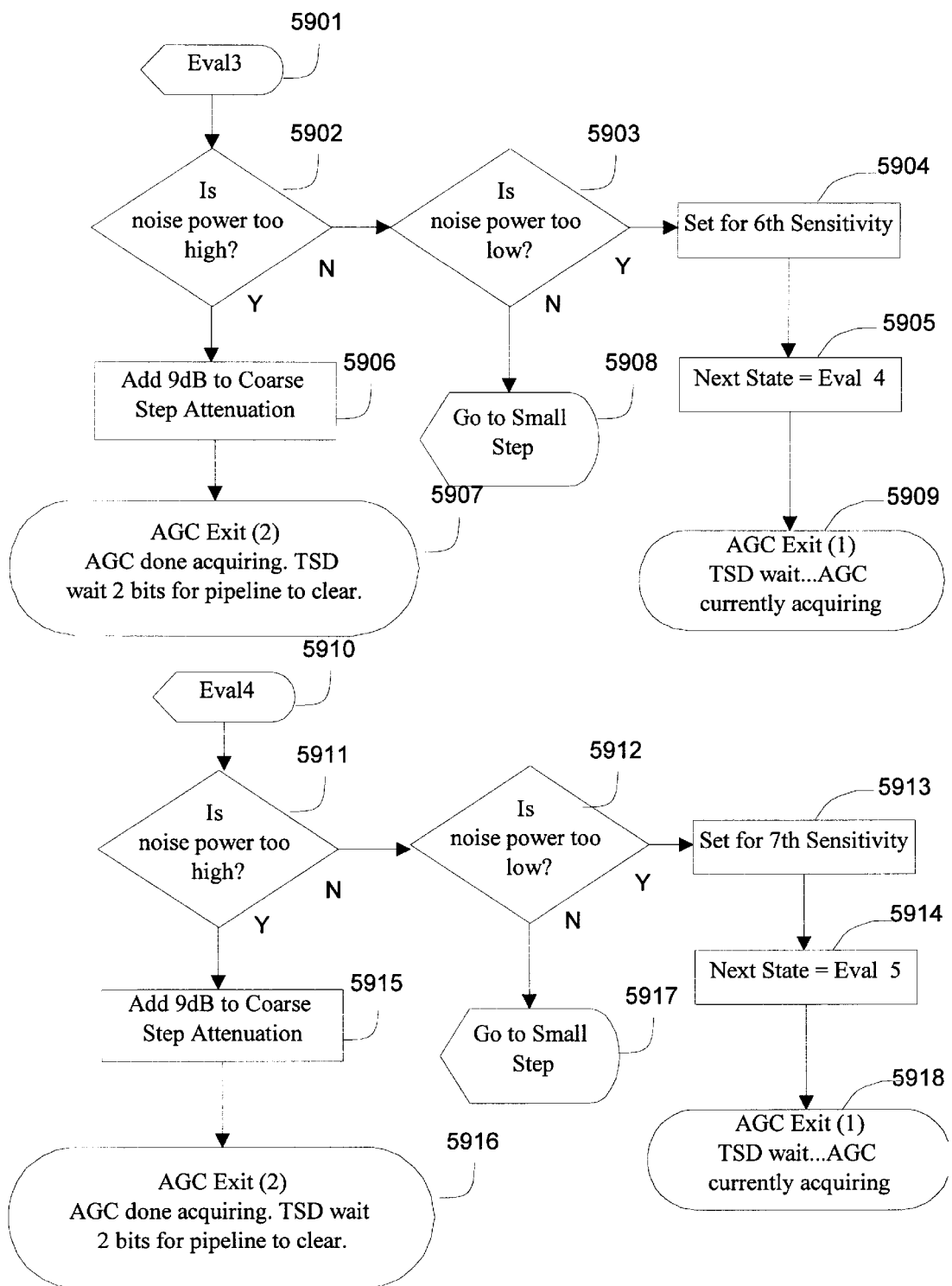
Figure 59

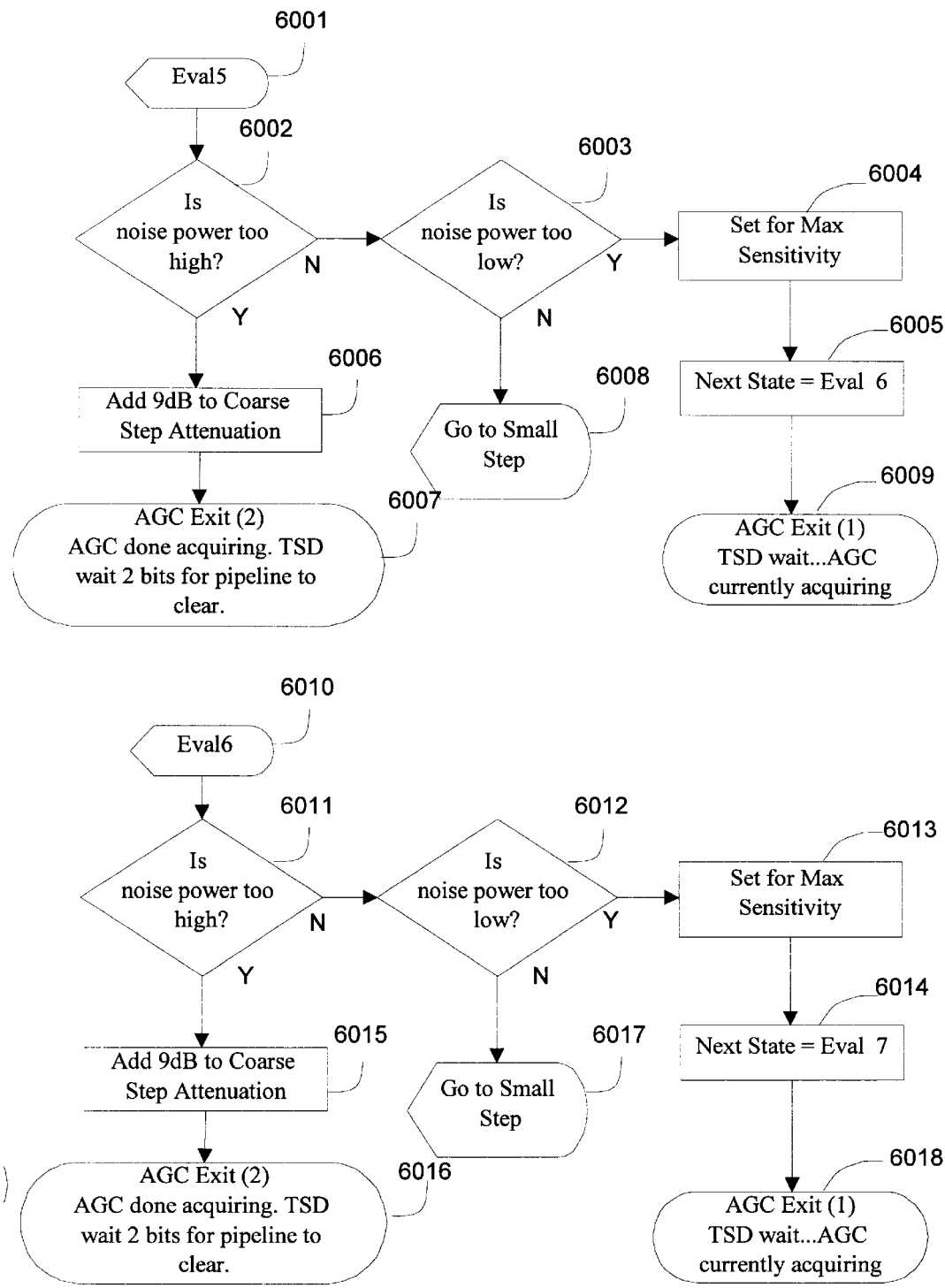
Figure 60

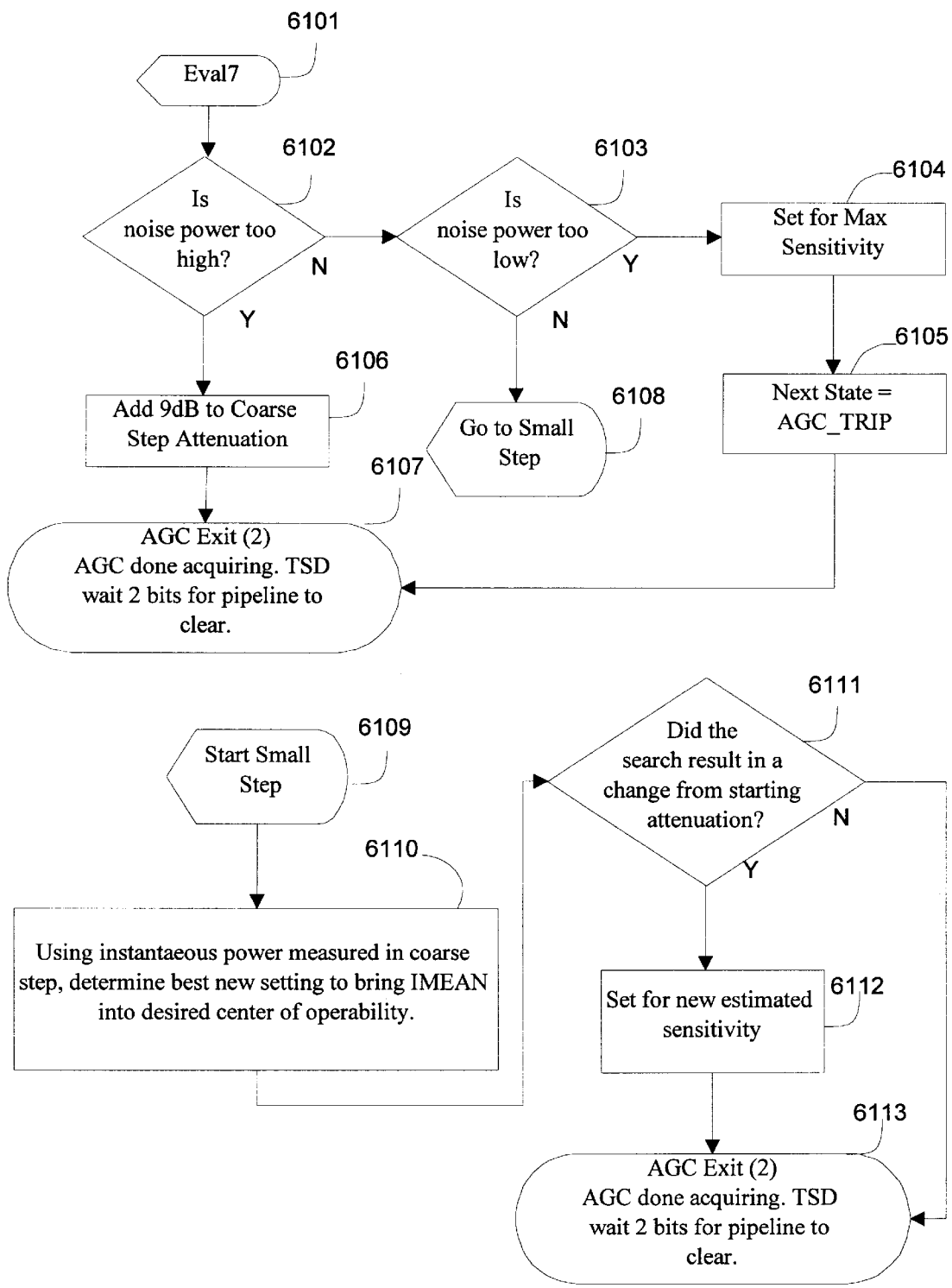
Figure 61

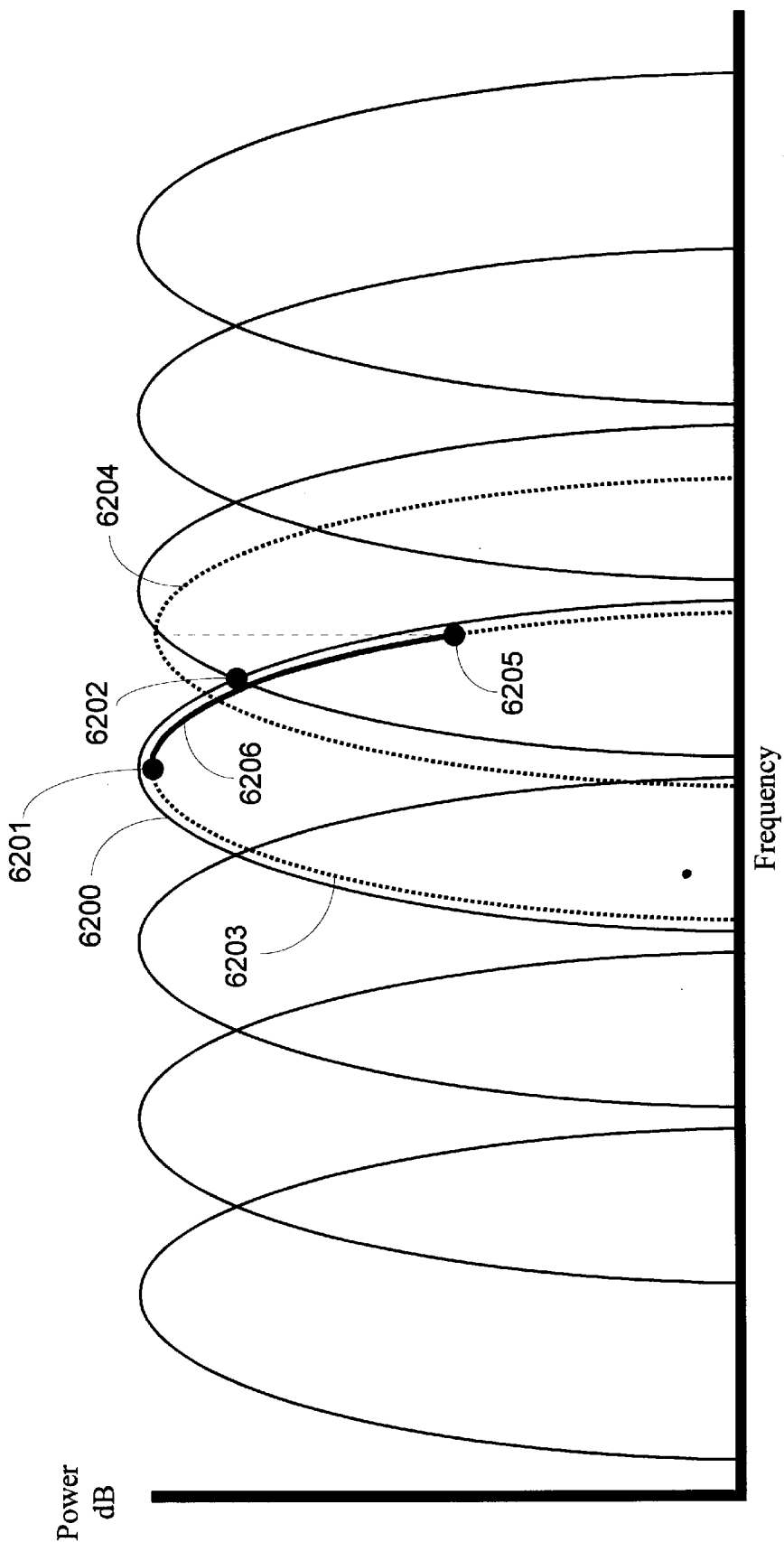
Figure 62

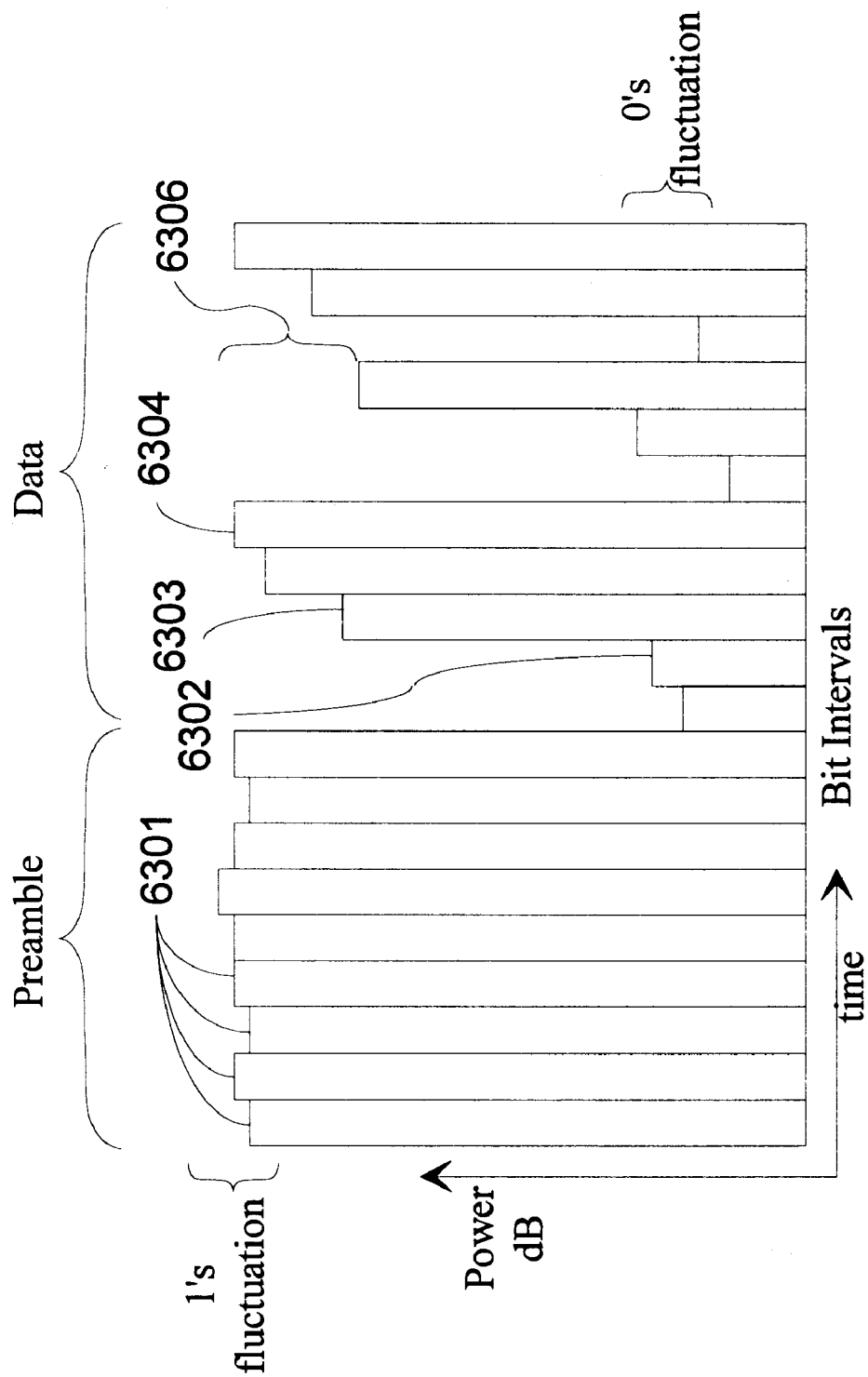
Figure 63

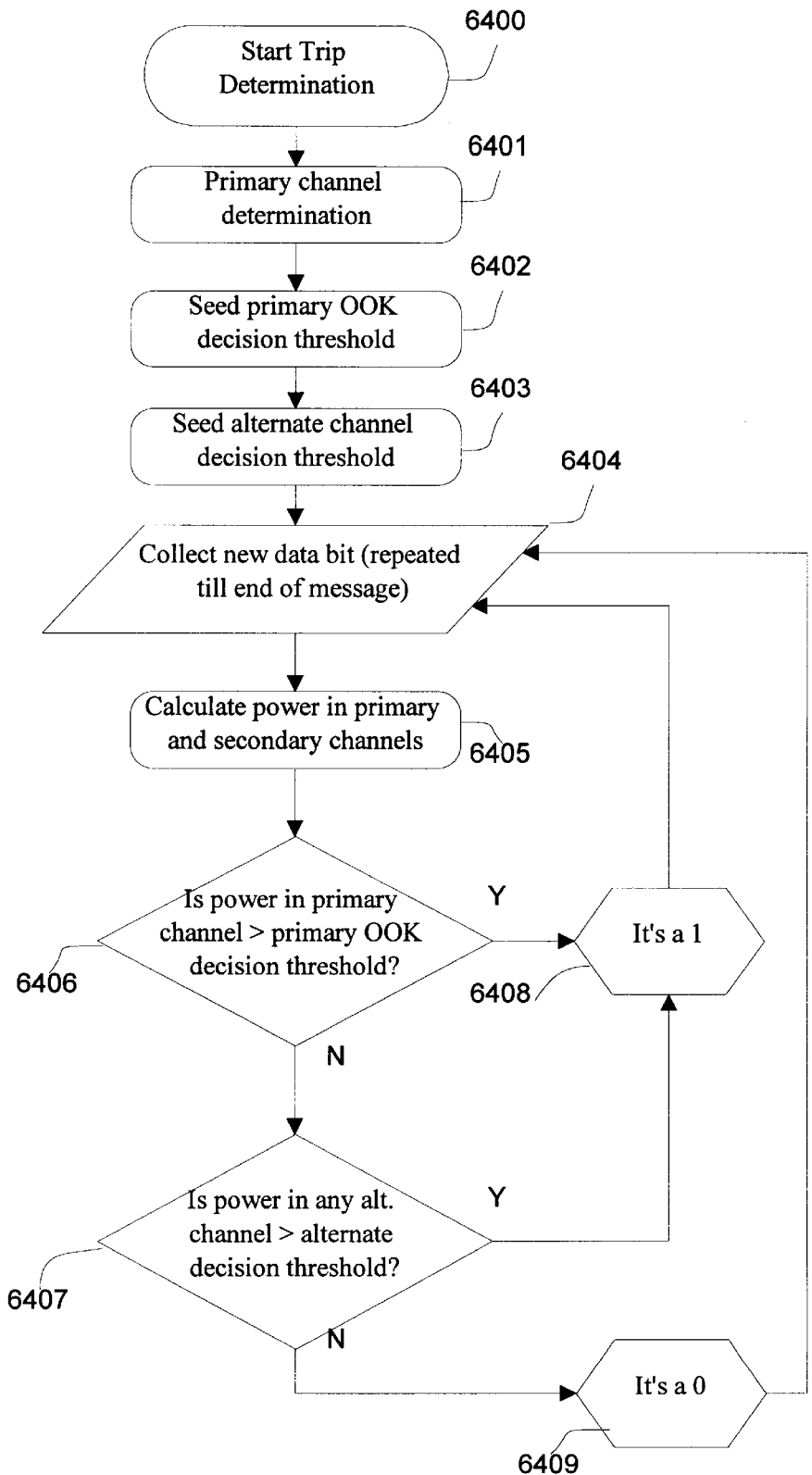
Figure 64

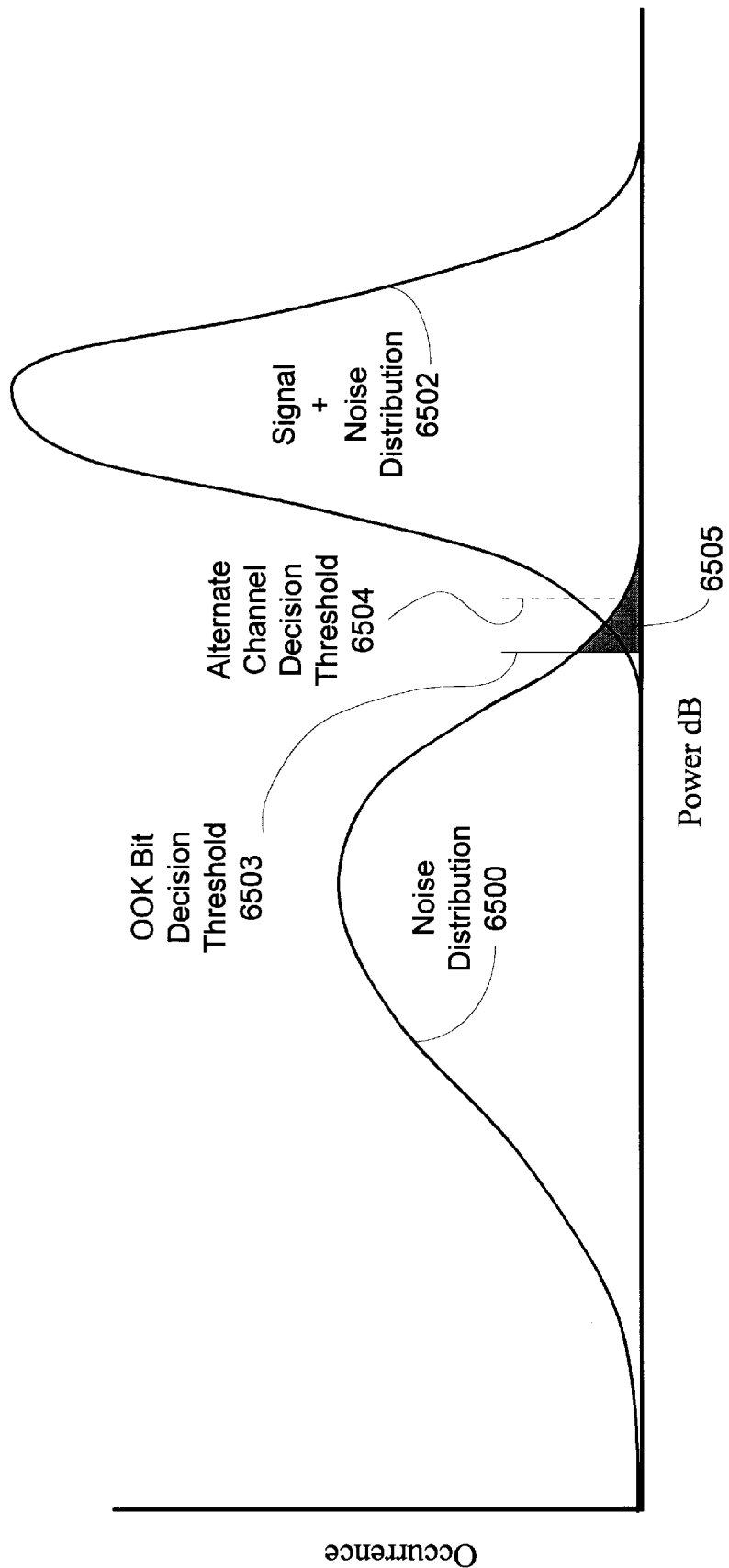
Figure 65

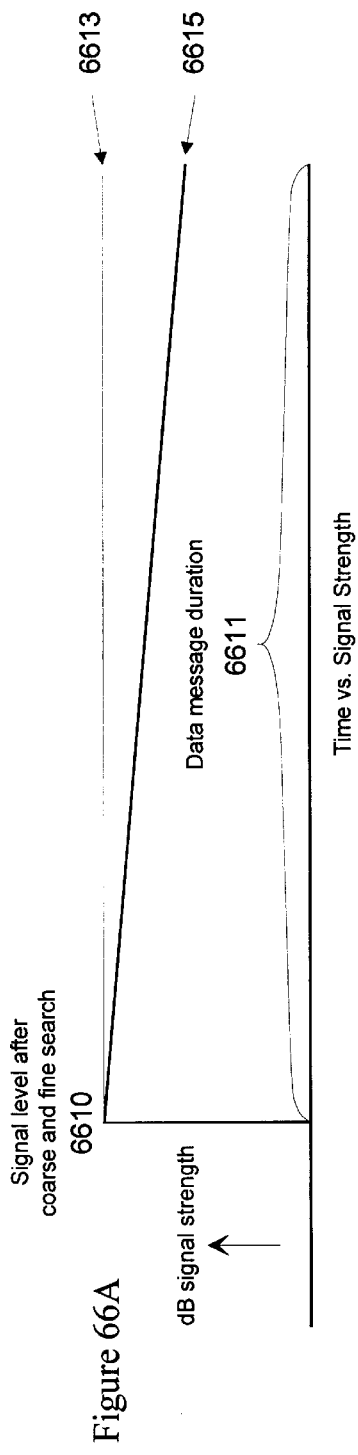
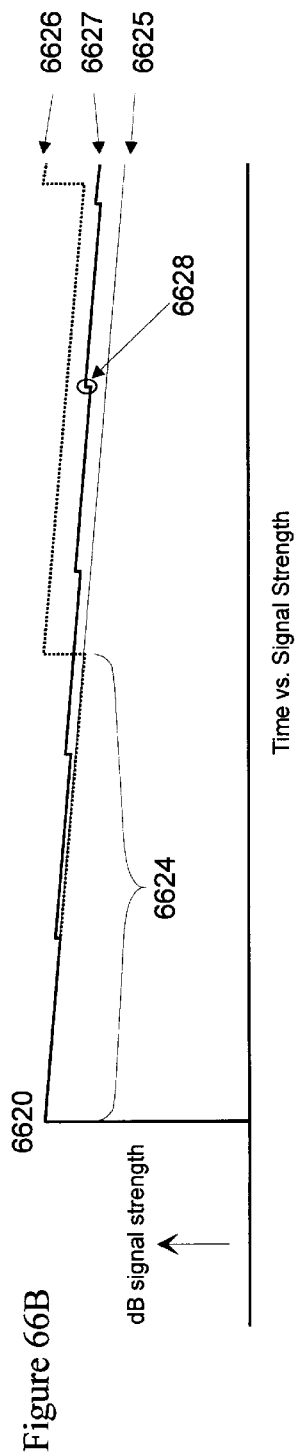
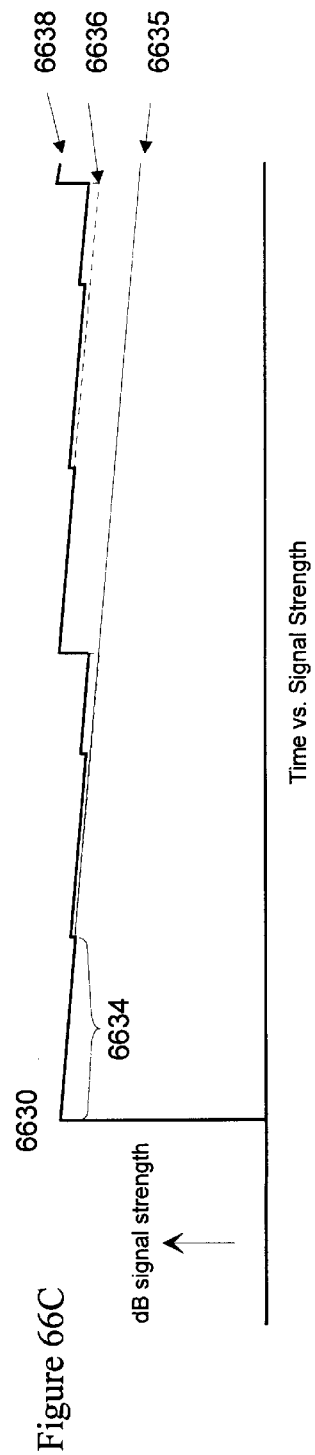

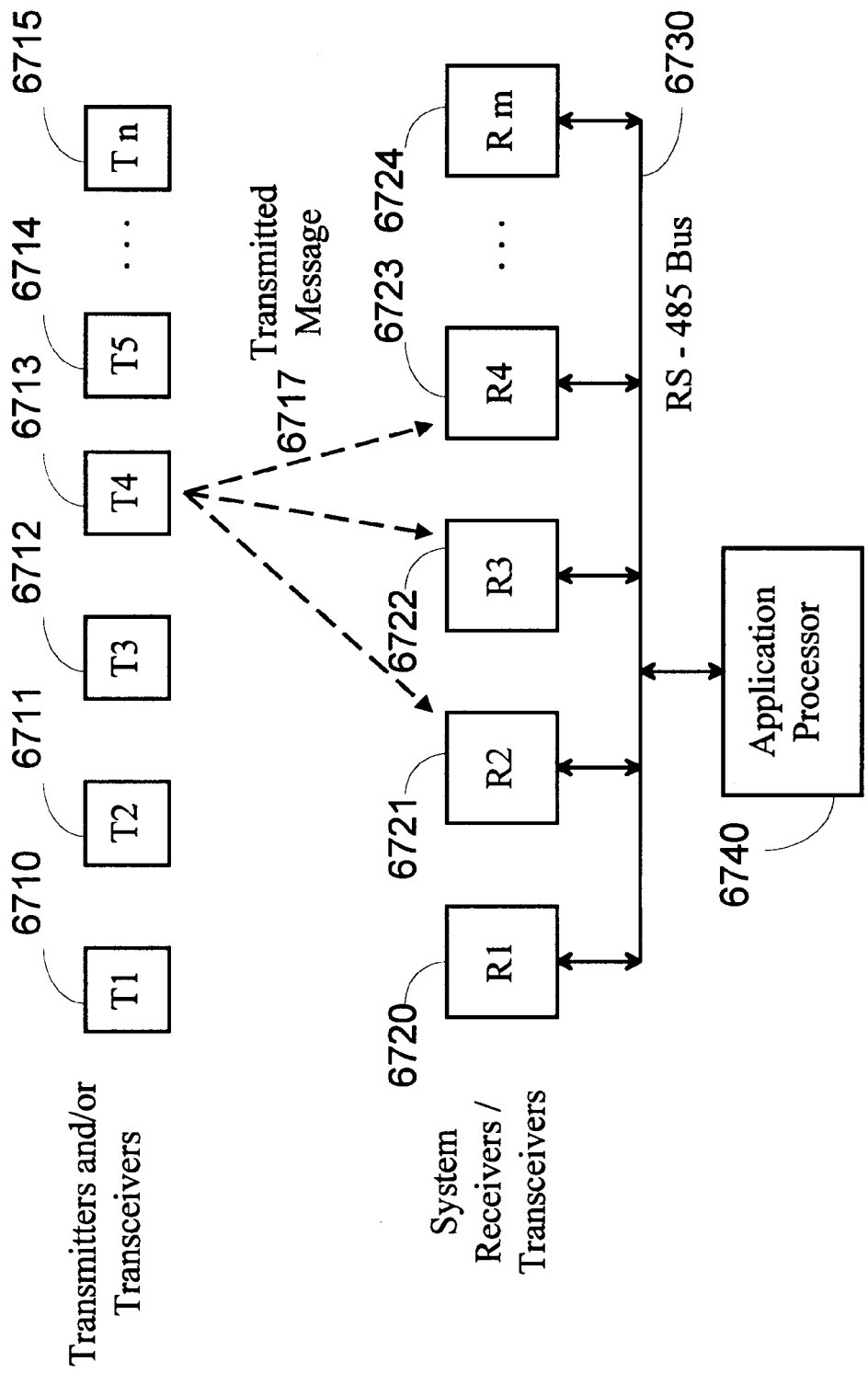
Figure 67

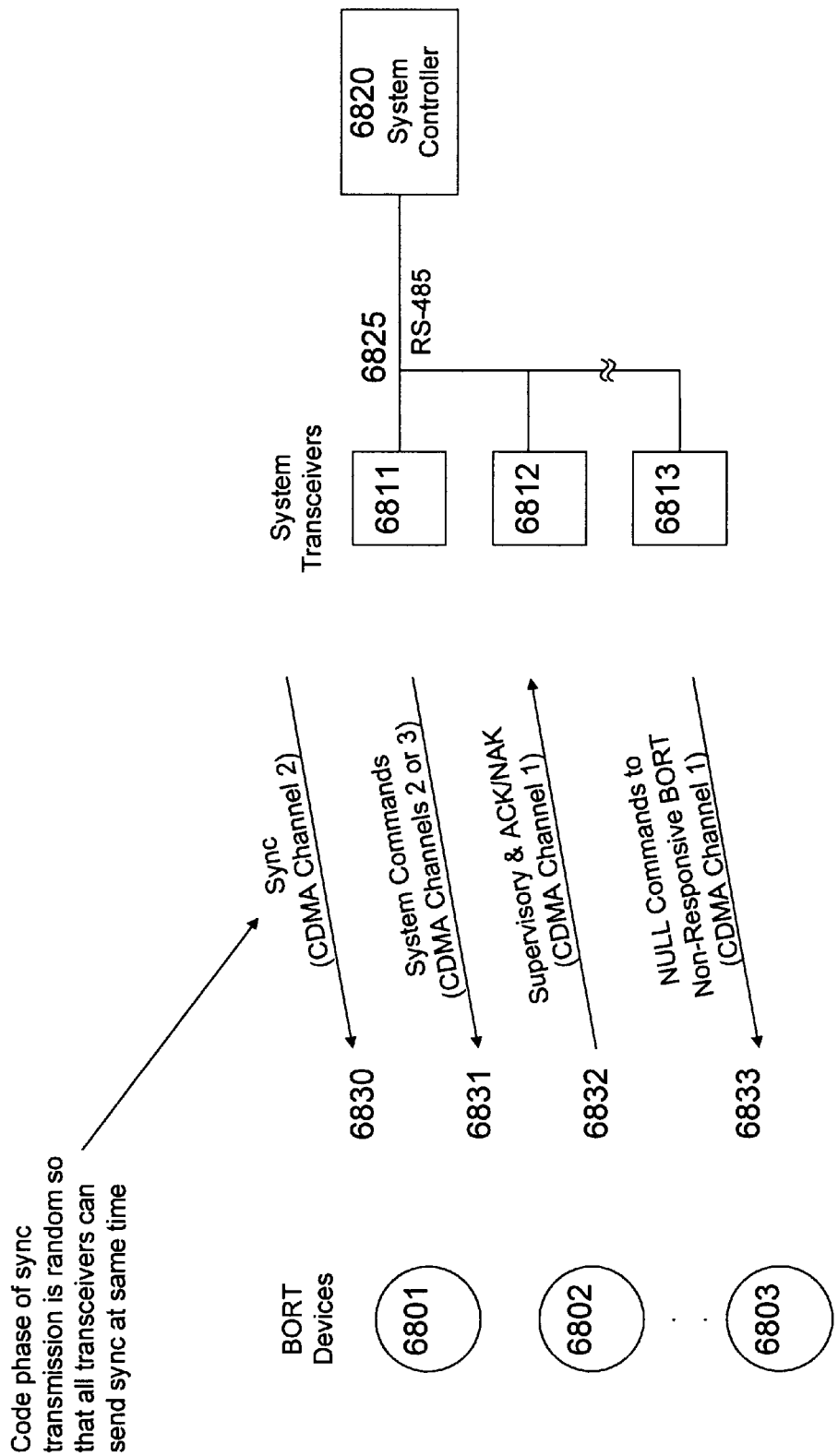
Figure 68

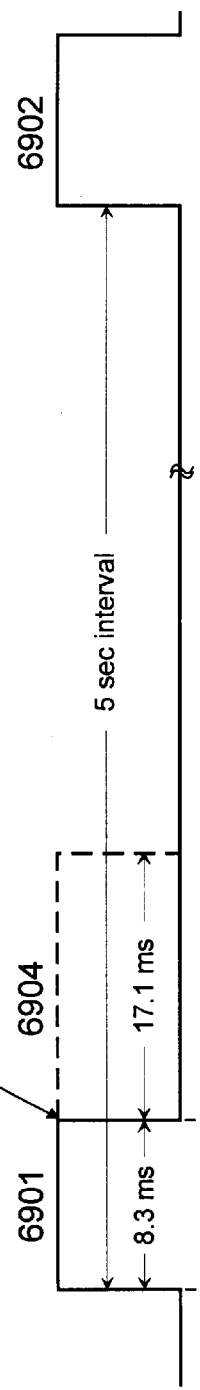
Figure 69A
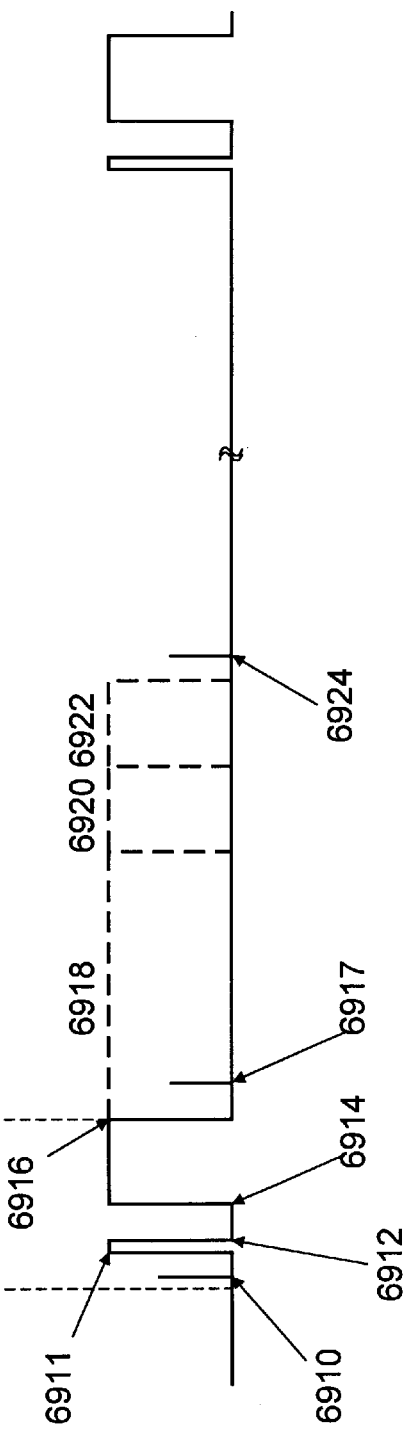
Figure 69B

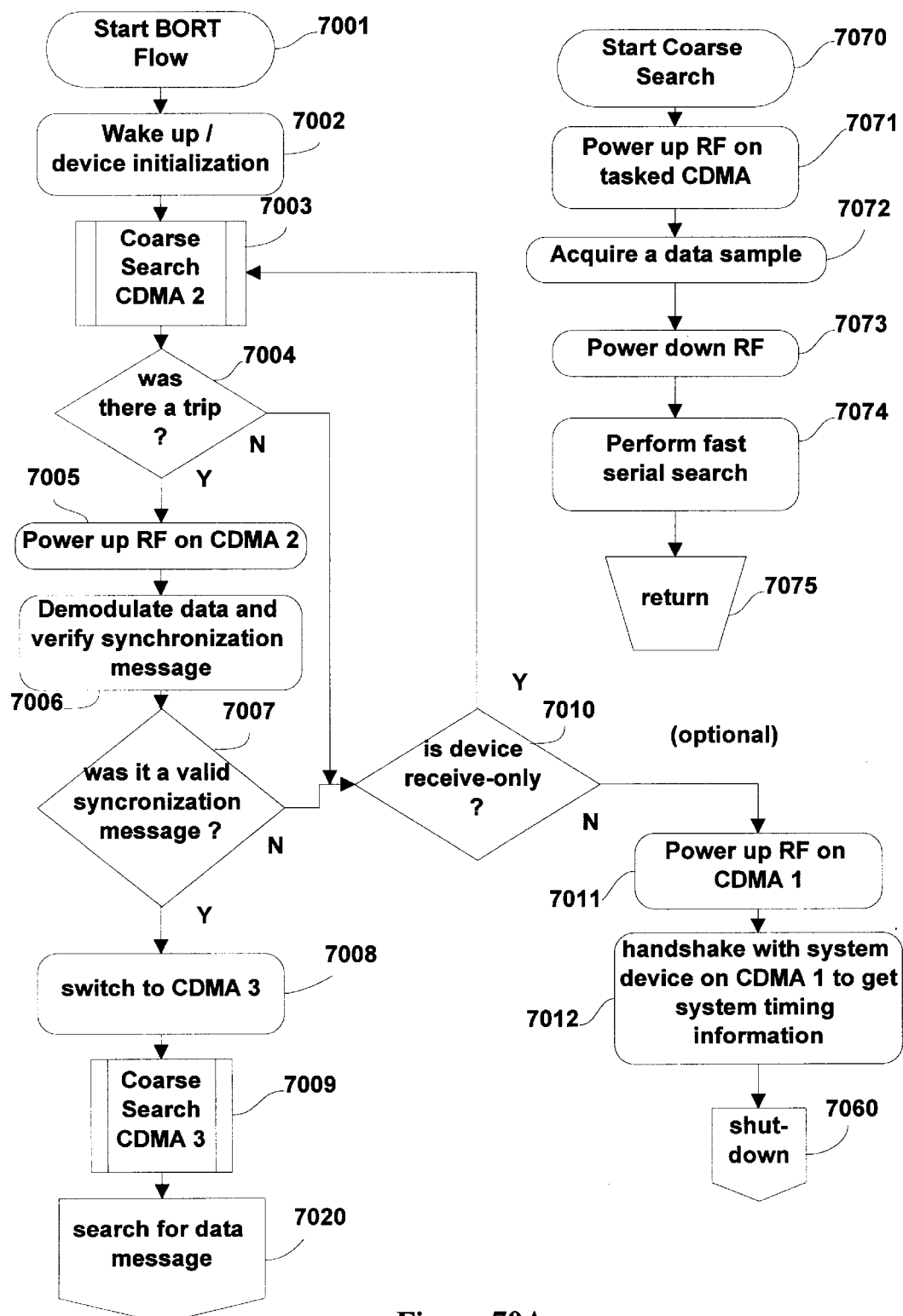
Figure 70A

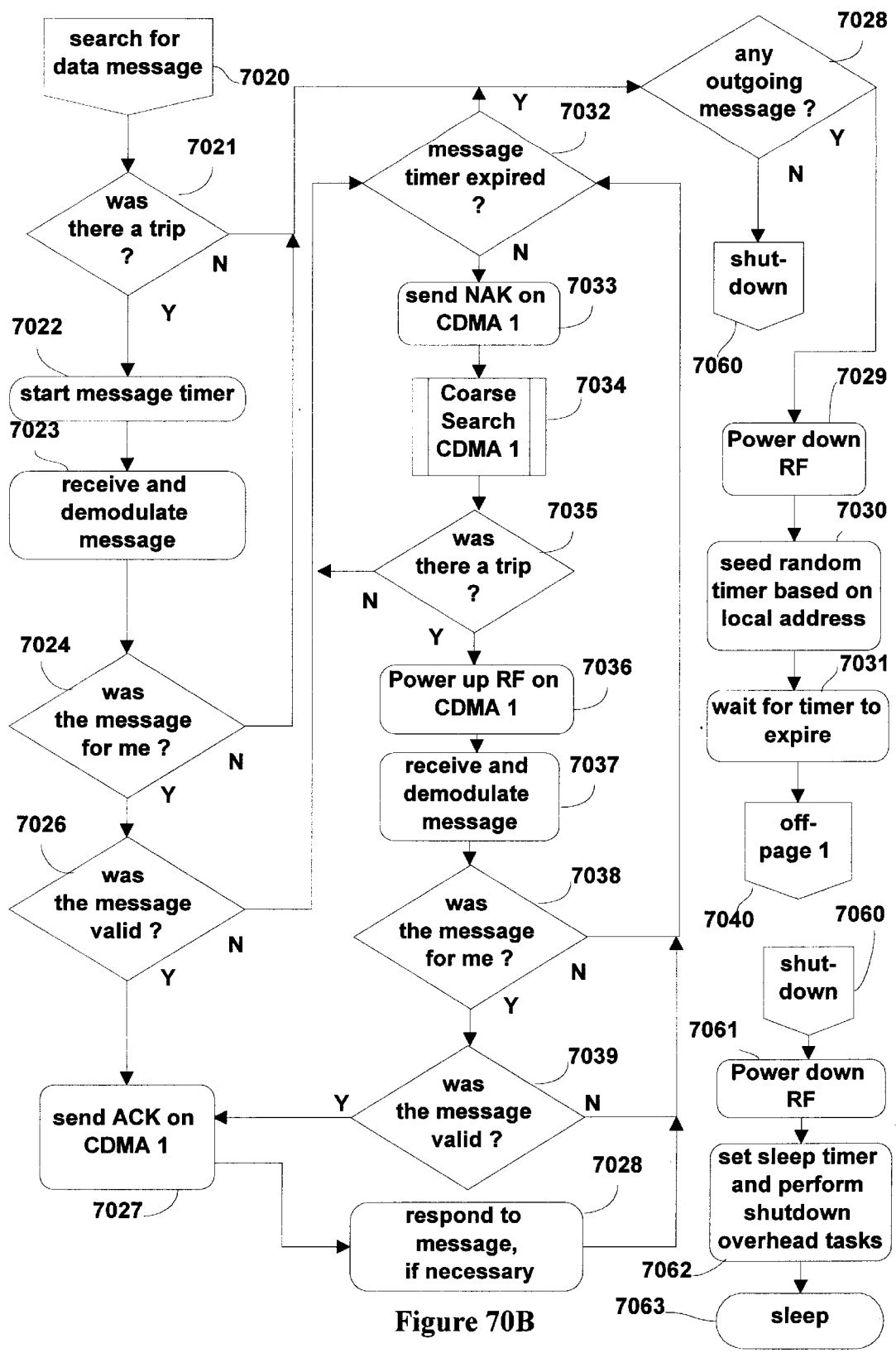
Figure 70B

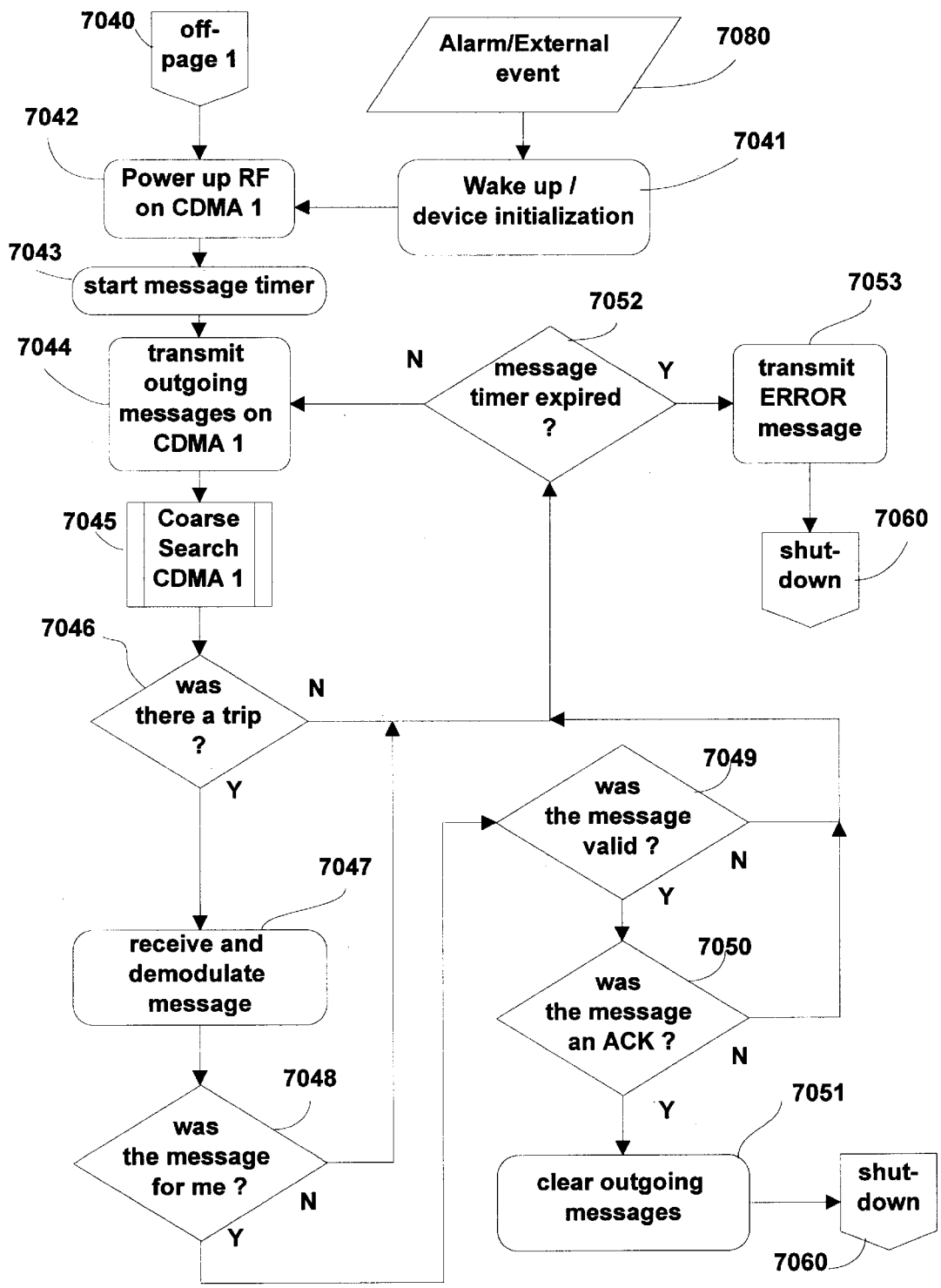
Figure 70C

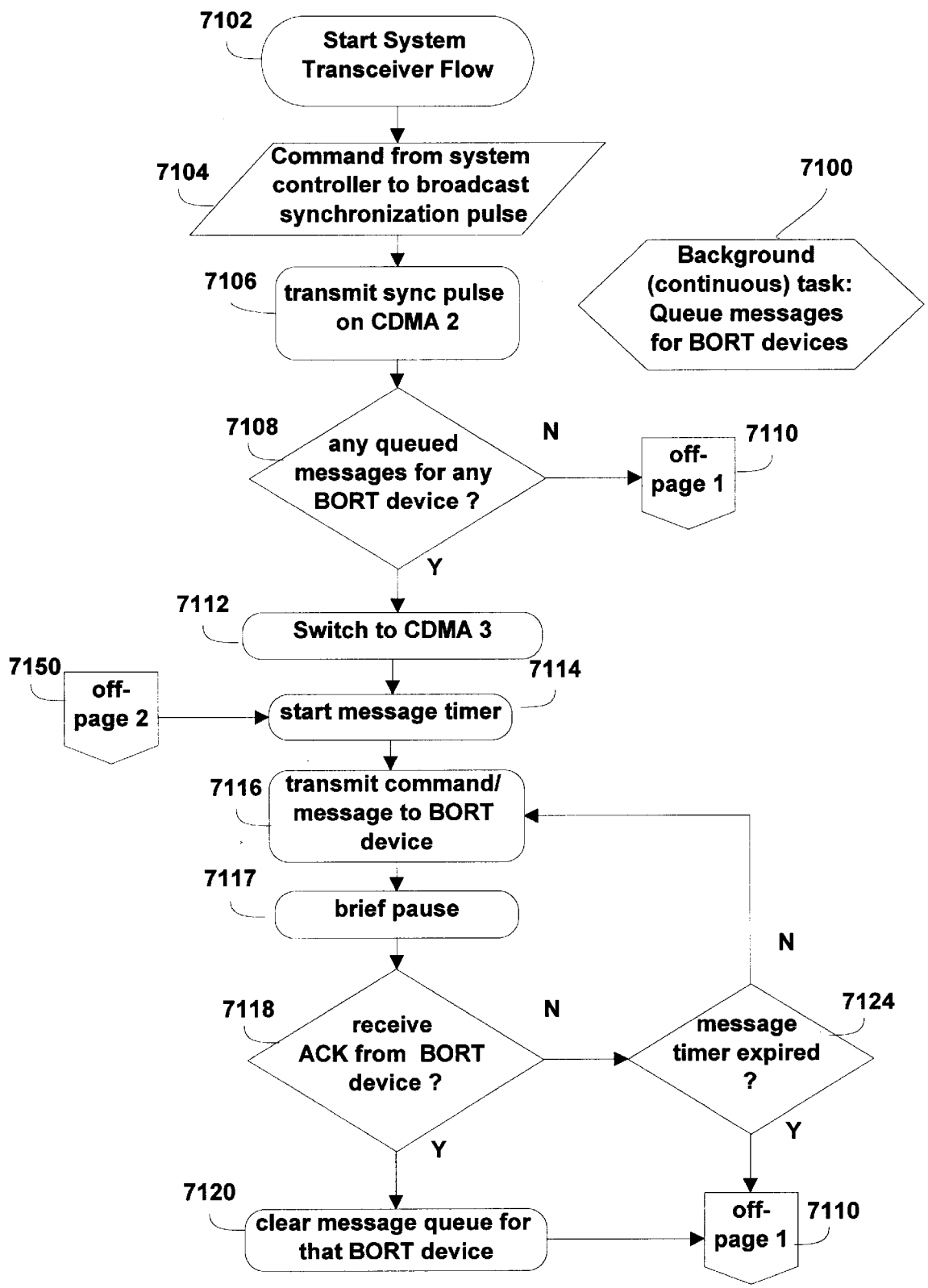
Figure 71A

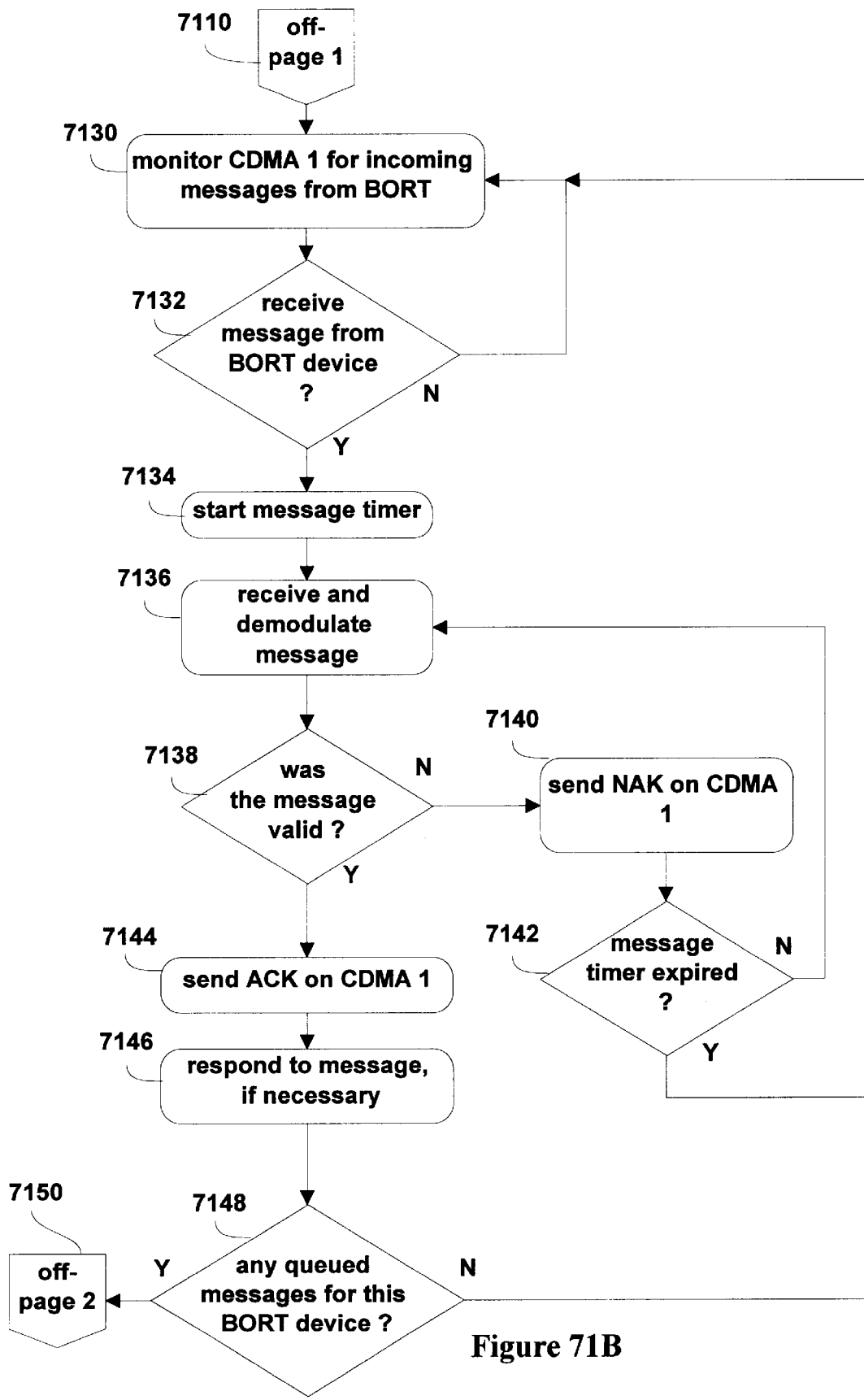
Figure 71B

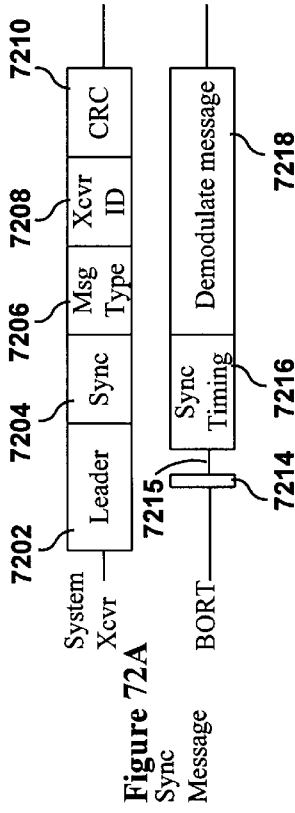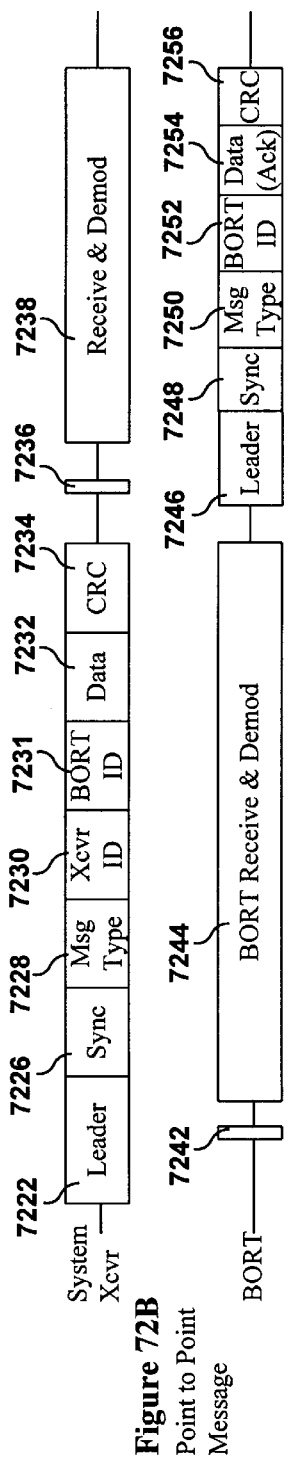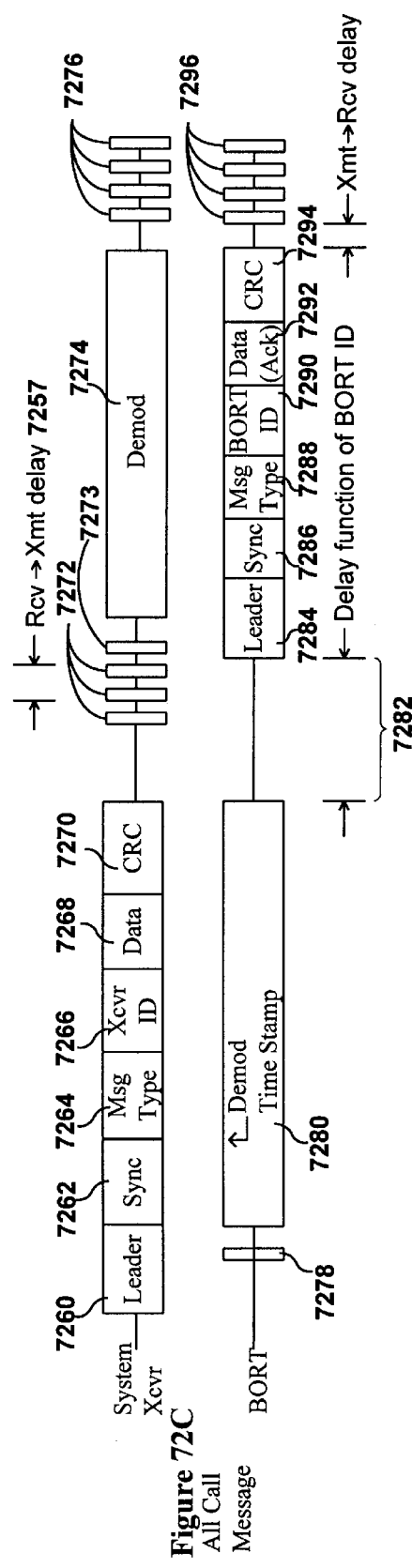

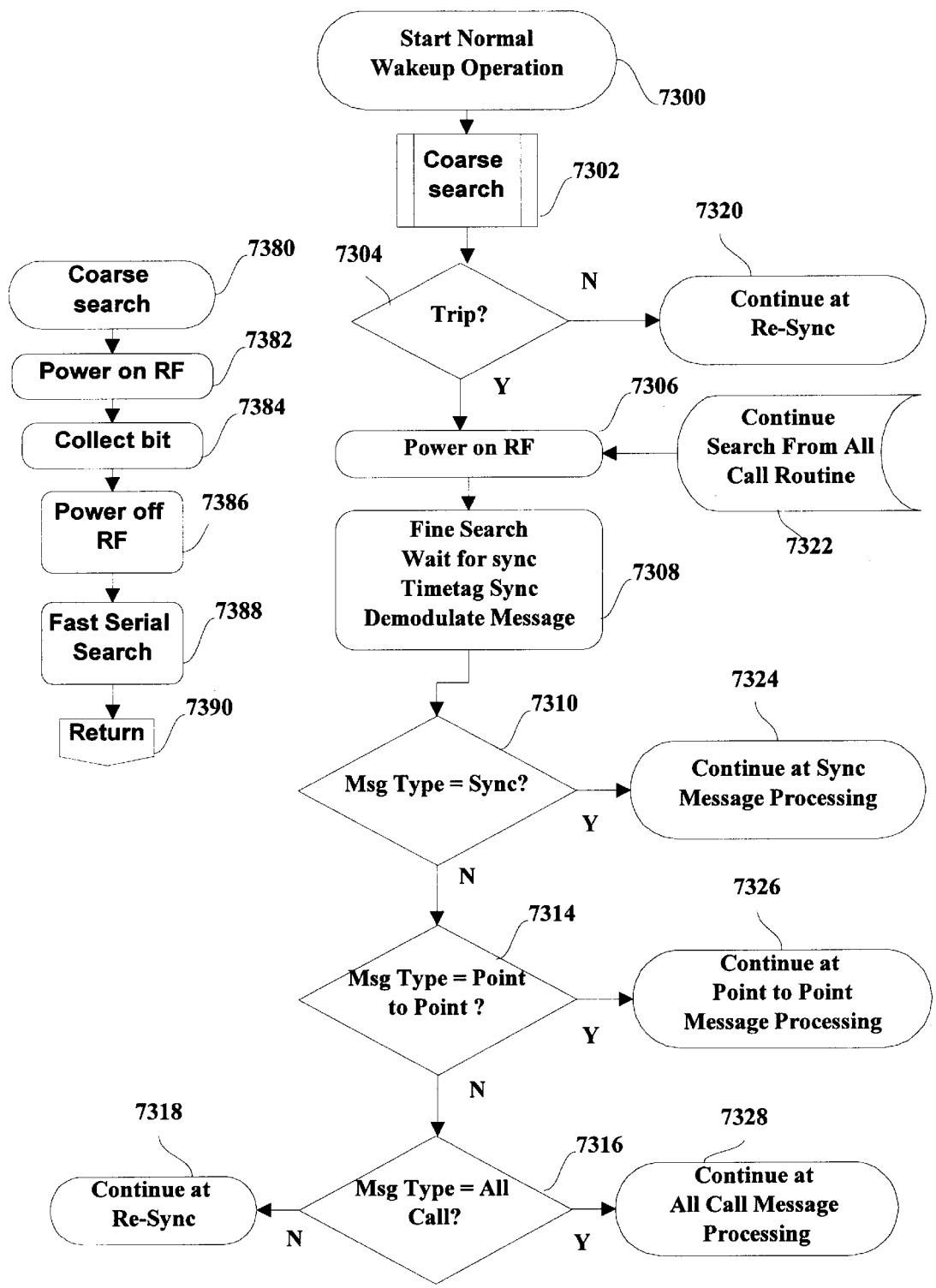
Figure 73A

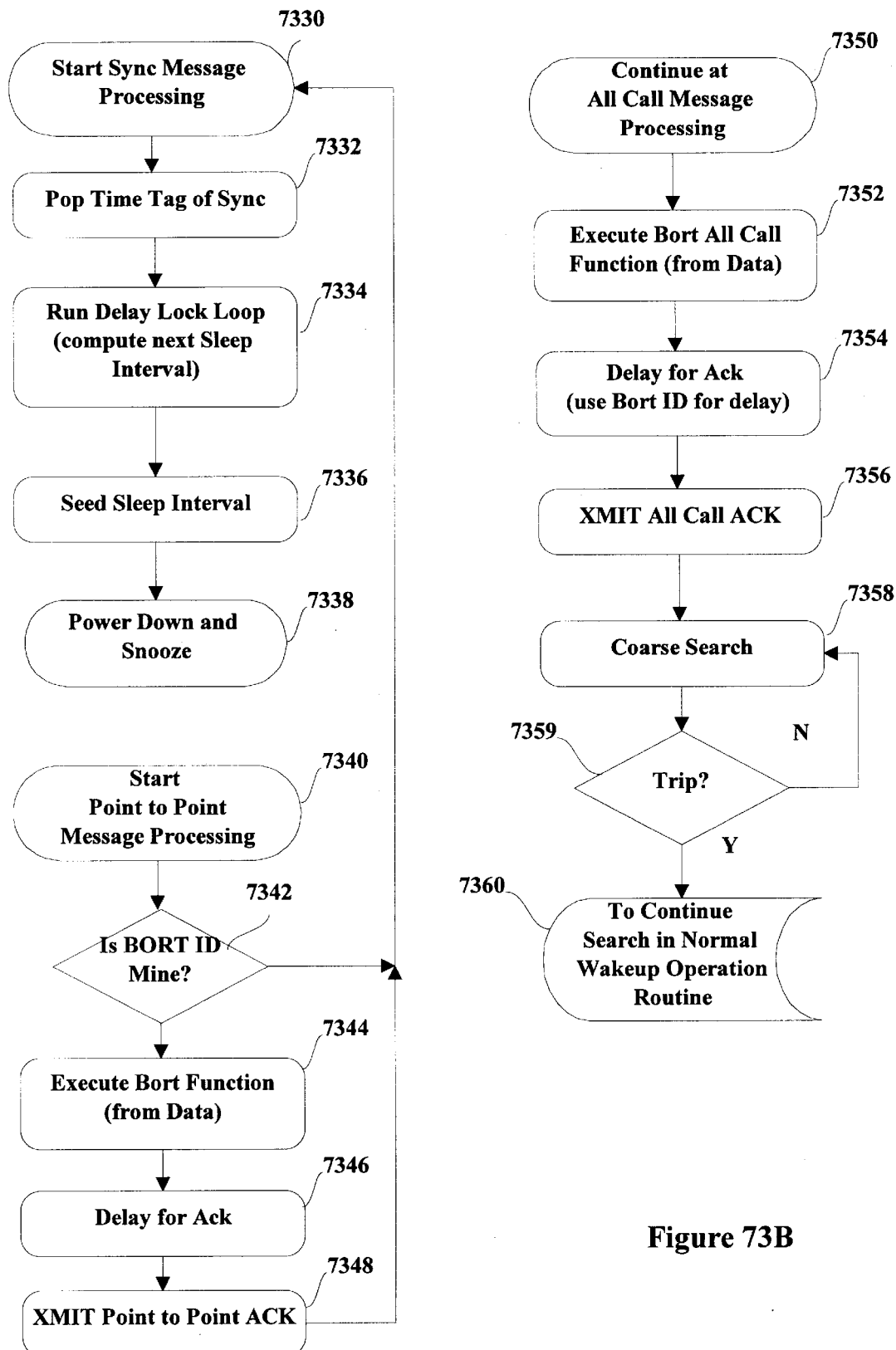
Figure 73B

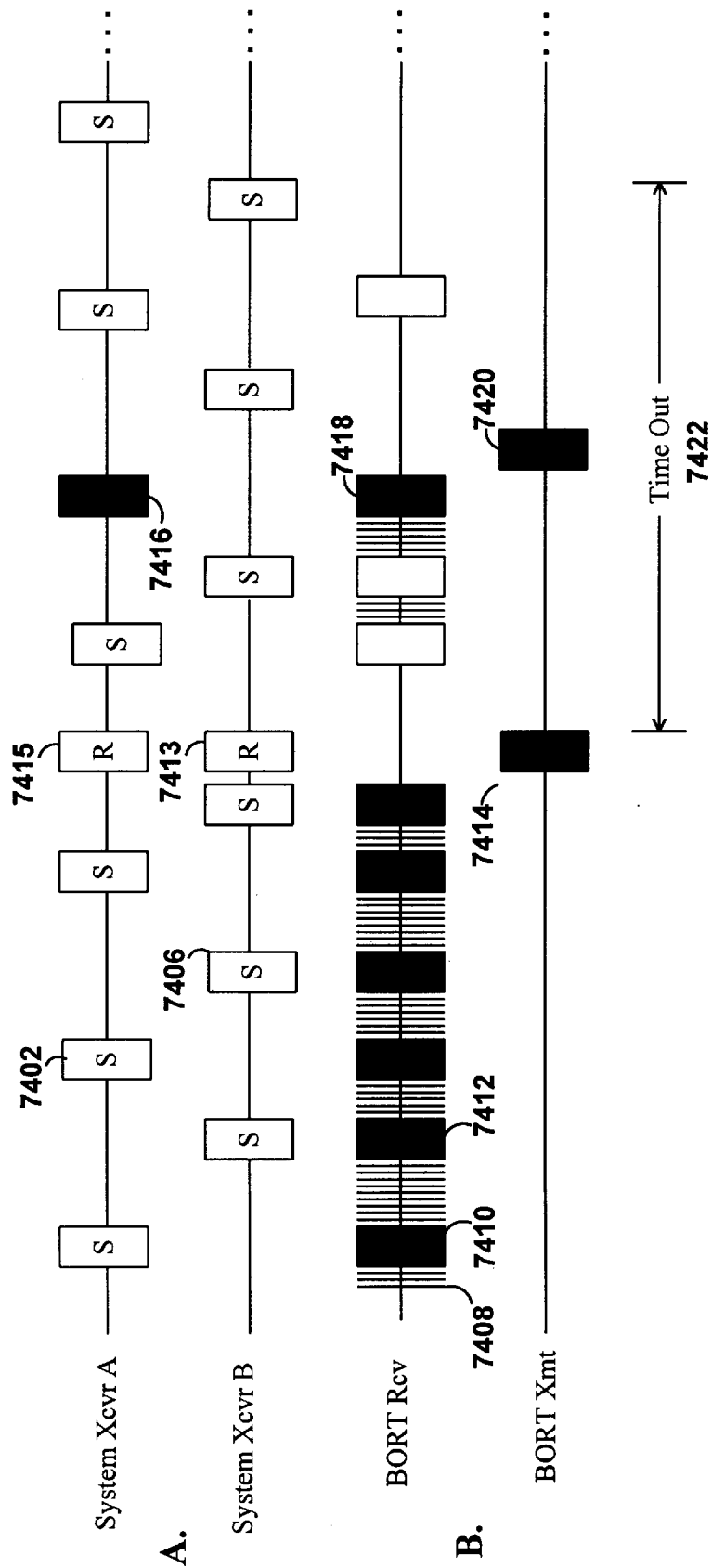
FIGURE 74

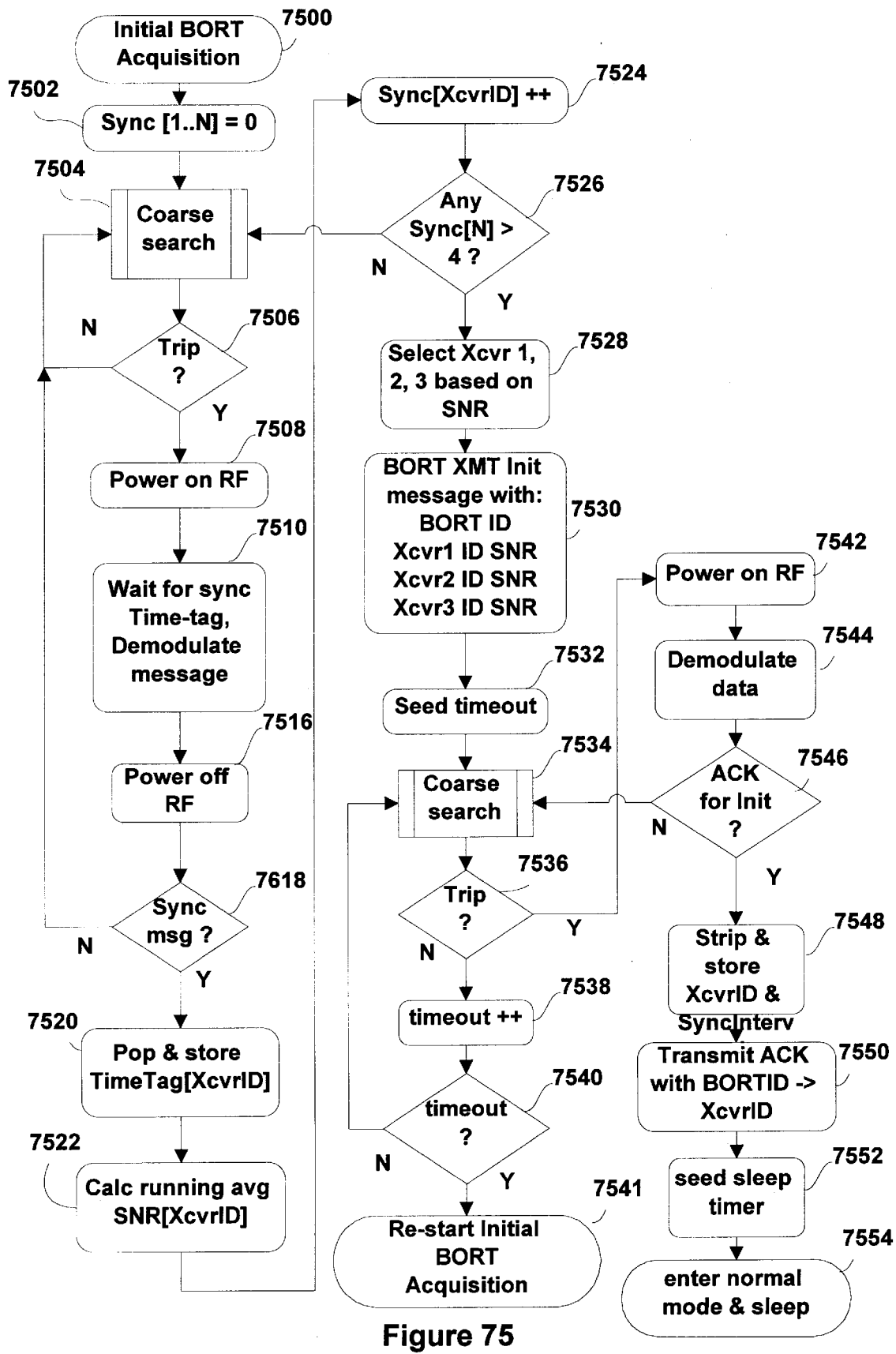
Figure 75

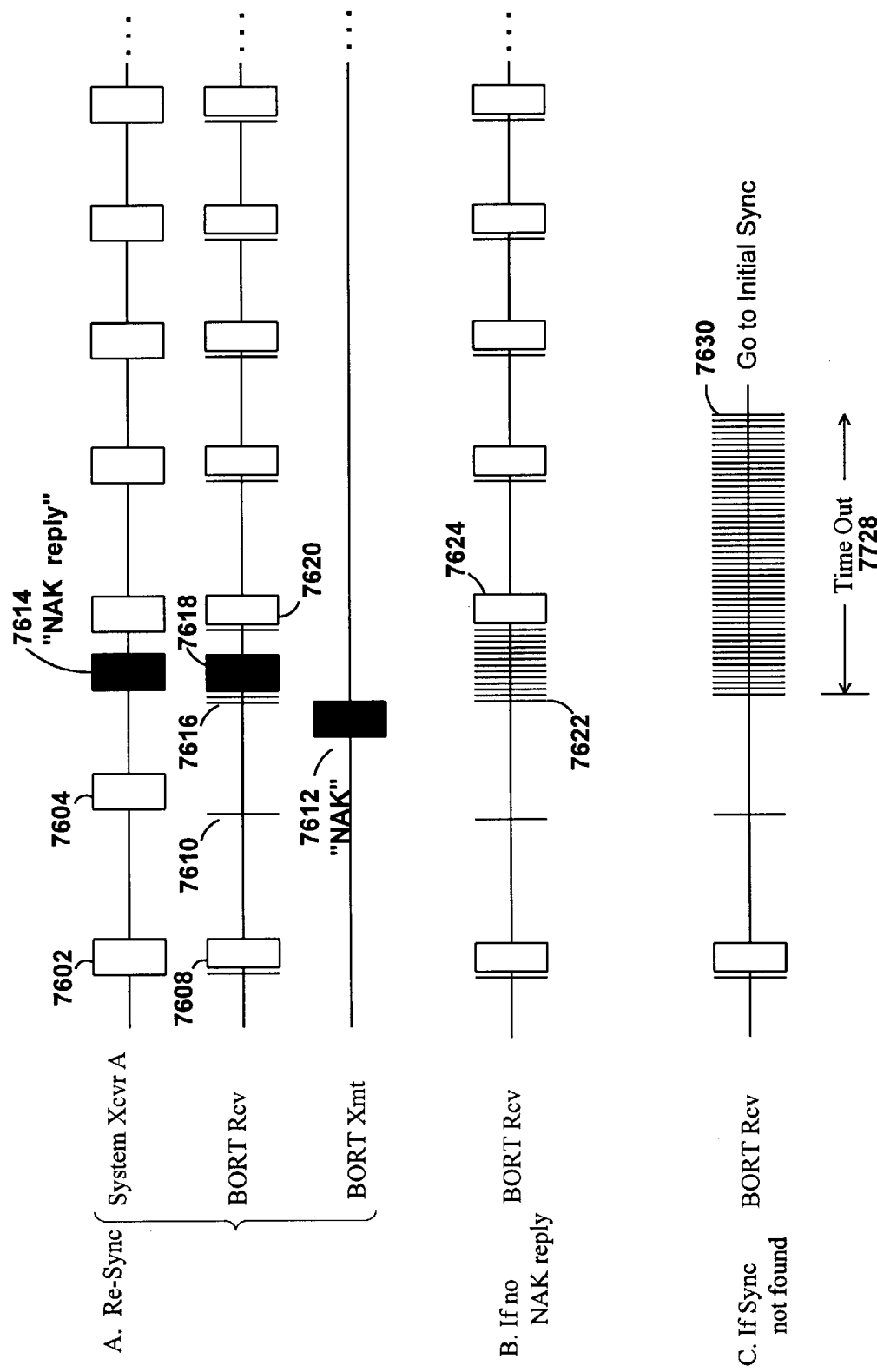

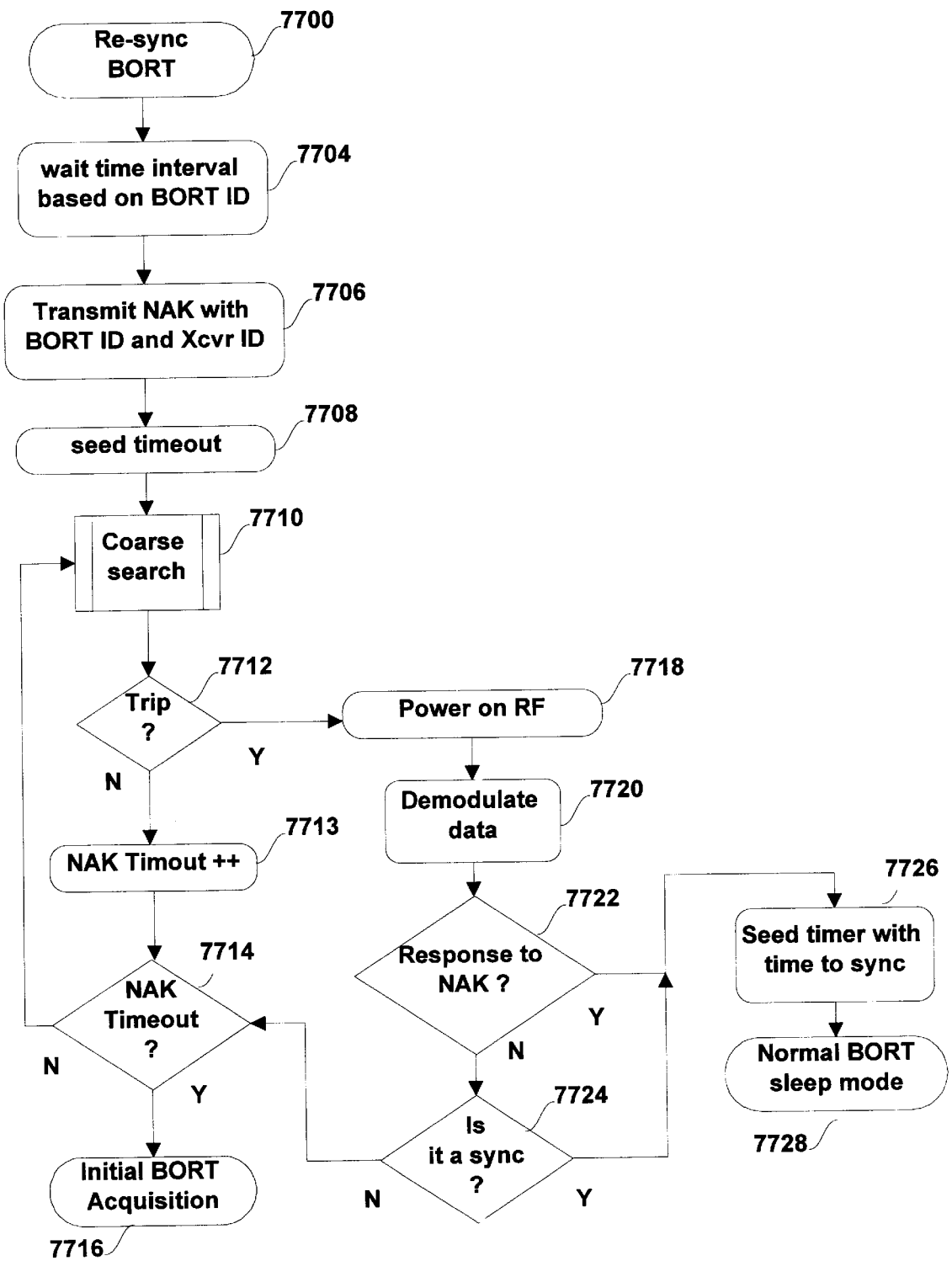
Figure 77

DIRECT SEQUENCE SPREAD SPECTRUM METHOD, COMPUTER-BASED PRODUCT, APPARATUS AND SYSTEM TOLERANT TO FREQUENCY REFERENCE OFFSET

CROSS-REFERENCE TO RELATED PATENT DOCUMENTS

The present application claims the benefit of U.S. Provisional Application Ser. No. 60/047,128, entitled "Direct Sequence Spread Spectrum DSP Transceiver", filed May 20, 1997 and U.S. Provisional Application Ser. No. 60/051,922, entitled "Direct Sequence Spread Spectrum (DSSS) Communication Device, System and Method", filed Jul. 8, 1997, Attorney Docket No. 6926-0026-20PROV, Naden, G., et al, the respective contents of which are incorporated herein by reference.

The present application contains subject matter related to that disclosed in U.S. Pat. No. 4,977,577, filed Nov. 2, 1988, issued Dec. 11, 1990; U.S. Pat. No. 5,067,136, filed Jul. 12, 1990, issued Nov. 19, 1991; U.S. Pat. No. 5,095,493, filed Aug. 20, 1990, issued Mar. 10, 1992; U.S. Pat. No. 5,119, 396, filed Aug. 27, 1990, issued Jun. 2, 1992; U.S. Pat. No. 5,265,120, filed Mar. 11, 1992, issued Nov. 23, 1993; U.S. Pat. No. 5,457,713, filed Mar. 7, 1994, issued Oct. 10, 1995; U.S. Pat. No. 5,598,427, filed Oct. 24, 1991, issued Jan. 28, 1997; Provisional U.S. patent application Ser. No. 60/047, 128, filed May 20, 1997 entitled "Direct Sequence Spread Spectrum DSP Transceiver"; U.S. patent application Ser. No. 08/485,007, entitled "Direct Sequence Frequency Ambiguity Resolving Receiver", filed Jun. 7, 1995; U.S. patent application Ser. No. 08/559,913, entitled "Direct Sequence Spread Spectrum DSP System", filed November 17, 1995, the respective contents of which are incorporated herein by reference.

BACKGROUND OF THE INVENTION

1. Field of the Invention

The present invention is directed to communications-related systems, networks apparatuses and methods as well as computer-based digital signal processing mechanisms and methods used therein. More particularly, the invention is directed to the field of direct sequence spread spectrum (DSSS) communication that employ a DSSS transmitter and a DSSS receiver, or transceiver configured to convey a data signal in a transmitted DSSS signal by spreading the data signal on transmission and correlating on reception so as to "despread" the DSSS signal and recover the data signal.

2. Discussion of the Background

Conventional narrowband (i.e., non-spread spectrum) radio communication devices transmit signals in frequency bandwidths that are roughly equivalent to a data signal bandwidth (or information bandwidth). These devices typically use a radio-frequency (RF) carrier derived from a frequency reference (i.e., a device that produce a precise frequency, although the accuracy of the frequency usually depends on the cost of the device) and modulate the data on the RF carrier. Common conventional data modulation methods such as frequency modulation (FM), phase modulation or amplitude modulation (AM) cause the RF carrier to occupy slightly larger bandwidth then the RF carrier alone, but the total bandwidth for the RF carrier and data is not much larger. As such, interference signals (e.g. jammers) that are transmitted in the same bandwidth as the RF carrier and data can effectively "jam" the signal and prevent a receiver from reproducing the data signal. Aside from jamming, disturbances in the communications path between the transmitter and receiver can interfere with reception. For example, fading due to multipath or atmospheric obstruction can attenuate the signal significantly. Also, shadowing becomes significant if the signal must pass through solid matter such as buildings, walls, floors or trees and vegetation.

Spread spectrum radio communication addresses the shortcomings of narrowband communications by mixing (i.e. applying) a wideband spreading signal to the data signal so as the "spread" the data signal. In these types of systems, the transmitter also modulates a RF carrier with data, as with the narrowband systems, but then adds one more modulation step by modulating the signal with a wideband, noise-like signal (e.g. a PN code). Consequently, the data signal is spread in frequency over a much larger bandwidth, typically several million Hertz (MHZ). Common spread spectrum techniques include frequency hopping and DSSS. Frequency hopping systems move (i.e., "hop") the data modulated carrier to frequencies following a pseudo-random pattern defined by the PN code. DSSS mix a PN code with the data modulated carrier to create a DSSS signal which simultaneously occupies roughly the bandwidth of the pseudo noise signal.

Narrowband interference signals transmitted at same frequency as a portion of the spread signal, "jam" the spread signal by an amount proportional to the ratio of jammer bandwidth to pseudo-noise bandwidth. At a minimum, the interference signal will at least be attenuated by a "processing gain" of the spread spectrum signal, where processing gain is defined as a ratio of data signal bandwidth to spread signal bandwidth. For similar reasons, spread spectrum signals also offer some degree of immunity to channel fading and multipath loss.

DSSS systems have been used in the past to achieve low probability of intercept (LPI) for secure communication and thus are valuable in military applications or other scenarios requiring covert communications. DSSS is also used in places where multipath or fading is prevalent, such as satellite communication. For example, Global Positioning System (GPS) operates using DSSS techniques. However, as recognized by the present inventors, conventional DSSS systems are expensive (considering the transmitter and receiver) because relatively high performance frequency references and digital signal processing equipment is used. Accordingly, DSSS techniques are most commonly used in military and high-end consumer market, where component cost is less of a factor than with low-end consumer product.

Conventional direct sequence spread spectrum transceivers are directed towards high-end systems (e.g. systems costing in the hundreds or thousands of dollars in 1997) that require advanced, if not state-of-the-art, digital signal processing equipment, and associated components. Past DSSS systems have avoided using lower cost components because conventional wisdom dictates that selectively high fidelity frequency references are required at the transmitter and receiver, as well as powerful digital signal processing equipment so to compensate for even minor frequency deviations between transmitter and receiver systems. Contrary to conventional DSSS design practice, the present inventors have identified that these conventional DSSS devices are not applicable for low-end, inexpensive, commercial use applicable for high-volume sale, nor are they well suited for small packages, that may be used in a variety of non-standard field uses, such as, for example, home security and fire systems, data telemetry, access control, remote meter reading as well as other applications.

As recognized by the present inventors, one factor that drives the cost of conventional systems is the use of lengthy PN codes that require substantial digital signal processing to be despread in a receiver. While there are many advantages to using a long code (such as with code division multiple access, CDMA, telephony which permits many users to transmit on a common channel at the same time) the present inventors have recognized that a shorter code, such as a 63 bit PN code, may enable the use of components applicable for lower cost applications.

FIG. 1 is a block diagram of a conventional receive system that of either a conventional receiver (either narrowband or DSSS receiver). The receive system includes a RF front end section 120, a first local oscillator (109, 112, 111, and 110, as will be discussed) section, an analog-to-digital conversion section 121, baseband mixing section (115, as will be discussed) and a baseband processing section 122, as shown. The details of the conventional receiver are described below, following a general overview description. The RF section 120 performs the function of converting electromagnetic wave energy (including the transmitted signal) and outputting an analog signal. The analog signal is maintained within a predetermined signal level range, as controlled by an automatic gain control circuit (AGC) as shown. The output from the RF front end is provided to a first local oscillator section having a mixer 109, which translates the analog signal to a lower frequency by using a precise, and generally expensive, voltage controlled oscillator 110. By employing the precise voltage controlled oscillator 110, the position of the translated signal (i.e., a down converted signal), is controlled to within a narrow predetermined frequency range.

The downconverted signal is then passed to the intermediate frequency processing section 121, that adds appropriate gain prior to a digitalization process while filtering out-of-band images necessary for the digitization process, as will be discussed herein. The output of the intermediate frequency section is passed to the analog to digital converter ADC shown as mixer 115 (as will be discussed), which converts the analog signal into a digital representation for subsequent processing in the baseband section 122.

In this conventional architecture, the analog AGC's function is to keep the signal level applied to the ADC 115 within an operational range of the ADC. Once digitized, the signal is passed to the baseband section 122, where digital signal processing operations are performed on the signal and the signal is detected and demodulated, resulting in outputting the data signal originally transmitted from the transmitter (either in a spread or non-spread form).

In the special case of direct sequence spread spectrum receivers, the burden of performing the "inverse spreading" (despreading) operation on the signal usually falls on the digital signal processor 116 section 1 of the baseband processing section 122. In some cases, the despreading code is mixed in the RF front end 120, first LO or intermediate frequency (IF) sections of the receiver, but such analog architectures require significantly precise components or specialized compensation mechanisms. Accordingly, conventional direct sequence spread spectrum receivers, require high performance digital signal processors or complicated analog sections in order to perform the despreading and correlation functions, as well as signal acquisition and demodulation processes. As a corollary, a precise frequency reference at the DSSS transmitter is assumed to be present so little to no frequency ambiguity is presented into the signal received by the receiver.

Conventional digital receiver design wisdom is such that the loss in performance associated with using low cost, low power desirable and possible components does not justify their use in light of the fact that slightly more expensive components provide greater precision and processing power and therefore avoid performance problems associated with low-cost, inaccurate components. As identified by the present inventors, the high performance digital signal processors, as well as high fidelity voltage controlled oscillators, are not conducive to low cost, low power applications, and that with proper compensation mechanisms, the adverse effects of low cost components can be justified.

More particularly, FIG. 1 depicts RF downconversion and signal conditioning components used to prepare a received analog signal for sampling. Antenna 101 receives the RF signal sent from a transmitter and passes the signal through RF diversity switch 102 and on to a bandpass filter (BPF) 103. Alternatively, a controllable select mechanism 104 may select antenna 105 to receive the RF signal. The antennas may be physically separated and/or of different polarizations so as to enable spatial or polarization diversity reception. The BPF 103 rejects undesired frequencies prior to signal amplification by an amplifier 106. The RF signal is then filtered by BPF 107 and amplified by another amplifier 108 prior to downconversion in a mixer 109. The frequency of the downconversion tone applied to the mixer 109 is controlled by a voltage controlled oscillator (VCO) 110. The output of the VCO 110 is filtered by a BPF 111 and amplified by an amplifier 112.

After downconversion, the downconverted signal is positioned at an intermediate frequency (IF) determined by the downconversion tone applied to the mixer 109, and additional gain is provided by an amplifier 113. A BPF 114 serves as an anti-aliasing filter prior to a second downconversion operation that, as recognized by the present inventors, may be performed with the sampling ADC 115. After the second downconversion operation, the signal is positioned near baseband (i.e. near 0 Hz).

The digital signal processor (DSP) 116 performs various operations including despreading the signal if it is a spread spectrum signal and then sends the baseband signal to a demodulation block 117 so as to extract the data originally added to the transmitted signal by the transmitter. Frequency control of the DSP 116 is provided by an oscillator 118 and using the DSP 116 passes the frequency control to all relevant sections 110, 115 and 117 to compensate for mismatch in received signal frequency, and/or chip phase, though frequency mismatch is usually minimized by using accurate frequency references at the transmitter and receiver. While FIG. 1 depicts a single RF downconversion step, other downconversion steps may be added to properly center the received signal at the desired ADC IF frequency.

Countering Channel Disturbances

Conventional receivers, and transceivers (which are receivers that also include a transmitter), employ various types of diversity transmission and reception features so as to overcome disturbances in the communications channel (such as signal loss due to blockage by trees, buildings and other obstructions, for example, in a cellular telephone application). Various types of diversity techniques include frequency diversity, time diversity, spatial diversity and code diversity such as that employed in code division multiple access (CDMA). Diversity reception techniques, conventionally require some information being provided by the baseband digital signal processing section, so as to determine how to optimally employ the diversity features of the system. For example, in the conventional system of FIG. 1, two antennas, 101 and 105, may be controlled by an antenna select line, that connects with the baseband processing section 122, as shown. The decision process for which the antenna to select, will draw additional processing resources from the digital signal processor 116, thereby further establishing a need for digital signal processor resources with substantial processing power.

The present inventors have identified that a need exists for integrating diversity reception techniques for receiving DSSS signals having relatively low signal processing gain in low-end products with minimal signal processing resources.

Techniques For Digitizing RF and IF Signals

FIGS. 2 and 3 show respective frequency plots of a signal of interest, before and after, respectively, being passed through a harmonic sampling operation, a technique that may be used to reduce signal processing complexity in digital receivers. One special case of harmonic sampling is shown in FIGS. 4 and 5, where the harmonic sampling is performed using a "real", not complex or quadrature, harmonic sampling approach, as will be discussed.

Harmonic Sampling

Harmonic sampling (also known as undersampling, bandpass sampling or Super-Nyquist sampling) is a technique that may be used to translate a signal at an RF or intermediate frequency (IF) to a resulting frequency near or at baseband.

FIGS. 2 and 3 illustrate an example scenario where the sampling rate for the ADC is between 0 Hz (labeled as 204) and the maximum analog input frequency 214. (These specific frequencies are used to simplify the later discussion with respect to these present invention and should not be construed as a specific implementation of a prior art device). The signal of interest 210 exists at an IF frequency 212 of 10.8 MHZ, and the sample rate of the converter 206, as recognized by the present inventors and as will be discussed in the context of one of the preferred embodiments, is an integer multiple such as 4 times the chipping rate (i.e., a rate at which chip of the PN sequence are produced). In the conventional oversampled application, with a sample rate (Fs) any signal that exists between 0 Hertz (Hz) 204 and Fs/2 205 (i.e., the Nyquist bandwidth) is digitized and represented untranslated following digitization. Thus, maling it necessary to use an anti-alias lowpass filter to attenuate frequencies above the Nyquist frequency 205. However in harmonic (undersampled) applications such as that depicted in FIG. 2, the anti-alias filter is a bandpass filter (208). The purpose of the filter remains unchanged, as all frequencies except the signal of interest must be attenuated to a point of insignificance.

The sampling device operates as a discrete component whose sample event is set by a clock edge. The signal is tracked until the sample edge occurs, and is then immediately held. In an ideal sampling device, this track and hold system operates on an infinitesimally small time window (a clock edge). This time domain operation is an impulse function and can be expressed as a series of fundamental frequencies (tones) in the frequency domain separated by the frequency of the sampling clock. Each of these tones is equal in magnitude and extend to infinity. For sampling applications, these tones act as harmonics in an ideal mixer and the input signal is mixed against these harmonics, creating repetitive images in the digitized spectrum.

Care must be taken to ensure that the relative frequency of the IF with respect to the harmonic tones do not create overlapped images, because the overlapping will degrade the dynamic range of the system. The optimal frequency separation for the IF with respect to any given tone is one-fourth the sampling frequency because this translates the signal and all images to the center of the Nyquist bandwidth. Accordingly, frequency error inherent in the system is therefore afforded the greatest guardband and usable dynamic range is maxined.

FIG. 3 depicts the resultant digitized spectrum after the signal is sampled at Fs=4.8 MHZ and demonstrates a zero guardband system where the signal of interest occupies the entire Nyquist bandwidth 316 for a given sample rate. The resulting images 318, 319, 320, 321, 322, and 323 are separated every Fs/2 in frequency. Ideal IF center frequencies ($F_c$) will therefore exist at multiples of the sample rate ±¼ of the sample rate. The following equation may be used to select ideal IF frequencies for a given Fs.

$$IF = Fs(N \pm \frac{1}{4}),$$

where N is an integer harmonic sampling multiplicand. For the example depicted in FIG. 2, N=2 and "+¼" is selected. Whenever the "–¼" option is selected, the downconverted image is "high side injected" and will be spectrally flipped (high frequencies at 0, and 0 at Fs/2). The actual IF frequency can exist at any harmonic of the sample rate. Although, practical limitations should be observed because the input frequency range 202 is limited primarily due to the limitations in the track and hold operator to adequately follow the signal without introducing distortion. Any slew limiting or overshoot will introduce noise into the system, which is true for limiting single-bit digitizers as well as multi-bit digitizers.

The effect of aperture jitter contributes to phase noise in the digitized signal, where aperture jitter is defined as a time difference present in a decision threshold for realizable sampling components. Assuming the sample clock has zero phase noise (which seldom is true), the sampling component will observe the clock edge with some degree of time error based on the voltage comparison window of edge recognition. The error is often only a few picoseconds; yet, it is quantifiable and contributes negatively as phase noise. As recognized by the present inventors, because the signal of interest is placed at higher IF frequencies, and therefore higher harmonic frequencies, the aperture jitter increases proportional to the harmonic multiplicand.

Real-only Sampling

A way to achieve lower computational loading is to process the sampled data as real-only, thus discarding the quadrature processing altogether. FIGS. 4 and 5 depict a signal IF spectrum prior to sampling and after real-only sampling. In FIG. 4, the analog input range 402 for the ADC is between 0 Hz and the maximum analog input frequency 414. The signal of interest 410 exists at an IF frequency 412 of 10.8 MHZ. As previously discussed, the presently described frequencies were identified by the present inventor and presented in the prior context only for the purposes of explaining real-only sampling. The sample rate 406 is shown to be 4 times the chipping rate, and the anti-alias lowpass filter 408 attenuates undesired frequencies. The downsampled, digitized spectrum exists at 0 Hz, 519 (i.e., baseband), and present in the Nyquist bandwidth 516 are two copies of the same spectrum flipped about 0 Hz. All of the signal information is available now in the previous bandwidth of interest, but, 3 dB off orthogonal transmitter loss is present resulting in degraded performance. Repetitive images of the signal exist throughout the frequency spectrum and are depicted as items 518, and 520 through 522.

Techniques for Processing Digital Signals having High Sample Rates

A challenge with modern digital receivers is identifying how to convert radio frequency energy into digitized samples which occur at extremely high sampling rates (in most applications well over 1 MHZ) and providing enough digital signal processing power to process in real time the samples provided from the analog to digital converter. A technique that has been used to lower the sample rate of digital signals is to low pass filter the digital signal samples, followed by decimating in time the respective samples. Decimation in time is a process in which a set of adjacent samples are combined into a lesser number of samples so as to produce a lower sample rate. This lesser number of samples is then more easily handled by digital signal processors. Accordingly, decimation reduces signal processing demands in digital receivers by lowering sample rate. For a general discussion of decimation and sample rate reduction techniques, see Frerking, M, "Digital Signal Processing and Communication Systems", Van Nostrand Reinhold, 1994, the contents of which is incorporated herein by reference, in particular pp 65–66, 193–199. Nonetheless, while decimation is an approach for reducing sample rate, conventional wisdom suggests that performance in digital receivers requires high performance digital signal processors that can operate at very fast clock rates. In contrast, the present inventors have identified that the combination of decimation, downconversion, and judicial use of harmonic sampling, contributes to enabling the use of lower-end digital signal processor that performs adequately even when receiving a signal from a transmitter having an inaccurate frequency reference.

Setting Detection Bandwidth

Receive systems typically contain cascaded filters to band-limit the received signal prior to detection. The final filter prior to detection sets the predetection bandwidth of the system. Typically, this predetection bandwidth is as narrow as possible so as to maximize receiver sensitivity. The wider the filter, the more noise energy is present in the signal detection process. Typical direct sequence systems set this final predetection bandwidth to be equal to the desired signal of interest, thus maximizing the receive sensitivity.

As recognized by the present inventors, the conventional approach is only possible if the transmitter and receiver are perfectly aligned in frequency, either by tightly controlling the transmitter and receiver frequency references or by using a frequency acquisition and control loop to adjust the receiver reference to match the transmitter's reference. Both approaches are expensive in component cost and/or complexity. Poor frequency stability in transmitters and/or receivers may be accommodated by widening the receiver predetection bandwidth to compensate for frequency error in the data link, but at increased noise power and lower system performance.

FIG. 6 depicts a probability distribution function for noise versus signal plus noise in two predetection bandwidths. For conventional systems having a bandwidth of 20 kHz, distribution 605 depicts the probability distribution function of noise. In contrast to conventional systems, Applicants have identified a need for receivers with a much wider detection bandwidth (115 KHz, versus 20 KHz) so as to capture the transmitted signal with a 115 kHz transmitter uncertainty bandwidth. The distribution for a bandwidth of 115 KHz is shown as the element labeled 610.

Distributions 630 and 625 are for a keyed, or "ON" signal of −110 dBm as detected in a 115 kHz and 20 kHz predetection bandwidth respectively. As depicted, the signal to noise ratio (SNR) is greater for predetection bandwidth of 20 kHz (640) than for 115 kHz (645). SNR is measured as the difference in mean power for noise 615, 620 and signal 635. Consequently, the present inventors have identified that a performance penalty is to be paid in the form of decreased SNR if low-cost, inaccurate frequency references are used for transmitting and receiving a signal.

FIG. 6 further demonstrates that the wider predetection bandwidth of 115 KHz incurs a sensitivity loss relative to a narrower predetection bandwidth. As the predetection bandwidth is allowed to grow wider, the noise distribution function approaches the signal distribution function actually overlapping it and inducing errors on detection which corresponds to a reduction in sensitivity. Accordingly, the present inventors have identified that when constructing a system, a balance must be struck between the predetection bandwidth and frequency error budget accounting for reasonable performance degradation as well.

Code Chip Coarse Synchronization

Direct sequence transmission systems require that the receiver and the transmitter have aligned pseudorandom codes in order to properly despread the received signal. The receiver has the burden of aligning the receiver pseudorandom code with a transmitter pseudorandom code in order to properly despread the signal.

Direct sequence receivers must correlate the received signal in order to recover data. The correlation process can be described as either a serial or parallel process. Prior art has typically performed low cost correlation in a serial process wherein multiple bit intervals (or multiple code repetition intervals) of received data are used against successive relative chip phases of the receiver PN code to correlate data. High cost, high end systems typically achieve correlation much faster using a technique called parallel correlation. System which use parallel correlation use one or a few code periods of data to correlate against many phases of the PN code in parallel to produce a correlation function over one or a few code periods of data.

The present inventors have recognized that with either the slow serial search or the parallel search, the RF front end must remain active in order to continuously receive the signal, and thus, cannot be turned off during the computation of the correlation function, so as to conserve battery power.

For conventional systems that use a slow serial search, the burden is put on the transmitter to transmit a long preamble which allows the receiver to sequence through all possible combinations of the PN code for acquisition. Prior systems that use slow serial searches therefore require transmitters to transmit long preambles, shortening battery life and increasing power requirements. The present inventors have identified a need for a fast serial search method that would enable transmitters to optionally shorten their preamble period, and conserve battery power.

Conventional systems have been fielded with 92 code period preambles (i.e., preambles that repeat the entire code 92 times) so as to enable slow serial search receivers to acquire the 63 chip phases (63 candidate chip phases requiring a separate code period) with remaining code periods required for fine search and antenna diversity. The present inventors have realized that there is a need for new receivers that are backwards compatible with the existing transmitters that transmit 92 code periods in a preamble but can make better use of the long preamble, perhaps to employ additional diversity techniques to improve signal detection and demodulation, as well as reduce receive power.

Fine Synchronization (Fine Sync)

For direct sequence receivers, a fine sync process, sometimes called a fine search process, further reduces correlation error following the coarse synchronization process (coarse sync, or coarse search process). The coarse sync process terminates when a correlation result surpasses a predetermined threshold (i.e., a trip condition) indicating that the received signal is aligned to within +/−½ of a code chip interval of the PN code. Ideally, however, the signal and the PN code should be perfectly aligned to provide optimum performance. So as to more closely align the signal with the PN sequence, a fine sync process is initiated after the coarse sync process so as to further reduce the relative chip interval between the received signal and the receiver PN code.

FIG. 7 illustrates results observed in an ideal receiver when attempting to align the PN code to the received signal through successive ¼ chip fractional chips steps as part of a fine sync process. The circles in FIG. 7 represent respective powers (i.e., correlation results) received from the fine sync correlation process for relative ¼ chip fractional offsets of a signal, absent noise, and the PN code. A perfect correlation yields the maximum process gain at zero chip phase error, as shown by the center circle. For a PN code of length 63, which the inventors have recognized is relevant to one PN code for the present invention, the maximum process gain is 18 dB. Also, chip errors that are greater than 1 chip width result in the loss of all system process gain, such that the received signal cannot be detected or demodulated.

Conventional systems typically use either a slow fine serial search process, parallel fine search process or code tracking loops to compute the correlation function for fine sync. Slow fine serial search systems typically require one code period of data per fractional chip step to compute the correlation power, followed by a process for determining the maximum correlation from those data samples. As depicted in FIG. 7, computation for each of those correlation powers will require 9 code periods to compute the correlation peak (i.e., ±1, ±¾, ±½, ±¼, and 0). Alternatively, conventional systems may employ parallel processes where 1 code period of data is applied to 9 different correlators, arranged in parallel, each with a distinct fractional PN code offset, so as to compute the correlation peak simultaneously. The present inventors have recognized that the slow serial process requires more time to compute than the fast parallel process, but requires less computational processing power.

Fine search processes are used to initially acquire the spread spectrum signal and at predetermined time intervals through the data message in order to maintain correlation alignment. The term "reposition" or "repo" is a term used in spread spectrum systems, such as in transceiver systems designed by Axonn, to reposition the PN code and received signal while receiving a data message portion of the received signal.

Drift Offset Between Transmit and Receive Frequency References

Typical direct sequence spread spectrum systems require very stable local frequency references for transmit and receive operations in order to maintain near coherent (i.e., in phase) operation. Ideally, transmitters and receivers will operate using a common frequency reference in order to maintain correlation throughout the data message. An example of such a direct sequence system is the Global Positioning Satellite (GPS) system, which requires very accurate frequency references, typically Cesium based or other atomic standards. These precise, expensive frequency references provide adequate timing accuracy to virtually eliminate frequency and code phase drift between the received signal, as sent from the transmitter, and the downconversion tones and PN code generated in the receiver. Additionally, the receiver must employ complex digital signal processing in order to resolve time difference of arrival between multiple direct sequence signals in order to derive a stable local time reference for use. The direct sequence receiver must, therefore, measure and track frequency errors and code phase errors for transmitters in order to maintain reliable data communications.

As recognized by the present inventors, conventional direct sequence spread spectrum systems have opted to virtually eliminate by frequency and code phase drift problems by employing reasonably accurate frequency references at the transmitters and receivers. However, accurate frequency references are expensive for low-end commercial applications and draw more power than desired for battery powered applications (often because the frequency references will add heaters and other current drawing devices to help stabilize the reference). Related to this observation, the present inventors recognized that, frequency drift attributable to the transmitters frequency reference, a carrier frequency error will correspond to a related chipping rate error present in the PN code generator because the inaccurate frequency reference taints both the carrier frequency and the chip phase. Based on this observation, it is feasible that the receiver may employ methods to measure the frequency error and predict the code phase error.

Provided that search and trip are successful (i.e., the signal and PN code are aligned), frequency offset between the transmitter and the receiver may be measured to determine the magnitude and direction of the frequency uncertainty. Frequency and/or phase detectors, as will be discussed, may be used to determine the magnitude and direction of the frequency uncertainty. Once a frequency error is determined, a local oscillator (LO) downconversion tone is changed to compensate for the frequency error. This method is the classic Automatic Frequency Control (AFC) loop. The present inventors identified that a problem with this approach is that it requires the LO AFC loop to settle, often taking many code periods to complete. For systems that have adequate time to implement a frequency locking loop, this may be an acceptable trade-off. Also, as recognized by the present inventors, making the frequency correction in the RF downconversion portion of the receiver, and not in the baseband processing section of the receiver, preserves the signal processing efficiency, thereby enabling the use of lower cost, lower performance digital signal processing components as compared with state-of-the-art signal processing components.

In a receiver, a first LO is usually generated by a phase and/or frequency locked synthesizer. A block diagram of an integrated circuit-based LO synthesizer, such as a National Semiconductor LMX1501A, is given in FIG. 8. Conventional phase lock frequency synthesizers are described in Manassewitsch, V., "Frequency Synthesizers Theory and Design", John Wiley & Sons, 1987, pp. 43–48, the contents of which is incorporated herein by reference. The synthesizer of FIG. 8 includes a stable reference frequency source 800 (such as a quartz crystal oscillator), a reference divider

805, a phase and/or frequency detector 810, a loop filter 820, a voltage controlled oscillator 830 and feedback dividers 840 and 850. An output 860 of the synthesizer is a signal at the desired frequency. The desired frequency is set by programming the moduli of the dividers 805, 840 and 850.

Making such an adjustment does correct for frequency error, however it does not adjust for code phase error or code phase drift over time. Traditional systems which employ frequency references, as depicted in FIG. 8, typically use high power expensive components to set that reference very accurately. As will be discussed, the present inventors have identified a method to set the LO synthesizer very inexpensively, requiring a minimum of digital signal processing resources and subsequently track code drift throughout acquisition and demodulation without adjusting the receive local frequency reference.

Decimation

Digital signal processing systems typically employ decimation as a way to lower a number of samples that need to be processed at various processing steps. The effect of decimation is to combine a number of samples into a lesser number of samples, or merely select a subset of samples within a block of adjacent samples for subsequent processing. Decimation is typically preceded by a filter whose characteristics often impact signal strength adversely, particularly because the decimation operation has a characteristic transfer function that preferentially passes signals occurring in a middle portion of the characteristic transfer function, but attenuating signal offset from the middle portion. The present inventors have identified methods for eliminating or limiting the effects of decimation loss while minimally impacting processing requirements.

SUMMARY OF THE INVENTION

Accordingly, one object of the present invention is to overcome the above identified limitations and excesses in conventional direct sequence spread spectrum systems that prohibit the use of low-cost, low-end frequency references and digital signal processing components for performing the substantive direct sequence spread spectrum transceiver operations.

It is another object of the present invention to provide a method and apparatus for receiving a direct sequence spread spectrum signal sent from a transmitter having a relatively inaccurate frequency reference.

It is yet another object of the present invention to provide a method and apparatus for receiving and/or transmitting a direct sequence spread spectrum signal over a long period of time using only battery power as controlled by a power saving mechanism and/or signaling protocol.

It is still a further object of the present invention to provide a method and apparatus for receiving and/or transmitting a direct sequence spread spectrum signal with a device having a size (i.e., footprint) about equivalent to that of a conventional credit card.

Yet another object of the present invention to provide a method and apparatus for quickly acquiring a transmitted direct sequence spread spectrum signal. An aspect of this object is to provide a fast serial search method that offers the simplicity attributes of a conventional slow serial search method and efficiency attributes of a parallel correlator, while also conserving battery power by disabling an RF front-end of a transceiver after receiving a portion of the signal and while attempting to acqire the direct sequence spread spectrum signal.

Still a further object of the present invention is to provide a receiver and/or transceiver architecture that includes a scalable sensitivity attribute that allows the sensitivity of the receiver/transceiver to be incrementally improved, at the expense of increasing computational loading.

It is still a further object of the present invention to provide a receiver and/or transceiver that includes a distributed decimation architecture that reduces computational load for baseband processing, while maintaining minimal decimation loss and reliable data communications.

It is another object of the present invention to provide a multi-channel direct sequence spread spectrum receiver and/or transceiver variant that offers increased sensitivity relative to a single channel receiver and/or transceiver, with provisions for improving system performance with enhanced automatic gain control (AGC) mechanisms, false trip avoidance mechanisms, direct current (DC) removal mechanisms, and predictive reposition mechanisms.

It is a further object of the present invention to provide a method and system for operating a receiver and/or transceiver in a direct sequence spread spectrum application using battery for power, with power management features.

It is still a further object of the present invention to provide a method and apparatus in a direct sequence spread spectrum communication system, with variable data rate option, by adjusting a relation of bit length to number of code chips per bit, using a relatively short pseudo-noise sequence length.

Another object of the present invention to provide a method for receiving OOK signals using a receiver and/or transceiver that employs a hard limited analog to digital converter.

Still another object of the present invention is to provide a direct sequence spread spectrum system/network that establishes a communications protocol for saving battery power at various remote receiver/transceiver elements in the network.

It is another object of the present invention to provide a computer-based product including digital signal processing methods and data structures for efficiently implementing a direct sequence spread spectrum receiver/transceiver.

It is another object of the present invention to provide a direct sequence spread spectrum transceiver, and system that uses the transceiver that may be adapted to improve performance by substituting higher performance transceiver mechanisms for less capable mechanisms, although more computationally demanding and generally at higher cost.

These and other objects are provided by a method, apparatus, computer-based product and system that uses a receiver (or transceiver) to receive, digitize and process a direct sequence spread spectrum signal using efficient, low-cost digital signal processing components. A radio front end, and/or analog to digital conversion (ADC) apparatus are included to receive the direct spectrum signal and convert the received signal into a digitized signal. Downconversion and decimation are performed on the digitized signal at an intermediate frequency prior to despreading and correlating the digitized signal with a pseudorandom noise (PN) code used at a transmitter to spread a data signal contained in the direct sequence spread spectrum signal. Despreading and correlating the signal with PN signal extracts the data signal portion of the direct sequence spread spectrum signal for subsequent processing.

In order to initially align, and maintain alignment of, the PN code with the direct sequence spread spectrum signal, a timing and state control mechanism is included and provides time reference correction information to the signal processing components of the receiver and/or transceiver, without expressly modifying a locally generated time reference. Additional features include synchronization algorithms, suitable for use for low performance digital signal processors, implemented in coarse search and fine search algorithms for acquiring the direct sequence spread spectrum signal, using minimal processing resources.

The receiver and transceiver, according to the present invention, employ power management mechanisms that, at least in selected embodiments, may be powered by small batteries that apply power only to those components necessary to maintain an operational state of the receiver and/or transceiver, based on a present operational state of the receiver and transceiver. Using the power management features, the receiver and/or transceiver may communicate with other direct sequence spread spectrum transmitters and receivers as part of a communications network for multi-year periods of time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram of a conventional Digital Signal Processor (DSP)-based receiver;

FIG. 2 is a graph illustrating a signal spectrum before conventional harmonic sampling of an Intermediate Frequency (IF) signal when the IF signal is converted to "near baseband";

FIG. 3 is graph illustrating a resulting frequency spectrum of conventional harmonic sampling of the Intermediate Frequency (IF) signal of FIG. 2 when the IF signal is converted to "near baseband";

FIG. 4 is a graph illustrating the signal spectrum before conventional harmonic sampling of an IF signal;

FIG. 5 is graph illustrating a resulting frequency spectrum of conventional harmonic sampling of the IF signal of FIG. 4 when the IF signal is brought directly to baseband;

FIG. 6 is a graph that shows signal level distributions for 115 kHz and 20 kHz of noise bandwidth;

FIG. 7 is a graph of a conventional correlation function with associated power loss due to fractional chip error of spreading code alignment;

FIG. 8 is a block diagram of a conventional local oscillator frequency synthesizer;

FIG. 9 is a block diagram of a single channel transceiver of the first embodiment of the present invention;

FIG. 10 is plan view of the single channel transceiver, and associated battery pack of the first embodiment;

FIG. 11 is a block diagram of a digital signal processing portion of the single channel receiver portion of the transceiver of FIG. 9;

FIG. 12 is a circuit diagram of a digital downconversion and decimation stage of the transceiver of the first embodiment, as realized by a table lookup process;

FIG. 13 is a circuit diagram that shows an alternative digital downconversion and decimation stage, realized by Boolean logic;

FIG. 14 is a graph that demonstrates (1) how decimation can reduce system performance, and (2) how this reduction in system performance can be avoided according to the signal processing architecture of the first embodiment;

FIGS. 15A–B are graphs that illustrate a signal acquisition process of the first embodiment;

FIG. 16 is a flow chart of a fast time domain serial search process of the first embodiment;

FIG. 17 is a graph that shows how the ideal correlation process of FIG. 7 is adversely affected by noise;

FIG. 18 is a graph that compares respective results of different inventive fine search methods;

FIG. 19 is a flow chart of a Center of Mass fine search method;

FIG. 20 is a flow chart of a Center of Mass 9 method;

FIG. 21 is a flow chart of a Center of Mass 5+ method;

FIG. 22 is a flow chart of a Center of Mass 9' method;

FIG. 23 is a flow chart of a top-level search process performed by the transceiver of the first embodiment of the present invention;

FIG. 24 is a graph that shows how antenna diversity can improve the received signal to noise ratio;

FIG. 25 is a block diagram of a low-cost implementation of a frequency diversity transmitter portion of the transceiver of FIG. 9;

FIGS. 26A–B are graphs showing the respective transmitted signals with frequency diversity disabled and enabled;

FIGS. 27A–D are timing diagrams showing how a transceiver of the first embodiment implements antenna and frequency diversity;

FIG. 28 is a graph showing how averaging a signal in the first embodiment reduces an effects of noise;

FIG. 29 is a graph showing how averaging reduces a false alarm rate in the first embodiment;

FIGS. 30A–F are respective approaches for incrementally increasing data rate using partial sums of the correlation function;

FIG. 31 is block diagram of an alternative demodulator of the first embodiment showing a differential binary phase shift keying (DBPSK) demodulator, with scaleable bit rate;

FIG. 32 is a block diagram of an alterative embodiment of a receiver portion shown in FIG. 9 for resolving frequency ambiguity between a remote transmitter and the receiver;

FIG. 33 is a illustration of an approach for implementing a frequency detection portion of the receiver shown in FIG. 32;

FIG. 34 is a block diagram of an implementation of the digital-to-analog converter of FIG. 32;

FIG. 35 is a block diagram of the digital downconversion, decimation, and removal of Analog-to-Digital converter (ADC) DC offset of a multi-channel receiver portion of a second embodiment transceiver embodiment of the present invention;

FIG. 36 is a block diagram of channel formation portion of the multichannel receiver shown in FIG. 35, which reduces processing requirements for symmetric channel filters;

FIG. 37 is a block diagram of a center channel forming portion, having reduced processing requirement attributes, for a center channel filter of the multichannel receiver of FIG. 35;

FIG. 38 is a graph demonstrating how a reduction in decimation loss may be achieved in the multi-channel receiver of the second embodiment of the present invention;

FIG. 39 is a graph showing how non-uniformly spaced frequency channels in the multi-channel receiver of the second embodiment limits system performance loss;

FIG. 40 is a block diagram of a fast frequency domain code correlator portion of the second embodiment;

FIG. 41 is a block diagram of a conventional correlator;

FIG. 42 is a block diagram of a conventional circular correlator;

FIG. 43 is a block diagram of a conventional circular correlator implemented with a convolution process;

FIG. 44 is a block diagram of a conventional circular convolution correlator, operating in the frequency domain;

FIG. 45 is a illustrative flow diagram of an implementation of an inventive frequency domain code correlator of the second embodiment;

FIG. 46 is a graph of signal conditions that can cause false trips (i.e., false correlation detection indications);

FIG. 47 is a graph that shows how the power of a received noise signal will be distributed among frequency channels in a multi-channel receiver;

FIG. 48 is a graph that shows how the power of a received Carrier Wave (CW) jammer signal will be distributed among frequency channels in a multi-channel receiver;

FIG. 49 is a graph that shows how the power of a received non-correlated spread spectrum signal will be distributed among frequency channels in a multi-channel receiver;

FIG. 50 is a graph that shows how the power of a received correlated spread spectrum signal will be distributed among frequency channels in a multi-channel receiver;

FIG. 51 is a flow chart of false trip avoidance method implementable in the multi-channel receiver;

FIG. 52 is a graph illustrating results of a correlation function of a single code period of data in the multi-channel receiver embodiment;

FIG. 53 is a graph similar to FIG. 52, but including an averaging mechanism to reduce the effect of noise;

FIG. 54 is another graph showing how averaging reduces a false alarm rate in the multi-channel receiver;

FIGS. 55–61 are flow charts of an Automatic Gain Control (AGC) method implementable in the multi-channel receiver of the second embodiment;

FIG. 62 is a graph showing signal power loss in a multi-channel receiver of the second embodiment due to past frequency drift of the transmitter;

FIG. 63 is a graph showing received signal loss due to fast transmitter frequency drift;

FIG. 64 is a flowchart of a process implementable in the multi-channel receiver to compensate for fast frequency drift in a signal transmitted by a transmitter;

FIG. 65 is a graph showing a method for limiting noise contribution and corresponding to the process illustrated in FIG. 64;

FIGS. 66A–C are graphs of signal loss due to frequency error and how this loss may be reduced by implementing a code phase repositioning and predictive code phase repositioning process throughout the message;

FIG. 67 is a block diagram of a system with multiple transmitters, and multiple receivers that are connected to a processor via a common bus in a network, according to a third embodiment of the present invention;

FIG. 68 is a block diagram showing a battery operated remote transceiver (BORT) application of the network of FIG. 67;

FIGS. 69A–B are graphs shows network timing, corresponding to FIGS. 67 and 68;

FIGS. 70A–C jointly present a flow diagram of a process flow implemented in a BORT device of FIG. 68;

FIGS. 71A–B jointly present a flow diagram of a process flow of a system transceiver of FIG. 68;

FIGS. 72A–C jointly present a timing diagrams showing the steady state communication exchanges between a system transceiver and a BORT device;

FIGS. 73A–B jointly present a flow diagram showing the steady state operation of a BORT device;

FIG. 74 is a timing diagram showing the initialization sequence of a BORT device in a BORT-based system, or network;

FIG. 75 is a flow diagram showing a BORT initialization process;

FIGS. 76A–C are timing diagrams showing the re-synchronization sequence of a BORT device in a BORT-based system, or network; and FIG. 77 is a flow diagram of a BORT re-synchronization process.

DETAILED DESCRIPTION OF THE PREFERRED EMBODIMENTS

Referring now to the drawings, and more particularly to FIGS. 9 and 10 thereof there is illustrated a first embodiment of the present invention in the form of a credit card sized single channel transceiver (which includes a receiver and a transmitter, hence the term "transceiver"), that is included as part of a direct sequence spread spectrum network of transmitters, and receivers, which include transceivers. As will be discussed in reference to FIGS. 9–34, the present transceiver is of a sufficiently small size that it may be operated under battery control, and require low end, low performance digital signal processors in order to perform the digital receiver, transceiver and other control functions.

FIG. 9 is a block diagram of the single channel transceiver that includes two antennas 901 and 903 that feed a radio frequency (RF) front end 905. A direct sequence spread spectrum signal, formed at a transmitter preferably with a 63 bit pseudorandom noise (PN) code at a transmitter, is coupled into the antennas 901 and 903 and to the RF front end 905. An output of the RF front end 905, provides, at an intermediate frequency (IF), the received signal to a single bit analog to digital converter (ADC) 907. The ADC 907 converts the analog signal into a series of digital samples, as a particular sample rate as will be discussed, which are then be processed in baseband processing section 908. The digital signal processing section 908 includes a low performance 16-bit digital signal processor, which operates at less than 20 MHZ clock. One example of such a digital signal processor is Model 893×1, available in the United States from Zilog.

More particularly, the digital samples from the ADC 907 are passed to a quadrature (i.e., inphase, I and quadrature, Q) downconversion mechanism 909 that further reduces the center frequency of the received signal to baseband, and decimates the digital signals. By downconverting and decimating the digital signal sample rate is reduced, which in turn reduces a digital signal processing load placed on the digital signal processing section 908. The output of the quadrature downconversion mechanism 909 is provided to a direct sequence despreading/correlator mechanism 911. The despreading correlation mechanism 911 aligns the PN code, which is the same code as that used to spread a data signal at the transmitter but generated locally at the transceiver, to the incoming signal so as to correlate the received signal with the locally generated PN code. As a consequence (as will be explained), the despreading/correlating mechanism 911 further decimates the correlated signal so as to further reduce the data rate and realize the 18 dB of processing gain (i.e., the gain associated with the PN spread spectrum signal) so that the signal may then later be passed to additional mechanisms for identifying when the signal is correlated, how well the signal was correlated, and ultimately for extracting the data from the correlated signal.

The output of the direct sequence despread/correlator 911 passes to a switch 913, preferably implemented as a state-driven digital process, under control of a timing and state control mechanism 921, as shown. The timing and state control mechanism 921 first throws the switch 913 so as to connect to a coarse search and trip mechanism 919 which performs initial signal acquisition, and acquisition detection respectively. Once the coarse search and trip mechanism 919 determines that the signal has been acquired, the timing and state control mechanism 921 throws the switch 913 into a middle position, as illustrated, so as to pass the output of the direct sequence despread/correlator 911 to a fine search mechanism 917.

The fine search mechanism adjusts the receive PN sequence to align within a small predetermined chip interval with respect to the transmitted PN sequence. In the preferred embodiment the fine search mechanism 917 positions the received PN sequence to less than ¼ of a chip interval. Once within the ¼ chip alignment, the timing and state control circuit 921 moves the switch 913 to the upper position, as illustrated, so as to pass the output of the direct sequence despread/correlator 911 to the demodulation circuit 915 which extracts the data from the transmitted signal and passes the data to a data sink as shown.

The output of the demodulation mechanism 915 is also passed to the timing and state control mechanism 921 as a reposition signal to perform a reposition operation like that discussed in U.S. Pat. No. 5,457,713, as identified in the Cross-Reference Section, and therefore, will not be further discussed herein.

The time reference correction mechanism 923 provides a time reference correction signal to the ADC 907, quadrature downconversion mechanism 909, and direct sequence despread/correlator mechanism 911, in order to compensate for time drift errors induced by differences in transmitter and receiver time references (a time reference being a particular implementation of a frequency reference, and thus the two terms being used in a corresponding sense herein), due to inherent inaccuracies in low-cost, low performance time references such as receiver time reference 927 as shown. The time reference correction mechanism does not adjust the receiver time reference 927, as is done in convention receivers. Rather the time reference correction signal compensates for the inaccuracies induced by the time reference 927 in the various elements that employ an input from the receiver time reference 927.

The timing and state control mechanism 921 also includes an antenna select control signal which selects between antennas 901 and 903 when antenna diversity (such as for spatial or polarization diversity purposes) is employed. In addition, the select signal includes a frequency control select signal, illustrated by a dashed line, applied to the RF front end 905, so as to control frequency diversity reception when frequency diversity is employed in the transceiver of FIG. 9, as will be discussed.

The transceiver of FIG. 9 includes a power control mechanism 925 that is controlled by the states determined in the timing and state control mechanism 921, so as to provide a power management function for the transceiver. More particularly, when the transceiver is operated in selected states, where not all of the components, such as the RF front end 905, are required for successful operation, the power control mechanism 925, places the selected components in a reduced power consumption mode of operation. Although not shown for clarity purposes in FIG. 9, the power control mechanism 925 is operatively coupled to a battery pack 1003 (FIG. 10) and to each of the active components in the transceiver illustrated in FIG. 9. Consequently, the power control mechanism, can remove power from the RF front-end 905, transmitter 929 and the entire, or subsections of, the digital signal processing section 908.

The transmitter 929 that is connected to a transmit antenna 931, which may be a separate element, but preferably is the same as antenna 901 or 903 with an accompanying diplexer (not shown). The transmitter 929 is provided with an external data source as shown, and derives time and frequency information from the receiver time reference 927 such that transmissions by the transmitter 929 will also be subject to the timing uncertainties caused by low cost receiver time reference 927. The transmit feature associated with the transmitter 929, and the waveform produced therein are discussed in U.S. Pat. No. 4,977,577, as well as the corresponding related patents and applications as previously discussed in the Cross-Reference Section.

FIG. 10 is a plan view of the credit card outline transceiver 1000 as was discussed in FIG. 9. The two dimensional footprint of the credit card outline transceiver 1000 includes a length in an X direction of about 3.4", and a width in a Y direction of about 2.1" as shown. A thickness (not shown) is roughly 0.4". The battery pack 1003 connects to the credit card outline transceiver 1000 via a connector 1002 as shown. The battery pack 1003, includes two external 3.6 V lithium thionyl chloride (LiSOCl$_2$) cells (such as a LS-14500 cell available from Faft Corporation), which provide sufficient power to operate the transceiver, as discussed herein, for multiple years.

The data source and data sink on the credit card transceiver shown in FIG. 9, is provided via bidirectional interface 1004 as shown in FIG. 10. The connector includes a serial interface such as a RS232C, pseudo RS232C (0–5V RS232C) or other interfaces such as RS-485. In addition, other interfaces may also be suitable, such as universal serial bus USB, Fire Wire (IEEE 1394), and other data interfaces available in data communication equipment.

Selecting Sequence Length Based on Prime Factors

The process gain that a radio exhibits is driven by the length of the spreading sequence. The present invention uses the class of codes referred to as maximal length (ML) sequences, due to their correlation properties, and preferably a 63-bit ML sequence.

ML sequences are always of length $2^k-1$, where k is any positive integer. The process gain associated with a particular spreading sequence is 20 log(n), where n is the length of the spreading sequence. Longer spreading sequences allow for more process gain; but require more computational loading to achieve correlation. The present invention does not attempt to achieve the greatest possible processing gain (because too much processing power is required) but provides a reasonable amount of processing gain that can be realized with limited computational resources.

For any given relative code phase alignment between the transmitter and receiver spreading codes, a single power value must ultimately be calculated, where the phrase "code phase" refers to an alignment of the code chips used to spread the signal relative to the code chips of the PN code generated locally at the transceiver. The present invention uses decimation in the time domain and Fourier transforms in the frequency domain to achieve this result. The present invention utilizes partial decimation (i.e., multiple decimation stages distributed throughout the transceiver) and partial transformation techniques to reduce computational loading. These techniques are enabled by selection of length of the spreading sequence that can be factored into prime numbers. In the preferred embodiment, a code length of 63 is selected and can be factored into prime numbers 3, 3, and 7. Table 3 depicts ML sequences of length $2^k-1$ for k up to 13, as well as the number of prime factors for each length and a processing gain associated with each code length.

TABLE 3

Maximal Length Sequence Lengths

| k | $2^k$-1 | # of Prime Factors | Process Gain(dB) |
|---|---|---|---|
| 1 | 1 | 1 | 0.000 |
| 2 | 3 | 1 | 4.771 |
| 3 | 7 | 1 | 8.451 |
| 4 | 15 | 2 | 11.451 |
| 5 | 31 | 1 | 14.914 |
| 6 | 63 | 3 | 17.993 |
| 7 | 127 | 1 | 21.038 |
| 8 | 255 | 3 | 24.065 |
| 9 | 511 | 2 | 27.084 |
| 10 | 1023 | 3 | 30.099 |
| 11 | 2047 | 2 | 33.111 |
| 12 | 4095 | 5 | 36.123 |
| 13 | 8191 | 1 | 39.133 |

One example of computational savings resulting from selecting a code sequence that is factorable by multiple prime factors is illustrated by comparing a length-31 sequence (which is not factorable) and a length-63 sequence (factorable by three prime factors). The length-31 sequences have about 15 dB process gain, which would generally be recognized as having an adequate process gain, without resorting to a longer code sequence. However, since 31 is a prime number, a Fourier transform performed on a signal that was spread with this code sequence would require 31*31=961 multiply-accumulate operations. In contrast, the length-63 code sequence has prime factors 7, 3, and 3, and thus requires a Fourier transform with only 63*(7+3+3)=819 multiply-accumulate operations. Therefore, scaling from 31 to 63 provides 3 dB of additional process gain with no additional, actually a decrease, in computational loading.

Another computational efficiency feature offered by a code sequence that is factorable by multiple prime numbers is that increase flexibility is achieved in selecting intermediate decimation factors. This in turn enables flexibility in the number and position of decimation, filtering, and downconversion processes employed in the transceiver.

Single Channel Receiver Partial Decimation Method

The single channel embodiment of this invention employs a distributed (partial) decimation scheme configured to reduce the Nyquist bandwidth of the signal to equal the frequency uncertainty caused by inaccurate frequency references in the transmitter and receiver. To this end, in this embodiment, the signal is sampled at 4 times the chip rate (i.e., the number of chips per second applied in the despreading stage), downconverted and decimated by 4 immediately so as to drop the resulting sample rate to 1.2 MHZ. The signal is correlated (despread) and subsequently decimated again to drop the Nyquist bandwidth to ±57.6 kHz, which in the preferred embodiment is the frequency uncertainty bandwidth (BW).

The digital signal processing flow for the receiver portion of the transceiver shown in FIG. 9 is depicted in FIG. 11. In FIG. 11, a signal of interest lies at an IF frequency of 49.2 MHZ and is applied to an input 1102 of a ADC 1104 at a sampling frequency of 4.8 MHZ (1106). The resulting signal at the output 1108 of the ADC 1104 is at a near baseband frequency of 1.2 MHZ with a sampling of 4.8 MHZ. A tone generator 1110, combined with phase delay element 1112 and mixers 1114I and 1114Q, combine to form a quadrature half mixer. A first decimation stage is implemented with low pass filters 1116I and 1116Q and decimation blocks 1118I and 1118Q. Code correlation is performed as the signal from PN code generator 1120 is mixed in 1122I and 1122Q to generate correlated I and Q data streams. This data is further filtered by low pass filters 1124I and 1124Q and then decimated by elements 1126I and 1126Q.

The resulting I and Q data streams form a set of partial decimation sums, each sum being the correlation of 42 processed samples. The decimation from the sample rate with 252 points to 6 points reduces the effective Nyquist bandwidth for the signal and sets the predetection bandwidth to 115 kHz. Finally, the magnitude of the resulting signal power is calculated by respective squaring mechanisms 1128 I and 1128 Q and summation blocks 1130I, 1130Q, and 1132. The result is signal a 1134, which is a magnitude scalar value representative of the correlated signal power in a 115 kHz noise bandwidth.

The leftmost portion of FIG. 11 performs the quadrature downconversion and partial decimation. The right portion of FIG. 11 performs the subsequent despreading and decimation required to limit the noise bandwidth and achieve maximum sensitivity, while spanning a frequency uncertainty of 115 kHz.

Alternating a decimate-by-10 operation followed by a decimate-by-11 operation, three times in succession, realizes the decimate-by-10.5 block 1126 in FIG. 11. The resulting 6 data points of I and 6 data points of Q are squared, thus destroying their phase relationship prior to final decimation which is performed as a summing function. As the phase relationship is lost in the squaring block, further techniques for limiting noise bandwidth is prevented so that the subsequent summation yields a predetection noise bandwidth of 115 kHz. Once again, the wide predetection noise bandwidth of 115 kHz, which is much larger than the approximately 19.2 kHz baseband signal is needed because the exact position of the baseband signal cannot be a priori predicted with any degree of certainty, owing to the inaccuracy of the transmitters frequency reference.

The above-described process is used to create a single channel receiver tolerant to various frequency uncertainties. It is limited only in the number of decimation end points and associated decimation bandwidth prior to squaring. Reducing the 63 data points to 5 (decimate-by-13, 12,13,12,13) would result in a final noise bandwidth and frequency uncertainty of 96.3 kHz. Similarly reducing the 63 data points to 4 (decimate-by-16, 15,16,16) would result in a final noise bandwidth and frequency uncertainty of 77.1 kHz; 3 points (21,21,21)=57.8 kHz; 2 points (32,31)=38.5 kHz. Finally, decimating all the way to one point before squaring is the implementation of one of the channel filters used in the most sensitive embodiment that yields a single channel equal to the data bandwidth of 19.2 kHz.

Digital Downconversion at Fs/4 Centered IF Minimizes Computational Loading

Preferably the ADC 1104 is a 1-bit sampled limiter. However, a multi-bit ADC may also, albeit at greater expense and possible requirement that an Automatic Gain Function (AGC) function be used to avoid applying the signal at a level that is outside of the multi-bit ACC's dynamic range.

The overall noise contribution due to IF slew limiting and aperture jitter is evaluated to ensure that remaining dynamic range supports signal processing requirements. For the present invention, the dynamic range must be able to receive both noise and at least 18 dB (and preferably 36 dB) of signal. Because the low-cost embodiment of the instant invention is a 1-bit limited system, the dynamic range of the system is limited to the process gain of 18 dB. But since the system can also produce carrier insertion for jamming signals, the theoretic process gain against a frequency coincident jamming signal is 36 dB.

The resulting spectrum following digitization is centered at +¼ Fs so as to mammize distance to the nearest image (as was discussed in reference to FIG. 3). Additional images exist at -¾ Fs as well as -¼ Fs. Because the signal is sampled real, the image is ideally centered in the Nyquist bandwidth prior to final downconversion as shown previously in FIG. 3. The final conversion to baseband must be performed in quadrature to ensure that negative images do not overlap. The digitized signal is downconverted to baseband using a half-mixer, as discussed in reference to the background art. The present invention completes the signal downconversion operation by moving the quadrature signal centered at Fs/4 (i.e., 1.2 MHZ) to baseband (i.e., 0 Hz), as performed with components 1110, 1112 and 1114.

FIG. 11 illustrates the sampled limiter (i.e., ADC) 1104 as a mixer because the sampled limiter 1004 is operating as a harmonic sampler and thus also downconverts the IF centered at 49.2 MHZ. Several IF frequencies are preferred based on the availability of inexpensive surface acoustic wave (SAW) filters. Inexpensive bandpass SAW filters enable the harmonic sampling technique due to their sharp roll-off and excellent ultimate rejection characteristics. 10.8 MHZ is very near the standard SAW frequency of 10.7 MHZ used widely as a communication IF. 34.8 MHZ is ideal due to SAW filters that are present in many color televisions. 49.2 MHZ, the preferred embodiment, is also ideal due to the volume of portable telephones using this frequency. 70 MHZ SAW filters are also available, but the harmonic multiplicand (and corresponding aperture jitter noise) increases and the slew limiting requirements of the sampling device increase component cost.

The 10th harmonic multiplicand of the sample rate 1106 of 4.8 MHZ creates a mixing tone at 48 MHZ, the difference yielding the digitized downconverted image 1108 centered at 1.2 MHZ. The half-mixer (1144) performs a complex translation of the real signal centered at 1.2 MHZ and completes the downconversion to the baseband signal at 0 Hz.

Signal processing efficiencies exist with under these special circumstances when the IF is centered in the Nyquist bandwidth. Namely, the downconversion tone 1110 is realized digitally as a series of values of 1.2 MHZ as sampled at 4.8 MHZ, which in turn defines a 4:1 relationship between Fs and the IF center frequency (Fc). This 4:1 relationship enables a particularly efficient downconversion operation because a coefficient set for the I (In phase) data downconversion mixer may be represented as follows:

I Coefficients $[\cos(k\pi/2)]$: 1, 0, -1, 0, 1, 0, -1, 0, 1, 0, -1, 0 . . .

Similarly, the Q (Quadrature) coefficients related to I by 90 degrees become:

Q Coefficients $[\sin(k\pi/2)]$: 0, 1, 0, -1, 0, 1, 0, -1, 0, 1, 0, -1 . . .

for all $k \in \{0, 1, 2, 3, \ldots\}$. This relationship assumes an initial phase of 0 degrees for the coefficient set, but because the present invention does not provide coherent detection, an initial phase relationship is arbitrary. Forcing the initial phase to 0 degrees greatly simplifies the computational task for performing the quadrature downconversion because each mixer 1114I and 1114 Q need only perform half of the multiplies because one-half of the coefficient terms are zero. The processing efficiency is further simplified by recognizing that when a multiply is to be performed with a non-zero coefficient, the sampled data is either multiplied with a 1 or a -1, which corresponds to a sign inversion of the sample. Consequently, these samples are either left unchanged or simply inverted in sign by a sign inversion operation.

Under the above-described conditions, the half-mixer multipliers 1114I and 1114Q become simple XOR gates for single-bit data. A single XOR gate performs the same task for parallel ADC data provided the data is already in Gray code or other binary weighted format in which a single bit change creates a signed inversion of equal magnitude. Marvin E. Frerking teaches this technique for narrowband systems in his text entitled "Digital Signal Processing in Communication Systems", 1994, the contents of which is incorporated herein by reference. As presently recognized, this technique is similarly applicable to a direct sequence spread spectrum receiver.

The resulting complex signal 1113I and 1113Q at the input to the lowpass filters 1116I and 1116Q have a Nyquist bandwidth of 2.4 MHZ. The time resolution provides ¼-chip steps for fine search by skipping or reusing a data point. The fine search algorithm uses this technique to correlate the incoming signal against a fixed PN at ¼-chip resolution.

Coarse search does not require ¼-chip time resolution. Rather, a reduction of data and corresponding computational loading is realized by decimating the complex signal to the chip rate. FIG. 11 performs this function in the lowpass filters 1116I and 1116Q and decimators 1118I and 1118Q. Decimation-in-time processes may be viewed as providing mixing and sampling operations. Filters 1116I and 1116Q are used to reject unwanted images that exist in the digitized spectrum separated by the Nyquist bandwidth, in this case 2.4 MHZ. A digitally implemented "boxcar-averaging" filter is used in the instant invention so as to minimize correlation loss while rejecting image power below the trip threshold.

Decimate-by-four 1118I and 1118Q mechanisms follow the filters 1116I and 1116Q so as to lower the effective sample rate to 1.2 MHZ, shown as signals 1119I and 1119Q. The decimation process immediately following the half-mixer may be realized as a simple adder that adds every other sample, ignoring the products containing zero coefficients. The combined downconversion/decimation block is therefore optimized for minimized computation and signal processing load, reducing multipliers to single XOR gates and the decimators to simple adders.

Alternatively, the entire downconversion/decimation process is performed without any mathematical processing operations being performed on samples originating from a one-bit ADC converter. Specific signal processing functions are avoided by using two 16-element lookup tables and indirect addressing based on a serialized 4-bit nibble. The 16-element lookup tables may be implemented in semiconductor memory or other mechanism for holding database entries (such as boolean operators, as will be discussed). Data structures for the database entries are shown in Tables 1 and 2, where respective fields of the respective data structures include decimated and downconverted data samples corresponding to particular sets of pre-decimated samples.

FIG. 12 depicts a digitizing system that would use this technique replacing the half mixer and decimate operators of FIG. 11. In FIG. 12, a signal of interest 1202 lies at an IF frequency of 49.2 MHZ and is sampled by the 1 bit ADC 1204 at a sampling frequency of 4.8 MHZ (1206). The resulting signal 1208 is at a near baseband frequency of 1.2 MHZ with a sampling rate of 4.8 MHZ. Because the sampling rate is four times the code repetition rate, four samples represent a single code chip. These four samples are converted into parallel by the serial-to-parallel converter 1210 and then passed to a database implemented as the lookup tables 1212 I and 1212 Q implemented as semiconductor memory. The four parallel samples are used as the address input (address or database indica) of these lookup tables 1212I and 1212Q. The four address bits are weighted according to the I coefficients (1, 0, −1, 0) and the corresponding Q coefficients (0, 1, 0, −1) to produce the D0 and D1 output bits. The divide-by-four device 1216 serves to clock latches 1214 I and 1214 Q to produce the output data streams 1218 I and 1218 Q at one fourth the rate of the original sample stream. The table lookup feature of FIG. 12 takes full advantage of the 4:1 ratio of Fs to Fc.

Table 1 illustrates the content and data structure of the lookup tables that simultaneously perform this downconversion and decimation function. In Table 1, downconversion coefficient values of A3–A0 are represented in parentheses, and all possible input patterns are presented. Note that for the purposes of correlation, a '1' in the input data corresponds to a '+1' value and that a '0' in the input data corresponds to a '−1' value. These sampled data values are multiplied by the downconversion coefficient values, in parentheses, then summed to produce the binary weighted D0 and D1 output values.

The I data only uses alternating data points exclusive of the Q data (unused points are shaded gray in Table 1), and therefore, Table 1 collapses into two 4-element tables as shown in Table 2. Conversely, in systems where additional memory is available, the shift register 1210 can be expanded and the table appropriately increased in scale to perform a wide variety of decimation ratios and downconversion tones. For example, if the Fs to Fc ratio were 8:1, eight samples of the data would be sufficient for multiplication (mixing) with one period of the downconversion tone. The shift register 1210 would be lengthened to 8, and the lookup table would have 256 values. The data width of the output would be scaleable, and the quantization error would be predictable and programmed into the lookup table. This quantization error is not a problem in the case of 4:1 ratios because the coefficients are integer. Fractional coefficients, however, create a need to represent non-integer decimation results. The output of the lookup table can represent the fractional results to whatever resolution is required by the system implementation at the cost of widening the datapath (e.g., a bus).

TABLE 1

Downconvert and Decimate Lookup Table

I Data Lookup Table

| $A3_{(1)}$ | $A2_{(0)}$ | $A1_{(-1)}$ | $A0_{(0)}$ | D1 | D0 |
|---|---|---|---|---|---|
| 0 | ▒ | 0 | ▒ | 0 | 1 |
| 0 | ▒ | 0 | ▒ | 0 | 1 |
| 0 | ▒ | 1 | ▒ | 0 | 0 |
| 0 | ▒ | 1 | ▒ | 0 | 0 |
| 0 | ▒ | 0 | ▒ | 0 | 1 |
| 0 | ▒ | 0 | ▒ | 0 | 1 |
| 0 | ▒ | 1 | ▒ | 0 | 0 |
| 0 | ▒ | 1 | ▒ | 0 | 0 |
| 1 | ▒ | 0 | ▒ | 1 | 0 |
| 1 | ▒ | 0 | ▒ | 1 | 0 |
| 1 | ▒ | 1 | ▒ | 0 | 1 |
| 1 | ▒ | 1 | ▒ | 0 | 1 |
| 1 | ▒ | 0 | ▒ | 1 | 0 |
| 1 | ▒ | 0 | ▒ | 1 | 0 |
| 1 | ▒ | 1 | ▒ | 0 | 1 |
| 1 | ▒ | 1 | ▒ | 0 | 1 |

Q Data Lookup Table

| $A3_{(0)}$ | $A2_{(1)}$ | $A1_{(0)}$ | $A0_{(-1)}$ | D1 | D0 |
|---|---|---|---|---|---|
| ▒ | 0 | ▒ | 0 | 0 | 1 |
| ▒ | 0 | ▒ | 1 | 0 | 0 |
| ▒ | 0 | ▒ | 0 | 0 | 1 |
| ▒ | 0 | ▒ | 1 | 0 | 0 |
| ▒ | 1 | ▒ | 0 | 1 | 0 |
| ▒ | 1 | ▒ | 1 | 9 | 1 |
| ▒ | 1 | ▒ | 0 | 1 | 0 |

TABLE 1-continued

Downconvert and Decimate Lookup Table

| A3 | A2 | A1 | A0 | D1 | D0 |
|---|---|---|---|---|---|
| X | 1 | X | 1 | 0 | 1 |
| X | 0 | X | 0 | 0 | 1 |
| X | 0 | X | 1 | 0 | 0 |
| X | 0 | X | 0 | 0 | 1 |
| X | 0 | X | 1 | 0 | 0 |
| X | 1 | X | 0 | 1 | 0 |
| X | 1 | X | 1 | 0 | 1 |
| X | 1 | X | 0 | 1 | 0 |
| X | 1 | X | 1 | 0 | 1 |

TABLE 2

Downconvert and Decimate Lookup Table

I Data Lookup Table

| $A3_{(1)}$ | $A2_{(0)}$ | $A1_{(-1)}$ | $A0_{(0)}$ | D1 | D0 |
|---|---|---|---|---|---|
| 0 | X | 0 | X | 0 | 1 |
| 0 | X | 1 | X | 0 | 0 |
| 1 | X | 0 | X | 1 | 0 |
| 1 | X | 1 | X | 0 | 1 |

Q Data Lookup Table

| $A3_{(0)}$ | $A2_{(1)}$ | $A1_{(0)}$ | $A0_{(-1)}$ | D1 | D0 |
|---|---|---|---|---|---|
| X | 0 | X | 0 | 0 | 1 |
| X | 0 | X | 1 | 0 | 0 |
| X | 1 | X | 0 | 1 | 0 |
| X | 1 | X | 1 | 0 | 1 |

The example in FIG. 12 uses a 16-element table that holds the sum of the two valid samples in a two-bit result. Processors that have an abundance of memory and excellent memory access operations but do not have fast multiply-accumulators will benefit from this technique. This enables the class of general purpose microcontrollers to perform "DSP" functions without the need of fast multiply-accumulator operations.

In another alternative, reference is made to data in Table 2, where the resulting I data and Q data are simplified into logical combinations of the input samples. The lookup table itself can be replaced with a few logic gates (serving as the database, which is a hardwired, preprogrammed alternative to the semiconductor database of FIG. 12) implemented in the decimation stage. The Boolean logic expression for these is given by:

I [D0]=!(A3 XOR A1), I [D1]=A3 AND !A1
Q [D0]=!(A2XOR A0), Q [D1]=A2 AND!A0, where "!" denotes negation of Boolean term. A 2-bit sum for each I and Q data path is denoted as D1, D0 where D0 is the least significant bit. FIG. 13 depicts the downconversion and decimation circuit that performs this function.

In FIG. 13, a signal of interest 1302 lies at an IF frequency of 49.2 MHZ and is sampled by the 1 bit ADC 1304 at a sampling frequency of 4.8 MHZ (1306). A center of the resulting signal 1308 is above a baseband frequency by about 1.2 MHZ and represented with a stream of samples at a sampling rate of 4.8 MHZ. Because the sampling rate is four times the code repetition rate (i.e., a rate at which the PN code repeats itself), four samples correspond to a single code chip interval. These four samples are converted into a parallel representation by the serial-to-parallel converter 1310 and then passed to Boolean logic blocks 1312I and 1312Q. The combinatorial block 1312I performs the same function as the lookup table and produces a decimated, downconverted signal. A divide-by-four device 1316 serves to clock latches 1314I and 1314Q so to produce the decimated, downconverted output data samples as 1318I and 1318Q.

Coefficient-less Downconversion, Despread and Decimation in a DSP Processor

Another alternative approach for implementing the quadrature downconversion and decimation function uses a signal processing engine such as a DSP or other processor to perform this function as the data is read from the sampling device.

This approach will only be computationally efficient if the processor possesses the capability for sign inversion of the data without adding computational complexity. This is often true in commercial digital signal processors because the read function is highly pipelined into the execution process so as to maximize performance. Sign inversion can most simply be performed by adding or subtracting the value as read, requiring no multiply function at all. Provided this condition is met, the processor combines the 4:1 downconversion ratio efficiencies discussed previously with the data collection and decimation to perform the downconversion, despreading and decimation process without the need for storing any data coefficients. This is particularly useful for processors with limited RAM memory such as very inexpensive processors or a hardware state-machine implementation (as implemented in a programmable logic device—PLD, application specific integrated circuit—ASIC, etc.).

Coefficient-less decimation, downconversion and despreading as implemented in the present embodiment is based on the processor's ability to sign-accumulate data as read from the sampling device. Two parallel interleaved processes are executed to compute the inphase and quadrature data streams.

When avoiding the storage of coefficients to perform the downconvert, despread and decimate function, an in-line execution process is performed that adds/subtracts in the accumulation process to represent multiplication by 1 or −1. In this context, the in-line code itself serves as the database repository for the resulting downconverted, despread, and decimated samples. So as to further illustrate to explain this technique, exemplary pseudo-code for the in-line code is listed below:

| | | |
|---|---|---|
| LOAD | A,PORT | ;read data from port, seed the accumulator with value |
| ACCUM | A,PORT | ;read data from port, accumulate value into register A |
| SUBTRACT | A,PORT | ;read data from port, subtract value from register A |
| NOP | | ;perform no function, wait for next sample. |

A single processor can interleave the inphase and quadrature functions if there exists multiple accumulators or registers in the processor to hold intermediate values. For the purpose of this example, the above instructions would be modified to replace the "A" register with a "B" register. Either multiple accumulators, context switched register files or temporary storage of intermediate values performs this function.

Provided that the processor is executing at a multiple of the sample rate, the downconversion and decimation algorithm may be encoded into the firmware without using any data store. For example, if the processor executed four instructions per sample, the downconversion and decimation function becomes as follows:

| | | |
|---|---|---|
| LOAD | A,PORT | ;I read, seed accum (I virtual coefficient = 1, Q = 0) |
| NOP | | ;wait for new data |
| NOP | | ;wait for new data |
| NOP | | ;wait for new data |
| LOAD | B,PORT | ;Q read, seed accum (I virtual coefficient = 0, Q = 1) |
| NOP | | ;wait for new data |
| NOP | | ;wait for new data |
| NOP | | ;wait for new data |
| SUBTRACT | A,PORT | ; read sample, accum (I virtual coefficient = −1, Q = 0) |
| STORE | MEM,A | ;save decimated I value for later processing. ;no need to wait for next sample since it is a 0 coefficient |
| NOP | | ;wait for new data |
| NOP | | ;wait for new data |
| SUBTRACT | B,PORT | ; read sample, accum (I virtual coefficient = 0, Q = −1) |
| STORE | MEM,B | ;save decimated Q value for later processing. |

-continued

| | |
|---|---|
| NOP | ;wait for new data |
| NOP | ;wait for new data |

The above pseudo-code performs a quadrature downconversion and 4:1 decimation on an input data stream. It is repeated as in-line code for however many iterations necessary to correspond with a symbol interval. For concurrently run processes, the NOP instructions are replaced with instructions for performing concurrent processes, such as moving data or subsequent signal processing.

The above example is implemented in a loop structure when downconversion and decimation is the only function to be performed. Alternatively, despreading could be combined with the method where the spreading code inverts the sign of accumulation on a chip by chip basis. For chips where the spreading code is a "1", the above described process leaves the resulting sample unchanged. For chips where the spreading code is a "0", the above process sign inverts the decimated result prior to performing the STORE operation, or alternatively the LOAD and SUBTRACT functions could be replaced with a LOAD_NEGATIVE and ACCUM instruction where the data is sign inverted on the initial read and accumulated on the second sample instead of subtracted. The code becomes an in-line algorithm where the length of the algorithm extends to the encompass the received signal spreading code.

Because multiplication is an associative operation, the downconversion and decimation functions can be performed concurrently even if the downconversion and oversample ratios are different. The downconversion ratio is given by the ratio of Fs to Fc which must be 4:1 for this process to function properly.

An oversample ratio is given by a ratio of Fs to the frequency of chipping rate, $F_{chip}$ which may be any integer number. The present embodiment uses an oversample rate of 4:1, but a 5:1 is used in the multi-channel embodiment (discussed later). Table 3 depicts how the associative property of multiplication allows for simultaneous downconvert and despread without the need for coefficient store

TABLE 3

Coefficient-less Downconvert & Despread

| Data Sample Index | Fs:Fc = 4:1 Down- conversion | | $Fs:F_{chip}$ = 5:1 Despread | Combined Virtual Coefficient | | In Line Operation for I | In Line Operation for Q | In Line Interleaved I & Q Downconvert & Despread |
|---|---|---|---|---|---|---|---|---|
| | I | Q | PN | I | Q | | | |
| 1 | 1 | 0 | 1 | 1 | 0 | ADDI | NOP | ADDI |
| 2 | 0 | 1 | 1 | 0 | 1 | NOP | ADDQ | ADDQ |
| 3 | −1 | 0 | 1 | −1 | 0 | SUBI | NOP | SUBI |
| 4 | 0 | −1 | 1 | 0 | −1 | NOP | SUBQ | SUBQ |
| 5 | 1 | 0 | 1 | 1 | 0 | ADDI | NOP | ADDI |
| 6 | 0 | 1 | −1 | 0 | −1 | NOP | SUBQ | SUBQ |
| 7 | −1 | 0 | −1 | 1 | 0 | ADDI | NOP | ADDI |
| 8 | 0 | −1 | −1 | 0 | 1 | NOP | ADDQ | ADDQ |
| 9 | 1 | 0 | −1 | −1 | 0 | SUBI | NOP | SUBI |
| 10 | 0 | 1 | −1 | 0 | −1 | NOP | SUBQ | SUBQ |
| 11 | −1 | 0 | −1 | −1 | 0 | SUBI | NOP | SUBI |

As shown in Table 3, for the I data sample, an in-line coded series of accumulate and subtract operation performs the downconversion, despread and decimate function without using coefficients even in the case where the oversample ratio is 5:1.

The decimation ratio becomes a straight-forward operation in that the accumulated sum may be stored as an intermediate partial decimation result at any integer number of samples. This provides for intermediate decimation results for setting a predetection noise bandwidth similarly for the quadrature data. For example, assuming the receiver is already PN aligned with the received signal and demodulating the signal, the 252 samples may be decimated by 42, i.e., 42 successive samples accumulated and stored as intermediate values, setting the predetection bandwidth to +/−57.6 kHz.

This technique has application for programmable processors or hardware state-driven engines where memory limitations prohibit access to enough coefficients (of the PN code) to encompass the received signal spreading code length. For example, in a DSP processor with 128 memory locations available for coefficient storage, a spreading code length of 63 and an oversample ratio of 4:1, the number of data samples corresponding to a code repetition interval is 252. Most processors are optimized for a one-to-one correspondence of data sample to PN code coefficient. With only 128 memory locations, there are too few locations to hold 252 coefficients. Using this technique, the downconvert, despread and decimation function requires no memory locations for coefficient storage using the processing efficiency principles discussed herein.

The sampled signal interval is initially decimated to a sampling rate equal to the chipping rate. During coarse search mode, before the signal is aligned with the PN code, the sampled data is mixed with the PN code at increments of 1-chip steps. For each spreading code phase position, the correlation result is bandwidth limited down to the predetection bandwidth so as to determine if that particular spreading code position resulted in a high correlation result, indicative of code alignment.

Because decimation is similar to sampling, the effects of aliasing must be avoided, and therefore a decimation filter is included prior to the decimation step to ensure that alias images do not destroy system performance. Also, this filter should attenuate the desired signal to a minimal extent because the signal may still contain mismatches in PN alignment. In order to maximize correlation gain (process gain), a boxcar averaging filter is used as the decimation filter. A boxcar averaging filter has a rectangular time domain window characteristic and therefore maximizes correlation gain derived near the sample window discontinuities.

The boxcar averaging decimation filters implemented in the preferred embodiment are unitary scaled at the window discontinuities. In the frequency domain, this is a sinc function, which is characteristic of a transfer function of the decimation filter, having a roll-off that is a function of the decimation frequency. Because the transfer function will have a rounded shape, signals that are not centered in the middle of the transfer function will be attenuated by an amount corresponding to a frequency offset error imparted on the transmit signal by the inaccurate frequency reference employed by the transmitter while forming and transmitting the signal.

The present embodiment reduces the effects of decimation loss as a way to keep from incurring as much as 3.9 dB loss for transmitters that have a significant frequency offset error that place the transmitted signal at the edge of the detection bandwidth, Nyquist band edge. Several approaches for addressing the decimation loss (due to a filtering effect) are discussed below.

Digital Frequency Correction and Downconversion

Curve 1402 in FIG. 14 represents how a frequency uncertainty error imparted on the received signal will reduce a signal power in an initial downconversion and decimation operation. Suppose the frequency of the transmitted signal is close to the Nyquist band edge, (i.e., at a left hand side or right hand side of the "transmitter frequency uncertainty range", as illustrated) the receiver will suffer a 3.9 dB loss in signal power, which, among other things, will inhibit the receiver's ability to align the signal. After the alignment is performed and the frequency error is determined (as will be discussed), a correction is then made to the downconversion tone so as to shift the frequency of the receiver by ±½ the frequency uncertainty. As explained below, the effective signal loss of the transmitter will then be represented by either curve 1404 or 1406 depending on whether the signal is shifted up or down in frequency.

Once the processor determines that the transmitter frequency error exceeds at least 50% of the decimation bandwidth, the downconversion tone is altered by ±50% of the Nyquist bandwidth, which moves the desired signal from the center to 50%. The resulting effect is that depicted in FIG. 14 of moving the decimation center by ±50% where it can be seen that the worst case decimation loss is limited to 0.9 dB. This shifting operation recovers 3 dB at band edge relative to using the center channel alone.

The added step of altering the digital downconversion tone adds complexity to the receiver because the downconversion coefficients become a complex tone sampled at the ADC rate. The sign of the tone is a function of whether the I component leads or lags the Q component. Preferably, the tone should be 50% of the decimation bandwidth so as to limit loss to 0.9 dB. However, a tone close to 0.9 dB will yield similar results and may improve computational efficiencies in performing the downconversion. By choosing the tone to be evenly divisible into the data sample set, the coefficient set may be represented by only a portion of the cycle. For example, 252 data samples would be collected if the sample rate were 4 times the chip rate for a 63 chip sequence. The sample rate is approximately 4.8 MHZ, so a downconversion tone equal to Fs/4 would repeat every 4 samples, thus the coefficient set need only be 4 samples long. Only ¼ cycle of the downconversion tone need be stored as coefficients since the I and Q processes access the same coefficient set in offset sequence. The order and the sign of coefficient retrieval completes the downconversion coefficient set with the only restriction being that the ¼ cycle must divide into the data record by an integer.

Frequency Offsetting the 1$^{st}$ Local Oscillator

A second approach for correcting the frequency of an incoming signal is to adjust the downconversion frequency in the 1st local oscillator. This is accomplished by programming the conventional LO synthesizer of FIG. 8 to a new frequency.

Changing the Decimation Filter

Yet another method to reduce decimation loss is to increase the computational complexity of the digital signal processing IF filter. Rectangular window time averaging is used up to the final decimate-by-2 stage and in this stage a sinc time response FIR filter is used which has no appreciable decimation loss. On the other hand, the FIR filter approach increases the computational load and potentially requires a more costly, and more power consuming digital signal processor.

Improving Trip Sensitivity to Overcome Band Edge Decimation Loss

The synchronization search process is modifiable in yet another method for reducing frequency uncertainty decimation loss. In the previous discussion the digital or RF/IF frequency correction was made following initial search and trip determination. As demonstrated in FIG. 14, there exists a significant loss of signal power at the frequency uncertainty band edge. This loss also has an adverse impact for signal detection. The previous discussion makes the assumption that the signal can first be detected and roughly located so an appropriate correction be made to limit the loss for demodulation. It is often true that signal detectors are more sensitive than demodulators, yet it is preferred that the detection process have the same signal-to-noise ratio (SNR) advantage as the demodulation process.

The detection process is enhancable by incorporating the techniques discussed above into the search process. One method for improving detection at band edge is to subdivide the frequency uncertainty band into a set of center frequencies which set the worst case loss for decimation loss at tolerable limits. In the present invention as depicted in FIG. 14, only two bands are necessary to maintain worst case loss to 0.9 dB. Lines 1404 and 1406 represent 2 center frequencies which will perform this task. The search process simply makes an adjustment, alternating between these two candidate frequencies. As before, frequency selection can be made either in the digital downconversion or in a RF/IF downconversion step. The signal leader (or preamble, as will be discussed) or synchronization interval needs to have sufficient duration for all candidate frequencies to be evaluated.

Alternatively, both lobes may be simultaneously performed, the two lobes being depicted in FIG. 14. In this method, downconversion must be performed digitally to re-use the sampled data twice or however many times is necessary to limit the decimation loss to system requirements. This method trades off computational loading for sensitivity in that the initial decimation process and search function must be duplicated.

Upon a trip (i.e., synchronization detection) in one of the redundant search processes, the other is suspended and data demodulation proceeds from the offset which produced the trip so as to save computational loading.

Another method for improving band edge sensitivity is averaging, which as discussed later herein, is a technique for improving sensitivity across the predetection bandwidth, including the frequency uncertainty band edge. Optimal sensitivity can be achieved using averaging, band limiting and frequency adjustments as discussed above at the cost of system complexity, transmitted duration and receive algorithmic loading.

In systems where sampled limiters are used, the signal amplitude information is stripped, and thus, except for signals which are at the same relative power as thermal noise, all signals appear in the final correlation function at the same relative power level. Because of this, a simplified threshold mechanism searches only the maximum and compares it to an absolute threshold, thus skipping a noise estimation process.

Fast Serial Search

Following sampling, downconversion to baseband, and initial decimation, correlation of the signal must be achieved. Correlation could be accomplished in the first RF mixer by combining the downconversion tone with the PN code. However, this approach would prohibit the use of the fast search algorithms disclosed herein, and would require the RF front-end 905 to remain on. More preferably, the correlation (or despreading) task is performed in software at the minimum frequency possible, namely the chipping rate.

Direct sequence receivers align the receiver PN code with the transmitter PN code (as represented in the received signal) in order to realize the process gain. This search process can be performed serially by evaluating a sampled data set with respect to a given receiver code phase, stepping the code phase by one chip, and repeating the process until a power increase is noted. Since the information provided by the correlation function is relevant for only a 1 chip width of the PN code, the correlation process must be repeated so as to cover each possible chip location. Because the code length in the present embodiment is 63 chips long, a serial search approach would require as many as 63 steps before alignment is attained.

So as to assist in code alignment, the transmitter transmits, as a first part of the direct sequence spread spectrum signal, a leader which is a repeated copy of the PN code. FIGS. 15A–B help illustrate this alignment process, where FIG. 15A depicts the transmitter power over time. For an ASK data modulation (such as on-off-keying for binary channel symbols), the transmitter keys-on at a time 1502, dwells for a time corresponding to the leader, where the transmitter repeated sends copies of the PN code, and then transmits the ASK data at a time 1504.

FIG. 15B depicts the received power developed in the receiver corresponding to the transmitted signal. An increase in transmitted power is detected at point 1506. Signal correlation is achieved at point 1508, which is the initial trip event. Because the search process steps in one chip increments (or multiples thereof), the resulting trip alignment up to point 1508 will be within ½ chip. This degree of alignment is insufficient because a ½ chip offset error represents a 6 dB process gain loss. Consequently, to improve performance by further limiting alignment loss, a fine search process follows the coarse search so as to resolve the code misalignment to within a small fraction of a chip, which is accomplished at a time 1510. Once fine search is performed, the receiver waits until a time 1512 to begin receiving the ASK data.

Regarding the coarse search process, the present embodiment uses the fast serial search to achieve initial trip. This approach offers a preferred trade-off of performance versus computational complexity in the first embodiment. The fast serial search operates in the receiver in the time domain by collecting and storing one code repetition interval (i.e., one portion of the leader that corresponds in length to a PN code repetition). At the beginning of the coarse search process, the receiver initiates a real-time clock and then sequentially steps the PN code in one-chip steps against the collected and stored data until the portion of received signal has been correlated with all 63 code positions. At the end of the process, the maximum correlation power is determined along with the associated phase position of the PN code that generated the maxima. For systems that use an ADC, the trip condition would require that the maximum value exceed the average of the remaining values by a predetermined threshold. For systems that use a sampled limiter, the trip condition may optionally use a predetermined threshold because systems with a sampled limiter are amplitude indifferent. The real-time timer is used during the process to count the passing of code intervals so the receiver can resume collecting data at the chip position which produced the maxima, thereby maintaining correlation for a subsequent sample.

This fast serial search process has several key advantages for digital receivers as implemented in the present invention. Because the receiver only collects one code repetition, the RF front-end may be powered down during the subsequent DSP search, saving battery life. Also, the physical collection of data as described in the serial search consumes much of the processors computational bandwidth. By halting the collection process, the computational bandwidth is recovered in the present invention. Even with low-cost DSP processors, the search time is reduced from 63 code periods to approximately 10. The transmitter leader can therefore be reduced, extending transmitter battery life.

To be most effective, the fast serial search, or other search, is performed in less than ½ the time required to transmit the leader so as to ensure detection by the receiver. Moreover, assuming that a first sampled bit was collected immediately before the key-on of the transmitter, i.e., time 1502 in FIG. 15A. The receiver's search process will not report a trip event because the receiver's locally generated PN code will be compared to an incomplete portion of the transmitters PN code contained in the leader. Under these conditions, if the receiver spends more than ½ the leader transmit time performing the search, the next portion of the leader sampled by the receiver would lie past a mid-point of the leader, and thus the receiver would once again fail to synchronize with the transmitted signal because the receiver would be attempting to correlate based on a portion of the transmitters PN sequence, contained at the end of the leader, and a beginning portion of the ASK data contained in the transmitted signal. Moreover, the new search would extend into the data section of transmission and the receiver would not be ready to demodulate.

FIG. 16 is a flowchart explaining the steps performed in the fast serial search process. The process beings in step 1605 and proceeds to step 1610, where a data record corresponding to a PN code length is captured and stored in memory. The process proceeds to step 1615, where an initial PN sequence phase is set to zero. The data sample is correlated against the current PN sequence and the result is stored in step 1620; subsequently, the PN sequence phase is incremented by one in step 1625. A decision block is performed in step 1630 wherein the process determines whether or not the data sample has been correlated against all possible PN sequence phase positions. If the data sample has not been correlated against all possible PN sequence phase positions, the process returns to step 1620 to correlate the data against the next PN phase position. If the data sample has been correlated against all possible PN sequence phase positions, the process continues to step 1635 wherein the maximum value of the 63 correlation calculations is determined. The process proceeds to step 1640, where the two largest power values are ignored and an average power value is calculated from the remaining 61 values. Step 1645 compares the maximum power value with the average power value. If the maximum value exceeds the average value by the trip threshold, the process proceeds to step 1650 wherein a trip event is declared and the fine search and demodulation process begins. If the maximum value does not exceed the average value by the trip threshold, the process returns to step 1610 to sample and store another code period of data.

Searching over all 63 code phases prior to making a trip decision provides maximum sensitivity, minimizes the likelihood of failing to detect code alignment, and reporting false trip events. Also, alterative steps include stepping the PN code relative to the data, data relative to the PN code or both, because the relative phase positions is the relevant information sought in the correlation process.

Fine Search

If the coarse search process yields a trip event, the degree of alignment will be within ±½ chip of the optimum code phase alignment because the correlation peak is only one chip wide. (If the chip offset were greater than ½ chip, then the adjacent relative phase alignment would result in a higher correlation result). However, as previously discussed, even fractional code misalignments can result in significant signal loss. For optimal performance, the receiver aligns the two spreading codes as closely as possible, therefore maximizing the signal strength of the received spread spectrum signal.

So as to more closely align the two spreading codes, the receiver of the present embodiment initiates a fine search process wherein the receiver changes the spreading code by fractional chips and attempts to establish a better code alignment. The processor (ASIC, PLD, microprocessor, or other signal processing apparatus) slips or advances a single sample by ¼ chip intervals. Because the processor executes several instructions per sample interval, a fraction of the ¼ chip step is achieved by hesitating instruction intervals combined with slipping samples. In the preferred embodiment, the processor controls the sample clock to the ADC, so that the processor executes 4 instructions per sample. Therefore, the processor can affect a slip of the locally generated PN code relative to transmit PN code (as represented in the received portion of the leader) by ¹⁄₁₆ of a chip by inserting a single NOP instruction into the bit-time processing loop.

FIG. 17 shows a "real world" fine search process, to be contrasted with the ideal correlation process discussed in reference to FIG. 7. The solid triangular line 1705 represents the ideal correlation peak, and the vertical lines 1710 at each fractional chip phase position show the potential signal drift due to instantaneous noise. The dashed line 1720 shows an example of a fine search process in the presence of noise. Conventional fine search algorithms, correlate each relative code position with the data sample, and then choose the code position that generates the highest signal level. In FIG. 17, such an algorithm will result in a ¼ chip error, resulting in a mean 2.5 dB signal loss; the error will resulting from the process detecting that correlation occurred at position 1730 rather than 1725. The standard deviation of the noise becomes a significant factor in identifying the true correlation peak. More particularly, a larger standard deviation noise will cause the lengths of the vertical lines 1710 to increase causing greater numbers of correlation errors in the serial fine search process.

A conventional method to overcome the effects of instantaneous noise is to dwell on each fine search position for more than one code period and average the values. However, a disadvantage to this method, for battery operated applications, is that increased amounts of transmitter leader time is required to obtain enough samples to average.

A goal of the fine search algorithm in the present embodiment is to obtain the best possible spreading code correlation as quickly as possible. To do this, the receiver of the present embodiment dwells on each fractional spreading code position for only one code period, but does not select the strongest signal out of the data set. Rather, the present fine sync process uses both chip offset and correlation strength of the entire data set to determine the ideal code alignment. Preferably, application of a center of mass operation on this entire data set improves fine search accuracy. Alternative operations including least squares, curvefitting and convolution may be used, but are less computationally efficient in the present application. By employing the center of mass operation, artifacts of noise are suppressed without having to dwell on each chip position multiple bit times. The function employed in the center of mass operation is represented by:

$$\overline{X} = \frac{\sum m\overline{x}}{\sum m},$$

where $\overline{X}$ is the x-coordinate of the center of mass, $\overline{Xx}$ is the x-coordinate of the relative chip position, and m is the linear signal strength (mass) at each relative chip position.

FIG. 18 shows the results of three different search processes evaluated over several hundred fine search passes on real data containing noise. These processes slip the phase position of the receiver despreading code by ⅕ chip steps, and seven discrete positions are used (−⅗, −⅖, −⅕, 0, +⅕, +⅖, and +⅗). Because the initial trip can occur within ⅓ chip of the transmitted spreading code, the respective processes at least include data from −½ chip to +½ chip of the trip position. Also, the processes may utilize any fractional value, keeping in mind that smaller fractional positions may yield a better result but will require more data samples as well as require more computational power.

The "Peak 7" process searches the 7 different chip phase positions and selects the maximum signal value. The "Peak 7" line 1810 depicts the results when the maximum signal strength value is selected from the 7 chip positions. Note that even though the initial trip sometimes occurs at the best possible code alignment, the fine search process will, on the average, result in a 1.5 to 2.0 dB loss in received signal. This process has been previously implemented.

Inventive methods described as "CM 7" and "CM 7+" algorithms have an effect of averaging out the noise of 7 bit times without dwelling on each chip position for 7 bit times. The "CM 7" process calculates the center of mass of the 7 different chip positions and selects the chip value which coincides with the center of mass. This process works well if the initial trip is within ⅕ of a chip of the ideal relative code phase position. However, if the initial trip is greater than ⅕ of a chip from the ideal position, the correlation loss becomes severe, as seen at the end points of curve 1820 of FIG. 18. This shortcoming is addressed in the CM7+ process, explained below.

The "CM 7+" process is a conditional two-step process. If the initial trip and subsequent center of mass calculation results in a fine search adjustment of less than ⅕ chip, then the condition is satisfied. If, however, the center of mass calculation shows that the initial trip error was greater than ⅕ chip, then the process moves the trip location by ⅖ chips, collects new data points out to 1 chip from the initial trip position, and re-calculates the center of mass, by re-using 5 of the first correlation sums. The fine search error results in less than a 0.75 dB loss, as seen on curve 1830 of FIG. 18.

Steps in the "CM 7+" algorithm are explained with reference to FIG. 19 where the method begins in steps 1905 and then 1910, where an initial PN sequence phase is set to the initial trip phase minus ⅗ of a chip. The process proceeds to step 1915, where one code period of data is taken and stored. The data sample is correlated against the current PN sequence and stored in step 1920; subsequently, the PN sequence phase is incremented by ⅕ of a chip in step 1925. A decision block is performed in step 1930 wherein the process determines whether or not the data sample has been correlated against all seven fractional phase positions. If the data sample has not been correlated against all fractional code chip phase positions, the process returns to step 1920 to correlate the data against the next phase position. If the data sample has been correlated against all fractional phase positions, the process continues to step 1935 wherein the center of mass calculation is performed. The process proceeds to step 1940, where the center of mass result is compared against the initial trip value. If the center of mass indicates that the fine search position is within ⅕ of a chip of the coarse search position, then the algorithm proceeds to step 1945 to begin the demodulation process. If the center of mass indicates that the fine search position is more than ⅕ of a chip away from the coarse search position, then the algorithm proceeds to step 1950, where the algorithm recenters the trip location by ⅖ of a chip, collects new data points, and recomputes the center of mass. As stated earlier, other algorithms such as least squares, curve fitting, and convolution can also be used to implement this fine search technique.

Center of Mass 9

A variant of the fine sync process uses the decimation process to acquire a minimum of data points and gives a reasonable trade-off between accuracy and computational loading. Upon an initial trip event identified from the coarse search process, the initial code phase will be within ½ chip of the ideal code phase position. The process, as described below, uses a sample rate (Fs) at 4× the chipping rate.

Once a data sample is acquired, it can be correlated against different phases of the spreading code, and, if not decimated, the data sample can be correlated against all fractional code phase positions, provided that a fractional resolution of the spreading code equals the sampling rate of the data. This approach requires storage of a single data sample with a duration equal to the code repetition. The initial downconversion and decimation process is performed prior to despreading and the result is a data set containing one element for each chip of the spreading sequence. This data set is used in coarse search where all possible combinations of the phase of the spreading code are used to determine if a trip event occurs, and thus the coarse search step resolution is in integer chip steps.

The receiver of the present embodiment re-uses the decimation process in the fine search process. Multiple data samples are taken at fractional phase offsets so as to calculate the correlation power over the correlation peak. This center of mass 9 process is explained with reference to the flowchart of FIG. 20. The process begins in step 2005 and then block 2010 where a first data sample is acquired at a 4:1 multiple of the chip rate and then decimated to the chip rate. This data sample is correlated three times in block 2011 with the spreading code at −1, 0, and +1 chip offsets from the initial trip position. In step 2012, the spreading code is adjusted by +¼ chip from the initial trip phase position. In block 2020 a second data sample is acquired and then decimated to the chip rate. This data sample is correlated twice in block 2021 with the spreading code at −¾ and +¼ chip offsets from the initial trip position. In step 2022, the spreading code is adjusted by +¼ chip from the previously sampled phase position. In block 2030 a third data sample is acquired and then decimated to the chip rate. This data sample is correlated twice in block 2031 with the spreading code at −½ and +½ chip offsets from the initial trip position.

In step 2032, the spreading code is adjusted by +¼ chip from the previously sampled phase position. In block 2040 a fourth data sample is acquired and then decimated to the chip rate. This data sample is correlated twice in block 2041 with the spreading code at −¼ and +¾ chip offsets from the initial trip position.

In block 2050, the center of mass calculation is performed on the correlation results from the −1, −¾, −½, ¼, 0, +¼, +½, +¾, and +1 code phase offsets in step 2051 to establish the code position to receive and demodulate data in block 2052.

An alternative process that does not use initial decimation, but rather stores the entire data sample array. This method is explained with reference to the flowchart of FIG. 21 where the algorithm begins in step 2105 and then 2110 where a data record is acquired at a multiple of the chip rate and stored for re-use. The process continues in step 2111 where this data is despread and power measurement determined for five relative code chip offsets of ½, −¼, 0, −+½, +¼ chips where the 0 chip offset equals the initial trip phase. In step 2112, the center of mass is calculated on the correlation results from the ½, ¼, 0, +¼ and +½ chip phase offset power measurements. From block 2115, if the initial center of mass calculation is within ¼ chip from the initial trip position, the process proceeds to block 2140 wherein the relative phase of the receiver code generator is adjusted to the center of mass value. From block 2120, if the center of mass calculation yields a miss distance greater than −¼ chip from the initial trip position, the algorithm proceeds to block 2121 where the original data signal is despread and power measured for −¾ and −1 chip offset. In block 2122, the center of mass is calculated on the correlation results from the −1, ¾, −½, −¼ and 0 chip phase offset power measurements. The process then proceeds to block 2140 where the relative phase of the receiver code generator is adjusted to the center of mass value. From block 2130, if the center of mass calculation yields a miss distance greater than +¼ chip from the initial trip position, the algorithm proceeds to block 2131 where the data signal is despread and power measured for +¾ and +1 chip offset. In block 2132, the center of mass is calculated on the correlation results from the 0, +¼, +½, +¾ and +1 chip phase offset power measurements. The process then proceeds to block 2140 where the relative phase of the receiver code generator is adjusted to the center of mass value.

In some applications it is beneficial to simplify the processes, either due to memory restrictions for holding code or to take advantage of a processor's pipelined architecture. Thus, alternatively, steps 2115, 2120, and 2130 may be removed from the process, although in this variant all possible data points must now be calculated. This alternative process is explained with reference to FIG. 22 where the process begins in step 2205 and then 2210 where a data record is acquired at said multiple of the chip rate and stored for re-use. The algorithm proceeds to block 2211 where the data is despread and power measured determined for nine relative code chip offsets of −, −¾, −½, −¼, 0, +¼, +½, +¾ and +1 chips where the 0 chip offset equals the initial trip phase. In block 2212, the center of mass is calculated on the correlation results from the −1, −¾, −½, −¼, 0, +¼, +½, +¾ and +1 code phase offset power measurements. The process then proceeds to block 2240 where the relative phase of the receiver code generator is adjusted to the center of mass value.

Receiving OOK Data in a Hard-Limiting DSSS Receiver

On/Off Keyed (OOK) systems, a subset of ASK modulation systems, use OOK modulation to format transmitted messages, and rely on an ability of the receiver to detect the presence or absence of energy coincident with particular bit (or symbol) times. This is the extreme case for amplitude modulation where data is encoded linearly or at discrete amplitude steps relative to a peak value.

Hard-limited receivers are not typically used for ASK systems because hard-limited receivers use a detection mechanism that inherently strips the amplitude information from the signal. Thus, hard-limited systems are mostly used in phase or frequency modulated systems, where the data information is encoded in the phase of a carrier. Nonetheless, because of the hard limiting receiver's wide dynamic range, it is desirable to use it in a low-cost receiver to receive transmission from an OOK transmitter.

A transmitter feature of the present embodiment implements on-off-keying by imposing a requirement to not only amplitude attenuate the signals during a "0" state, but also suspend the PN code generator used to spread the transmitted signal as shown in FIG. 25, 2510, 2552. In turn, the receiver that uses a hard-limiter will not notice the amplitude key but it will be able to use the code on / code off aspect to make a determination between correlation sum and no correlation sum. The bit state determination is therefore a function of the ability to produce process gain in the receiver.

Because the receiver is relatively indifferent to amplitude changes, it may seem reasonable to modulate only by employing code on/code off, but not varying a power. However, it is presently identified that systems operating near power per unit bandwidth restrictions should not use this approach because removal of the code will cause the transmitted narrow band signal to have a higher peak power roughly equal to the process gain. Otherwise, a combination of amplitude and code keying is desired to create a OOK transmitter which operates at controlled power spectral density.

Scalable Signal Acquisition and Synchronization

The present invention has scaleable embodiments that allow for increased system improvement for increase processing power and, perhaps, battery power. Accordingly, the several approaches discussed herein, in some instances, are specialized algorithms to acquire, synchronize, detect a trip condition and subsequently demodulate data using the least amount of computational resources. Processes that appear to be equivalent in function must be compared based on their computational efficiency, and related power draw for a particular application. To this end some processes disclosed herein may appear to be less elegant than known algorithms, but, as is often the case, these known, conventional algorithms presuppose that a certain amount of processing resources and power is available.

Top Level Receive Algorithm

FIG. 23 is a flow chart of a top level receiver signal acquisition process, which is applicable to a battery mode of operation where "time to search" is triggered by a wake-up interval timer. The process of FIG. 23 is also applicable to continuous search receivers that stay on line continuously where "time to search" merely is a start point in a continuous loop.

The process begins in step 2305 and then step 2310 where the receiver samples and stores one code period of data. Subsequently, the process proceeds to step 2315 where the antenna and/or frequency settings are selected for the subsequent search to allow for settling in the VCO, as will be discussed in reference to FIG. 27. Alternatively, if averaging is used, these steps may be delayed until the last sample is taken so as to complete the average. The decision to perform antenna or frequency selection is an optional step and depends on the specific system requirements and architecture. The process continues at step 2325, where a coarse search process is performed. Coarse search may be any of the fast search methods discussed previously, or any known methods.

If time-averaging is used, the process continues to step 2330 through branch 2331 and then branch 2333 is taken, where the steps of 2310 and 2325 are repeated until the proper amount of data has been sampled, stored, and averaged. Averaging is implemented on a single antenna and frequency setting; therefore, step 2315 is not repeated in the averaging algorithm. When sufficient data samples have been taken, control is passed through branch 2332 to decision block 2335 where a trip decision is made based on the process depicted in FIG. 28. If a trip is detected, then the receiver performs the fine search and demodulation processes in step 2340, where the fine search operation uses a center of mass algorithm discussed previously or other known methods. Subsequently, the process proceeds to step 2345, where the process decides whether or not to enter into sleep mode, based upon the receiver type. If the receiver is battery powered, the receiver will either go into sleep mode in step 2350, or return to step 2305 to repeat the signal acquisition process. If the receiver is externally powered, the receiver returns to step 2305. If in step 2335 a trip is not achieved, the process proceeds to step 2355 where the receiver verifies that the acquisition process has been performed for all possible antennas and frequencies. If not, the process returns to step 2310 to collect new data and select another antenna (if necessary) or another frequency (if necessary) 2315. From step 2355, the process proceeds to the sleep decision step 2345 only if all possible antennas and frequency values have been searched.

Many possibilities exist for a specific path followed in process of FIG. 23, depending on system requirements, transmitter leader length and averaging options. Nonetheless, the flexibility afforded by the scaleable approach for acquisition, trip and demodulation based on system requirements is evident.

Spatial Diversity (Antenna Diversity)

The present transceiver includes redundant receive antennas 901, 903 (FIG. 9) so as to offer recourse in overcoming signal fading or shadowing by allowing the antennas 901, 903 to be physically separated and/or orthogonally polarized. The receiver utilizes the antennas 901, 903 in acquisition to select the channel with greatest power for demodulation. FIG. 24 depicts the antenna selection process, assuming the coarse search process has already been performed. The fine search process is complete with an optimal phase position calculated at time 2405 and verified at time 2410, all of which being performed using the same antenna. At time 2415, the alternate antenna is evaluated for reception, using the same PN phase that was selected at the end of the fine search process. If the received power on the alternate antenna port (i.e., the opposite port to the primary port on which trip was determined) is greater than that of the primary port, the alternate port is selected and demodulation begins during interval 2430. The process is also repeated at various points throughout the data collection during bit periods where known symbols are expected.

Frequency Diversity

To maximize data throughput, transmitters and receivers must overcome the effects of jammers. Many systems use time diversity, or data redundancy, to overcome the effects of instantaneous jammers. Continuous jammers, or jammers which maintain the same frequency output over long periods of time, are unaffected by time diversity tactics and must be circumvented by other techniques. Systems that use frequency diversity by way of frequency hopping exist, but require the additional components, control, cost and power associated with an agile frequency synthesizer.

As will be discussed below, the transceiver of the present embodiment uses a frequency diversity scheme in an economical manner that does not force the requirement of a frequency synthesizer in a compatible transmit-only or transceiver device.

Transmitter and Frequency Diversity

FIG. 25 is a block diagram of a DSSS transmitter that may be used to communicate with the receiver of the first embodiment or may be in the transmitter portion of a transceiver according to the first embodiment. In FIG. 25, the transmitter includes a frequency reference source 2502, which is low cost crystal having accuracy of 50 ppm (parts per million) error. This example shows one frequency reference for the entire transmitter. clock divider circuit 2504 produces a code clock signal 2506 for a data generator 2508 and a PN generator 2510. The data generator 2508 is implemented by a microprocessor, external source or other data source. The PN generator 2510 is also implemented, although it does not have to be, by the same device as data generator 2508. A Clock divider circuit 2512 produces a diversity clock signal 2514, which is an integer multiple of the code clock 2506. The frequency diversity enable signal 2516 controls switch 2518 (implemented as an AND gate), either producing a logic "0" (2520 with diversity disabled) or passing the diversity clock signal (2522 with diversity enabled).

The data generator 2508 generates a binary data stream 2524 at baseband and is combined with the PN code 2526 in the XOR gate 2528 so as to produce a waveform spectrum 2530, also at baseband. With frequency diversity enabled, the baseband signal is mixed in a second XOR gate 2532 with diversity enable signal 2522 and low-pass filtered 2534 to produce a signal with spectrum 2538. With frequency diversity disabled and signal 2520 held at a logic "0", the second XOR gate 2532 and LPF 2534 serve as a buffer, producing a signal with spectrum 2536, which is identical to the signal with spectrum 2530.

The output of frequency source 2502 is upconverted in upconverstion circuit 2540 to produce an RF carrier 2542 with a center frequency of about 915 MHz plus the frequency error of 2502 multiplied by the upconversion factor of 2540). With diversity disabled, the signal with spectrum 2536 is combined with the carrier 2542 in mixer 2544. This product is band-pass filtered in 2546 to produce a signal with single sinc spectrum 2548 with a center frequency of about 915 MHz. This signal is amplified at 2552 and transmitted from antenna 2554.

With diversity enabled, the signal with spectrum 2538 is combined with the carrier 2542 in mixer 2544. This product is band-pass filtered in 2546 to produce a signal with dual sinc spectrum 2550 with a center frequency of about 915 MHz. This signal is amplified at 2552 and broadcast on antenna 2554.

If frequency diversity is enabled, the generated signal will be as depicted in FIG. 26B, with dual images 2601 and 2602 centered at about 915 MHz. The signal power of either lobe of this signal is 3 dB down from the power output of the signal from FIG. 26A, because the signal power is now distributed in twice the bandwidth as the signal in FIG. 26A. With frequency diversity enabled, the receiver may select from either of two frequency components from which to retrieve the data signal. As an alternative, the receiver performs signal searches at all three frequency values, using the algorithm from FIG. 27 to cycle through all possible frequency settings. This approach assumes a transmitter that alternates, or coexists with other transmitters, between diversity FIG. 26B) and no diversity (FIG. 26A).

The present receiver includes a select mechanism for selecting one of several receive frequencies. This mechanism is provided for two primary modes of operation. In the first mode, the receiver is tasked to use one of the available frequencies to select transmitters using that frequency band. This allows the receiver to be compatible with pools of transmitters separated by frequency to be selected through receive frequency tasking. The time to switch between frequencies is typically not critical in this mode of operation.

The second mode of operation is intended to capture a transmitter pool (i.e., a group of one or more transmitters) that transmit simultaneously at different frequencies using the previously discussed frequency diversity process. Such transmitters use this diversity technique where the signal is split and separated in frequency by a fixed amount. The receiver must monitor the two (or three) frequencies as part of the acquisition process. Because the frequency selection is integrated into the acquisition process, a timely transition between selection helps minimize transmitter leader time. This mode of operation adds diversity in frequency to increase the probability of data throughput in the presence of intentional or unintentional interference and multipath propagation. If a static interference signal and/or a fade exists at one of the transmitted frequencies, the other frequency may be used to demodulate the data. The receiver of the present embodiment uses this technique to improve throughput, quickly alternating search frequencies while processing a previous captured bit interval. By pipelining the process, the frequency transition time can be absorbed thus minimizing the impact on search time.

FIGS. 27A–D depicts this receive acquisition schedule which includes the antenna and frequency diversity processes discussed above. FIG. 27D depicts a transmitted signal and FIGS. 27A–C depict the receiver process used to acquire the signal. FIG. 27A represents different candidate frequencies on which the receiver attempts to acquire the signal; FIG. 27B represents the antennas on which the receiver attempts to acquire the signal; FIG. 27C represents different samples obtained by the receiver and used by the receiver to determine if the transmitter is presently transmitting.

As shown in FIG. 27D, the transmitter presents a leader (i.e., preamble) signal prior to data, where the leader is of sufficient duration to allow the receiver to evaluate all combinations of diversity provided for in the system architecture. As shown in FIG. 27C, the receiver samples data at times 2735 for one code period then processes the data using the fast serial search process for a duration 2737, lasting several code periods. The leader is of sufficient length that allows for the receiver to perform successive searches which coincide with all diversity combinations used in the system.

By using the fast search algorithms taught, it is possible that a change in diversity at the transmitter will occur while the receiver is attempting to acquire the signal. Changes to the frequency or antenna may be made and a settling time for frequency change (shown at time 2715) therefore must be absorbed into the receiver's signal acquisition process, as will be discussed.

Time Domain Averaging to Improve Coarse Search Sensitivity

FIG. 28 depicts the benefit of averaging over successive correlation processes to improve acquisition sensitivity. Each coarse search 2812, 2814, 2816, 2818 produces a cross correlation of the received signal and the PN code embedded in the receive coefficients, with 2810 being the average value over the previous N multiple searches. This process requires that subsequent samples are phase coherent to each other, meaning that the time relationship of the first sampled data point in each code period is identical. This phase coherency is obtained using a timer and/or counted state processes to ensure zero relative code phase alignment. Only the frequency reference drift is left uncompensated, but this drift is low relative to the time interval of search.

The averaging is performed as a box-car or finite impulse response (FIR) filter structure where the last N symbols are averaged, or the averaging may be performed in an exponential or Infinite Impulse Response (IIR) averaging process where the previous results are decayed and added to a fraction of the current sample. In the present embodiment, an exponential averaging process is used so as to minimnize memory requirements because only the current sample plus one decaying average need be maintained. The weight "N", as shown in FIG. 28, is 6 where the previous average is multiplied by ⅚ to decay the previous result, the current sample is multiplied by ⅙ and summed to the previous product. The result is stored for future decay and then passed to the trip decision process.

FIG. 29 depicts the reduction in false alarm rate for averaging 6 samples in the present single channel receiver embodiment. Curves 2910 and 2920 show the power distribution of noise in a 115 kHz noise bandwidth with and without averaging, respectively. Curves 2930 and 2940 show the power distribution of a −110 dBm signal in 115 kHz noise bandwidth with and without averaging, respectively. Improvement is visualized by comparing a minimized overlap of distributions (2920 and 2940, and 2910 and 2930) which is a measure of false alarm rate and degradation in bit error rate. The mean power for the noise and signal plus noise distributions remain unchanged, yet the deviations are reduced creating a greater miss distance between the minimum "On" and the maximum "Off" distributions.

Averaging is only useful if coordinated with the leader length of the transmitter, and in the case of the present signal channel receiver embodiment, each coarse search operation takes less than 12 PN code intervals. Accordingly, averaging over 6 searches produces a maximum benefit after 72 code intervals. Because the leader length is 92 code intervals on the transmitter, this leaves 20 code intervals for fine search, AGC and overhead. In systems where the leader length must be reduced, the averaging time-base may be reduced accordingly. There is an asymptotic diminishing return on investment for averaging. Averaging two noise samples together reduces the noise deviations by 3 dB. To gain another 3 dB, the number of samples must be doubled to 4. Each significant reduction of noise deviations requires a doubling of time. The most effective average is, therefore, the first average and subsequent averages, while helpful, provide diminishing returns. Also, the improvement cannot exceed the mean signal to noise ratio (SNR) at the output of the bandpass filter preceding the magnitude computation.

While averaging can improve trip sensitivity to overcome the greatest portion of the 3.9 dB loss at maximum frequency ambiguity due to decimation loss, the system performance and cost is at odds according to a trade off of sensitivity for leader length in the transmitter and power/computation loading in the receiver.

Increased Data Rate Using Partial Code Correlation

A "scalable" feature of the present invention is an adjustable data rate. Data rate may be increased in the receiver while using partial decimation coupled with data modulation transitions in the transmitter that occur at fractional PN code boundaries.

A standard modulation method for transmitting data in the present inventive system is OOK where a data value "1" is represented by the presence of signal for a repetition of the PN code and a data value "0" is represented by the absence of signal for the same interval.

An alternative data modulation method is BPSK data where the signal is present for both "1" and "0" data symbols, yet the carrier phase is inverted 180 degrees to delineate the data state. In this data modulation method, the correlation sum will either sum positively or negatively depending on the arbitrary carrier relationship at acquisition. The data "1" is assigned the state during the preamble (leader) so that the PN sequence will be transmitted "in the clear". A Costas loop or other technique for translating the received phase normal to that of the phase detector is used to create a maximum data miss distance and therefore maximize SNR.

Alternatively, data is differentially encoded (DBPSK) which simplifies the incoherent reception problem. In a differentially encoded signal, the phase inversion event marks a data state where the absence of inversion marks the alternate bit state.

In either OOK, BPSK or DBPSK system, the data rate can be increased by creating artificial symbol boundaries within the PN code. The present transceiver system uses a 63 chip PN code length to represent a standard symbol, and therefore provides a data symbol (or data bit) rate of approximately 19.2 Kbits/second. The data rate can be effectively doubled by arbitrarily assigning the first 31.5 chips to one data symbol, and the second 31.5 chips to the second. The transmitter must perform the BPSK or DPSK phase inversion at the 31.5 chip boundary or amplitude key the signal, and the receiver must perform the correlation process by parts (i.e., treating the first 31.5 chips separate from the subsequent 31.5 chips).

Boundary conditions are relatively arbitrary and data rates may be increased at any fractional code interval provided the rate divides evenly into the code repeat rate or a multiple of the code repeat rate. For example, it may be desirable to send three symbols over two code repeat intervals. The transmitter and receiver need only have a synchronization method, or other prearranged agreement, to know when to expect phase inversion or keying of the carrier.

Regulatory restrictions (such as Federal Communication Commission, FCC, restrictions) may place a practical limit to this technique, because the regulations require a minimum process gain for systems to operate as a spread spectrum systems, which are allowed to use special signal bands. However, the process gain is typically specified at the data symbol rate and thus, by dividing the 63 chip PN code by 2 effectively loses 3 dB of process gain for each symbol, and if the PN code is further divided, the system may no longer be entitled to "spread spectrum" status. Furthermore, the effect of the system process gain on other facets of the system also bear on increasing the data rate, including correlation loss due to filtering, sampled limiting or noise bandwidth.

FIGS. 30A–F depict a PN code repetition interval and the 63 chips collected at 4 times the chip rate, and respective symbol intervals at predetermined fractions of the 63 chips. A total of 252 samples represent the data collected for one PN pattern generated in the present invention. Assuming the data is correlated with the receiver PN code, FIG. 30A depicts the maximum process gain available for a symbol rate equal to the code repeat rate resulting in 17.99 dB of process gain at a 19.2 kbits/sec data rate. FIG. 30B depicts the maximum process gain per symbol for a symbol rate equal to twice the code repeat rate. This effectively doubles the data rate to 38.4 kbits/sec with a corresponding process gain maximum of 14.98 dB. FIG. 30C depicts three symbols per code interval yielding a data rate of 57.6 kbits/sec with a maximum process gain of 13.22 dB. FIG. 30D depicts four symbols per code interval yielding a data rate of 76.8 kbits/sec with a maximum process gain of 11.97 dB. FIG. 30E depicts five symbols per code interval yielding a data rate of 96.0 kbits/sec with a maximum process gain of 10.97 dB. FIG. 30E depicts six symbols per code interval yielding a data rate of 115.2 kbits/sec with a maximum process gain of 10.21 dB.

Beyond 6 symbols per code interval the process gains drops below 10 dB which is the minimum allowable process gain for spread spectrum systems operating in the 902–928 MHz band per FCC regulations. However, aside from the FCC regulation, more that 6 symbols may be achieved, or even a composite of different symbol lengths may be used for certain applications or users that require greater data rates/or symbol rates. Similarly, adaptations to the receiver mechanisms may be made so that multiple PN codes may be used to lower data rate, but increase processing gain, and therefore, robustness of selected transmitted signals.

Frequency Tracking during Data Demodulation

Data demodulation may proceed after acquiring spreading code synchronization of the receiver to the transmitter. If the transmitter derives its spreading code sequence from the same frequency reference as its RF carrier, it is sufficient for the receiver to track the transmitter carrier so as to maintain spreading code synchronization throughout data demodulation. Also, to demodulate a phase modulated signal, it is preferred to remove the effect of the carrier frequency error between transmitter and receiver.

One way to remove the effect of the carrier frequency error between transmitter and receiver is to use conventional DBPSK demodulation augmented with frequency error correction. According to this approach, assume the received signal is despread, downconverted to baseband and decimated to a bandwidth greater than or equal to the frequency error as previously discussed. This is shown as 3100 in FIG. 31 with 6 output samples C(n') 3105 per code period. Choi, Z. Y, Lee, Y. H., "Compensating Frequency Drift in DPSK Systems via Baseband Signal Processing", IEEE Transactions on Communications Vol. 45 No. 8, August 1997, pp 921–924, the contents of which is incorporated herein by reference, discusses this technique using one sample per code period as unduly limiting the frequency range that can be corrected. A conventional DBPSK demodulator 3110 as taught in Frerking, M., "Digital Signal Processing and Communications Systems", Van Nostrand Reinhold, 1994, pp 433–435, 448–450, is shown in FIG. 31. The bit rate being scaleable by the parameter L in the DBPSK demodulator 3110.

| R (kbit/s) | L |
|---|---|
| 19.2 | 6 |
| 38.4 | 3 |
| 57.6 | 2 |
| 115.2 | 1 |

In reference to FIG. 31, a product of the present bit samples C(n') 3105 are multiplied by a complex conjugate of the previous bit samples and decimated to one sample C(n) 3115 in the DBPSK demodulator so as to convert the frequency error to a static phase error θ. The complex sample $C_\theta(n)$ 3125, whose angle is the static phase error θ, averaged over the previous M bits, is estimated in a decision feedback loop 3120. The static phase error θ is canceled before making the demodulated data bit decision bit(n) 3130 as shown in FIG. 31, and is accomplished by multiplying C(n) by the complex conjugate of $C_\theta(n)$ and taking the sign of the real part of the product to make the bit decision bit(n) 3130. The $C_\theta(n)$ average is updated with C(n) multiplied by the sign of bit(n). This approach enables the conventional DBPSK demodulator to work in the presence of frequency error. The computational burden is low and does not increase the cost of the DSP over that required for an ASK data demodulator.

An alternative way to remove the effect of the carrier frequency error between transmitter and receiver is to null the error with an automatic frequency control (AFC) loop. Off-the-shelf components that implement the digital signal processor 3280, such as a DSP integrated circuit (IC), a general purpose micro-controller (uC) IC, general purpose digital logic, or a custom digital IC or any combination of these, can be adapted with appropriate software to implement the phase and/or frequency detector and loop filter.

A block diagram of a LO synthesizer using the DSP 3280 is shown in FIG. 32. With the switch 3205 in position 1, the synthesizer includes a stable reference frequency source (such as a quartz crystal oscillator) which is the master clock for the DSP 3280, a downconvert despread and decimate function 3210 as previously disclosed, a frequency detector 3220, a loop filter 3230, a voltage controlled oscillator 3250 and feedback divider 3255. The output 3260 of the synthesizer is a signal at the desired frequency. A digital to analog converter (DAC) 3240 is placed between the loop filter 3230 and the VCO 3250 to provide an analog control signal to the VCO 3250. Low cost DACs 3240 are available in a dual 8-bit converter package where fine converter steps are set to 1/64 of the coarse converter steps. The loop filter algorithm 3230 first adjusts the coarse converter to the coarse frequency error 3232 and then the fine converter to the fine frequency error 3233 during frequency control loop settling.

After the LO is locked to the receiver frequency reference, the receiver is reconfigured by changing the switch 3205 to position 2 in FIG. 32. The receive antenna 3201 feeds the conventional analog RF front end 3203 which includes an analog to digital converter (ADC) at its output. The downconvert coefficients in block 3210 are the computationally efficient Fs/4 set, as previously discussed, and thus a computational burden is minimal and may be shared by other receiver functions. The frequency locked loop drives the coarse and fine frequency errors 3232, 3233 between the transmitter and receiver and hence the decimation loss to zero.

FIG. 33 illustrates part of a frequency detector implementation as was shown as the decimating frequency detector 3220 in FIG. 32, and preferably uses the output of the digital down conversion operation, decimated to 12 samples per spreading code period. The formula $$\omega = \dot{\theta} = \frac{I\dot{Q} - Q\dot{I}}{I^2 + Q^2}$$

is the well-known result that signal frequency is the first derivative of signal phase with respect to time. (The over dot signifies first derivative with respect to time.) The continuous time first derivative is approximated by the discrete time first difference 3320 as is known in the DSP art. For the frequency detector to function without error, a group delay of the first difference must be independent of frequency and must equal a group delay of the decimated I and Q samples. This is accomplished by the structure 3310 shown in FIG. 33, where the values $I_n$ are the I samples from block 3210. The 12 I and Q samples per code period are initially decimated by 2 as shown by the "+" sign in brackets combining adjacent $I_n$ samples. FIG. 33 is also representative of a similar structure for the Q samples. The computations may done as the I and Q samples are acquired so as to conserve DSP memory. When the frequency detector is preceded by a sampled limiter, the denominator term $I^2+Q^2$, which is the signal power, is constant and can be set to one without loss of functionality. The formula $$\omega = \sum_6 (I\dot{Q} - Q\dot{I})$$

computes the frequency computation ω and the decimation by combining the intermediate results of 3310 summing over a code period. This causes the frequency detector to have the same noise performance as the data demodulators previously discussed.

FIG. 34 is a block diagram of a very low cost DAC that includes a coarse 3401 charge pump and a fine 3403 charge pump (controlled current source) driving a capacitive voltage divider 3405. In this DAC the output voltage is proportional to the charge on the capacitors. The "Charge Control" logic 3410 turns on a charge pump for a predetermined time interval required to deposit or remove a particular charge on the capacitors 3405. This produces an output voltage proportional to the frequency error 3415 computed by the loop filter. The charge estimate logic 3420 keeps track of the charge on the capacitors. To conserve power in a battery operated device, the power to the synthesizer is cycled on and off During a power-off event, the estimated charge on the capacitors is saved in non-volatile memory. During a power-on event, the estimated charge is retrieved from non-volatile memory and used, as will be discussed, to replace the charge on the capacitors that was present prior to the power-off event. The recharge to estimate logic 3430 and the charge control logic 3410 restore the charge on the capacitors by driving the respective current sources 3401 and 3403 for predetermined periods of time corresponding with the estimated charge values stored in memory. Then the frequency locked loop is activated while minimizing the power-on settling time of the LO synthesizer because the charges where restored prior to the frequency locked loop becoming activated.

A third way to remove the effect of the carrier frequency error between transmitter and receiver is to control the first LO VCO 3250 (FIG. 32) in a Costas carrier recovery loop for BPSK demodulation. This is shown in FIG. 32 where the Costas phase error detector is substituted for the frequency detector 3220. The downconvert coefficients are the computationally efficient Fs/4 set. The computational burden is minimal and some of the diagram blocks in FIG. 32 may be shared by other receiver functions.

A fourth way to remove the effect of the carrier frequency error between transmitter and receiver uses the Costas carrier recovery loop for BPSK demodulation. This shown in FIG. 32 with the frequency detector 3220 replaced with a Costas phase error detector. The digital down conversion coefficients in conjunction with the downconvert and decimate function 3210 previously discussed in reference to FIG. 32, form a numeric controlled oscillator (NCO). The DAC 3240 is fed a constant frequency setting and the loop filter 3230 outputs 3232, 3233 control the down conversion coefficients. Some of the diagram blocks in FIG. 32 may be shared by other receiver functions. According to this approach the NCO must generate arbitrary frequencies for the downconvert tone so the computational efficiencies discussed previously may not be as prevalent.

A fifth way to remove the effect of the carrier frequency error between transmitter and receiver is to measure the frequency error using the frequency detector 3220 shown in FIG. 32. An additional computation downconverts the decimated I and Q signals from downconvert and despread and decimate block 3210 to zero frequency error in a feedforward arrangement prior to DBPSK demodulation. These steps add computational complexity.

Multi Channel Receiver

A second embodiment of the present invention is directed to a multi channel transceiver, having a receiver and transmitter that provides enhanced system sensitivity and performance relative to the single channel transceiver of the first embodiment, although requiring additional digital signal processing power than the single channel transceiver of the first embodiment.

The multi channel transceiver contains several common components with the single channel transceiver of the first embodiment. In particular, the multi-channel transceiver includes the antennas 901, 903, RF front end 905, transmitter 929, associated antenna 931, and low performance receiver time reference 927 of the single channel receiver, as discussed in FIG. 9. Differences, however, will be described with respect to the digital signal processing section 908 of the single channel receiver in FIG. 9, and these differences, as well as other functions for enhancing performance, are discussed below.

As discussed, the single channel receiver compensates for a frequency ambiguity of the transmitted signal by using a 115 kHz predetection bandwidth so as to be assured of capturing the transmitted signal therein. However, as discussed previously, the wider bandwidth caused a sensitivity loss, as compared with a conventional receiver that does not attempt to compensate for transmitter frequency uncertainty and therefore uses a detection bandwidth that is commensurate in size to a signal bandwidth. Like the single channel embodiment, the multi-channel receiver (actually transceiver, but for simplicity referred to as a receiver) includes a baseband processing stage that is sufficiently wide to account for the transmitter frequency uncertainty range, although the multi-channel receiver offers improved sensitivity by further subdividing the frequency ambiguity bandwidth into smaller overlapping bandwidths, each of which match the bandwidth of the desired signal.

In order to determine which of the channels actually contains the signal, the multi-channel receiver includes a channel selection mechanism that selects one of a plurality of smaller bandwidths in order to acquire the spread spectrum signal and demodulate the data contained therein. The multi channel receiver, therefore, offers slightly better performance than the single channel receiver of the first embodiment because at least one of the channels will capture the signal, and that channel will have a bandwidth that more closely approximates a bandwidth of the signal.

The multi channel receiver uses a multi-bit ADC 3504 that serves the same function as the single bit converter in the single channel receiver, in that it digitizes the analog signal into a series of digital samples, however the ADC 3504 represents the digital samples in multi bit words for subsequent processing in the baseband processor. Because the ADC 3504 has limited dynamic range (i.e., a range from lowest signal representable by the ADC 3504 to the highest signal representable by the ADC 3504), an automatic gain control AGC mechanism 3502, as depicted on FIG. 35, is used to adjust the incoming signal from the RF front end (similar to the RF front end 905 of FIG. 9) to fall within the dynamic range of the ADC 3504. Keeping the received signal within the dynamic range of the ADC 3504 prevents the signal from being "clipped" (i.e., causing the ADC to perform a non-linear operation on the signal) if the signal is too high, and prevents the signal from being "swamped" by quantization noise generated by the ADC 3504, if the received signal is too low. The AGC mechanism 3502 is shown as an adjustable attenuator having an AGC control input that is controlled by a processor.

FIG. 35 also shows a quadrature downconvert and decimate operator similar to 909 in FIG. 9, although processor 3530 depicts the mechanisms used for creating the downconversion and decimation coefficients used in the multichannel receiver. Tone generator 3532 generates a tone at frequency (Fc) equal to an IF center frequency (Fc) of the received signal. The tone generator 3532 feeds phase shifter 3534 so as to impart a 90 degree phase shift and thus provide a quadrature tone. These in-phase and quadrature tones serve as I and Q downconversion tones for the incoming signal sampled by the ADC 3504. Each downconversion tone is mixed with the PN code generator 3536, which has been spectrally compressed with a filter 3538 and mixed in mixers 3540 and 3542 so as to create a downconversion and despreading coefficient table that is precalculated and stored in semiconductor memory in the DSP processor.

Mixers 3512 and 3522 perform the downconversion and despread process using the signal from the ADC 3504 and the quadrature downconversion despreading signal from the precalculated look-up table stored in memory. The resulting signal is a quadrature, baseband, despread signal passed to low pass filters 3514 and 3524 and decimated in downsampling operators 3516 and 3526 to lower the signal sample rate prior to DC (0 Hz) removal in DC removal mechanisms 3518 and 3528. The resulting signal is a despread downconverted and decimated representation of the sample signal received at the input of the quadrature downconversion, despread and decimation process.

The signal processing mechanism depicted in FIG. 35 has sufficient processing power to perform either a slow serial search, or a fast serial search, as long as the data record for one code repetition interval is stored in memory and correlated against all possible combinations of the PN code generated locally in PN code generator 3536. To this end, the decimation efficiencies previously discussed may also be employed herein.

As shown in FIG. 35, the sample rate (Fs) of the ADC is 6.0 MHz which differs from the single channel sample rate of 4.8 MHz. The preferred over sample rate of the multi-channel receiver is a 5:1 ratio relative to the chipping rate of 1.2 MHz which sets the sample rate at a slightly higher frequency. The over sample ratio is immaterial to the operation of the device and only sets the requirements for the anti-aliasing filter preceding to the ADC. Accordingly, a subsequent description for the multi-channel receiver will be based on a 5:1 over sample ratio.

The present inventors have identified that by precalculating the hybrid coefficients, a coefficient lookup table may enable the downconvert, despread and decimate process to be implemented in very modest DSP components that are presently available.

The final process step depicted in FIG. 35 is DC removal, and is performed by DC removal mechanisms 3518 and 3528 that remove undesirable effects of a voltage bias introduced at an analog signal side of the ADC 3504. By canceling this DC component, as discussed below, the present multi-channel receiver may use a low precision voltage reference at the ADC 3504, compensating in real-time in firmware. This further reduces hardware complexity and cost in realizable systems at a very small computational loading cost.

Analog to Digital Converter DC Removal

ADC devices typically have an AC coupled input with a voltage reference set by precision resistors and active components. Drift in the resistors due to aging and temperature will vary the reference voltage and center point, creating a DC bias in the incoming data stream. ADC bias on the signal will be interpreted as a CW jammer in the system, exactly centered in the IF, and will be translated to the Nyquist extremes (0 and Fs/2). This creates an elevated noise floor and will decrease radio sensitivity if left uncorrected.

Traditional DC removal techniques are implemented in firmware and calculate a mean of the sampled data and subtract the mean from each data sample. This process works adequately, yet requires that each data sample be acted on by a math function prior to any signal processing. This roughly doubles the computational loading for processing a data sample.

The present multi-channel receiver performs DC removal at a later point in the signal processing, removing the need to perform the math function at the sample rate. In reference to FIG. 35, DC removal is performed in operators 3518 I and 3528 Q, not at point 3508, and thus performs DC removal on downconverted, decimated and despread samples. The multi-channel receiver performs a despread-and-decimate function on the raw data, reducing the number of samples by the decimation ratio of decimators 3516 and 3526 as shown in FIG. 35.

The incoming data is preferably sampled at 5 times the chip rate such that 315 (315=63×5) samples per bit interval are collected and are subjected to DC compensation. The signal is decimated by 21 to produce 15 quadrature samples per bit period, yielding a Nyquist-bandwidth frequency uncertainty of 288 kHz, of which only 120 kHz is of interest. Removing the DC component from the input data following the decimation reduces the loading from 315 math operations to 30 (15 I terms and 15 Q terms).

Decimation often implements an averaging function, but instead of averaging, the decimation process can instead compute the sum. This introduces an error factor that will be proportional to 1/N where N is the decimation ratio. For low-end processors, ignoring the divide-by-N to compute a true average may result in an overflow in the processor, but this can be avoided by judiciously scaling coefficients, or incoming data, or using sufficient bits in the accumulation process to hold the worst case sum. The decimation (summing) process can be expressed as 15 multiply-accumulate processes against independent data and coefficient sets. Each decimation block i can be expressed as:

$$DECOUT_i = \sum_{n=1}^{21} D_i(n)C_i(n)$$

where $D_i(n)$ represents 21 ADC data words and $C_i(n)$ represents the corresponding 21 coefficient words. The result is a scalar value representing one of 15 downsampled data points per I and Q processor. Because a DC offset value is present in the samples, the term $D_i(n)$ contains the sampled data plus a constant, A, added to each data point.

$$D_i(n)=D_i(n)+A$$

The decimation scalar is distorted by this constant, A, expressed as:

$$DECOUT_i = \sum_{n=1}^{21} [D_i(n) + A]C_i(n)$$

Because the coefficients are unchanging (stored in ROM), they can be treated as constants and the following simplification is possible:

$$DECOUT_i = \sum_{n=1}^{21} [D_i(n)C_i(n) + AC_i(n)]$$

$$DECOUT_i = \sum_{n=1}^{21} D_i(n)C_i(n) + A\sum_{n=1}^{21} C_i(n)$$

$$DECOUT_i = \underbrace{AK_i}_{\substack{DC \\ Removal}} + \underbrace{\sum_{n=1}^{21} D_i(n)C_i(n)}_{\substack{Despread/Despread \\ Block}}$$

The new constant $K_i$ represents the sum of the coefficients for the decimation block. As the decimation block boundary is arbitrary, a non-zero mean for the decimation block acts as a multiplier for DC offset if a correction is not performed. The product $AK_i$ must be compensated within each decimation block if the computation is to be correct.

Each I and Q decimation block therefore has an independent K scalar multiplier that magnifies DC. A mean measure of the DC component is needed so as to complete the decimation correction. To this end, a number of random sampled data points are averaged for each bit interval to produce an estimate of the mean. More particularly, in the present embodiment, 16 random ADC data points per code period are averaged to compute a mean. The "code period" mean is then time-averaged over an the most recent 8 code periods to calculate a running approximation of A.

The summation of each decimation coefficient block ($K_i$) is computed at a compile time and provided as a lookup table. The time-averaged mean (A) is multiplied with each of the I and Q coefficient sums ($AK_i$) to create 30 DC removal products ($K_i$) which are subtracted from their respective I and Q decimation results.

Optimization of Coefficients and Implementation for Channelized Receivers

A final bandwidth in a receiver must match the information bandwidth to achieve maximum sensitivity. The present multi-channel receiver embodiment uses overlapped channel filters to achieve an optimal signal-to-noise ratio (SNR). The data sampled at the ADC 3504 is despread and partially decimated to a point where the decimated signal bandwidth is at least as great as the frequency uncertainty of the transmitter (greater to reduce decimation loss at band edge, as was discussed). The receiver next sends the partially decimated data into a bank of channel filters to complete the decimation process and make the decimation bandwidth equal to the signal bandwidth.

The channel filters may be implemented using a fast Fourier transform (FFT) or discrete Fourier transform (DFT), finite impulse response (FIR) filter or infinite impulse response (IIR) filter or other similar transform that band-limits the data signal. FIG. 39 depicts the channel implementation method where channel filters are implemented using a DFT. By spacing the channel filters non-uniformly, the between-channel roll-off intercept can all be made to be equal in absolute power to achieve better performance across the entire frequency uncertainty of interest. Moreover, arranging the respective channel filters in the frequency uncertainty bandwidth in a way that the intercept points between any two channels is limited to a fixed number, say 1.5, dB, then there will be a lowered risk that the signal may be missed because it occurred in a "gap" between adjacent channels. For this reason, a DFT is preferred over an FFT because an FFT provides uniform channel spacing that is equal to the channel bandwidths. If an FFT is used, the between-channel roll-off adds 3.9 dB of loss to the decimation loss.

Signal processing efficiencies are realizable by using channel filters that are symmetrically spaced about 0 Hz. Because each channel filter is implemented as a complex vector multiplication, the negative channel can be implemented using intermediate components of the positive channel, as will be expressed using complex (real and imaginary numbers) expressions. The input data stream may be represented as:

Data=A+jB, where "A" and "B" represent vector components of sampled data. In this case, the vector holds 1 code period of sampled data partially decimated down to a sampling rate greater than 2 times the frequency uncertainty. The channel filter coefficient is a tone represented by the complex vector C+jD. The positive channel filter becomes the product of these two tones.

+CF=(A+jB)*(C+jD)=(AC−BD)+j(BC+AD)

The negative channel filter has the same offset frequency about 0 Hz as the positive channel filter. It therefore has the same coefficients as the positive filter, but the imaginary term is sign reversed represented as C−jD, and so the negative channel filter becomes the product of these two tones.

−CF=(A+jB)*(C−jD)=(AC+BD)+j(BC−AD)

While calculating each channel filter, the intermediate product terms AC, BD, BC and AD are temporarily saved. In the case of the 15-point channel filters implemented in the channelized embodiment, each product term represents 15 multiply-accumulate instructions. The total channel filter therefore takes 60 multiply-accumulate instructions, plus 2 add or subtract operations to complete a complex vector result. The negative channel filter need only perform the 2 add or subtract operations, thus saving the 60 multiply-accumulate instructions. The preferred embodiment employs this technique to maximize the number of usable overlapped channels. Adding more channels reduces the between-channel losses and more efficiently utilizes processor computational bandwidth. This technique enables the realization of many channels in a very modest digital signal processor.

FIG. 36 depicts a signal processing mechanism that implements the above-described symmetrical channel filter efficiencies, for realizing a single pair of channel filters, symmetric about 0 Hz. Other mechanisms are used for calculating the other symmetrical channel filter pairs.

As seen in FIG. 36, signals 3602 and 3604 represent the I and Q decimated data streams of a baseband signal. A frequency generator 3606 and delay element 3608 (i.e., a phase shifter) generate the frequency offset for both the positive and negative frequency channels. Multiply operators 36M1 through 36M4 generate the product terms 36P1 through 36P4 respectively by multiplying signals 3602 and 3604 with inphase and quadrature frequency offsets produced by frequency generator 3606 and delay element 3608, as shown. The product terms 36P1–36P4 are decimated by lowpass filters 36F1 through 36F4 and then decimated by 15 in the downsampling elements 36D1 through 36D4 so as to produce the signals AC, BD, BC, and AD. The signals AC, BD, BC, and AD are then either added or subtracted in elements 36A1 through 36A4 to produce the intermediate values that will be used to determine the signal power in the respective symmetric channel filters. These intermediate values are squared in squaring operators 36S1 through 36S4 and then combined in adders 3614 and 3616 to produce both the positive and negative channel filter outputs for a particular frequency offset.

Similarly, computational efficiencies are realized in the implementation of the center channel filter (i.e., 0 Hz offset). The center channel filter is the most straight forward to implement because it may be noted that for a 0 Hz frequency offset, as noted in FIG. 36, the quadrature component of the sinusoidal transform may be constant 0 while the in-phase component may be constant 1. Thus, half of the product terms go to 0 while the other product term is the data itself (multiplied by 1). The 0 Hz channel filter therefore becomes the sum of the squares of the decimated in-phase and quadrature data.

FIG. 37 illustrates a center frequency channel determination mechanism that receives the I and Q decimated data streams, 3702 and 3704 respectively, and applies the same to lowpass filters 37F1 and 37F2 and decimation blocks 37D1 and 37D2 so as to produce single data points. These single data points are squared in squaring operators 37S1 and 37S2 and then added in adder 3706 to produce the center channel output.

The purpose for employing the decimation filter is to attenuate image frequencies that exist above the Nyquist frequency. According to the filter roll-off, these image frequencies are rejected by at least 13 dB. However, the decimation loss with regard to transmitter frequency error is the loss across the center of the main lobe of the sinc function. FIG. 38 is a graph illustrating an amount of decimation loss for the transmitter frequency uncertainty range as a function of percent of Nyquist bandwidth. When a signal of interest 3803 approaches the band edge of the Nyquist bandwidth 3802 or 3804, up to 3.9 dB of decimation loss can be expected, as shown.

The multi-channel receiver performs decimation to reduce the data rate prior to channel filter implementation.

For a channelized radio, the optimal decimation would bring the Nyquist bandwidth down to equal the transmitter frequency uncertainty at a cost of significant decimation loss. Maximizing decimation means that each channel filter performs its function on the minimum of data points. Relaxing the decimation increases the channel filter computational loading, yet provides relief against decimation loss.

For channelized digital receivers, the sampled data is processed to create overlapping filters that span the frequency uncertainty. The sensitivity of each channel filter is set by the bandwidth of the channel filter and the total decimation loss. The ideal channel filter would be performed at the maximum data rate, thus suffering no decimation loss. This is not practical, in systems having limited computational resources, as is the case with the present multi-channel receiver. Accordingly, the realization of the present multi-channel receiver performs a partial initial decimation, lowering the effective bandwidth and associated data rate prior to channelization. Thus, when scaling the multi-channel receiver to provide a most sensitive performance, samples are made at 5 times the chipping rate, and decimated by 21 so as to achieve a pre-channel filter Nyquist Bandwidth of ±144 kHz. Subsequent overlapping channel filters continue the decimation process so that the noise bandwidth ideally matches the signal bandwidth. The initial decimation brings the uncertainty down only far enough to make it feasible to implement enough channel filters to span the frequency uncertainty of interest.

The non-uniform overlapped channel filters shown in FIG. 39 span the transmitter frequency uncertainty of FIG. 38, shown between points 3806 and 3808. Because the individual filters have non-uniform spacing (i.e., non-uniform with respect to the channel centers) the between-channel loss can be controlled to create a worst case system loss of 1.4 dB (as illustrated by the dashed line 3903) at cross-point 3908 inclusive of decimation and between-channel loss. The curve 3902 of FIG. 39 represents the signal loss due to initial decimation of the signal from 6 MHz to 288 kHz and is the same as line 3801 as depicted in FIG. 38. Curve 3902 corresponds to the top of line 3801 (FIG. 38) between points 3806 and 3808. Channel filter 3904 is shown offset from the center channel by −59.65 kHz and represents the negative-most channel spanning the transmitter frequency uncertainty. If the signal of interest is located in the center of this channel filter 3904, the power loss of the signal at 3906 is entirely due to initial decimation. However, if the transmitted signal is located close to the intercept point 3908, the additional signal loss is due to between-channel roll-off.

Alternatively, a set-on channel filter may be used to further reduce system loss due to filter shape. Set-on channel filter 3910 is used to eliminate or reduce the effects of between-channel loss, where the set-on channel filter has variable center frequency that may be moved to be centered overtop of a signal, once the signal is detected. Following a trip event in one of the static channels, the processor implements an interpolation mechanism that interpolates a power in two adjacent channel filters so as to determine a best estimate of actual frequency offset. The set-on channel filter is subsequently steered to exactly match the desired signal center frequency, thus removing any channel filter roll-off. Total system loss is therefore limited to the decimation loss. FIG. 39 depicts the set-on filter as a dashed line 3910 which recovers the roll-off loss between two fixed channels.

Fast Search in Multi-Channel Receiver

The principles taught for fast serial search in the single channel receiver embodiment work equally well for the present multi-channel receiver embodiment. In addition, the present inventors have developed frequency domain algorithms for computing a fast correlation function as will be discussed.

Fast Frequency Domain Coarse Search

An alternative search method uses a frequency domain parallel correlator 4000 shown in FIG. 40. Correlation is performed by calculating the Woodward radar ambiguity function $$A_{XY}(\tau, v) = \sum_N (n - \tau) \times (n) e^{j2\pi v n}$$

The ambiguity function is the received signal energy as a function of spreading code phase $\tau$ and carrier frequency shift $v$ between transmitter and receiver. The receiver is adjusted by the code phase and carrier frequency shift that results in greatest received signal energy so as to acquire synchronization with the transmitted signal. A size of the phase step in the search method is one code chip and a size of the frequency shift step is the frequency of the code repetition.

When the number of frequency shift steps is smaller than the number of phase steps to be covered, a frequency domain technique is computationally efficient. This is illustrated in FIG. 40 for 7 frequency shift steps and 63 phase steps. The process steps are as follows:

Step 1. A real input fast Fourier transform (FFT) 4010 is performed on an input record 4005 of one period of the reference code. The 63 output (frequency) points centered on 0 Hz are saved in memory and the remaining output points are zeroed, which results in a reference code 4014 being filtered by an ideal low pass transfer function 4012. This computation is performed only once.

Step 2. The received signal is preferably sampled at the rate of 5 samples per spreading code chip (or 4 may be used as well). A real input fast Fourier transform (FFT) 4020 is performed on an input record 4015 one code period long.

Step 3. A circular indexing shift operation of $v-f_s/4$ 4030 is performed on the output points 4024 so as to down-convert from the IF to baseband, and the resulting 63 output (frequency) points 4034 centered on 0 Hz are saved. The remaining output points are then zeroed, which results in an ideal low pass filtered baseband received signal at a frequency shift $v$.

Step 4. These 63 frequency points 4034 are multiplied in a multiplier 4040 by the complex conjugate 4045 of the 63 reference code frequency points 4014. An inverse fast Fourier transform (IFTT) operation 4050 is performed on the product, and the result is a slice of the ambiguity function at one frequency shift $v$.

Step 5. Steps 3 and 4 are repeated for each frequency shift so as to complete the computation of an ambiguity function 4060, and from this result the receiver can be synchronized using the methods disclosed elsewhere herein. This algorithm is exemplified with a 63 chip spreading sequence, although parameters of the algorithm may be changed to accommodate other spreading sequence lengths, intermediate frequencies, and sampling rates.

Fast Frequency Domain Fine Search

After resolving the carrier frequency shift $v$ between transmitter and receiver, it is preferable to resolve the spreading code phase τ to ¼ of a chip. This is preferably accomplished by repeating step 3 with ν set for greatest received signal energy. See FIG. 40.

The 63 frequency points 4034 are multiplied in the multiplier 4040 by the complex conjugate 4045 of the 63 reference code frequency points 4014. The 63 point product is zero padded to 252 points (i.e., add points having zero value) in zero pad operator 4070, and perform an inverse fast Fourier transform (IFFT) 4080 on the zero padded product. The result is a slice of an ambiguity function 4090 at the optimum frequency shift ν with a phase resolution of ¼ of a chip, from which the receiver can be synchronized to within +⅛ of a chip using the methods discussed herein.

This method is exemplified with a 63 chip spreading sequence, but parameters of the algorithm may be changed so as to accommodate other spreading sequence lengths, intermediate frequencies, and sampling rates.

Fast Frequency-Domain Search Implementations

The purpose of this algorithm is to synchronize the PN code of the receiver to that of the transmit signal. Two parameters need to be resolved in order to achieve this end: transmitter-receiver frequency offset ν and code-delay τ. By evaluating the receive signal energy at every (τ,ν)-pair, the processor can chose the best parameters for synchronization. This 2-dimensional correlation function over code-delay and frequency is called the Ambiguity function A(τ,ν). Assuming a strong-enough signal is indeed being transmitted, the (τ,ν)-pair that best aligns with the transmit signal will have the strongest Ambiguity function value. See FIGS. 41 through 45.

When each chip is oversampled in the spreading sequence by some integer amount Q, and if the spreading sequence hasM chips, N=Q*M samples are taken. The synchronization process would then resolve τ to 1/Qth chip. However, in an effort to hasten the acquisition time, the present alternative synchronization process trades 1/Qth-chip resolution at slower speeds for single-chip resolution search at higher speeds, and reduces its processing load by band-limiting the receive signal. However, this will not be apparent until later in the procedure. Note that lower search resolution will cause a sensitivity loss.

FIG. 41 illustrates the conventional process of evaluating the Ambiguity function at a specific (τ,ν)-pair. FIG. 41 shows N samples over a time span of one code period, d[n] 4101 and N coefficients of one code period, a[n] 4102. Both enter a correlator 4103 and the correlation between the two signals 4104 is the Ambiguity function evaluated at (τ,ν).

FIG. 42 illustrates a conventional process where a slice of the Ambiguity function 4201 is evaluated for all delays using a circular correlation operator 4202 with the same inputs.

FIG. 43 illustrates a conventional circular correlation process that is very similar to a process known as circular convolution. Reversing one input sequence a[n] 4301 produces a sequence b[n] 4302, as shown and thus the circular convolution operator 4303 can be used as part of the circular correlation operator 4304 to produce the ambiguity function.

A conventional circular convolution process is shown in FIG. 44 and is based on an understanding that convolution in the time domain is equivalent to multiplication operator 4401 in the frequency domain. Sequences 4402 and 4403 entering the circular convolver are reformatted into a frequency representation using the DFT operators 4404 and 4405, and combined in the multiplication operator 4401 an output as product 4406. The product 4406 is reformatted into a time-domain representation 4407 using an Inverse Discrete Fourier Transform operator (IDFT) 4408. Without the frequency transformations, a circular convolution requires $N^2$ multiply-accumulate operations, that, at first glance may seem inefficient, but in fact is not so inefficient when considering the possible computational savings offered by an FFT-based implementation (as is discussed below, after the discussion of FIG. 45).

FIG. 45 illustrates an inventive fast-frequency search process employed in the multi-channel receiver embodiment, which is relatively more computationally intensive than any search process employed in the single-channel receiver of the first embodiment, but uses bandpass filtering, and decimation-in-time as a way to reduce processing load. C[n] 4501 is an extracted M-length frequency-domain subsequence from B[n] 4502 centered around $f_s/4$, where B[n] 4502 is a product of an N-point DFT performed on time domain representations (a[n] . . . b[n]) of the spreading sequence, as generated by the receiver. Likewise, E[n] 4503 is an extracted M-length frequency-domain subsequence from D[n] 4504 centered around $(f_s/4)+\nu$, where D[n] 4504 is an N-point result of a DFT operation performed on N time domain samples, d[n] of the received signal. These data extractions C[n] and E[n] are equivalent to ideal band-pass filtering in the frequency domain and decimating in the time domain. D[n] 4504 are stored in RAM so that D[n] 4504 can re-extract E[n] 4505 as the process steps through values of ν to fill in the Ambiguity function, as shown in the graph portion of FIG. 45. A gray region of FIG. 45 represents precalculated values stored in ROM. A data structure of the stored data includes a field configured to hold the M points corresponding to the portion of the code spectrum centered around $f_s/4$. The product F[n] 4505 is transformed back to the time domain sequence f[n] 4506 before being put into the Ambiguity array 4507, as shown in FIG. 45.

The DFT and its Inverse can be calculated using the Fast Fourier Transform process. Ordinarily the DFT (or the IDFT) takes $N^2$ multiply-accumulate operations, just as many as circular convolution. The FFT, on the other hand, relies on the number of prime factors of N. which results in computational efficiencies. If N is the product of q prime numbers $P_1, P_2, \ldots P_q$, then a number of multiply-accumulate operations becomes $N*(P_1+P_2+ \ldots +P_q)$, assuming all of the prime numbers are greater than or equal to 2, noting that $(P_1+P_2+ \ldots +P_q) \leq (P_1*P_2* \ldots *P_q)=N$ for all prime integers $P_i \geq 2$. The more prime factors for N, the faster the FFT algorithm can compute the DFT. However, a savings exists over the straightforward circular convolution method only when $2(P_1+P_2+ \ldots +P_q) \leq N$. For the preferred 63 chip spreading code, 63 is evenly divisible by prime factors 7, 3, and 3, and thus $2(7+3+3)=26 \leq 63$, which means the preferred chip spreading code enables the realization of these computational efficiencies.

The FFT algorithm breaks the large DFT into smaller DFT's. Depending on the target architecture and the prime factors, the Winograd DFT method may be used as a substitute for the smaller prime DFTs. Winograd's method minimizes the number of multiply operations for certain prime DFTs but also incurs higher indexing complexity. Most effective digital signal processing devices will perform multiply operations as efficiently as addition operations, and may have provisions for successive and modulo indexing. Winograd's method will not be as advantageous in such processors as it could be with a processor that does not have single-instruction multiply operations. Preferably the Winograd method is not used in the present embodiment for the indivisible DFTs because digital signal processing devices are generally more efficient in the $N^2$ calculation in general. In addition, 3 and 7 are relative low number primes and thus $N^2$ is somewhat small. Because of these computational efficiencies, prime factors should also play a role selecting a spreading sequence, as they are in the preferred case of 63 chip spreading sequence.

False Trip Avoidance in a Multi-Channel Receiver

Identifying valid trip events is a challenge in multichannel receivers because there are several false signals, such as impulsive jammers, undesired signals, and signals or noise that will occasionally give the appearance of false synchronization detection. However, by employing false synchronization avoidance mechanisms, the multi-channel receiver of the present embodiment offers relatively fast signal acquisition and reduced transmitter preamble time.

False trips events are received power fluctuations at an erroneous code phase that are sufficient to cause the receiver to dwell at that code phase and evaluate the incoming signal to determine if correlation has, in fact, been obtained. Sources of received RF signals include ambient noise, keyed carrier wave (CW) jammers, non-correlated spread spectrum signals, and correlated spread spectrum signals. Non-correlated spread spectrum signals are signals that may properly be decoded by the receiver, provided that the receiver can eventually obtain code phase coherence with the received signal; a correlated spread spectrum signal is one in which spreading code phase coherence has already been achieved. A trip event occurs when there is a measurable increase in received signal power over successive periods of time, however, this increase may be due to several sources and, perhaps, many of these increases will not result in a legitimate, true trip event signify that the received signal should be demodulated. The presently described inventive process is arranged to reduce the instances of reporting a trip event on a keyed CW jammer or a non-correlated spread spectrum signal.

FIG. 46 is a graph of time versus signal power, where power 4605 represents a background noise floor and power 4610 represents an observed power increase owing to a CW jammer beginning to transmit a CW signal. Because the CW jammer may modulate the signal by frequency hopping, or "keying" for "mark" symbols or "not keying" for "space" symbols, signals received from these CW jammers may appear to turn-on and turn-off. However, a marked increase in signal power will also occur whenever a transmitter of interest initially begins transmitting as shown by the power 4620 in FIG. 46, resulting in a non-correlated signal. Another increase in signal power occurs when the receiver has achieved spreading code coherency with the transmitter, resulting in a correlated signal power 4625, the increase being due to the process gain provided by the spreading code. It is this third increase in signal power that is of interest for identifying a trip event, however a legitimate trip event may occur with no appreciable increase in received signal power 4635. Thus, simply observing raw power levels, which is the technique employed by existing systems, will result in numerous false trips or missed trips.

In the present multi-channel embodiment, trip event decisions are made after the signals have been despread and after the signal has been separated into various frequency bins, where a highest performance is obtained by using 11 overlapping frequency bins (channels). The aforementioned signal types will have unique power distribution characteristics (e.g., signal "signatures") as cumulatively viewed in the frequency bins. FIGS. 47–50 depict the power levels of these signals distributed throughout the bins. FIG. 47 represents random noise and in FIGS. 48–50, a center frequency of a received signal is depicted as being coincident with the center frequency 4805, 4905, 5005 (i.e., in bin 5) of the channel filters in the respective figures. In FIGS. 48 and 49, the signals have similar characteristics, even though FIG. 48 depicts an undesired CW jammer while FIG. 49 depicts a desired signal at an uncorrelated relative code phase. The power level of the frequency bins 4805, 4905 is lower than the power level in the surrounding bins due to code carrier suppression. FIG. 50 illustrates the power distribution in the respective bins when the correlated spread spectrum signal is present. Frequency bin 5 (5005) holds the center frequency of the transmitted signal as depicted by the maximum signal level. Because the frequency bins overlap, some of the energy present in bin 5 will also be in bins 4 (5004) and 6 (5006), but powers in the remaining bins begins to drop off sharply after that, as set by the attenuation provided by each channel filter (i.e., because much, or all, of the signal energy falls outside of the filter passband).

Steps in the false trip avoidance process are explained with reference to FIG. 51 where the method begins in step 5105, where the power level is measured in each channel filter The process proceeds to step 5110 where the frequency bin with the maximum signal strength is determined and designated as max1. Subsequently, step 5120 ignores the frequency bins that are adjacent to max1 providing for channel overlap. Step 5120 calculates the average value of the signal strength values in the remaining frequency bins and designate this value as avg. A decision is performed in step 5125 wherein if max1 is greater than avg by a predetermined threshold, process control is passed to step 5140, where the fine search process is initiated. If block 5125 determines that max1 is not greater than avg by a predetermined threshold, process control is passed to step 5150, where the coarse search process is continued.

FIG. 51 also illustrates an alternative method where the method begins in step 5105, where the power level is measured in each channel filter. The process proceeds to step 5110 where the frequency bin with the maximum signal strength is determined and designated as max1. Subsequently, step 5130 ignores the frequency bins that are adjacent to max1 providing for channel overlap. Out of the remaining frequency bins, step 5130 will then locate the bin with the maximum signal strength and designate that frequency bin as max2. A decision is performed in process 5135 wherein if max1 is greater than max2 by a predetermined threshold, process control is passed to step 5140, where the fine search process is initiated. If block 5125 determines that max1 is not greater than max2 by a predetermined threshold, process control is passed to step 5150, where the coarse search process is continued.

FIG. 51 also illustrates another process that uses the approach discussed earlier for the 1-bit ADC for the single channel embodiment. In particular, the process begins in step 5105, as previously discussed, and proceeds to step 5110, as previously discussed. If the 1-bit ADC process is employed, the process flows to step 5141, where a stored predetermined a threshold is retrieved from memory and, in step 5145 is compared with max1 obtained in step 5110. If the response to the inquiry in step 5145 is affirmative, the process proceeds to step 5140, where the fine search process is initiated. However, if the response to the inquiry in step 5145 is negative, the process proceeds to step 5150, where the coarse search process continues by returning to step 5105.

Enhancing Coarse Search

Averaging similarly improves signal acquisition performance in the present multi-channel receiver embodiment, as was the case for the single channel receiver embodiment. However, in the multi-channel receiver, where the final decision bandwidth equals the signal bandwidth and multiple channels are spaced apart so as to span the frequency uncertainty range, the averaging process is a different in several respects. For example, instead of the correlation data being represented as vectors, for each sampled code period, the correlation data exists in another dimension as well, so as to be arranged in a plane of information, each data point being described by three axes coordinates: frequency channel, code phase and power. FIG. 52 depicts a sample data set from one code period (i.e., no averaging), while FIG. 53 shows the collection of several data sets, appropriately averaged. A most noticeable result of averaging is a suppression of background noise, as is evident from a comparison of noise floors 5220 and 5320 in FIGS. 52 and 53, respectively.

As discussed with respect to the single channel embodiment, averaging may be performed as a box-car or FIR structure where the last N symbols are averaged. Alternatively, averaging may be performed in an exponential or IIR averaging process where the previous results are decayed and added to a fraction of a present sample.

FIGS. 52 and 53 depict the desired signal correlation peak at points 5210 and 5310, respectively, in a plane of frequency channel versus correlation code phase. The preferred multi-channel receiver embodiment employs 11 frequency channels and 63 code chips, although the number of channels and chips may be varied in accordance with the discussion of trade-offs as presented herein.

FIG. 54 is a histogram of power versus occurrences that illustrates a reduction in false alarm rate achieved by averaging 6 samples in the multi-channel receiver embodiment. Curves 5410 and 5420 show the power distribution of a 20 kHz noise bandwidth with and without averaging respectively. Curves 5430 and 5440 show the power distribution of a −110 dBm signal in 20 kHz noise bandwidth with and without averaging respectively. The mean power for the noise and signal plus noise distributions remain unchanged, yet the deviations are reduced creating a greater distance between the minimum "On" and the maximum "Off". Consequently, extending the distance between the minimum "On" and the maximum "Off" corresponds directly with decreasing the probability of reporting a false trip condition.

Frequency domain averaging is identical to the multi-channel case depicted in FIG. 45, where the result of the fast frequency coarse search is a plane of power versus frequency and code phase. This process, however, uses different mathematical operations to achieve the same result, yet the result may be averaged as in the channelized time domain coarse search to achieve better SNR. Applying the method for reducing false trips for impulsive interference following averaging provides the maximum sensitivity achievable, under the presently described circumstances.

Automatic Gain Control (AGC)

As previously discussed, AGC is used to adjust a signal level of a received signal to fall within an instantaneous dynamic range of the ADC. At times this is a challenge, because the receiver may be exposed to signals of varying strengths. For example, a receiver placed within a few feet of a transmitter will be exposed to a very strong signal level, but a receiver located far from the transmitter will be exposed to a very weak signal level. AGC allows the received signal, in either case, to be adjusted to within a predetermined range, prior to being applied to the ADC. One factor considered in the AGC mechanism, is a level of a received noise floor and thus the AGC mechanism monitors the received noise floor, attempting to keep it within an operable range of the ADC. However, as the noise floor rises, there is a risk that the AGC mechanism will not act to lower the signal level applied to the ADC and will result in clipping an intended signal, as a result of inadequate "headroom", which has profound adverse affects on signal correlation and reception. Accordingly, if the AGC mechanism detects that the noise level has risen too much, the AGC mechanism will act to attenuate the received signal (and noise) to a lower level, ensuring that the received signal will remain within the ADC's dynamic range.

The AGC process is implemented in software and is executed once per code period while the search process is attempting to correlate. If an attenuation change is deemed necessary by the AGC process determining that the sample values are above a predetermined threshold, for example, the search process is interrupted while AGC adjusts the receiver gain, over several code periods, which in turn adjusts the corresponding signal strength of the received signal. Decisions made by the AGC process are based on the measured noise floor (where the measurement may be made with a discrete level detector or by digital analysis on the received sample stream) and serves to keep the noise floor within the operable region of the ADC. The AGC process may be augmented with time constant mechanisms to offset the effect of impulsive interference, and averaging mechanisms that combine several sample sets so as to avoid involving an AGC adjustment if short-term perturbations in the noise floor are observed. Similarly, the AGC process may be adapted to operate off of the strongest received signal, so as to avoid driving the ADC outside of the ADC's dynamic range by the strong signal, whether the strong signal is the intended signal or not.

Attenuation of the received signal is set with two controls, implemented in hardware, although other software or firmware driven control may be used as well. The signal level may be adjusted (preferably attenuated) in the attenuator 3502 by a maximum of 75 dB using a step and digital attenuator that operates under the control of the AGC signal (as shown in FIG. 35). A 4-bit digital attenuator located in the attenuator 3502 is positioned prior to the ADC and provides attenuation in 3 dB steps up to a maximum of 45 dB attenuation. A coarse 30 dB step attenuator may optionally be applied in front of the first RF amplifier, thus protecting the mixer from very strong signals and related intermodulation products created by excessively strong signals being applied to the mixer.

A related problem caused by excessively strong signals is that the signals may result in the digital signal processing operations performed on the signals to enter an overflow state. For example, the digital signal processor used to compute the correlation sum on the received signal also implements the decimation process concurrently therewith. In an implementation of the multi-channel receiver a digital signal processor that computes this correlation sum has the undesirable attribute of failing to retain an indication of intermediate overflow. This means that in the decimation process, should an accumulator in the digital signal processor overflow at some intermediate point, there may be no report of the overflow condition after the decimation process is complete. Even though a digital signal processor may retain an overflow condition immediately following a mathematical instruction, the digital signal processor may reset the overflow flag on the next mathematical instruction. A similar problem exists if the decimation process were fabricated using discrete components such as adders and accumulators.

It is possible to prevent overflow from ever occurring provided the accumulator has enough resolution for all worst case summations, but digital signal processors with such attributes are relatively expensive and otherwise not suitable for use in low-end applications. An alternative method scales the signal or coefficients used in the digital signal processing operation such that an overflow will never occur in a given number of accumulator bits. However, both techniques require the hardware to be more complex than minimally necessary as extending the accumulator adds hardware expense and complexity and attenuating the signal loses fidelity and resolution in signal quantization.

Accordingly, the overflow concern is easily avoidable by using modem digital signal processors having sufficient processing capability, overflow indication mechanisms, and/ or large accumulators. However, because it is preferred to minimize cost by using a low-end processor in the present receiver, identifying the source of the problem and solution to the problem requires innovative processes and mechanisms. The present multi-channel receiver uses a small accumulator while managing the possibility of overflow by integrating signal scaling into the AGC process. To more completely understand the problem identified by the inventors and the solution therefor, a discussion on the failure mechanism and how it impacts data integrity is presented below.

Provided that an overflow condition may occur for strong signals at a given AGC setting, the receiver's processes and mechanisms must be able to detect the presence of strong or weak signals and act accordingly, making adjustments in the attenuator 3502 (FIG. 32) to keep the signal in the desired received power band. Weak signals do not create a problem, because the signal power drops monotonically with signal attenuation, and a low threshold near the minimum correlation limit triggers a signal drop event.

A problem arises when the signal is greater than that which can be supported in the resolution of a signal data word (e.g., 16-bit word) because the end decimation result becomes non-monotonic due to clipping of the signal (by inadequately representing the full size of the signal power in a given data word). So as to prevent the signal from being clipped, the present multi-channel receiver uses a threshold set near the maximum correlation limit of the accumulator so as to create a value driven overflow condition. The threshold is effective in determining a need for AGC (e.g., provides a warning signal), yet the value reported is not used because it becomes non-monotonic.

The AGC process addresses this unreliable reporting of an overflow condition by searching backward, keeping a range of untrustworthy samples (i.e., perhaps tainted by an unreported overflow condition) shadowed in previous evaluation ranges where the power can be trusted. As will be explained, the range of ambiguity can be eliminated by asserting first maximum attenuation and then subsequently stepping through progressively less attenuation.

When first initiated, the AGC process starts by asserting maximum attenuation (so as to produce a minimum signal level applied to the ADC) and then progressively lowering the amount of attenuation in roughly 9 dB steps (or other suitable step sizes), through 7 coarse acquisition steps. By first applying maximum attenuation, there is no ambiguity regarding whether the data samples have been caused an overflow condition during the decimation process. When the noise level detected in one of these steps is near optimal (i.e., at a preferred level within the ADC's instantaneous dynamic range), the AGC process causes a fine attenuation step to be executed so as to place the received noise floor within 3 dB of the desired level. Subsequently, the AGC process terminates and the normal correlation (search function) resumes.

The AGC process as implemented in the present embodiment accounts for a three-code period delay set by pipeline processing. Thus, when the AGC process causes an AGC attenuation change, the next two code periods are already being processed. The third code period, following a setting operation, will hold data that reflects the change. For this reason, the AGC acquisition process is heavily pipelined to minimize waiting for data. FIGS. 55 through 65 depict the state process implemented in the AGC process and mechanism. The following description details the steps used in the most sensitive exemplary embodiment of the multi-channel receiver.

The AGC process flow shown in FIG. 55 begins in step 5501 and then to step 5502 where a Boolean flag is maintained. An inquiry is made so the AGC process recalls, between program calls, whether the AGC process is currently acquiring a signal. If the response to the inquiry is affirmative, the process proceeds to step 5506 so as to determine where the AGC process is in the acquisition cycle. If AGC is not acquiring, the process continues by computing a time averaged noise floor in step 5503 using the last 8 code periods for smoothing the instantaneous noise. A counter (code interval timer) is decremented and tested in steps 5504 and 5505 so as to add hysterisis to the AGC process. If the counter has expired, the AGC algorithm is enabled to begin an acquisition if necessary by proceeding to step 5507 where the instantaneous noise floor is monitored so as to determine if there exists enough headroom in the ADC and decimation process to support a correlation operation. If the noise level is too high, and there exists more attenuation as inquired in step 5508 for use, the process proceeds to step 5506 so as to initiate the acquisition process. However, if the instantaneous noise value requires attenuation but there is not any additional attenuation available, the process proceeds to step 5511, where the process aborts. If the instantaneous noise level is not too high, the process continues at 5509 where the time averaged noise floor is evaluated as being too low. If the time averaged noise floor is too low, and attenuation can be removed from the current setting 5510, an acquisition is necessary, so the process proceeds to step 5506 to properly set the lower attenuation level. If the time averaged noise level is too low, but no further attenuation can be removed, the algorithm aborts in step 5511.

FIG. 56 is a flowchart of a decision tree for determining where the AGC algorithm is in the AGC acquisition cycle. Step 5601 continues from step 5506 as shown on FIG. 35. After step 5601 the process proceeds to step 5602 where an inquiry is made regarding the AGC processing state, which is determined by checking a state variable. Depending on the value of the state variable, the process continues to respective of steps 5603 through 5613, as will be explained below with respect to FIGS. 57–61.

FIG. 57 is a flowchart of four of the decision tree branches depicted in the flowchart of FIG. 56. Step 5701 is the continuation of step 5603; Step 5704 is the continuation of step 5604. Step 5711 is the continuation of step 5605. Step 5714 is the continuation of step 5606. When the acquisition process begins in step 5701, the maximum attenuation (minimum sensitivity) is applied in step 5702. Subsequently, the state variable is advanced to step 5703 and the AGC process terminates in step 5710 and waits for a new code period of data. However, on the next code interval, the process flow resumes to step 5704 where a recheck of the previous decision to perform AGC is performed in step 5705. If the test of the instantaneous noise floor results in a decision not to need AGC, the noise value has crept up to the decision threshold and only a small adjustment is needed. Thus, to determine the magnitude of the adjustment, the last two noise samples are averaged in step 5706 and a small adjustment is made step 5707. If in step 5705 the test for AGC shows the receiver remains saturated, the attenuation is set at maximum in step 5708, the state is advanced in step 5709 and the process waits for a new code interval of data in step 5710.

On the next code interval, the process flow resumes through step 5711 and then to step 5712 where attenuation is lowered prior to beginning the search process. As previously discussed, this attenuation setting will not be available for next 3 code intervals due to the pipelining of the DSP process, so the state variable is advanced in step 5713 and the process waits for a new code interval of data in step 5717.

On the next code interval, the process flow resumes through step 5714 and then in step 5715, attenuation is lowered to continue the search process. Subsequently, the state variable is advanced in step 5716 and the process waits for a new code interval of data in step 5717.

FIGS. 58, 59 and 60 are flowcharts of six of the decision tree branches depicted in FIG. 56. Step 5801 is the continuation of step 5607. Step 5810 is the continuation of step 5608. Step 5901 is the continuation of step 5609. Step 5910 is the continuation of step 5610. Step 6001 is the continuation of step 5611. Step 6010 is the continuation of step 5612. The processes depicted in FIGS. 58, 59 and 60 demonstrate the evaluation of the attenuation levels set 3 code intervals previous (due to pipeline delay).

In reference to FIG. 58, the first evaluation step 5801 the instantaneous noise level is evaluated in step 5802. If the noise level is too high, the optimum point has already been passed, and thus a blind 9 dB is added in step 5806 before the AGC process terminates in step 5807, instructing the calling module that it has completed acquisition. However, if the noise level as determined in step 5802 is not too high, the noise level is tested for being too low in step 5803 indicating the attenuation is still to great. Subsequently, the next attenuation step is applied in step 5804, the state is advanced in step 5805 and the process is suspended in step 5809, waiting for the next code interval of data. If the test performed in step 5803 indicates the noise value is between the low and high thresholds, the search only needs a fine step and the process flow resumes at step 5808.

On the subsequent code intervals the evaluation steps 5810, 5901, 5910, 6001, 6010 evaluate the instantaneous noise level 5811, 5902, 5911, 6002, 6011, respectively. If the noise level is too high, the optimum point has already been passed, and a blind 9 dB is added in steps 5815, 5906, 5915, 6006, 6015 respectively before the AGC process terminates in steps 5816, 5907, 5916, 6007, 6016 respectively, instructing the calling module that it has completed acquisition. If the noise level of steps 5811, 5902, 5911, 6002, 6011 is not too high, the noise level is tested for being too low in steps 5812, 5903, 5912, 6003, 6012 indicating the attenuation is still to great. The next attenuation step is applied in steps 5813, 5904, 5913, 6004, 6013; the state is advanced in steps 5814, 5905, 5914, 6005, 6014; and the routine suspends in steps 5818, 5909, 5918, 6009, 6018 and waits for the next code interval of data. If the test of steps 5812, 5903, 5912, 6003, 6012 indicates the noise value is between the low and high thresholds, the search only needs a fine step and algorithmic flow resumes at steps 5817, 5908, 5917, 6008, 6017.

FIG. 61 is a flowchart of the last evaluation step and the small step algorithm process flow. The last attenuation step is evaluated if the search thus far has not found a solution. Step 6101 is the continuation of step 5613 depicted in FIG. 56. Step 6109 is the continuation of steps 5707, 5808, 5817, 5908, 5917, 6008, 6017 or 6108. The attenuation is set to a minimum three bit code intervals previous, so the current data represents the maximum sensitivity setting. The noise level is tested in step 6102 and if the noise level is too high, the optimum point has already been passed, and a blind 9 dB is added in step 6106. The algorithm suspends operation in step 6107, instructing the calling module that the AGC process is finished. If the noise value measured in step 6102 is not too high, it is evaluated as being too low step 6103. If too low, there are no further steps to minimize attenuation so the attenuation is set to a minimum in step 6104, the state variable is set to indicate the AGC is not acquiring in step 6105 and the process suspends operation in step 6107, instructing the calling module that the AGC process is finished. However, if the noise power is between the upper and lower thresholds, a small adjustment is needed and the process continues through 6108 to 6109. Once one of the evaluation steps determines the measured noise value to be between upper and lower thresholds, the process proceeds to step 6109 and subsequently to step 6110 where the measured instantaneous noise power is subtracted from the desired power and the difference is used to adjust the current attenuation setting to optimum. Then, in step 6111, an inquiry is made to determine if the result is different from the passed attenuation value. If the small adjustment test determines the attenuation setting should be changed, the attenuation is adjusted in step 6112 and the process terminates in step 6113, instructing the calling module that the AGC process is finished.

Reception of Data Transmission with Fast Frequency Drift

Multi-channel receiver systems enjoy excellent sensitivity, as compared with receiver systems that use detection bandwidths that are appreciatively wider than the data bandwidth. Ideal systems exactly match the channel bandwidth to the data bandwidths, because SNR (and hence communication quality) is maximized when the received, despread signal exactly matches in frequency one of the channels in the channelized receiver and the receiver detects and monitors the signal from the single channel of coincidence.

Problems exists when the ideal channelized system attempts to demodulate a signal from a specific channel and the transmitter fails to maintain frequency fidelity during data transmission. Factors leading to the frequency error include the transmitter frequency pulling, or receiver local frequency reference pulling, each of which may occur if the respective frequency reference is in some way subjected to environmental changes, such as supply power variation. All contribute to short term, intra-message frequency instability which degrade the ability of a channelized receiver to optimally demodulate a signal, because the received signal "drifts" between adjacent channels.

The conventional approach has been to avoid drift problems altogether by ensuring the transmitter and receiver reference components not experience frequency drift, primarily by using crystal controlled or direct digital synthesis frequency references. Cost efficient transmitters often have frequency references which are sensitive to changes in power supply voltage or electromechanical interference, even self interference. This is especially true for OOK transmitters which often enable and disable amplification stages to modulate data which can effect local frequency references such as voltage controlled oscillators. In other words, the combination of an OOK transmitters with an inaccurate frequency references causes particular challenges for a low-cost receiver that has available only minimal processing capacity.

In contrast to conventional practice, the present invention employs cost efficient components and combines them so as to be used in systems having transmitters that transmit messages with, perhaps, significant frequency drift and offset. Conventional practice accommodates the sizable transmitter frequency drift by quantifying the total frequency error budget, for all of the relevant system components, and expanding the channel bandwidths in the receiver to exactly match the worst case frequency drift. The wider receiver bandwidth de-sensitizes the receiver because the increased channel bandwidth degrades SNR (and hence performance) by the increase of noise bandwidth.

At the expense of increased computational complexity, the present multi-channel receiver embodiment uses several channels, each matching the data bandwidth, so as to track frequency drift throughout a message. FIG. 62 depicts a bank of channel filters where a specific filter matched to the data bandwidth has shape 6200. A signal exactly aligned in channel 6203 transmitting a "1" would have a measured mean power denoted as 6201 in FIG. 62. Because the channel filters have independent roll-off characteristics, a signal adjacent to the desired channel will be attenuated according to the shape of the filter 6200. As such, there exists a between-channel loss (i.e., because the signal falls in between to channels) denoted by point 6202, signifying a worst case system sensitivity for signals which have no frequency drift. A signal exactly centered between two channel filters would be measured in either filter with a mean power as denoted at 6202. For this reason, it is most beneficial to overlap the channel filters to limit the between channel loss. The system loss budget can then be specified using this worst case estimation.

The above description remains valid as long as the transmitters do not exhibit frequency drift during transmission of a message. But, if the transmitters do exhibit frequency drift beyond the between-channel frequency, the signal will continue to roll off, until the drift becomes so pronounced the signal is ultimately completely rejected by the selected channel filter.

In FIG. 62, the Curve 6204 depicts the ideal signal 6203 which has been pulled off frequency beyond the between-channel point 6202 to a high attenuation point 6205. Under these conditions, if the receiver was demodulating, the signal from the initial channel 6200 would progressively drop power, during bit interval, because the drift would cause signal to move away from the center of the channel and toward an edge of the channel. If the transmitter drift was constrained between the frequency excursions shown as curves 6203 and 6204, the signal power will fluctuate between points 6201 and 6206 (heavy line 6206).

The present multi-channel receiver uses several channel filters to track frequency fluctuations during data demodulation. The total frequency excursion must be quantified for the transmitters in question and system application. The technique is most feasible for correcting small scale frequency drift on the order of the data bandwidth. Wide scale frequency drift could be corrected in the transmitter.

As long as the frequency drift is relatively small, overlapping only a few channels in the system at worst, and provided the steady state condition can be measured, the frequency drift loss can be recovered using the adjacent channels and a process described below. The steady state condition is defined as the resting frequency of the transmitter. Typically frequency drift is caused by changes in the transmitter power structures, most typically caused by keying an OOK transmitter. As such, it is common for the frequency to have error coincident with a change in amplitude key state. The steady state condition is therefore measured when there is a run of same state values while the transmitter is keyed, perhaps in a preamble or initiation sequence of the signal data structure.

In the graph of FIG. 63, the lines 6301 represent the respective powers measured in a single channel filter over a sequence of bit intervals. Variation between the heights of the lines indicates that there is a time variable power variation. Explaining the power variation in the depicted example, the transmitter exhibits signal loss during a 0 to 1 transition state shown as line 6303. After a period of time while transmitting a series of 1s, the power is recovered by the bit interval corresponding with the line 6304. This recovery coincides with the transmitter drift correction over time. The loss in power when the sequence of 1s is transmitted effects the bit error rate, and may influence the decision threshold mechanism to call the bit a "0" (i.e., a bit error) in cases where there is low SNR, i.e., where the noise floor 6302 approaches the 1s level (6303).

A method for using alternate channels to overcome the frequency drift is explained with respect to FIG. 64. Assuming the drift direction and relative magnitude may be determined, where the direction may be bidirectional or uni-directional depending on the design and nature of failure in the transmitter, the trip determination step 6400 may be any of the processes discussed herein or any other determination of signal activity. Following a trip event, the primary channel determination is determined in step 6401 where the primary channel is determined as the channel which most closely aligns with the steady state power of the transmitter, while the transmitter is transmitting a preamble portion of the signal. The primary channel is the channel with the largest measured mean power during a run of 1s in the preamble of the transmitted message. Subsequently, the process proceeds to step 6402 when an initial primary OOK decision threshold for determining a 1 or a 0 is set. This may be static based on the measured amplitude of a 1, a zero or combination thereof or it may be dynamic and change to track with the message as received. An alternate channel threshold is then set in step 6403 so as to track with the primary channel threshold. The value of this alternate channel threshold must be equal to or greater than the primary channel threshold as explained below to keep from adversely affecting the bit error rate of the receiver.

Data demodulation commences following initialization, and at each new bit interval collected in step 6404, the received signal power is measured in each of the candidate channels in step 6405 where the signal may deviate. The power in the primary channel is compared to the primary OOK decision threshold in step 6406. If the power exceeds the threshold, a 1s determination is made in step 6408 and the next bit is processed. If the power is below the primary OOK decision threshold, the alternate channels are evaluated in step 6407 using the alternate decision threshold. If any of the alternate channels exceed the alternate decision threshold, a 1s decision is made in step 6408 and the next bit is processed. If none of the alternate channels exceed the alternate decision threshold, a 0's determination is made in step 6409 and the next bit is processed.

The difference between the primary and alternate channel decision threshold effects the bit error rate (BER). The alternate decision threshold must be at least equal to the primary decision threshold and preferably larger so as to minimally impact the receiver BER. FIG. 65 depicts noise versus signal plus noise graphs, where it is seen that a 1/0 decision threshold 6503 may be set such that the BER contribution from the primary channel zero determination equals the percentage of noise to the right of the decision threshold 6505. If the same decision threshold were used for each of the alternative channels, then the system BER would be increased to include the total of all the percentages to the right of each decision threshold for zeros determination. This is true due the fact that noise is generally uniform in distribution (for spread signals), and each channel filter will have a noise distribution as depicted by 6500. The likelihood that noise power in each channel exceeds any arbitrary value within the distribution is identical. This distorts the combined channel noise distribution adversely weighing it toward the signal plus noise distribution and increasing BER.

A second threshold is used for the alternate channels which is set such that the combined zeros determination BER contribution for the alternate channels is small relative to the primary zeros BER. The overall system BER is not adversely affected and the benefit of using the alternate channels is achieved. Exact placement for decision thresholds and separation for primary and alternate decision thresholds is determined based on system requirements for signal detection and data integrity.

Predictive Code Reposition

Once a receiver has achieved coarse and fine search, the time references, e.g., crystals in the transmitter and receiver will drift (relative to each other) over time, particularly if low-cost components are used. If the drift is too large, the receiver will begin to lose process gain, and gets progressively worse for longer messages. U.S. Pat. No. 5,457,713 (Sanderford, et. al) discusses a method to maintain spreading code coherency between a transmitter and receiver for long messages. At predetermined points in a message, the transmitter will transmit an expected symbol. The receiver uses this symbol to perform an additional fine search process to re-align the receiver spreading code. This method maintains code coherency at the expense of added overhead in the transmitted message.

The present receiver embodiments use the results of the initial search process to predict the rate of time base drift. This method requires that the transmitter use one time base to control the RF frequency as well as to generate the code chip rate. Conversely, the receiver must use one time base to generate the downconversion tones as well as generate its code chip rate. This method also requires that the receiver be able to quantify the frequency error so that the spreading code phase drift can be predicted. In the multi-channel receiver embodiment, one of the eleven channels will be selected as the candidate filter by the coarse search process. The receiver then uses the channel index (e.g., channel number) relative to 0 frequency error to predict the time base drift as follows:

FIG. 39 shows the spacing and center frequencies of the frequency channels (as has previously been discussed). If the transmission frequency is 915 MHZ and the frequency channel at 37.4 kHz is chosen as the candidate filter, this means that the crystal drift between transmitter and receiver is:

37 kHz/915 MHZ=40.4 ppm error.

This ppm error also affects the spreading code chip rate. For example, over a period of 100 bit times, the error associated with this crystal drift is 100 bits×63 chips/bit×40.4 ppm=0.25 chip error, which results in a 2.5 dB loss of signal correlation. If the system specification requires that the receiver stay within a certain code phase distance of the transmitter throughout the duration of the message, the receiver must periodically adjust its spreading code phase, under the present conditions. The frequency at which this adjustment is made is driven by the resolution of the spreading code generator, the ppm of the transmitted signal, and the system requirements. The present embodiment acquires 5 data samples per code chip, and executes 3 instructions per sample interval. By optionally inserting an additional instruction, the computer is able to achieve a despreading code adjustment resolution of $1/15^{th}$ of a chip.

This technique, while helping to maintain spreading code coherency, has a limitation in that each channel filter is 20 kHz wide, and thus the error of the predictive value is given by:

20 kHz/915 MHZ=21.8 ppm which means that over time, this predictive repositioning technique will not necessarily adequately correct spreading code alignment error. Techniques such as frequency and/or phase discrimination provide frequency resolution that is even narrower that the 20 kHz channel filter, and the optional use of these techniques will reduce the error of the prediction reposition process. Depending on system requirements, the predictive reposition method may be sufficient to maintain code coherence over a message duration without the use of the standard reposition method.

The effects of reposition are explained in FIGS. 66A, 66B, and 66C wherein points 6610, 6620, and 6630 represent the signal level after the coarse and fine search algorithms have been performed. After the duration of the message 6611, the signal strength of the message will have decreased to points 6615, 6625, and 6635 due to crystal drift. Item 6613 shows the signal strength of an ideal message with no loss of process gain. Items 6626 and 6636 show the signal recovery provided by the use of the standard reposition method. The repetition rate 6624 of the standard reposition algorithm is predetermined by the positioning of the reposition symbols within the transmitted message.

The feature 6627 shows a signal recovery provided by the predictive reposition method. An amount of signal recovery 6628 is determined by the system's ability to discern the frequency error of the received RF signal. The repetition rate 6634 of the predictive reposition method is set by the worst-case system loss requirement and the amount of signal recovery 6628 that can be achieved.

Alternatively, the two reposition methods can be used together to provide enhanced performance. Feature 6638 shows the combination of the two methods as providing better results (signal levels) than either method working alone.

Elimination of Redundant Data in a Multi-Drop Network

In some RF installations, physical obstacles will cause the performance of the system to degrade due to fading. In reference to FIG. 67, a network with multiple transmitters 6710 through 6715 and multiple receivers 6720 through 6724 are installed in various locations and each of which may be required to assure adequate coverage. In many installations it is desirable to connect all of the receivers to a common processor 6740 with some type of shared medium 6730, such as a multi-drop bus, such as an RS-485 bus, a local area network, USB, FireWire, etc. Once having received a message, the respective receivers would then relay data to the processor 6740 in some pre-determined fashion. Poll-response, Ethernet, and token-ring protocols are just three of many methods that would serve this purpose, and would be used whenever some type of data collection and/or processing is to be performed at a central location (such as security alarm applications, tracking systems, etc.).

As shown in FIG. 67, multiple receivers R2, R3, and R4 (which may be transceivers) may, or may not, receive the same transmitted message 6717 from transmitter T4. Each of these receivers would then attempt to forward the message to the application processor 6740. Present network systems allow the bus peripherals (the receivers) to forward all messages to the common processor 6740, forcing the processor 6740 to detect and eliminate redundant messages. However, this technique increases bus traffic and forces the processor to perform extra processing to detect and eliminate redundant data messages. The present invention eliminates this extra bus traffic by requiring that the receivers monitor the bus 6730 for redundant data messages.

Whenever a data message is received, the receiver will store the message in a queue until it is time for that receiver to relay the messages to the common processor 6740. Since the receiver is attached to a multi-drop network, the receiver is able to monitor all messages transmitted on the bus 6730. Whenever a receiver is not transmitting data to the common processor 6740, that receiver will monitor the bus 6730, reading all data messages transferred to the processor 6740. Each data message will have some type of unique identification such as a property code, system code, transmitter ID tag, Cyclical Redundancy Check (CRC), CDMA channel, or the like. The waiting receiver will compare each data message on the bus with the messages stored in its local message queue. Whenever the waiting receiver detects that another receiver is transmitting a message to the processor 6740 that is identical to a message in its local queue, that waiting receiver will delete the message from its local queue. Each waiting receiver will attempt to eliminate as many messages from its local queue prior to relaying the messages to the common processor, thereby reducing bus traffic and reducing the processing requirements of the common processor.

FIG. 67 shows that transceivers and/or receivers on the same hard-wired interface communicate with all remote transmitters and transceivers within a defined proximity. Further, the present network embodiment uses the same CDMA and system property code for all devices associated with a particular hard-wired line. This method allows redundancy and the ability of the system to eliminate redundant messages.

Battery Operation

Another embodiment of the present invention is a very small, battery operated transceiver that incorporates combinations of features of the single-channel and multi-channel transceiver embodiments. An advantage of being small and low cost is that the transceiver can be installed in places and in quantities that are not possible or practical for larger devices. For example, an attribute of being small is that the transceiver may operate for long periods of time off of battery power, and thus may be used in remote locations where commercial power service (e.g., electrical wall outlets) are not available (e.g., on top of flagpoles, buildings, and mobile platforms, such as cars, airplanes, etc.) Such applications might include two-way smoke detection, strobe light and/or sounder control, two-way keypad, two-way thermostate, remote auto-dialer, remote sensor/controller, two-way remote meter reading/power cut-off, and process control/energy management.

Using a battery operated remote transceiver (BORT) creates problems with feasibility of use and battery life. Conserving battery life is a challenge for battery operated transceivers that may be located in accessible locations where it is difficult to replace the batteries. Conventional transmitters conserve power by operating in sleep modes where the transmitter alternately sleeps, wakes up, transmits, and then returns to sleep. These transmitters are not restricted to transmit on any particular schedule and thus do not care when they transmit, because these transmitters assume that a receiver is continuously available (powered on).

So as to maximize battery life in the BORT, the BORT will go into alternate sleep and active cycles, which in turn creates an additional difficulty when the BORT is used in a network setting. As will be discussed, to maintain network coherency, the transceivers must be active during predetermined windows of time (i.e., scheduled events). Otherwise, one device in the network may transmit while the would-be receive devices are in sleep mode, resulting in lost data messages. To maintain this network coherency, a 'system' transceiver (or alternatively, multiple system transceivers) will be active all of the time and will be powered by a continuous external power supply and will periodically generate a network synchronization message. The maximum period between these synchronization message transmissions is adjustable, but is set according to the frequency drifts of the system transceiver and the respective BORT devices. During normal operation a BORT device will communicate with a single system transceiver. Over successive communication periods, the BORT device can narrow the frequency ambiguity between itself and its assigned system transceiver. This technique will allow the BORT device to increase its receiver sensitivity and increase its process gain (and provide additional isolation from transmitters).

For efficient power consumption, each BORT device turns off its RF front-end (905 in FIG. 9) and signal processing sections (907, 909, 911, 913, 915, 917, and 919, in FIG. 9) when not in use. Upon a wake-up event and once a full power-up condition is completed, the BORT device will pause until the analog components in the RF section have had time to settle. The BORT device then samples only enough data to make network synchronization and trip decisions, and then disables power to the RF front-end 905. If the trip threshold decision is made, the BORT device will re-apply power to the RF front-end 905, use the data to determine code phase coherency, and then re-acquire the data signal. This acquisition process uses a fast search process as previously described, but if no signal is detected, the BORT device must reacquire system timing, which it does by remaining active and continuing to acquire data samples until a network synchronization pulse is detected. Alternatively, the BORT device can query the system transceiver, by transmitting a query message, requesting network timing information.

FIG. 68 depicts a BORT application where several system transceivers 6811–6813 maintain communication with a plurality of BORT devices 6801–6803. A system controller 6820 maintains supervision of the system transceivers via multi-drop bus 6825, such as an RS-485 bus or the like.

The transceivers 6811–6813 and BORT devices 6801–6803 have access to 6 code-division multiple access (CDMA) channels, based on 6 unique PN sequences. The network uses CDMA channel 1 for ALOHA-type transmissions 6832, 6833, and the system transceivers use CDMA channel 2 to broadcast system synchronization messages 6830. A phase of the PN sequence will be random throughout the system transceivers, so as to allow all transceivers to broadcast the synchronization message simultaneously. This method allows fast signal acquisition without undue destructive self-interference due to the fact that the correlation function is only one chip wide. The respective BORT devices 6801–6803 will then acquire the transmitted signals that, in all likelihood, are the first to produce a Trip event. CDMA channels 2 and/or 3 are used by the system transceivers 6811–6813 to broadcast commands 6831 to the BORT devices 6801–6803.

FIGS. 69A–B depict the signal timing of the BORT network. The system transceivers 6811–6813 (FIG. 68) issue synchronization messages 6901, 6902 every 5 seconds. Due to a 100 parts per million (ppm) inaccuracy of the crystals and a 7.8 ms inaccuracy of the sleep timer circuit on the BORT device, the synchronization (sync) message must be at least 8.3 ms long. Alternatively, a sleep timer circuit with no inaccuracy allows this value to be reduced to 500 μs to cover only the timing ambiguity of the crystal drift, less if the drift is tracked using a delay-lock loop (DLL).

Within this synchronization window, the BORT device will power up at a time 6910 (FIG. 69B) from a low-power sleep mode. After device initialization, the BORT device will sample one code period of data at time 6911 and then go off-line at time 6912. After performing the fast search and fine search algorithms, the BORT device will reacquire the signal at time 6914 and wait until the end of the synchronization signal 6916. The BORT device will measure and store the duration of the received synchronization signal. By keeping a running log of the signal duration, the BORT can determine if its wake-up timer is moving relative to the system synchronization timing. If so, the BORT device can then make corrections to its wake-up timer so as to better maintain system coherency.

The system transceivers 6811–6813 have multiple options after the completion of the sync message at time 6916. If no commands need to be transmitted to the BORT devices 6801–6803, the transceivers 6811–6813 will key-off their transmitters (i.e., stop transmitting). If commands need to be transmitted to the BORT devices 6801–6803, the system transceivers 6811–6813 will transmit the command immediately following the synchronization message 6904. If one of the BORT devices 6801–6803 is actively tracking the synchronization message and then fails to detect a spread spectrum signal at this time, that BORT device will decide that no commands are pending. After performing system housekeeping duties, the BORT device will go immediately into sleep mode at time 6917. However, if the BORT device is tracking the synchronization message and detects the beginning of a command message 6918, the BORT device remains active to receive the command and cany out the system command 6920. After completion of the task, the BORT device may optionally transmit an acknowledge (ACK) message 6922 via an ALOHA messaging protocol, and then after performing system housekeeping duties, the BORT device will enter a sleep mode at time 6924.

Other signaling protocols may be used so as to avoid synchronization message collisions from other system elements that can fill in the ASK key-off window and force a needless command search. To eliminate this needless command search, commands are transmitted on CDMA channel 3. After the completion of the synchronization message 6916 on CDMA channel 2, the BORT device will switch to CDMA channel 3 and sample one code period of data. The BORT device will then perform a fast search as before. If a signal is detected on CDMA channel 3, the BORT device will perform fine search and receive and process the command as before. If no signal is detected on CDMA channel 3, then the BORT device will enter sleep mode. This alternative is preferred if the network modulation convention is ASK. So as to have adequate time for the BORT device to perform the search algorithms on the initial CDMA 3 transmission, the transceiver pauses for 700 ms prior to transmitting command message 6904.

Alternatively, the system transceivers 6811–6813 can maintain code phase coherence when changing from CDMA channel 2 to CDMA channel 3. In this manner, the BORT devices 6801–6803 may achieve instant spreading code synchronization with CDMA channel 3 codes since there will be no code phase ambiguity.

Alternatively, protocol messages may also be used to maintain system coherency. If one of the the BORT devices 6801–6803 wakes up and does not detect a system sync message on CDMA channel 2, then that BORT device may send a 'not acknowledge' (NAK) message to the system transceivers 6811–6813 on CDMA channel 1. Upon receipt of the NAK message, the closest of the system transceivers 6811–6813 will transmit a timing correction message to the BORT device on CDMA channel 1. The BORT device will adjust its sleep timer accordingly, and may or may not reply to the transceiver with an ACK message on CDMA channel 1. The BORT device will then go into sleep mode and wake up during the next available system sync message.

From the following expression it is clear that the impact of system synchronization loading on ALOHA availability is minimal:

(8.3 ms/5 sec)*100%=0.17% vs. (500 us/5 sec)*100%= 0.01%.

The system controller 6820 can send commands to the system transceiver of the system transceivers 6811–6813 nearest the desired BORT device of the BORT devices 6801–6803 at any time. This command will be queued and sent behind the next sync pulse; the system controller 6820 creates the timing and gives the command to initiate the sync pulse.

Some destructive interference occurs due to multiple system transceivers sending simultaneous sync pulses, although simultaneous transmission is nonetheless used so as to reduce loss of ALOHA air time. This approach is preferred over an alternative approach of assigning each system transceiver 6811–6813 an independent time slot.

The BORT system, or network, includes two types of devices, namely the BORT devices 6801–6803 and the system transceivers 6811–6813, each of which may include the single channel or the multi-channel transceivers of the first and second embodiments, respectively. A flowchart explaining the control process implemented in respective processors in the BORT devices 6801–6803 begins in FIG. 70A. The process begins in step 7001, where one of the BORT devices 6801–6803 is in a low-power sleep state, and then the process continues to step 7002, where the BORT device powers up into an active state based upon a wake-up signal provided by a wake-up timer that is preferably contained in the BORT device. In step 7003, the BORT device executes a coarse search process on CDMA channel 2, where the steps for this coarse search routine begin in step 7070, continuing in step 7071 where the device powers up the RF section on the CDMA channel provided by the calling routine. The BORT device will then acquire a data sample in step 7072 and power down its RF front-end in step 7073. The BORT device will then perform a fast serial search in step 7074 and return to the calling routine in step 7075.

Subsequent to the coarse search in step 7003, the BORT device makes a trip event decision in step 7004. If in step 7004 it was decided that a trip event occurred, the process proceeds to step 7005 where the BORT device powers up its RF front-end for reception on CDMA channel 2 and demodulates the data message in step 7006. In step 7007, the BORT device determines whether or not the BORT device acquired a synchronization message. If a synchronization message was present, the BORT device performs an additional coarse search on CDMA 3 (in steps 7008 and 7009) and then searches for an additional data message in step 7020, which is continued in FIG. 70B. If the respective condition of either step 7004 or step 7007 is not met, the BORT device has become active and has not detected a valid synchronization message, and so control is then passed to step 7010.

If the BORT device is receive only, the BORT device remains active, repeating steps 7003 through 7006 until a subsequent synchronization message is detected, satisfying the condition of step 7007. From step 7010, if the device has transmit capability, then the device has the option to power up its RF section in step 7011 in preparation for transmitting a handshaking message. The process then proceeds to step 7012 where the BORT device initiates a handshaking protocol with a system transceiver on CDMA channel 1 to acquire system timing information and then proceeds to step 7060, which is the beginning of a shutdown routine.

This shutdown process is explained in reference to FIG. 70B where the shutdown routine begins in step 7060 and continues to step 7061, where the RF front-end is powered down. Subsequently, in step 7062, the BORT device sets the low-power sleep timer correctly so that the BORT device will awaken during the next network synchronization period. Other tasks are performed as necessary to minimize sleep current loading and to assist the BORT device in its subsequent wake-up interval. Finally, the shutdown process proceeds to step 7063 where the BORT device enters a low-power sleep state.

Step 7020, shown in FIG. 70B, initiates a data message search process which occurs after the BORT device has performed a coarse search, as was discussed in reference to step 7007 in FIG. 70A. If a trip condition is met in step 7021, the BORT device starts a message timer in step 7022 and receives and demodulates the message in step 7023. Next, in step 7024 the BORT device verifies that the incoming message was intended for that device. If that BORT device was the intended recipient of the message, the process continues to step 7025 where the BORT device verifies that the incoming message was valid. If the message was valid, then the process continues to step 7026 where the BORT device transmits an acknowledgment on CDMA channel 1 and then in step 7027 responds to any commands that were embedded within the message. The process then proceeds to step 7028, where BORT device determines if there are any outgoing messages to be transmitted to the system transceivers 6811–6813. From step 7021, if the BORT device does not detect any incoming messages from the system transceiver, then process flow also passes to step 7028. Also from step 7024, if the BORT device determines that it was not the intended recipient of any incoming messages, then the process proceeds to step 7028, where the BORT device determines if there are any outgoing messages that are to be transmitted to the system transceivers 6811–6813. If not, the process continues to step 7060, which initiates the shutdown procedure. If there are one or more messages to be transmitted to the system transceivers 6811–6813, the BORT device will initiate preparations for transmission in step 7029.

From step 7026, if the received message had an error, the process proceeds to step 7032 where the device determines if the message timer has expired. If the timer has expired, then the BORT device will quit (e.g., time out) and pass control to step 7028. If the timer has not expired, the BORT will send a "not acknowledge" command on CDMA 1 (step 7033). The process then proceeds to step 7034 where the device performs a coarse search on CDMA channel 1. In step 7035, if no trip condition is met, then the device performs the steps of 7033 and 7034 until either a trip condition is met or the timer expires. If a trip condition is met in 7035, the process proceeds to step 7036 where the BORT device will apply power to its RF front-end on CDMA channel 1 and demodulate the message in step 7037.

In step 7038 the BORT device verifies that the incoming message was intended for that device. If the BORT device was the intended recipient of the message, the process continues to step 7039 where the BORT device verifies that the incoming message was valid. If the message was valid, the process continues to step 7026 where the BORT device transmits an acknowledgment on CDMA channel 1. If the conditions of either steps 7038 or 7039 are not met, then process control is returned to step 7032.

From step 7029, the device will power down its RF front-end and then seed a random timer as shown in step 7030. After the timer determines the time corresponding to the seed expires in step 7031, the process continues in step 7040, as will be discussed in reference to FIG. 70C. The process continues in step 7042, where the BORT device powers up its RF front-end with channel CDMA 1 settings as its default settings. The BORT device is configured so that an external event (step 7080) can cause the device to awaken from sleep mode (step 7041) and power up its RF section in CDMA channel 1 (step 7042). The device will start its message timer in 7043, and then transmit the outgoing messages in step 7044. At this point, the BORT device is expecting an acknowledgment from the system transceiver. In step 7045, the device performs a coarse search on CDMA channel 1. The process proceeds to step 7046, where a trip decision is made. If a trip occurred, the BORT device will receive and demodulate the message in 7047 and then verify that the incoming message was intended for that device in 7048. If the device was the intended recipient of the message, the process continues to step 7049 where the device verifies that the incoming message was valid. If the message was valid, then the process continues in step 7050 where the BORT device verifies that the message was an acknowledgment message from the system transceiver. If the message was a valid acknowledgment message, then the device will clear its outgoing message queue in 7051 and then enter shutdown mode in 7060. Note that if the conditions of steps 7046, 7049, or 7050 are not met, then the process proceeds to step 7052 where the device determines if its message timer has expired. If the message timer has not expired, then process control returns to step 7044. Otherwise, control is passed to 7053, where the BORT device transmits an error message and then proceeds to step 7060, which initiates the shutdown routine.

A flow diagram for the processes implemented in the system transceivers 6811–6813 begins in step 7102 of FIG. 71A and continues to step 7104 when a command is received from the system controller 6820 (from FIG. 68) to broadcast a synchronization pulse. As a background task in step 7100, the transceiver monitors the system bus 6825 and queue all messages that need to be transmitted to the BORT devices 6801–6803. From step 7104, the process proceeds to step 7106 where the transceiver transmits a synchronization pulse on CDMA channel 2. After the synchronization pulse has completed, the transceiver checks its message queue in step 7108 to see if there are any messages to be transmitted to the BORT devices 6801–6803. If there are messages to be transmitted, the transceiver will switch to CDMA channel 3 in step 7112 and then start a message timer in step 7114. The transceiver will then transmit the message to the BORT device and pause long enough for the BORT device to respond (steps 7116, and 7117). If an acknowledgment is received in step 7118, the transceiver clears its message queue for that particular BORT device step 7120 and then the proceeds to step 7110, (as will be discussed in reference to FIG. 71B). From step 7118, if the transceiver does not receive an acknowledgment from the BORT device, it will then check to see if the message timer has expired. If the timer has not expired, control is returned to step 7116, where the message is retransmitted to the BORT device. If the timer has expired, control is passed to step 7110 (FIG. 71B).

In FIG. 71B, the process continues to step 7130, where the system transceiver monitors CDMA channel 1 for incoming messages from the BORT devices 6801–6803. The transceiver remains in this loop until in step 7132 it is determined that either a message is received in step 7134 or (as was discussed in reference to FIG. 71A) the transceiver receives a message from the system controller to transmit a synchronization pulse (step 7104). In step 7134, the transceiver starts its message timer and then in step 7136 transceiver receives and demodulates the message. Decision step 7138 determines whether or not the message was valid. If the message was invalid, the process proceeds to step 7140 where the transceiver transmits a "not acknowledgment" message. If the message timer has expired (step 7142), then process control returns to step 7130 to monitor for additional messages. Otherwise, process control returns to step 7136 to attempt to re-acquire the message. From step 7138, if the message was valid, the transceiver will transmit an acknowledgment message (step 7144) and respond to the message if necessary (step 7146). If there is any queued message for this particular BORT device, process control returns to step 7150 (as is seen in FIG. 71A), otherwise, control is returned to step 7130.

FIGS. 72, 73, 74, 75, 76 and 77 show an alternative time division multiple access-based (TDMA) system/network architecture for the BORT devices. The following discussion explains the low level operation of the BORT system devices, as were previously discussed.

FIG. 72 shows a steady state communication timing diagram between a system transceiver and a BORT device for three types of messages. The term steady state means that these are messages used for normal exchange of information in three modes of operation. Initialization and exception handling will be discussed following the steady state discussion.

The system architecture is configured to minimize power drain at the BORT device. A significant amount of battery power is expended in the BORT device whenever it receives RF energy or transmit messages; a modest amount of battery power is expended whenever the BORT device is active, but has selected circuitry in a reduced power state, examples including initialization, Fast Serial Search as discussed earlier, and sleep mode preparation; and a minimum amount of battery power is expended while the BORT device is in sleep mode because the only active circuit is a low power oscillator and counter. The overall system architecture is configured to maintain positive control of the BORT devices with recovery mechanisms for re-establishing a communication link in the event of a lost message due to timing error or interference.

In order to minimize BORT power, the system transceivers behave predictably over time, and as discussed before, the BORT devices wake up on a schedule so as to retrieve a system sync message. To this end, one approach is for the system controller to manage the synchronization process, which is a different approach than pre-arranged options such as staggered, coincident or interleaved system transceiver sync intervals. As an exemplary embodiment, the system sync interval is fixed at 5 seconds with all transceivers interleaved and timing controlled by the system controller. Other options are also available, the preferences for each option depending on implementation trade-offs including consideration of on-air time, probability of receipt based on interleaved system controllers and asynchronous neighbor interference.

FIGS. 72A–C respectively show three messages which are all used to maintain sync with the system transceiver. The sync message is the most common system message (FIG. 72A), where this message occurs once every sync interval, 5 seconds for the purposes of this discussion. The top line, labeled "System Xcvr" shows the system transceiver sync message as transmitted. The bottom line shows relatively timing of the BORT device receiving the sync message. The transmitted sync message contains a leader 7202 which has sufficient duration to compensate for all timing errors in the wake-up process in the BORT device. The leader 702 contains copies of the spreading code, and the leader 7202 is followed by a sync data pattern 7204, a message type data pattern 7206, a transceiver identification (ID) data pattern 7208 and a cyclical redundant check (CRC) which serves to qualify the data message as non-corrupted. Each of the data fields may be of length necessary to satisfy system requirements. The BORT device wakes up based on a stored parameter in the previous sync interval, initializes and powers up the necessary sections of the device and collects one code period of data during time interval 7214 before shutting down the receive gain circuits for search 7215, fast serial or fast parallel search method as previously discussed. Following search, the BORT re-energizes the receive circuits, performs fine search, diversity search and begins demodulating data waiting for the sync data pattern 7216. Once the sync data pattern has been received, the BORT device calculates the actual wake-up time based on the time difference from initial search to sync data pattern. This information will be used later to calculate the next sleep interval. The BORT device continues to demodulate the remaining data 7218, detecting the message type and transceiver ID. The message type data field instructs the BORT device that the message is for sync only and no further action is required. The transceiver ID data field instructs the BORT device that it is accurately tracking the same system transceiver and has not drifted off with another transceiver. A positive lock for system integrity is therefore established by the BORT device without a need to energize a transmit circuit for the most common of system exchanges.

FIG. 72B shows a second steady state communication exchange denoted as a Point to Point message between a system transceiver and a BORT device. This message may occur once every sync interval in place of a sync message. In normal operation this message is infrequent relative to the sync message by an order of magnitude. In this mode of operation, the system transceiver appends additional data to a sync message intended for a specific BORT device. It is assumed that the system controller maintains an allocation database for which BORT devices are slaved to which system transceivers. The allocation mechanism will be discussed later in the discussion of system initialization. The top line of FIG. 72B shows the system transceiver transmit process followed by the receive process. The bottom line shows the BORT receive process followed by the acknowledge (transmit) process. As in the sync message, the system transceiver sends the Point to Point message leader 7222, followed by the sync 7226, message type 7228 and transceiver ID 7230 data patterns. But unlike the sync message, additional data is appended to include aBORT ID 7231 and optional data 7232 followed by the CRC 7234. The BORT device follows the normal wake-up process and samples a code repetition interval 7242, performs search processes and demodulates the message 7244. The BORT decodes the message as a Point to Point message, notes the transceiver ID and his BORT ID and responds with an acknowledge (ACK). The ACK follows similar structure including a leader 7246, followed by data fields of sync 7248, message type (ACK) 7250, BORT ID 7252, optional data 7254 and a CRC 7256. The system transceiver is always in listen mode when not transmitting, and so the transceiver detects the BORT acknowledge 7236 and demodulates the ACK 7238 completing the point to point exchange. The system controller either polls the ACK from the system transceiver or the transceiver initiates the interchange completing a positive handshake to the system controller.

FIG. 72C shows a third steady state communication exchange denoted as an "All Call" message between a system transceiver and a BORT device. This message may occur once every sync interval in place of a sync message. In normal operation, this All Call message is very infrequent relative to any other system message. In this mode of operation, the system transceiver appends additional data to a sync message intended for any BORT device able to detect the message. This mode of operation is typically reserved for emergency status when the BORT devices are required to become active and remain active until the emergency state is cleared. The top line of FIG. 72C shows the system transceiver transmitting the All Call message followed by receiving the BORT ACK. The bottom line shows the BORT device receiving the All Call followed by transmitting the ACK.

As in the sync and Point to Point message, the system transceiver sends the All Call message leader 7260, followed by the sync 7262, message type 7264 and transceiver IID 7266 data patterns. The message may optionally include end-user data 7268 followed by the CRC 7270. Every BORT device slaved to the system transceiver issuing the All Call follows its normal wake-up process and samples a code repetition interval 7278, performs search processes and demodulates the message 7280. When the BORT decodes the message as an All Call message, the BORT notes the transceiver ID and responds with an acknowledge (ACK). A high potential for collision exists as all BORT devices are trying to ACK the message simultaneously. So as to reduce contention probability, a delay is initiated by the BORT prior to sending the ACK to stagger the respective replies to the system transceiver. The BORT calculates the delay 7282 based on the sync interval divided by the BORT ID (or a number of bits in the BORT ID) which staggers the BORT devices to assist in collision avoidance. The ACK data structure includes a leader 7284, followed by data fields of sync 7286, message type (ACK) 7288, BORT ID 7290, optional data 7292 and a CRC 7294. The system transceiver is always in listen mode when not transmitting 7272. The transceiver detects the BORT acknowledge 7273 and demodulates the ACK 7274 completing the communication exchange. The system controller either polls the ACK from the system transceiver or the transceiver initiates the interchange completing a positive handshake to the system controller.

FIG. 73A and 73B show a flow diagram of the steady state processing corresponding with FIG. 72. The steady state process begins in step 7300 where once per sync interval the BORT wakes up, performs a search in step 7302 and makes a decision as to whether a trip condition exists in step 7304. The coarse search step 7302 is implemented as a subroutine call which is shown staring in step 7380 where the receiver RF front-end components are energized in step 7382, one code repetition interval is sampled and stored in step 7384 and the RF front-end is de-energized prior to a fast serial search step 7388 where the correlation function is performed prior to returning, in step 7390, to step 7302. This coarse search subroutine is also called, as shown in FIGS. 75 and 77. Because the present portion of the process is a sync processing thread, the BORT device expects to find a trip condition, but if no trip condition is found, the BORT device assumes sync has been lost or the expected message was jammed and processing continues in step 7320 where the system transceiver is re-acquired. Re-sync operation will be discussed later as shown in FIGS. 76 and 77.

If a trip was found as expected, the receive thread is initiated in step 7306 and the BORT device performs fine search, waits for the sync byte in order to establish a time-tag for use later in setting the sleep interval (in step 7308). The message is demodulated and data fields extracted. As the BORT device is attempting to maintain lock with one system transceiver, a check is made to determine if the message originated from the correct transceiver in step 7310. If the transceiver ID is not as expected, then synchronization with the desired transceiver is lost and a re-sync operation is performed in step 7318. If the transceiver ID is correct, then the BORT device has maintained sync and the message type is evaluated in steps 7312, 7314 and 7316.

If the message type does not match one of the three allowed steady state messages, the exception handler defaults to the re-sync function of step 7318. If the received message type is a standard sync message, the algorithm continues through steps 7324 and 7330 to 7332 where the time of sync byte relative to the wake up time is used in a digital lock loop in step 7334 to calculate the sleep time which will wake up the BORT device in the leader of the next sync message. The sleep timer is set in step 7336 and the BORT device enters a power down mode in step 7338 awaiting sleep timer wake up in the next sync interval.

If the received message was a Point to Point message in step 7314, the algorithm continues through steps 7326 and 7340 to 7342 where the BORT ID is evaluated in step 7342. If the received BORT ID matches the ID of the BORT device, the data bits are used to instruct the BORT on which function to perform in step 7344. An optional short delay is performed in step 7346 prior to a BORT ACK message in step 7348. The delay may be necessary to ensure the system transceiver is ready to receive the message, i.e. settling time for reversal of transmit to receive. Once the ACK has been sent, the BORT is ready to enter sleep mode and exits through the sync message process 7330 as discussed before. If the received message was an All Call message in step 7316, the algorithm continues through steps 7328 and 7350 to 7352 where the BORT performs the All Call function based on the message data in step 7352. The delay is calculated in step 7354 to stagger the BORT devices acknowledge messages and the ACK is sent in step 7356. The BORT then enters an extended search cycle continually searching in step 7358 looking for a new trip condition as step 7359. The BORT device does not sleep following an All Call reception. If a trip is found in step 7359, the process continues in the normal steady state processing thread at step 7306 through steps 7360 and 7322. In this manner, successive ALL Call messages are received and processed at whatever rate the system controller and transceiver desires. If the All Call condition is resolved, the system controller and transceivers send either a sync or Point to Point message where the BORT device enters a sleep mode following receipt.

The above discussion assumes the system is operating in a steady state mode. Exception handling and initialization are detailed below.

FIGS. 74A and B depict the system initialization sequence, where FIG. 74A shows a timeline of two system transceivers, both being received by a BORT device on the lines shown in FIG. 74B. Transceiver A and Transceiver B of FIG. 74A are shown staggered to demonstrate this process and the blocks on each line depict a complete transmitted or received message, solid blocks representing message steps in the acquisition flow. Each system transceiver continues to transmit sync messages 7402 and 7406 at a predefined system interval. The BORT device on power-up or initialization remains active continually searching at 7408 looking for a trip. Once a trip is found, the message is demodulated at times 7410, 7412 for a period so as to establish a good estimate of signal to noise ratio per system transceiver. A running average of SNR is maintained for several transceivers. This process is continued until at least four sync messages are collected from at least one system transceiver.

Once an estimate of SNR is complete, the BORT device nominates its selection to the system controller at time 7414 which contains as data the transceiver ID and SNR for the best of up to three system transceivers evaluated. All system transceivers hearing the nomination receive it at 7413, and 7415 and relay it to the system controller along with the SNR of receipt by the system transceivers. The system controller now has the SNR measurements relative to the BORT device and all system transceivers able to hear the BORT device where a determination is made as to allocation. The system controller allocates which system transceiver is associated with the BORT device and the chosen system controller relays this information to the BORT device at 7416. The BORT device continues to receive all messages following its nomination at time 7414 awaiting the allocation assignment which comes in the form of a Point to Point message at time 7416 from the system controller assigned. The BORT device receives the allocation Point to Point message at 7418 and acknowledges at time 7420 to complete the Point to Point exchange. The BORT device now has its transceiver IID and timing to enter sleep mode and enter steady state operation. If the allocation message at 7416 does not arrive within a predetermined time-out interval 7422, the BORT device assumes its nomination was not heard and re-issues it. Alternatively, the BORT may sleep for an extended period of time and attempt a new initialization, which may be a reasonable strategy for non-critical systems to compensate for extended power outages or system failures while preserving valuable BORT battery life.

FIG. 75 is a flowchart of the above-described procedure, where upon wake-up or initialization determination in step 7500 an array of sync counters is initialized in step 7502 to keep track of how many sync messages have been received from a few system transceivers. The BORT device continues to search in step 7504 until a trip is found in step 7506 where the RF front-end section is re-energized in step 7508 and the message is captured and demodulated in step 7510. The RF front-end section is placed in a reduced power state in step 7516 and the message is evaluated to see if it is a sync type (repetitive) message in step 7518. If the message is not repetitive, it is not considered as the time tag captured will be used to seed the sleep timer and the BORT resumes search 7504. If the message is repetitive, the time information is stored in an array based on the transceiver ID 7520 since the decision as to which transceiver to use is not yet made. In step 7522, a running average is made for the SNR of each transceiver being evaluated and a counter is incremented in step 7524 counting the number of sync messages received from a specific transceiver. If none of the counts exceed a predetermined number as determined in step 7526 the BORT resumes search in step 7504. If any of the counts exceed a predetermined number as determined in step 7526 the three best transceivers are selected based on SNR in step 7528 and a BORT nomination message is sent containing the transceiver ID and SNR for the best three candidates as observed by the BORT 7530.

A response time-out is started in step 7532 and the BORT searches continually in step 7534 until a trip is received in step 7536, the trip may or may not be the response expected. The RF front-end section is energized in step 7542 and the message is demodulated in step 7544 and considered in step 7546. If the message is not the expected response, the BORT device resumes search in step 7534. If the message is the response to the nomination, the allocated system transceiver ID is decoded from the data in step 7548 and stored for future reference in non-volatile memory. A Point to Point ACK is formed in step 7550 and sent and the BORT device enters sleep mode in steps 7552 and 7554. If while the BORT is waiting for a response at 7536 and not found, a time-out is incremented in step 7538 and evaluated at step 7540. If the time-out expires before the response is received the process starts over step 7502 (or alternatively the BORT device may enter an extended sleep interval to preserve battery conditions before resuming at step 7502).

If a BORT device detects loss of sync, it enters a re-sync mode depicted in FIGS. 76A–C and 77. FIG. 76A depicts a first tier of re-sync where the BORT device initiates a negative acknowledge (NAK) exchange. If re-sync fails according to that method, the procedure according to FIG. 76B is used as a second tier where the BORT device waits for the next sync message and resets. If re-sync fails according to that method, the procedure according to FIG. 76C is used as a third and final tier where the BORT device eventually enters the initialization mode, discussed earlier.

In FIG. 76A, the top line illustrates exemplary system transceiver activity at particular times such as sending sync messages 7602 and 7604, as shown. The BORT device processes the sync message at time 7608 but has a failure at time 7610 where the captured search interval does not coincide with the sync message of 7604. The same condition would exist if the system transceiver sync of 7604 were jammed relative to the BORT device. The BORT device initiates a NAK message 7612 and begins to immediately listen at 7616 for a NAK Reply 7614. When the system transceiver hears the NAK it repeats the previous message sent at the sync interval as a NAK Reply 7614 which includes a time value to the next scheduled sync message. The BORT device seeds the sleep mode timer and resumes normal processing at 7620. If the system controller fails to respond with the NAK Reply of 7614 or the BORT device cannot hear the NAK Reply, the BORT device continues to listen 7622 until the next sync message is heard at 7624 and normal processing resumes. If the BORT device fails to reacquire by either the NAK or waiting for sync, the BORT assumes the transceiver has failed, and enters an initialization mode 7630 following a predetermined time-out at 7628.

FIG. 77 is a flow diagram of the re-sync process starting at step 7700. In the normal wake-up process of FIG. 73A a determination is made that a re-sync is necessary (steps 7318 or 7320), thus initiating the re-sync process in step 7700, after which in step 7704, a wait time is calculated for generating a NAK message based on the BORT ID (or some number of bits of the BORT ID). The wait time is necessary to compensate for the situation where a jammer jams reception of the sync message to several BORT devices at the same time. By staggering their reply, the reliability, at the system level, of re-acquiring sync improves. The NAK is transmitted by the BORT device in step 7706 and a time-out interval is started in step 7708. The BORT device continually searches in step 7710 and upon finding a trip event in step 7712 energizes the RF front-end at step 7718 and demodulates the message in step 7720.

If the message received is the NAK Reply in step 7722, the sleep timer is seeded with a value to wake up the BORT device in the next sync interval in step 7726 based on the time value passed in the NAK Reply. The BORT system then enters a sleep mode in step 7728 and resumes normal operation. If the response received was not a NAK Reply, the response is evaluated to determine if the response is a standard steady state sync type message in step 7724. If so, the timer is set for a standard sync interval in step 7726 and the BORT device sleeps in step 7728. If the received message is neither a NAK Reply nor a sync message, the NAK time-out is incremented at step 7713 and evaluated at step 7714. While waiting for a NAK Reply in step 7712, the NAK time-out is incremented in step 7713 and evaluated in step 7714. If the NAK time-out expires, the BORT device enters the initialization mode 7716, 7500.

The mechanisms and processes set forth in the present description may also be implemented using a conventional general purpose microprocessor or digital signal processor (such as a IMS320C40, although, as discussed many of the inventive mechanisms and processes disclosed herein may be implemented in lower cost, lower performance processors) programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings, and in particular hybrids between the signal channel transceiver, multi-channel transceiver and BORT-based network embodiments. It is therefore to be understood that within the scope of the appended claims, the invention may be practiced otherwise than as specifically described herein.

To this end, an exemplary single channel embodiment of a transceiver has been described as a first embodiment of the present invention (see e.g., FIGS. 9, 10, 11), and a multi-channel embodiment has also been described as a second embodiment (see, e.g., FIGS. 9, and 35–36), where features of the respective embodiments may be exchanged with one another, albeit for potential penalties of cost, performance and complexity, as has been discussed. Accordingly, the present invention is directed not only to the claims as individually described, but also directed to combinations of the claims and alternative mechanisms as discussed herein.

More particularly, the multi-channel transceiver and single channel transceiver may both use a one-bit limited ADC or a multi-bit linear ADC. The simplicity of the one-bit limited ADC does not require the AGC function as discussed in reference to the multi-channel embodiment, and FIG. 35 for example, but the single channel embodiment could also use the multi-bit linear ADC, with AGC as discussed herein, although requiring additional processing power.

Both the single channel embodiment and the multi-channel embodiment have been explained with respect to particular examples given for decimation ratios, sampling rates etc. However, the approaches discussed for the single channel embodiment for digital downconversion-decimation, including the look-up table approach (see e.g., FIG. 12), Boolean logic approach (see e.g., FIG. 13) as well as coefficient-less approach, as discussed in the section entitled "Coefficient-less Down Conversation, Despread and Decimation in a DSP Processor" may also be implemented in the multi-channel embodiment.

While the discussion regarding DC removal with respect to FIG. 35, was made in the context of the multi-channel embodiment, the discussion is equally applicable to the single channel embodiment in which a multi-bit linear ADC is also used. Regarding the techniques for compensating for decimation loss, both the digital offset approach discussed with respect to FIG. 14, as well as the frequency offsetting of the first local oscillator, and cycling through various offsets, may be employed in either the single channel or the multi-channel embodiment Simultaneously computing all the offsets was an option discussed herein, such an option may be more suitable for use in a multi-channel embodiment or a hybrid embodiment between the multi-channel embodiment and single channel embodiment due to processing complexity and cost concerns. As with the other alternatives, penalties paid are in terms of cost and complexity. Similarly, the averaging approach discussed with regard to improving trip sensitivity and limiting decimation loss may also be employed in both the single channel and multi-channel embodiments, albeit for an increase in processing complexity. The set-on channel filter approach was discussed with respect to the multi-channel embodiment, see e g., FIG. 39, although it may also be applicable in the single channel embodiment, albeit at a more expensive computation cost to improve sensitivity and process gain during demodulation. The various fine search center of mass methods (see e.g, FIGS. 19–22 and DBPSK, as discussed with respect to FIGS. 31 and 32, for example), may be implemented in either the single channel or the multi-channel embodiment.

Both the single channel and the multi-channel embodiments are directed to direct sequence spread spectrum transceivers, that may be used in a system or network and both using a PN code as previously been discussed. The particular features of the PN code length, discussed with respect to Table 3, for example, is applicable to both the single channel and multi-channel embodiments. As was previously discussed, the selection of the PN code length, is an enabling feature regarding partial decimation as well as FFT radix based on small prime numbers, implemented in both embodiments.

Various other features have been discussed with respect to partial decimation in order to set a predetection bandwidth. While separate examples have been given with respect to the multi-channel and single channel embodiment, the present description should not be limited to only these particular descriptions, but rather other embodiments that will be extensions of the particular examples discussed herein, as well as devices which may be built in light of the present teachings.

FIGS. 30A–F have been presented in the context of the first embodiment, however, these approaches may be employed in either single channel or multi-channel embodiment, albeit for increased computational complexity as discussed herein. FIG. 34 described a circuit for precharging a voltage controlled oscillator for fast settling acquisition, however, this circuit may also be used in the multi-channel embodiment as well, and any hybrid between the single channel embodiment and the multi-channel embodiment.

FIGS. 40–45, discussed various frequency domain code correlators, which were presented in the context of the multi-channel embodiment. However, provided sufficient processing resources are available, these approaches may also be implemented in the single channel embodiment so as to provide an FFT based down conversation despread and decimation operation subsequent decimation in the frequency domain may be used to expand or set the predetection bandwidth as necessary for system requirements. The fast serial search approach discussed with respect to FIGS. 15A–B and 16, for example, are equally applicable in the multi-channel receiver implementation. Likewise, various power management features of the inventive transceiver, as discussed with respect to FIG. 9, the battery pack of FIG. 10, and that as discussed with respect to the BORT, are equally applicable in a single channel or multi-channel transceivers.

Features regarding on-off keying, (see e.g. discussion regarding FIG. 25, for example), may be applicable to either the single channel or multi-channel transceivers that use the one-bit limited ADC. The respective diversity approaches (antenna and frequency, for example, discussed with respect to FIGS. 9, 24–27, and FIGS. 68 (CDMA)), are applicable to both the single channel and multi-channel embodiment, and therefore are also applicable to hybrid embodiments. Likewise, the discussion regarding the BORT system and network (see e.g., FIGS. 67–77) are equally applicable to the single channel embodiment and the multi-channel embodiment, as either the single channel transceiver, multi-channel transceiver or a hybrid, may be employed in the BORT system/network. Furthermore, the discussion regarding the elimination of redundant data in a multi-drop network (discussed with reference to FIG. 67, for example) is also applicable to the single channel embodiment, as well as the multi-channel embodiment and any embodiment therebetween. Likewise, the discussion regarding predictive repositioning discussed with respect to FIGS. 66A–C, for example, as well as FIG. 39, are applicable to both the single channel and multi-channel embodiment.

While a few examples of how the various features of the inventive transceiver have been discussed above, it should be understood that the above-described combinations are only a subset of those that are possible as a natural extension of the exemplary embodiments discussed herein. Therefore, the above-identified combinations should not be construed as being an exhaustive listing, but rather an exemplary set of combinations that are considered part of the invention.

What is claimed as new and is desired to be secured by Letters: Patent of the United States is:

1. A direct sequence spread spectrum system comprising:
    a transmitter configured to transmit a direct sequence spread spectrum signal, comprising,
        a transmitter frequency reference that produces a frequency with a predetermined accuracy,
        a spreading code generator that generates said spreading code with a predetermined transmit signal chipping frequency error and modulates a data signal with said spreading code to produce a spread data signal having a frequency error component attributable to said predetermined accuracy of the transmitter frequency reference,
        a radio frequency generator that produces a radio frequency signal having a frequency error attributable to said predetermined accuracy of said frequency reference, and
        a transmitter signal combiner configured to receive and combine said radio frequency signal and said spread data signal to produce the direct sequence spread spectrum signal; and
    a receiver configured to extract said data signal from said direct sequence spread spectrum signal transmitted from said transmitter, comprising,
        a receiver frequency reference that produces a frequency with another predetermined accuracy,
        a code generator that generates said spreading code, said spreading code having a receiver chipping frequency error component,
        a receiver radio frequency generator configured to produce a downconversion signal derived from said frequency of said receiver frequency reference, said downconversion signal having a frequency error attributable to said predetermined accuracy of said frequency from said receiver frequency reference,
    a receiver signal combiner that combines the direct sequence spread spectrum signal with the downconversion signal to produce a translated signal said translated signal including said frequency error of said transmitter radio frequency signal error component and the downconversion signal error component,
    a sampling device that samples the translated signal at a frequency that is four times a center frequency of the translated signal to produce a sampled signal,
    a despreading and downconverting combiner coupled to the code generator and configured to despread and downconvert the sampled signal, comprising,
        a sign inversion mechanism that inverts a sign of respective samples of said sampled signal so as to despread and downconvert said sampled signal, and
    at least one data signal detector configured to detect the data signal, a composite bandwidth of said at least one data signal detector being in a range including a data signal bandwidth and a frequency uncertainty bandwidth of said signal due to at least the predetermined accuracy of the transmitter frequency reference.

2. The system of claim 1, wherein said receiver comprises at least one of a single channel receiver and a multi-channel receiver.

3. The system of claim 1, wherein said receiver further comprises an internal transmitter configured to transmit a signal therefrom, said receiver and said internal transmitter combining to provide a transceiver function.

4. The system of claim 1, wherein said predetermined accuracy of said transmitter frequency reference causing said frequency error of the radio frequency signal and said transmit signal chipping frequency error to be not independent of one another, said transmit signal chipping frequency error inducing a performance degradation at said receiver due to a time dependent reposition error.

5. The system of claim 1, wherein said receiver further comprises a computer-readable medium whose contents cause a processor to implement said despreading and downconverting combiner.

6. The system of claim 1, wherein:
said transmitter frequency reference comprises means for producing the frequency with the predetermined accuracy;
said spreading code generator of said generator comprises means for generating said spreading code;
said radio frequency generator comprises means for producing said radio frequency signal;
said transmitter signal combiner comprises means for producing the direct sequence spread spectrum signal;
said receiver frequency reference comprises means for producing said frequency with another predetermined accuracy;
said code generator of said receiver comprises means for generating said spreading code having said receiver chipping frequency error component;
said receiver radio frequency generator comprises means for producing said downconversion signal;
said receiver signal combiner comprises means for combining the direct sequence spread spectrum signal with the downconversion signal to produce the translated signal;
said sampling device comprises means for sampling the translated signal at the frequency that is four times the center frequency of the translated signal so as to produce the sampled signal; and
said despreading and downconverting combiner comprises means for despreading and downconverting the sampled signal, comprising,
means for sign inverting the sign of respective samples of said sampled signal so as to despread and downconvert said sampled signal, and
means for detecting the data signal, the composite bandwidth of said at least one data signal detector being in the range including the data signal bandwidth and the frequency uncertainty bandwidth of said signal due to at least the predetermined accuracy of the transmitter frequency reference.

7. The system of claim 1 wherein, said receiver further comprises:
a plurality of antennas;
a diversity reception control mechanism, comprising,
a selection mechanism for selecting one of said plurality of antennas after determining which of said antennas provides a signal that yields a correlation result meeting a selection threshold; and
a frequency diversity determination mechanism configured to determine at which of a plurality of frequencies a transmitted signal is centered and receive the transmitted signal at the frequency after making the determination.

8. A method for communicating a direct sequence spread spectrum signal, comprising the steps of:
transmitting from a transmitter a direct sequence spread spectrum signal, comprising substeps of,
producing with a transmitter frequency reference a frequency with a predetermined accuracy,
generating with a spreading code generator a spreading code with a predetermined transmit signal chipping frequency error and modulating a data signal with said spreading code to produce a spread data signal having a frequency error component attributable to said predetermined accuracy of the transmitter frequency reference,
generating with a radio frequency generator a radio frequency signal having a frequency error attributable to said predetermined accuracy of said frequency reference, and
combining with a transmitter signal combiner said radio frequency signal and said spread data signal to produce the direct sequence spread spectrum signal; and
extracting at a receiver said data signal from said direct sequence spread spectrum signal transmitted from said transmitter, comprising substeps of,
producing at a receiver frequency reference a frequency with another predetermined accuracy,
generating with a code generator said spreading code, said spreading code having a receiver chipping frequency error component,
producing with a receiver radio frequency generator a downconversion signal derived from said frequency of said receiver frequency reference, said downconversion signal having a frequency error attributable to said predetermined accuracy of said frequency from said receiver frequency reference,
combining with a receiver signal combiner the direct sequence spread spectrum signal with the downconversion signal to produce a translated signal, said translated signal including said frequency error of said transmitter radio frequency signal error component and the downconversion signal error component,
sampling with a sampling device the translated signal at a frequency that is four times a center frequency of the translated signal to produce a sampled signal,
despreading and downconverting with a despreading and downconverting combiner the sampled signal, comprising substeps of,
inverting with a sign inversion mechanism a sign of respective samples of said sampled signal so as to despread and downconvert said sampled signal, and
detecting with at least one data signal detector the data signal, a composite bandwidth of said at least one data signal detector being in a range including a data signal bandwidth and a frequency uncertainty bandwidth of said signal due to at least the predetermined accuracy of the transmitter frequency reference.

9. A method for simultaneously downconverting and applying a spreading code to a direct sequence spread spectrum signal, said spreading code having previously been used by a transmitter to spread a data signal at a predetermined chip rate, comprising the steps of:

sampling said signal at a sampling rate, Fs, to produce data samples, wherein said sampling rate, Fs, being four times a center frequency of said sampled signal, Fs being a multiple, M, of the code chip rate, M having a value of at least 1 and representing an oversample ratio;

downconverting and despreading respective samples in a signal signing step comprising,
  inverting a sign value of one of said data samples if a product of a downconversion coefficient and a despreading code coefficient is negative, not inverting if said product is positive, and zeroing said data sample if said product is zero.

10. The method of claim 9, wherein said downconverting and despreading step comprises:
  assigning a value of 1 to respective downconversion coefficient that coincide in time with a positive maximum value of a sinusoid having a frequency equal to the center frequency of said sampled signal,
  assigning a value of 0 to respective downconversion coefficients that coincide in time with a zero crossing at said sinusoid; and
  assigning a value of −1 to respective downconversion coefficients that coincide in time with a negative maximum of said sinusoid.

11. The method of claim 10 wherein said downconverting and despreading step comprises:
  assigning a value of 1 to respective spreading code coefficients that correspond in time with chips of said spreading code that are at a first state; and
  assigning a value of −1 to respective spreading code coefficients that correspond in time with chips of said spreading code that are at a second state.

12. A receiver configured to simultaneously downconvert and apply a spreading code to a direct sequence spread spectrum signal, said spreading code having previously been used by a transmitter to spread a data signal at a predetermined chip rate, comprising:
  means for sampling said signal at a sampling rate, Fs, to produce data samples, wherein said sampling rate, Fs, being four times a center frequency of said sampled signal, Fs being a multiple, M, of the code chip rate, M having a value of at least 1 and representing an oversample ratio;
  means for downconverting and despreading respective samples in a signal sample signing means comprising,
    means for inverting a sign value of one of said data samples if a product of a downconversion coefficient and a despreading code coefficient is negative, not inverting if said product is positive, and zeroing said data sample if said product is zero.

13. A receiver, comprising:
  means for simultaneously downconverting and applying a spreading code to a direct sequence spread spectrum signal, said spreading code having previously been used by a transmitter to spread a data signal at a predetermined chip rate;
  means for sampling said signal at a sampling rate, Fs, to produce data samples, wherein said sampling rate, Fs, being four times a center frequency of said sampled signal, Fs being a multiple, M, of the code chip rate, M having a value of at least 1 and representing an oversample ratio;
  means for downconverting and despreading respective samples in a single signing step comprising,
  means for inverting a sign value of one of said data samples if a product of a downconversion coefficient and a despreading code coefficient is negative, not inverting if said product is positive, and zeroing said data sample if said product is zero.

14. A receiver comprising:
  a despreader configured to simultaneously downconvert and apply a spreading code to a direct sequence spread spectrum signal, said spreading code having previously been used by a transmitter to spread a data signal at a predetermined chip rate,
  a signal sampler configured to sample said signal at a sampling rate, Fs, to produce data samples, wherein said sampling rate, Fs, being four times a center frequency of said sampled signal, Fs being a multiple, M, of the code chip rate, M having a value of at least 1 and representing an oversample ratio;
  a memory device configured to store said data samples,
  a processing device configured to retrieve said data samples and then downconvert and despread respective samples in a signal signing step comprising,
    a program stored in processor memory that causes the processor to invert a sign value of one of said data samples if a product of a downconversion coefficient and a despreading code coefficient is negative, not inverting if said product is positive, and zeroing said data sample if said product is zero.

15. A receiver that reduces signal loss caused by decimation of a direct sequence spread spectrum signal transmitted from a transmitter, said decimation having associated therewith a predetermined bandwidth and response characteristic, said response characteristic imparting a greater amount of attenuation in a first part of said bandwidth than in a second part of said bandwidth, comprising:
  means for receiving said signal using a receiver frequency reference, said transmitter employing a transmitter frequency reference where the tolerances of the respective references combine to create a predetermined signal position uncertainty range in which said signal is positioned prior to demodulation of the signal;
  means for decimating said signal with a decimation operator to reduce a sample rate of said signal;
  means for subdividing said predetermined signal position uncertainty range bandwidth into a plurality of candidate downconversion frequency bands;
  means for changing an amount by which a downconversion operator translates the signal toward the second part of said bandwidth, where said amount is set by assuming the signal is placed in one of the plurality of candidate downconversion frequency bands, attempting to correlate said signal with a spreading code used to spread the signal at the transmitter and means for determining whether correlation is achieved; and
  means for repeating sequentially said correlate said signal with a spreading code used to spread the signal at the transmitter and means for changing for the other channels and stopping said means for repeating when said means for determining determines that correlation is achieved.

16. The receiver of claim 15, wherein:
  said means for repeating comprises said means for changing for the other channels until the means for changing has been performed for all of the channels;
  said means for determining comprises,
    means for deciding that correlation is achieved after the means for changing has operated on all of the channels, and means for determining which of the plurality of candidate downconversion frequency bands yielded the greatest correlation result.

17. A method employed in a direct sequence spread spectrum receiver for avoiding false pseudorandom noise code synchronization detection caused by spontaneous in-band interference, said receiver having a plurality of channel filters arranged within a predetermined bandwidth corresponding to a frequency uncertainty range due to frequency offset in respective frequency references in a transmitter and said receiver, comprising the steps of:

attempting to despread said signal by applying the pseudorandom noise code to said signal and outputting a stream of digital samples;

applying said digital samples to said channel filters;

determining respective energy amounts within said channel filters;

identifying which channel filter has a maximum energy amount therein;

determining a composite average power for a portion of all remaining channel filters except for the channel filter identified as having the maximum energy and a pair of channel filters being adjacent thereto;

determining if said maximum energy exceeds said average energy by at least a predetermined amount, and deciding that an alignment of said pseudorandom noise code and said signal is within two chip intervals of said pseudorandom noise code so that coarse synchronization is achieved if said maximum energy exceeds said average energy by at least a predetermined amount; and performing fine search correlation and data demodulation if coarse synchronization is achieved and returning to said attempting step where said signal and pseudorandom noise code are shifted relative to one another before being applied to one another.

18. The method of claim 17, wherein said step of determining a composite average power comprises determining a composite average power for all remaining channels.

19. A direct sequence spread spectrum receiver configured to avoid false pseudorandom noise code synchronization detection caused by spontaneous in-band interference, said receiver having a plurality of channels arranged within a predetermined bandwidth corresponding to a frequency uncertainty range due to frequency offset in respective frequency references in a transmitter and said receiver, comprising:

means for attempting to despread said signal by applying the pseudorandom noise code to said signal and outputting a stream of digital samples;

means for applying said digital samples to said channel filters;

means for determining respective energy amounts within said channel filters;

means for identifying which channel filter has a maximum energy amount therein;

means for determining a composite average power for a portion of all remaining channels except for the channel filter identified as having the maximum energy and a pair of channels being adjacent thereto;

means for determining if said maximum energy exceeds said average energy by at least a predetermined amount, and deciding that an alignment of said pseudorandom noise code and said signal is within two chip intervals of said pseudorandom noise code so that course synchronization is achieved if said maximum energy exceeds said average energy by at least a predetermined amount; and means for performing fine search correlation and data demodulation if course synchronization is achieved and returning control to said means for attempting where said signal and pseudorandom noise code are shifted relative to one another before being applied to one another.

20. A direct sequence spread spectrum receiver configured to avoid false pseudorandom noise code synchronization detection caused by spontaneous in-band interference, said receiver having a plurality of channels arranged within a predetermined bandwidth corresponding to a frequency uncertainty range due to frequency offset in respective frequency references in a transmitter and said receiver, comprising:

a despreader configured to despread said signal by applying the pseudorandom noise code to said signal and outputting a stream of digital samples;

an application device configured to apply said digital samples to said channel filters;

an energy determination device configured to determine respective energy amounts within said channel filters;

a maximum energy detection device configured to identify which channel filter has a maximum energy amount therein;

a composite power device configured to determine a composite average power for a portion of all remaining channels except for the channel filter identified as having the maximum energy and a pair of channels being adjacent thereto;

a comparison device configured to determine if said maximum energy exceeds said average energy by at least a predetermined amount, and deciding that an alignment of said pseudorandom noise code and said signal is within two chip intervals of said pseudorandom noise code so that course synchronization is achieved if said maximum energy exceeds said average energy by at least a predetermined amount; and a device configured to perform fine search correlation and data demodulation if course synchronization is achieved and returning to said attempting step where said signal and pseudorandom noise code are shifted relative to one another before being applied to one another.

21. A direct sequence spread spectrum receiver that avoids false pseudorandom noise code synchronization detection caused by spontaneous in-band interference, comprising:

a frequency reference;

a plurality of channel filters arranged within a predetermined bandwidth corresponding to a frequency uncertainty range due to frequency offset in said frequency reference and another frequency reference used by a transmitter;

means for receiving a signal by said receiver;

means for attempting to despread said signal by applying the pseudorandom noise code to said signal and outputting a stream of digital samples;

means for applying said digital samples to said channel filters;

means for determining respective energy amounts within said channel filters;

means for identifying which channel filter has a maximum energy amount therein;

means for determining a composite average power for a portion of all remaining channel filters except for the channel filter identified as having the maximum energy and a pair of channel filters being adjacent thereto;

means for determining if said maximum energy exceeds said average energy by at least a predetermined amount, and deciding that an alignment of said pseudorandom noise code and said signal is within two chip intervals of said pseudorandom noise code so that coarse synchronization is achieved if said maximum energy exceeds said average energy by at least a predetermined amount; and means for performing fine search correlation and data demodulation if coarse synchronization is achieved and returning to said means for attempting where said signal and pseudorandom noise code are shifted relative to one another before being applied to one another.

22. A method in a direct sequence spread spectrum receiver for avoiding false pseudorandom noise code synchronization detection caused by spontaneous in-band interference, said receiver having a plurality of channel filters arranged within a predetermined bandwidth corresponding to a frequency uncertainty range due to frequency offset in respective frequency references in a transmitter and said receiver, comprising the steps of:

receiving a signal by said receiver;

attempting to despread said signal by applying the pseudorandom noise code to said signal and outputting a stream of digital samples;

applying said digital samples to said channel filters;

determining respective energy amounts within said channel filters;

identifying the channel filter having a maximum energy amount therein;

identifying another channel filter of said channel filters which has a second largest energy, said another channel filter not being one of a pair of channel filters being adjacent to the channel identified as having the maximum energy amount;

determining if said maximum energy exceeds said second largest energy by at least a predetermined amount; and performing fine search correlation and data demodulation if coarse synchronization is achieved, and returning to said attempting step where said signal and pseudorandom noise code are shifted relative to one another before being applied to one another.

23. A direct sequence spread spectrum receiver comprising:

means for avoiding false pseudorandom noise code synchronization detection caused by spontaneous in-band interference, including a plurality of channel filters arranged within a predetermined bandwidth corresponding to a frequency uncertainty range due to frequency offset in respective frequency references in a transmitter and said receiver, comprising, means for attempting to despread said signal by applying the pseudorandom noise code to said signal and outputting a stream of digital samples;

means for applying said digital samples to said channel filters;

means for determining respective energy amounts within said channel filters;

means for identifying the channel filter having a maximum energy amount therein;

means for identifying another channel filter of said channel filters which has a second largest energy, said another channel filter not being one of a pair of channel filters being adjacent to the channel filter identified as having the maximum energy amount;

means for determining if said maximum energy exceeds said second largest energy by at least a predetermined amount; and means for performing fine search correlation and data demodulation if course synchronization is achieved, and returning to said means for attempting where said signal and pseudorandom noise code are shifted relative to one another before being applied to one another.

24. A direct sequence spread spectrum receiver comprising:

a despreader that applies the pseudorandom noise code to said signal and outputting, a stream of digital samples;

a plurality of channel filters arranged within a predetermined bandwidth corresponding to a frequency uncertainty range due to frequency offset in respective frequency references in a transmitter and said receiver, wherein said channel filters being configured to operate on said digital samples;

a device to determine the respective energy amounts within said channel filters;

a device to identify the channel filter having a maximum energy amount therein;

a device to identify another channel filter of said channel filters which has a second largest energy, said another channel filter not being one of a pair of channel filters being adjacent to the channel filter identified as having the maximum energy amount;

a device to determine if said maximum energy exceeds said second largest energy by at least a predetermined amount; and a device to perform fine search correlation and data demodulation if course synchronization is achieved, and returning to said attempting step where said signal and pseudorandom noise code are shifted relative to one another before being applied to one another.

25. A direct sequence spread spectrum receiver that avoids false pseudorandom noise code synchronization detection caused by spontaneous in-band interference, comprising:

a frequency reference;

a plurality of channel filters arranged within a predetermined bandwidth corresponding to a frequency uncertainty range due to frequency offset in said frequency reference and another frequency reference used by a transmitter;

means for receiving a signal by said receiver;

means for attempting to despread said signal by applying the pseudorandom noise code to said signal and outputting a stream of digital samples;

means for applying said digital samples to said channel filters;

means for determining respective energy amounts within said channel filters;

means for identifying the channel filter having a maximum energy amount therein;

means for identifying another channel filter of said channel filters which has a second largest energy, said another channel filter not being one of a pair of channel filters being adjacent to the channel identified as having the maximum energy amount;

means for determining if said maximum energy exceeds said second largest energy by at least a predetermined amount; and means for performing fine search correlation and data demodulation if coarse synchronization is achieved, and returning to said attempting step where said signal and pseudorandom noise code are shifted relative to one another before being applied to one another.

26. A method for reducing code phase correlation error in a direct sequence spread spectrum receiver after a direct sequence spread spectrum signal and a pseudorandom code used to spread the signal at a transmitter have been aligned to one another within one pseudorandom code chip interval, comprising the steps of:

sampling said signal at a predetermined sampling rate and producing signal samples;

despreading said signal by applying said pseudorandom code to said signal samples and obtaining a despread signal;

determining a power of said despread signal, said power being an indication of how closely said signal and said pseudorandom code are aligned to one another;

identifying respective powers of despread signal for other relative pseudorandom code phases by,
despreading said signal by shifting a relative position of said signal and said pseudorandom code by less than said pseudorandom code chip interval,
determining said another of said respective powers of said despread signal, and
repeating said identifying step until all of said respective powers have been identified;

determining an operational positional alignment between said pseudorandom code and said signal samples by performing a center of mass operation on said power and said respective powers; and despreading said signal using said operational positional alignment previously determined and demodulating said despread signal.

27. The method of claim 26 wherein said step of determining an operational positional alignment comprises the steps of:

retarding a relative position of the pseudorandom code relative to the signal samples by at least ½ of said chip interval relative to an initial alignment position that caused said receiver to determine that said pseudorandom code and said signal are aligned to within one chip interval;

despreading said signal by applying said pseudorandom code to said samples and obtaining a despread signal;

computing and storing a power of said despread signal, said power being an indication of how closely said signal and said pseudorandom code are aligned to one another;

advancing the relative position by a fractional chip step, to compute and store one of the relative signal powers; and continuing said advancing step until said relative position of the pseudorandom code relative to the signal samples meets or exceeds one chip relative to said position in said retarding step; and determining said operational positional alignment between said pseudorandom code and said signal samples by performing a center of mass operation on said power and said relative powers.

28. The method of claim 27, wherein:

said retarding step and said advancing step combine to provide relative position alignments of $-\frac{1}{2}, -\frac{1}{4}, +\frac{1}{4}$ and $+\frac{1}{2}$ of a chip, and said determining a power step provides an initial signal power for a 0 relative position, thereby providing a first set of five signal powers corresponding respectively to relative position alignments of $-\frac{1}{2}, -\frac{1}{4}, 0, +\frac{1}{4}$ and $+\frac{1}{2}$ of a chip;

said performing a center of mass operation step comprises,
calculating a first center of mass of said first set of five signal powers,
determining if the first center of mass is greater than $+\frac{1}{4}$ chip offset, and if so performing the advancing step to identify respective signal powers for $+\frac{3}{4}$ and $+1$ chip offset and computing a second center of mass on a second set of five signal powers associated with the $0 +\frac{1}{4}, +\frac{1}{2}, +\frac{3}{4}$, and $+1$ relative position alignments,
determining if the first center of mass is less than $-\frac{1}{4}$ chip offset, and if so performing the advancing step in a retarding direction so as to identify respective signal powers for $-\frac{3}{4}$ and $-1$ chip offset and computing a third center of mass on a third set of five signal powers associated with the $-1, -\frac{3}{4}, -\frac{1}{2}, -\frac{1}{4}$, and 0 relative position alignments; and adjusting the relative phase to the operational positional alignment using said second center of mass if said first center of mass is determined to be greater than $+\frac{1}{4}$ chip offset, and adjusting the relative phase to the operational positional alignment using said third center of mass if said second center of mass is determined to be less than $-\frac{1}{4}$ chip offset.

29. The method of claim 27, wherein:

said sampling step comprises,
decimating said signal samples to reduce a sample rate of said samples to coincide with a chip code rate of said pseudorandom noise code, said samples being a first set of samples,
obtaining a second set of samples offset by ¼ of a chip interval of said code chip rate relative to said first set of samples; said second set of samples being provided at said sample rate,
obtaining a third set of samples offset by ½ of a chip interval of said code chip rate relative to said first set of samples, said third set of samples being provided at said sample rate, and
obtaining a fourth set of samples offset by ¾ of a chip interval of said code chip rate relative to said first set of samples, said fourth set of samples being provided at said sample rate;

said retarding step and said advancing step combine to provide relative position alignments of $-1, 0$, and $+1$ of a chip, and further comprising the steps of,
determining respective signal powers of said second set of samples for chip offsets of $-\frac{3}{4}$ and $+\frac{1}{4}$ relative to said relative position alignment for said first set of samples;
determining respective signal powers of said third set of samples for chip offsets of $-\frac{1}{2}$ and $+\frac{1}{2}$ relative to said relative position alignment for said first set of samples;
determining respective signal powers of said fourth set of samples for chip offsets of $-\frac{1}{4}$ and $+\frac{3}{4}$ relative to said relative position alignment for said first set of samples; wherein
said performing a center of mass operation step comprises,
calculating said center of mass using said signal powers associated with said chip set offsets for said first set of samples, second set of samples, third set of samples and fourth set of samples.

30. The method of claim 26, wherein:

said sampling step comprises sampling said signal at a multiple M of a chipping rate of said pseudorandom code;

decimating said samples to reduce a sample rate of said samples to coincide with the chipping rate;

adjusting the relative position by at least −½ of a code chip interval;

obtaining other data samples after said adjusting step, repeatedly determining a signal power of said other data samples, and adjusting the relative position farther by +1/M;

repeating said steps of obtaining, repeatedly determining and adjusting until said relative position is offset by at least +½ of a code chip interval;

determining a center of mass for said signal powers for respective of said relative positions;

if the center of mass is greater than 1/M of a chip code interval, collecting and measuring a set of additional signal powers for additional relative positions at a predetermined fractional increment, set of additional signal powers comprising elements between 0 and 1, and determining another center of mass using said additional signal powers; and adjusting said relative position by said center of mass if said determining step determines that said center of mass is not greater than 1/M of a chip code interval and adjusting said relative position by said another center of mass if said determining step determines that said center of mass is greater than a 1/M chip code interval.

31. The method of claim 26, wherein:

said sampling step comprises sampling said signal at by an amount corresponding to a product of N and M, where N is a length of said pseudorandom code and M is a multiple of a chipping rate of said pseudorandom code;

obtaining sets of data samples, respective sets corresponding to respective of plural fractional chip interval length relative position adjustments; and despreading respective of said sets of samples using a receiver spreading code generator configured to produce a code chip sample at a rate of (2×M)+1, comprising the steps of, offsetting the relative position by an amount and direction corresponding to −1 of a chip interval, despreading one of the sets of samples and obtaining a corresponding signal power, advancing the relative position by an amount corresponding to 1/M of a code chip interval, despreading another of the sets of samples and obtaining a corresponding signal power, repeating said advancing and despreading another steps until the relative position corresponds to +1 of a code chip interval.

32. A direct sequence spread spectrum receiver with means for reducing code phase correlation error after a direct sequence spread spectrum signal and a pseudorandom code used to spread the signal at a transmitter have been aligned to one another within one pseudorandom code chip interval, comprising the steps of:

means for sampling said signal at a predetermined sampling rate and producing signal samples;

means for despreading said signal by applying said pseudorandom code to said signal samples and obtaining a despread signal;

means for determining a power of said despread signal, said power being an indication of how closely said signal and said pseudorandom code are aligned to one another;

means for identifying respective powers of despread signal for other reative pseudorandom code phases including, means for despreading said signal by shifting a relative position of said signal and said pseudorandom code by less than said pseudorandom code chip interval, means for determining said another of said respective powers of said despread signal, and means for repeating said identifying step until all of said respective powers have been identified;

means for determining an operational positional alignment between said pseudorandom code and said signal samples by performing a center of mass operation on said power and said respective powers; and means for despreading said signal using said operational positional alignment previously determined and demodulating said despread signal.

33. A direct sequence spread spectrum receiver comprising:

a sampler for sampling said signal at a predetermined sampling rate and producing signal samples;

a despreader for despreading said signal by applying said pseudorandom code to said signal samples and obtaining a despread signal;

a power determination device for determining a power of said despread signal, said power being an indication of how closely said signal and said pseudorandom code are aligned to one another;

a power comparison device for identifying respective powers of despread signal for other relative pseudorandom code phases using, a despreading device for despreading said signal by shifting a relative position of said signal and said pseudorandom code by less than said pseudorandom code chip interval, and a device for determining said another of said respective powers of said despread signal;

a device for determining an operational positional alignment between said pseudorandom code and said signal samples by performing a center of mass operation on said power and said respective powers; and a device for despreading said signal using said operational positional alignment previously determined and demodulating said despread signal.

34. A direct sequence spread spectrum receiver for reducing code phase correlation error therein after a pseudorandom code used to spread the signal at a transmitter has been aligned to a locally produced pseudorandom code within one pseudorandom code chip interval, comprising:

means for sampling said signal at a predetermined sampling rate and producing signal samples;

means for despreading said signal by applying said pseudorandom code to said signal samples and obtaining a despread signal;

means for determining a power of said despread signal, said power being an indication of how closely said signal and said pseudorandom code are aligned to one another;

means for identifying respective powers of despread signal for other relative pseudorandom code phases comprising,
    means for despreading said signal by shifting a relative position of said signal and said pseudorandom code by less than said pseudorandom code chip interval,
    means for determining another of said respective powers of said despread signal, and
    means for repeating said identifying until all of said respective powers have been identified;
means for determining an operational positional alignment between said pseudorandom code and said signal samples by performing a center of mass operation on said power and said respective powers; and
means for despreading said signal using said operational positional alignment previously determined and demodulating said despread signal.

35. The receiver of claim 34 wherein said means for determining an operational positional alignment comprises:
    means for retarding a relative position of the pseudorandom code relative to the signal samples by at least ½ of said chip interval relative to an initial alignment position that caused said receiver to determine that said pseudorandom code and said signal are aligned to within one chip interval;
    means for computing and storing another signal power;
    means for advancing the relative position by a fractional chip step, to compute one of the other signal powers; and
    means for continuing said means for advancing until said relative position of the pseudorandom code relative to the signal samples meets or exceeds one chip relative to said position in said means for retarding; and
    means for determining said operational positional alignment between said pseudorandom code and said signal samples by performing a center of mass operation on said power and said relative powers.

36. The receiver of claim 35, wherein:
said means for retarding and said means for advancing combine to provide relative position alignments of −½, −¼, +¼ and +½ of a chip, and said determining a power step provides an initial signal power for a 0 relative position, thereby providing a first set of five signal powers corresponding respectively to relative position alignments of −½, −¼, 0, +¼ and +½ of a chip;
said means for performing a center of mass operation step comprises,
    means for calculating a first center of mass of said first set of five signal powers,
    means for determining if the first center of mass is greater than +¼ chip offset, and if so performing the advancing step to identify respective signal powers for +¾ and +1 chip offset and computing a second center of mass on a second set of five signal powers associated with the 0 +¼, +½, +¾, and +1 relative position alignments,
    means for determining if the first center of mass is less than −¼ chip offset, and if so performing the means for advancing a retarding direction so as to identify respective signal powers for −¾ and −1 chip offset and computing a third center of mass on a third set of five signal powers associated with the −1, −¾, −½, −¼, and 0 relative position alignments; and
    means for adjusting the relative phase to the operational positional alignment using said second center of mass if said first center of mass is determined to be greater than +¼ chip offset, and adjusting the relative phase to the operational positional alignment using said third center of mass if said second center of mass is determined to be less than −¼ chip offset.

37. The receiver of claim 35, wherein:
said means for sampling step comprises,
    means for decimating said signal samples to reduce a sample rate of said samples to coincide with a chip code rate of said pseudorandom noise code, said samples being a first set of samples, comprising
    means for obtaining a second set of samples offset by ¼ of a chip interval of said code chip rate relative to said first set of samples; said second set of samples being provided at said sample rate,
    means for obtaining a third set of samples offset by ½ of a chip interval of said code chip rate relative to said first set of samples, said third set of samples being provided at said sample rate, and
    obtaining a fourth set of samples offset by ¾ of a chip interval of said code chip rate relative to said first set of samples, said fourth set of samples being provided at said sample rate;
said means for retarding and said means for advancing combine to provide relative position alignments of −1, 0, and +1 of a chip, and further comprising,
    means for determining respective signal powers of said second set of samples for chip offsets of −¾ and +¼ relative to said relative position alignment for said first set of samples;
    means for determining respective signal powers of said third set of samples for chip offsets of −½ and +½ relative to said relative position alignment for said first set of samples;
    means for determining respective signal powers of said fourth set of samples for chip offsets of −¼ and +¾ relative to said relative position alignment for said first set of samples; wherein
    said means for performing a center of mass operation comprises,
        means for calculating said center of mass using said signal powers associated with said chip set offsets for said first set of samples, second set of samples, third set of samples and fourth set of samples.

38. The receiver of claim 34, wherein:
said means for sampling comprises means for sampling said signal at a multiple M of a chipping rate of said pseudorandom code;
means for decimating said samples to reduce a sample rate of said samples to coincide with the chipping rate;
means for adjusting the relative position by at least −½ of a code chip interval;
means for obtaining other data samples after said means for adjusting, determining a signal power of said other data samples, and adjusting the relative position further by +1/M;
means for repeating said means for obtaining, determining and adjusting until said relative position is offset by at least +½ of a code chip interval;
means for determining a center of mass for said signal powers for respective of said relative positions;
if the center of mass is greater than 1/M of a chip code interval,
means for collecting and measuring a set of additional signal powers for additional relative positions at a predetermined fractional increment, set of additional signal powers comprising elements between 0 and 1, and means for determining another center of mass using said additional signal powers; and means for adjusting said relative position by said center of mass if said means for determining determines that said center of mass is not greater than 1/M of a chip code interval and adjusting said relative position by said another center of mass if said determining step determines that said center of mass is greater than a 1/M chip code interval.

39. The receiver of claim 34, wherein:

said means for sampling comprises means for sampling said signal at by an amount corresponding to a product of N and M, where N is a length of said pseudorandom code and M is a multiple of a chipping rate of said pseudorandom code;

means for obtaining sets of data samples, respective sets corresponding to respective of plural fractional chip interval length relative position adjustments; and means for despreading respective of said sets of samples using a receiver spreading code generator configured to produce a code chip sample at a rate of (2×M)+1, comprising, means for offsetting the relative position by an amount and direction corresponding to −1 of a chip interval, means for despreading one of the sets of samples and obtaining a corresponding signal power, means for advancing the relative position by an amount corresponding to 1/M of a code chip interval, means for despreading another of the sets of samples and obtaining a corresponding signal power, means for repeating said means for advancing and means for despreading another until the relative position corresponds to +1 of a code chip interval.

40. A method for reducing code phase correlation error in a direct sequence spread spectrum receiver after a direct sequence spread spectrum signal and a pseudorandom code, used to spread the signal at a transmitter, have been determined by said receiver to be aligned to one another within one-half of a pseudorandom code chip interval, comprising the steps of:

sampling said signal at a predetermined sampling rate and producing signal samples;

performing a least-squares operation on signal powers associated with different fractional relative position offsets between said signal and pseudorandom code chip, comprising the steps of, producing a pseudorandom code at a relative position being less than or equal to ½ of an initial code chip position when said receiver determined that said signal and said pseudorandom code are aligned;

identifying a signal power associated with said relative position, producing at an advanced relative position the pseudorandom code, said pseudorandom code being advanced by a fractional chip step, repeatedly identifying a signal power associated with the advanced relative position, and repeating said steps of producing and repeatedly identifying until said relative position reaches or exceeds ½ chip beyond said initial code chip position, determining a least-squares value of said signal powers and adjusting said relative position by said least-squares value if said value is less than a predetermined chip threshold;

performing a center of mass calculation on said signal powers and adjusting said relative position by a ½ chip offset if said determining step determines that said least-squares value is not less than said predetermined threshold;

readjusting said relative position by performing said step of performing the least-square operation for a second time and after performing at least one of said steps of determining a least-squares value and a performing a center of mass calculation; and demodulating said signal after said readjusting step.

41. A direct sequence spread spectrum receiver that reduces code phase correlation error after a direct sequence spread spectrum signal and a pseudorandom code, used to spread the signal at a transmitter, have been determined by said receiver to be aligned to one another within one-half of a pseudorandom code chip interval, comprising:

means for sampling said signal at a predetermined sampling rate and producing signal samples;

means for performing a least-squares operation on signal powers associated with different fractional relative position offsets between said signal and pseudorandom code chip, means for producing a pseudorandom code at a relative position being less than or equal to ½ of an initial code chip position when said receiver determined that said signal and said pseudorandom code are aligned;

means for identifying a signal power associated with said relative position;

means for producing at an advanced relative position the pseudorandom code, said pseudorandom code being advanced by a fractional chip step;

means for identifying a signal power associated with the advanced relative position, means for successively returning control to said means for producing and means for identifying until said relative position reaches or exceeds ½ chip beyond said initial code chip position;

means for determining a least-squares value of said signal powers and adjusting said relative position by said least-squares value if said value is less than a predetermined chip threshold;

means for performing a center of mass calculation on said signal powers and adjusting said relative position by a ½ chip offset if said means for determining determines that said least-squares value is not less than said predetermined threshold;

means for readjusting said relative position by performing, the least-square operation for a second time and performing a center of mass calculation; and means for demodulating said signal after processing by said means for readjusting.

42. A direct sequence spread spectrum receiver that reduces code phase correlation error after a direct sequence spread spectrum signal and a pseudorandom code, used to spread the signal at a transmitter, have been determined by said receiver to be aligned to one another within one-half of a pseudorandom code chip interval, comprising:

a sampling device for sampling said signal at a predetermined sampling rate and producing signal samples;

a processing device for performing a least-squares operation on signal powers associated with different fractional relative position offsets between said signal and pseudorandom code chip, comprising, a code generation device configured to produce a pseudorandom code at a relative position being less than or equal to ½ of an initial code chip position when said receiver determined that said signal and said pseudorandom code are aligned;

a power identification device configured to identify a signal power associated with said relative position, a chip advance device configured to produce at an advanced relative position the pseudorandom code, said pseudorandom code being advanced by a fractional chip step, a signal power identification device configured to identify a signal power associated with the advanced relative position, and a repeating device configured to repeat at least one previous processing operation until said relative position reaches or exceeds ½ chip beyond said initial code chip position, a least-squares device configured to determine a least-squares value of said signal powers and adjust said relative position by said least-squares value if said value is less than a predetermined chip threshold;

a center of mass calculation device configured to perform a center of mass calculation on said signal powers and adjust said relative position by a ½ chip offset if said least-squares value is not less than said predetermined threshold;

a readjustment device configured to readjust said relative position by performing said the least-square operation for a second time and performing a center of mass calculation; and a demodulation device configured to demodulate said signal after said device configured to readjust said relative position has processed said signal.

43. A direct sequence spread spectrum receiver for reducing code phase correlation error, after a direct sequence spread spectrum signal and a pseudorandom code, used to spread the signal at a transmitter, have been determined by said receiver to be aligned to one another within one-half of a pseudorandom code chip interval, comprising:

means for sampling said signal at a predetermined sampling rate and producing signal samples;

means for performing a least-squares operation on signal powers associated with different fractional relative position offsets between said signal and pseudorandom code chip, comprising, means for producing a pseudorandom code at a relative position being less than or equal to ½ of an initial code chip position when said receiver determined that said signal and said pseudorandom code are aligned;

means for identifying a signal power associated with said relative position, means for producing at an advanced relative position the pseudorandom code, said pseudorandom code being advanced by a fractional chip step, means for repeatedly identifying a signal power associated with the advanced relative position, and means for repeating said means for producing and means for repeatedly identifying until said relative position reaches or exceeds ½ chip beyond said initial code chip position, means for determining a least-squares value of said signal powers and adjusting said relative position by said least-squares value if said value is less than a predetermined chip threshold;

means for performing a center of mass calculation on said signal powers and adjusting said relative position by a ½ chip offset if said means for determining determines that said least-squares value is not less than said predetermined threshold;

means for readjusting said relative position by using said means for performing the least-square operation for a second time and after using at least one of said means for determining a least-squares value and performing a center of mass calculation; and means for demodulating said signal after processing in said readjusting means.

44. A method for removing a frequency uncertainty error at an output of a differential binary phase shift keyed direct sequence spread spectrum signal in a receiver, said frequency uncertainty caused in part by a frequency offset between a transmitter frequency reference and a receiver frequency reference, said signal after being despread having a complex Nyquist bandwidth being greater than or equal to said frequency uncertainty, comprising the steps of:

storing a first data bit of said signal;

multiplying a second data bit with a complex conjugate of the first data and producing a complex product;

decimating said complex product to a single complex sample C(n) per data bit interval so as to provide a resulting signal with a static phase angle being at least one of $\theta$ and $\theta+180$ degrees;

removing said static phase angle with a decision feedback phase error canceler, comprising, determining a complex number $C_\theta(n)$ having an angle being a resulting static phase error averaged over M previous bits;

translating the static phase error to 0 by multiplying C(n) with a complex conjugate of $C_\theta(n)$ and obtaining a multiplication result, identifying a sign of a real part of said multiplication result and making a bit decision based thereon, and update a $C_\theta$ average with C(n) multiplied with a sign of the second bit.

45. The method of claim 44, wherein said removing step comprises removing said static phase angle for the differential binary phase shift key direct sequence spread spectrum signal in which a plurality of data bits are contained within one code phase of said signal.

46. A direct sequence spread spectrum receiver that removes a frequency uncertainty error at an output of a differential binary phase shift keyed direct sequence spread spectrum signal in a receiver, said frequency uncertainty caused in part by a frequency offset between a transmitter frequency reference and a receiver frequency reference, said signal after being despread having a complex Nyquist bandwidth being greater than or equal to said frequency uncertainty, comprising:

means for storing a first data bit of said signal;

means for multiplying a second data bit with a complex conjugate of the first data and producing a complex product;

means for decimating said complex product to a single complex sample C(n) per data bit interval so as to provide a resulting signal with a static phase angle being at least one of $\theta$ and $\theta+180$ degrees:

means for removing said static phase angle with a decision feedback phase error canceler, comprising, means for determining a complex number $C_\theta(n)$ having an angle being a resulting static phase error averaged over M previous bits, means for translating the static phase error to 0 by multiplying $C_\theta(n)$ with a complex conjugate of $C_\theta(n)$ and obtaining a multiplication result, means for identifying a sign of a real part of said multiplication result and making a bit decision based thereon, and means for update a $C_\theta$ average with C(n) multiplied with a sign of the second bit.

47. A direct sequence spread spectrum receiver that removes a frequency uncertainty error at an output of a differential binary phase shift keyed direct sequence spread spectrum signal, said frequency uncertainty caused in part by a frequency offset between a transmitter frequency reference and a receiver frequency reference, said signal after being despread having a complex Nyquist bandwidth being greater than or equal to said frequency uncertainty, comprising:

a storage device for storing a first data bit of said signal;

a multiplier device for multiplying a second data bit with a complex conjugate of the first data and producing a complex product;

a decimation device for decimating said complex product to a single complex sample C(n) per data bit interval so as to provide a resulting signal with a static phase angle being at least one of θ and θ+180 degrees:

a removal device for removing said static phase angle with a decision feedback phase error canceler, comprising, a determination device for determining a complex number $C_\theta(n)$ having an angle being a resulting static phase error averaged over M previous bits;

a translation device for translating the static phase error to 0 by multiplying $C_\theta(n)$ with a complex conjugate of $C_\theta(n)$ and obtaining a multiplication result, an identification device for identifying a sign of a real part of said multiplication result and making a bit decision based thereon, and an update device for updating a $C_\theta$ average with $C_\theta(n)$ multiplied with a sign of the second bit.

48. A direct sequence spread spectrum receiver that removes a frequency uncertainty error at an output of a differential binary phase shift keyed signal, said frequency uncertainty caused in part by a frequency offset between a transmitter frequency reference and a receiver frequency reference, said signal after being despread having a complex Nyquist bandwidth being greater than or equal to said frequency uncertainty, comprising:

means for generating said frequency reference;

means for storing a first data bit of said signal;

means for multiplying a second data bit with a complex conjugate of the first data and producing a complex product;

means for decimating said complex product to a single complex sample C(n) per data bit interval so as to provide a resulting signal with a static phase angle being at least one of θ and θ+180 degrees;

means for removing said static phase angle with a decision feedback phase error canceler, comprising, means for determining a complex number $C_\theta(n)$ having an angle being a resulting static phase error averaged over M previous bits;

means for translating the static phase error to 0 by multiplying C(n) with a complex conjugate of $C_\theta(n)$ and obtaining a multiplication result, means for identifying a sign of a real part of said multiplication result and making a bit decision based thereon, and means for update a $C_\theta$ average with C(n) multiplied with a sign of the second bit.

49. A method for distributing a decimation operation into plural stages in a direct sequence spread spectrum receiver, comprising:

receiving a direct sequence spread spectrum signal at said receiver, said signal having been spread at a transmitter with a spreading code of length N, N being divisible by a plurality of prime factors;

sampling said signal at a predetermined sampling rate;

producing said spreading code at said receiver;

decimating said signal in a first decimation stage by a first fraction of the sampling rate and providing a first decimated signal having a lower sample rate, wherein said first fraction is equal to one of said plurality of prime factors than said predetermined sample rate; and decimating said decimated signal in a second decimation stage by another fraction of the sampling rate and providing a second decimated signal have a lower sample rate than said first decimated signal, wherein said another fraction is equal to another of said plurality of prime factors.

50. The method of claim 49, wherein said receiving step, comprises receiving said direct sequence spread spectrum receiver wherein said signal has been spread at a transmitter with a spreading code having at least one of a code length less than 100, being a $2^k-1$ sequence, having prime factors being less than 10, but greater than 2.

51. The method of claim 49, wherein said sampling step comprises sampling said signal at a rate being an integer multiple of N.

52. The method of claim 49, wherein said step of decimating said signal in a first decimation stage comprises decimating before said signal has been despread with said spreading code and said decimating said decimated signal in a second decimation stage, comprising decimating after said despreading with said spreading signal.

53. The method of claim 52, wherein said step of decimating said decimated signal in a first decimation stage, comprises decimating by a decimation ratio of 4, and said decimating said decimated signal in a second decimation stage, comprising decimating by a decimation ratio of 10.5.

54. The method of claim 49, wherein said receiving step comprises receiving the direct sequence spread spectrum signal, said signal having been spread at the transmitter with a spread code of length N, where N complies with the requirement $2^k-1$.

55. A direct sequence spread spectrum receiver that distributes a decimation operation into plural stages comprising:

means for receiving a direct sequence spread spectrum signal at said receiver said signal having been spread at a transmitter with a spreading code of length N, N being divisible by a plurality of prime factors;

means for sampling said signal at a predetermined sampling rate: means for producing said spreading code at said receiver;

means for decimating said signal in a first decimation stage by a first fraction of the sampling rate and providing a first decimated signal having a lower sample rate than said predetermined sample rate; and means for decimating said decimated signal in a second decimation stage by another fraction of the sampling rate and providing a second decimated signal have a lower sample rate than said first decimated signal, wherein because N being divisible by the plurality of prime factors being an enabling feature for separately performing said first decimation stage and said second decimation stage.

56. A direct sequence spread spectrum receiver that distributes a decimation operation into plural stages comprising:
   a front-end device configured to receive a direct sequence spread spectrum signal at said receiver, said signal having been spread at a transmitter with a spreading code of length N, N being divisible by a plurality of prime factors;
   a sampling device for sampling said signal at a predetermined sampling rate;
   a code generating device for producing said spreading code at said receiver;
   a first decimation device for decimating said signal in a first decimation stage by a first fraction of the sampling rate and providing a first decimated signal having a lower sample rate than said predetermined sample rate; and
   a second decimation device for decimating said decimated signal in a second decimation stage by another fraction of the sampling rate and providing a second decimated signal have a lower sample rate than said first decimated signal, wherein because N being divisible by the plurality of prime factors being an enabling feature for separately performing said first decimation stage and said second decimation stage.

57. A direct sequence spread spectrum receiver having a plurality of decimation operators, comprising:
   means for receiving a direct sequence spread spectrum signal at said receiver, said signal having been spread at a transmitter with a spreading code of length N, N being divisible by a plurality of prime factors;
   means for sampling said signal at a predetermined sampling rate;
   means for producing said spreading code at said receiver;
   means for decimating said signal in a first decimation stage by a first fraction of the sampling rate and providing a first decimated signal having a lower sample rate than said predetermined sample rate, wherein said first fraction is equal to one of said plurality of prime factors; and
   means for decimating said decimated signal in a second decimation stage by another fraction of the sampling rate and providing a second decimated signal have a lower sample rate than said first decimated signal, wherein said another fraction is equal to another of said plurality of prime factors.

58. A method for efficient synchronization of a direct sequence spread spectrum signal in a receiver, said signal being spread with a maximal length spreading code of length N at a transmitter, N being divisible by a plurality of prime factors, comprising the steps of:
   receiving said signal;
   digitizing said signal; and
   correlating said spreading code with said signal by calculating a Fast Fourier transform with a predetermined number of computations, said predetermined number of computations being lower than a minimum number of calculations required to correlate another signal despread with another maximal length spreading code that is greater than or equal to 15 and divisible by a lesser number of prime factors than N.

59. A direct sequence spread spectrum receiver that efficiently synchronizes to a direct sequence spread spectrum signal, said signal being spread with a maximal length spreading code of length N at a transmitter, N being divisible by a plurality of prime factors, comprising:
   means for receiving said signal;
   means for digitizing said signal; and
   means for correlating said spreading code with said signal by calculating a Fast Fourier transform with a predetermined number of computations, said predetermined number of computations being lower than a minimum number of calculations required to correlate another signal despread with another maximal length spreading code that is greater than or equal to 15 and divisible by a lesser number of prime factors than N.

60. A direct sequence spread spectrum receiver configured to efficiently synchronize to a direct sequence spread spectrum signal, said signal being spread with a maximal length spreading code of length N at a transmitter, N being divisible by a plurality of prime factors, comprising:
   a front-end device for receiving said signal;
   a digitizer device for digitizing said signal; and
   a processing device for correlating said spreading code with said signal by calculating a Fast Fourier transform with a predetermined number of computations, said predetermined number of computations being lower than a minimum number of calculations required to correlate another signal despread with another maximal length spreading code that is greater than or equal to 15 and divisible by a lesser number of prime factors than N.

61. A direct sequence spread spectrum receiver that efficiently performs synchronization of a direct sequence spread spectrum signal, said signal being spread with a maximal length spreading code of length N at a transmitter, N being divisible by a plurality of prime factors, comprising the steps of:
   means for receiving said signal;
   means for digitizing said signal; and
   means for correlating said spreading code with said signal by calculating a Fast Fourier transform with a predetermined number of computations, said predetermined number of computations being lower than a minimum number of calculations required to correlate another signal despread with another maximal length spreading code that is greater than or equal to 15 and divisible by a lesser number of prime factors than N.

62. A method for setting a pre-detection bandwidth in a digital direct sequence spread spectrum receiver, comprising the steps of:
   receiving and digitizing a direct sequence spread spectrum signal and producing data samples;
   despreading a data set having N data samples with a pseudorandom noise code, used at a transmitter to originally spread a data signal to form said direct sequence spread spectrum signal, where N coincides in number with another set of samples representative of a pseudorandom noise code;
   decimating by parts another data set corresponding to a despread signal and producing M partial decimation summed samples, a ratio of N to M being an amount by which said another data set is decimated, said decimation ratio being proportional to a reduction in effective sample rate and pre-detection Nyquist bandwidth;
   squaring respective of said M partial decimation summed samples and producing squared samples; and
   combining said squared samples to respective of said partial decimation summed samples, wherein said pre-detection bandwidth being greater than or equal to a bandwidth of the data signal.

63. The method of claim 62, wherein said combining step comprises at least one of adding and averaging said squared samples.

64. The method of claim 62, wherein said decimating step comprises decimating by a decimation ratio that is either integer or rational.

65. A digital direct sequence spread spectrum receiver that sets a pre-detection bandwidth, comprising:
   means for receiving and digitizing a direct sequence spread spectrum signal and producing data samples;
   means for despreading a data set having N data samples with a pseudorandom noise code, used at a transmitter to originally spread a data signal to form said direct sequence spread spectrum signal, where N coincides in number with another set of samples representative of a pseudorandom noise code;
   means for decimating by parts another data set corresponding to a despread signal and producing M partial decimation summed samples, a ratio of N to M being an amount by which said another data set is decimated, said decimation ratio being proportional to a reduction in effective sample rate and pre-detection Nyquist bandwidth;
   means for squaring respective of said M partial decimation summed samples and producing squared samples; and
   means for combining said squared samples to respective of said partial decimation summed samples, wherein said pre-detection bandwidth being greater than or equal to a bandwidth of the data signal.

66. A digital direct sequence spread spectrum receiver configured to set a pre-detection bandwidth, comprising:
   a front-end device for receiving and digitizing a direct sequence spread spectrum signal and producing data samples;
   a despeading device for despreading a data set having N data samples with a pseudorandom noise code, used at a transmitter to originally spread a data signal to form said direct sequence spread spectrum signal, where N coincides in number with another set of samples representative of a pseudorandom noise code;
   a decimation device for decimating by parts another data set corresponding to a despread signal and producing M partial decimation summed samples, a ratio of N to M being an amount by which said another data set is decimated, said decimation ratio being proportional to a reduction in effective sample rate and pre-detection Nyquist bandwidth;
   a squaring device for squaring respective of said M partial decimation summed samples and producing squared samples; and
   a combining device for combining said squared samples to respective of said partial decimation summed samples, wherein said pre-detection bandwidth being greater than or equal to a bandwidth of the data signal.

67. A digital direct sequence spread spectrum receiver, comprising:
   means for receiving and digitizing a direct sequence spread spectrum signal and producing data samples;
   means for despreading a data set having N data samples with a pseudorandom noise code, used at a transmitter to originally spread a data signal to form said direct sequence spread spectrum signal, where N coincides in number with another set of samples representative of a pseudorandom noise code;
   means for decimating by parts another data set corresponding to a despread signal and producing M partial decimation summed samples, a ratio of N to M being an amount by which said another data set is decimated, said decimation ratio being proportional to a reduction in effective sample rate and pre-detection Nyquist bandwidth;
   means for squaring respective of said M partial decimation summed samples and producing squared samples; and
   means for combining said squared samples to respective of said partial decimation summed samples, wherein said pre-detection Nyquist bandwidth being greater than or equal to a bandwidth of the data signal.

68. A method for communicating using a direct sequence spread spectrum signal having symbol rates which are a multiple of a pseudorandom noise code repetition rate, comprising the steps of:
   aligning respective data symbols with the pseudorandom noise code;
   forming the direct sequence spread spectrum signal by inverting corresponding portions of said PN code for a portion of said symbols having a first logic value and not inverting corresponding portions for the other symbols;
   transmitting in a transmitter said direct sequence spread spectrum signal;
   receiving and correlating the direct sequence spread spectrum signal, and obtaining a correlation result;
   partitioning said correlation result to align with said portions that were inverted in said forming step;
   identifying partial correlation sums for fractional symbol correlation; and
   demodulating said data using said partial correlation sums.

69. The method of claim 68, wherein said forming step comprises forming a binary phase shift keyed signal by modulating data on said direct sequence spread spectrum signal using 180 degree phase inversion of the frequency reference and inverting said phase for multiple times through a PN code at rates which divide the PN code rate or a multiple thereof by integers.

70. The method of claim 68, wherein said forming step comprises forming an on-off keyed signal, and said transmitting step comprises transmitting with a power amplifier being on when said direct sequence spread spectrum signal is at a first level and turning said amplifier off when said direct sequence spread spectrum signal is at a second level.

71. A direct sequence spread spectrum transmitter system that transmits a direct sequence spread spectrum signal having symbol rates which are a multiple of a pseudorandom noise code repetition rate, comprising:
   means for aligning respective data symbols with the pseudorandom noise code;
   means for forming the direct sequence spread spectrum signal by inverting corresponding portions of said pseudorandom noise code for a portion of said symbols having a first logic value and not inverting corresponding portions for the other symbols;
   means for transmitting in a transmitter said direct sequence spread spectrum signal;
   means for receiving and correlating the direct sequence spread spectrum signal, and obtaining a correlation result;
   means for partitioning said correlation result to align with said portions that were previously inverted;

means for identifying partial correlation sums for fractional symbol correlation; and means for demodulating said data using said partial correlation sums.

72. A direct sequence spread spectrum transmitter system configured to communicate a direct sequence spread spectrum signal having symbol rates which are a multiple of a pseudorandom noise code repetition rate, comprising:

an alignment device for aligning respective data symbols with the pseudorandom noise code;

an inverter for forming the direct sequence spread spectrum signal by inverting corresponding portions of said PN code for a portion of said symbols having a first logic value and not inverting corresponding portions for the other symbols;

a transmit mechanism for transmitting said direct sequence spread spectrum signal;

a processor device for receiving and correlating the direct sequence spread spectrum signal, and obtaining a correlation result;

a partition device for partitioning said correlation result to align with said portions that were previously inverted;

a device for identifying partial correlation sums for fractional symbol correlation; and a demodulation device for demodulating said data using said partial correlation sums.

73. A communications system that communicates using a direct sequence spread spectrum signal having symbol rates which are a multiple of a pseudorandom noise code repetition rate, comprising:

a transmitter, comprising,
 means for aligning respective data symbols with the pseudorandom noise code,
 means for forming the direct sequence spread spectrum signal by inverting corresponding portions of said PN code for a portion of said symbols having a first logic value and not inverting corresponding portions for the other symbols, and
 means for transmitting in a transmitter said direct sequence spread spectrum signal; and a receiver, comprising,
 means for receiving and correlating the direct sequence spread spectrum signal, and obtaining a correlation result,
 means for partitioning said correlation result to align with said portions that were inverted in said means for forming,
 means for identifying partial correlation sums for fractional symbol correlation, and
 means for demodulating said data using said partial correlation sums.

74. A method for implementing down conversion, channelization, and code filtering steps in a direct sequence spread spectrum receiver having a fast Fourier transform correlator, comprising the steps of:

applying one period of a spreading code at 4 samples/chip to a fast Fourier transform, said spreading code being used at a transmitter to form a direct sequence spread spectrum signal received by said receiver, said fast Fourier transform having output points;

filtering said output points in a rectangular filter having a bandwidth corresponding to a chip rate of said spreading code and retaining ¼ of the output points centered on DC, and computing a complex conjugate of a filtered output and saving the complex conjugate as a filtered reference code;

maintaining a real-time counter for subsequent signal phase alignment;

sampling a received bandpass signal at 4 samples per chip for a duration of one code period, said bandpass signal having a center frequency approximately equal to a chip rate;

computing a fast Fourier transform of said bandpass signal and producing fast Fourier transform points;

downconverting said signal and channelizing a frequency uncertainty bandwidth by relabling ¼ of said fast Fourier transform output points centered at a frequency corresponding to an intermediate frequency plus a channel offset frequency as points being centered at 0 Hz;

multiplying said relabled output points by said saved filtered reference code and obtaining an output data set;

performing a coarse search correlation operation in one chip steps in one channel by performing an inverse fast Fourier Transform on said output data set; and repeating said downconverting, multiplying and performing step for the other channels.

75. The method of claim 74, further comprising the steps of:

implementing diversity reception by at least one of,
 selecting an antenna from a plurality of antennas and performing said correlating step, and
 selecting a center transmit frequency from a plurality of center transmit frequencies and performing said correlating step; and repeating a respective one of said selecting an antenna step for the other antennas of said plurality of antennas and selecting a center transmit frequency step for the other center transmit frequencies, and coordinating respective of said selecting steps with a settling time associated with selecting an antenna and selecting a center frequency for a duration that is less than or equal to a duration of a correlation operation.

76. The method of claim 75, wherein said repeating step comprises cycling through predetermined frequency and antenna combinations.

77. A direct sequence spread spectrum receiver that implements down conversion, channelization, and code filtering, comprising:

means for applying one period of a spreading code at 4 samples/chip to a fast Fourier transform, said spreading code being used at a transmitter to form a direct sequence spread spectrum signal received by said receiver, said fast Fourier transform having output points;

means for filtering said output points in a rectangular filter having a bandwidth corresponding to a chip rate of said spreading code and retaining ¼ of the output points centered on DC, and computing a complex conjugate of a filtered output and saving the complex conjugate as a filtered reference code;

means for maintaining a real-time counter for subsequent signal phase alignment;

means for sampling a received bandpass signal at 4 samples per chip for a duration of one code period, said bandpass signal having a center frequency approximately equal to a chip rate;

means for computing a fast Fourier transform of said bandpass signal and producing fast Fourier transform points;

means for downconverting said signal and channelizing a frequency uncertainty bandwidth by relabeling ¼ of said fast Fourier transform output points centered at a frequency corresponding to an intermediate frequency plus a channel offset frequency as points being centered at 0 Hz;

means for multiplying said relabeled output points by said saved filtered reference code and obtaining an output data set;

means for performing a coarse search correlation operation in one chip steps in one channel by performing an inverse fast Fourier Transform on said output data set; and means for repeating said downconverting, multiplying and performing step for the other channels.

78. A direct sequence spread spectrum receiver receiver configured to implement down conversion, channelization, and code filtering operations, comprising:

an application device for applying one period of a spreading code at 4 samples/chip to a fast Fourier transform, said spreading code being used at a transmitter to form a direct sequence spread spectrum signal received by said receiver, said fast Fourier transform having output points;

a filter for filtering said output points in a rectangular filter having a bandwidth corresponding, to a chip rate of said spreading code and retaining ¼ of the output points centered on DC, and computing a complex conjugate of a filtered output and saving the complex conjugate as a filtered reference code;

a device for maintaining a real-time counter used for subsequent signal phase alignment;

a sampling device sampling a received band;pass signal at 4 samples per chip for a duration of one code period, said bandpass signal having a center frequency approximately equal to a chip rate;

a processing device for computing a fast Fourier transform of said bandpass signal and producing fast Fourier transform points;

a downconversion device for downconverting said signal and channelizing a frequency uncertainty bandwidth by relabeling ¼ of said fast Fourier transform output points centered at a frequency corresponding to an intermediate frequency plus a channel offset frequency as points being centered at 0 Hz;

a multiplication device for multiplying said relabeled output points by said saved filtered reference code and obtaining an output data set;

a signal processing device for performing a coarse search correlation operation in one chip steps in one channel by performing an inverse fast Fourier Transform on said output data set; and a signal processing flow control device for repeating downconverting, multiplying and performing options for the other channels.

79. A direct sequence spread spectrum receiver, comprising:

means for calculating a fast Fourier transform;

means for applying one period of a spreading code at 4 samples/chip to the means for calculating the fast Fourier transform, said spreading code being used at a transmitter to form a direct sequence spread spectrum signal received by said receiver, said fast Fourier transform having output points;

means for filtering said output points in a rectangular filter having a bandwidth corresponding to a chip rate of said spreading code and retaining ¼ of the output points centered on DC, and computing a complex conjugate of a filtered output and saving the complex conjugate as a filtered reference code;

means for maintaining a real-time counter for subsequent signal phase alignment;

means for sampling a received bandpass signal at 4 samples per chip for a duration of one code period, said bandpass signal having a center frequency approximately equal to a chip rate, said means for calculating a fast Fourier transform computing a fast Fourier transform of said bandpass signal and producing fast Fourier transform points;

means for downconverting said signal and channelizing a frequency uncertainty bandwidth by relabling ¼ of said fast Fourier transform output points centered at a frequency corresponding to an intermediate frequency plus a channel offset frequency as points being centered at 0 Hz;

means for multiplying said relabled output points by said saved filtered reference code and obtaining an output data set;

means for performing a coarse search correlation operation in one chip steps in one channel by performing an inverse fast Fourier Transform on said output data set; and means for repeatedly applying said means for downconverting, multiplying and performing for the other channels.

80. The receiver of claim 79, further comprising:

means for implementing diversity reception by at least one of,
  means for selecting an antenna from a plurality of antennas and performing said correlating step, and
  means for selecting a center transmit frequency from a plurality of center transmit frequencies and performing said correlating step; and means for reapplying said means for selecting an antenna for the other antennas of said plurality of antennas and mean for selecting a center frequency for the other center transmit frequencies, and coordinating respective of said means for selecting with a settling time associated with selecting an antenna and selecting a center frequency for a duration that is less than or equal to a duration of a correlation operation.

81. A method for maximizing computational efficiency in a processor-based serial correlator in a direct sequence spread spectrum receiver, comprising the steps of:

sampling and storing as a signal data record of length N×M a portion of a direct sequence spread spectrum signal, where N is a spreading code length and M is an integer $\geq 1$;

maintaining a real-time counter so that another sample of said direct sequence spread spectrum signal may be obtained at a later time, said real-time counter enabling said another sample to be taken a predetermined number of chip lengths after said sampling step was performed;

forming a coefficient data record of said spreading code, said coefficient data record having a length of N×M;

sequentially computing correlation sums in said processor for at least a portion of all possible phase relationships of the sampled signal data record and the coefficient data record;

determining if one of said correlation sums exceeded a predetermined threshold indicative that a coarse search event has been detected; and using said real-time counter to align at least said another sample with said coefficient record data if said coarse search event is detected, comprising the step of aligning said at least another sample with said coefficient record data based on a maximum correlation sum determined in said determining step.

82. The method of claim 81, wherein said sequentially computing step comprises sequentially computing correlation sums for all possible phase relationships of the sampled data record and the coefficient data record.

83. The method of claim 81 wherein said sampling step comprises sampling said data record of a direct sequence spread spectrum signal, where said direct sequence spread spectrum signal comprises a leader having a length being at least N+1, where N is for a combination of diversity options.

84. The method of claim 81, further comprising the step of turning off a radio front end of said receiver after said first sample is received and before said second sample is received.

85. The method of claim 81, wherein said determining step comprises the steps of:
determining a relative positional adjustment of the received signal with respect to the data coefficient data record corresponding to the spreading code and adjusting the data coefficient data record by the relative positional adjustment;
forming a mixed signal by mixing the received signal with the data coefficient data record after said adjusting step;
filtering the mixed signal with a lowpass filter to form a filtered signal;
measuring a power of the filtered signal and repeating said determining step, forming step and filtering step for each relative phase position between the received signal and the data coefficient data record;
determining which relative phase position provided a maximum power;
determining an average power over at least a portion of the all relative phase positions excluding phase positions where said the maximum power occurred and within one chip interval of where the maximum occurred; and
comparing the measured maximum with the average power and deciding that correlation was achieved to within 1 chip interval if said maximum power exceeds said average power by a predetermined amount.

86. The method of claim 81, wherein said determining step comprises the steps of:
determining a relative positional adjustment of the received signal with respect to the data coefficient data record corresponding to the spreading code and adjusting the data coefficient data record by the relative positional adjustment;
forming a mixed signal by mixing the received signal with the data coefficient data record after said adjusting step;
filtering the mixed signal with a plurality of adjacent filters, each having a bandwidth greater than or equal to a bandwidth of the signal after being despread, and forming a plurality of filtered signals;
measuring respective powers for the plurality of filtered signals and repeating said determining step, forming step, filtering step and measuring step for each relative phase position between the received signal and the data coefficient data record and for each of the adjacent filters;
determining which relative phase position provided a maximum power;
determining an average power over at least a portion of all relative phase positions except for the maximum and within one chip interval of the maximum; and
comparing the measured maximum with the average power and deciding that correlation was achieved to within 1 chip interval if said maximum power exceeds said average power by a predetermined amount.

87. The method of claim 81, wherein:
said sampling step comprising sampling with a sampled limiter; and
said determining step comprises the steps of,
determining a relative positional adjustment of the received signal with respect to the data coefficient data record corresponding to the spreading code and adjusting the data coefficient data record by the relative positional adjustment,
forming a mixed signal by mixing the received signal with the data coefficient data record after said adjusting step,
filtering the mixed signal with a plurality of adjacent filters, each having a bandwidth greater than or equal to a bandwidth of the signal after being despreads, and forming a plurality of filtered signals,
measuring respective powers for the plurality of filtered signals and repeating said determining step, forming step, filtering step and measuring step for each relative phase position between the received signal and the data coefficient data record and for each of the adjacent filters,
determining which relative phase position provided a maximum power, and
comparing the measured maximum with a predetermined value and deciding that correlation was achieved to within 1 chip interval if said maximum power exceeds said predetermined power by a predetermined amount.

88. The system of claim 81 wherein, said receiver further comprises:
a plurality of antennas;
a diversity reception control mechanism, comprising,
a selection mechanism for selecting one of said plurality of antennas after determining which of said antennas provides a signal the yields a correlation result meeting a selection threshold;
a frequency diversity determination mechanism configured to determine at which of a plurality of frequencies a transmitted signal is centered and receive the transmitted signal at the frequency after making the determination.

89. A direct sequence spread spectrum receiver comprising:
means for sampling and storing as a signal data record of length N×M a portion of a direct sequence spread spectrum signal, where N is a spreading code length and M is an integer $\geq 1$;
means for maintaining a real-time counter so that another sample of said direct sequence spread spectrum signal may be obtained at a later time, said real-time counter enabling said another sample to be taken a predetermined number of chip lengths after sampling;
means for forming a coefficient data record of said spreading code, said coefficient data record having a length of N×M;
means for sequentially computing correlation sums in said processor for at least a portion of all possible phase relationships of the sampled signal data record and the coefficient data record;

means for determining if one of said correlation sums exceeded a predetermined threshold indicative of a coarse search detection event; and means for using said real-time counter to align at least said another sample with said coefficient data if said course search event is detected, comprising the means for aligning said at least another sample with said coefficient list based on a maximum correlation sum determined by said means for determining.

90. A direct sequence spread spectrum receiver comprising:

a device for sampling and storing as a signal data record of length N×M a portion of a direct sequence spread spectrum signal, where N is a spreading code length and M is an integer ≧1:

a device for maintaining a real-time counter so that another sample of said direct sequence spread spectrum signal may be obtained at a later time, said real-time counter enabling said another sample to be taken a predetermined number of chip lengths after sampling;

a formating device for forming a coefficient data record of said spreading code, said coefficient data record having a length of N×M;

a correlation device for sequentially computing correlation sums in said processor for at least a portion of all possible phase relationships of the sampled signal data record and the coefficient data record;

a determination device for determining if one of said correlation sums exceeded a predetermined threshold indicative of a coarse search detection event; and an alignment device for using said real-time counter to align at least said another sample with said coefficient data if said course search event is detected, and for aligning the at least another sample with said coefficient list based on a maximum correlation sum previously determined.

91. A direct sequence spread spectrum receiver, comprising:

means for sampling and storing as a signal data record of length N×M a portion of a direct sequence spread spectrum signal, where N is a spreading code length and M is an integer ≧1;

means for maintaining a real-time counter so that another sample of said direct sequence spread spectrum signal may be obtained at a later time, said real-time counter enabling said another sample to be taken a predetermined number of chip lengths after sampling by said means for sampling;

means for forming a coefficient data record of said spreading code, said coefficient data record having a length of N×M;

means for sequentially computing correlation sums in said processor for at least a portion of all possible phase relationships of the sampled signal data record and the coefficient data record;

means for determining if one of said correlation sums exceeded a predetermined threshold indicative that a coarse search has been detected; and means for using said real-time counter to align at least said another sample with said coefficient data if said coarse search event is detected, comprising means for aligning said at least another sample with said coefficient data record based on a maximum correlation sum determined in said means for determining.

92. A direct sequence spread spectrum system comprising:

a transmitter configured to transmit a direct sequence spread spectrum signal comprising, a pseudorandom noise code generator that produces a pseudorandom spreading sequence having a predetermined length, and a message formatting mechanism configured to form said direct sequence signal to have a leader component followed by a data pattern component, said leader component comprising plural copies of said pseudorandom spreading sequence and having a predetermined transmission length, said data pattern being spread by said pseudorandom spreading sequence; and a receiver that receives said spread spectrum signal comprising, a radio front-end that receives a first sample of said signal corresponding in length to at least one copy of said pseudorandom spreading sequence in said leader, an acquisition mechanism configured to correlate said first sample with the pseudorandom sequence and determine whether a correlation value exceeds a predetermined threshold, indicative of coarse synchronization being achieved, said acquisition mechanism requiring a predetermined amount of processing time to correlate said first sample with said pseudorandom sequence and determine whether coarse synchronization has been achieved, said processing time being not greater than ½ the transmission length, wherein if said first sample includes a beginning of said leader but not including a full copy of said pseudorandom code, said receiver has enough time to receive a second sample of said signal and acquire coarse synchronization before said data is transmitted by transmitter.

93. The receiver of claim 92 wherein:

said pseudorandom noise code generator of said transmitter comprises means for producing the pseudorandom spreading sequence having a predetermined length;

said message formatting mechanism of said transmitter comprises means for forming said direct sequence message to have the leader component followed by the data pattern component; and said acquisition mechanism comprises means to correlate said first sample with the pseudorandom sequence and determine whether a correlation value exceeds a predetermined threshold, indicative of coarse synchronization being achieved.

94. A direct sequence spread spectrum system comprising:

a transmitter comprising means for generating a pseudorandom spreading sequence having a predetermined length, and means for forming said direct sequence spread spectrum message to have a leader component followed by a data pattern component, said leader component comprising plural copies of said pseudorandom spreading sequence and having a predetermined transmission length, said data pattern being spread by said pseudorandom spreading sequence; and a receiver comprising, means for receiving a first sample of said signal corresponding in length to at least one copy of said pseudorandom spreading sequence in said leader, means for correlating said first sample with the pseudorandom sequence and determining whether a correlation value exceeds a predetermined threshold, indicative of course synchronization being achieved, and for requiring a predetermined amount of processing time to correlate said first sample with said pseudorandom sequence and determine whether course synchronization has been achieved, said processing time being not greater than ½ the transmission length, wherein if said first sample includes a beginning of said leader but not including a full copy of said pseudorandom code, said receiver has enough time to receive a second sample of said signal and acquire course synchronization before said data is transmitted by transmitter.

95. A direct sequence spread spectrum system comprising:
   a transmitter configured to transmit a direct sequence spread spectrum signal comprising,
      a pseudorandom noise code generator that produces a pseudorandom spreading sequence having a predetermined length, and
   a message formatting mechanism configured to form said direct sequence message to have a leader component followed by a data pattern component, said leader component comprising plural copies of said pseudorandom spreading sequence and having a predetermined transmission length, said data pattern being spread by said pseudorandom spreading sequence; and
   a receiver that receives said spread spectrum signal comprising,
      a radio front-end that receives a first sample of said signal corresponding in length to at least one copy of said pseudorandom spreading sequence in said leader,
      an acquisition mechanism configured to correlate said first sample with the pseudorandom sequence and determine whether a correlation value exceeds a predetermined threshold, indicative of course synchronization being achieved, said acquisition mechanism requiring a predetermined amount of processing time to correlate said first sample with said pseudorandom sequence and determine whether course synchronization has been achieved, said processing time being not greater than ½ the transmission length, wherein if said first sample includes a beginning of said leader but not including a full copy of said pseudorandom code, said receiver has enough time to receive a second sample of said signal and acquire course synchronization before said data is transmitted by transmitter.

96. A direct sequence spread spectrum receiver that is adapted to conserve power when executing a serial search operation to determine if a sample of a received signal is aligned within a predetermined number of chip intervals relative to a spreading code produced in said receiver, said spreading code employed by a transmitter to spread a data signal and form the direct sequence spread spectrum signal, comprising:
   a radio front end that acquires a first sample of said signal, said radio-front end comprising a digitizer that converts said sample into a digital signal;
   a signal processor comprising,
      a memory configured to hold said digital signal, at least one of,
      another memory configured to hold a copy of said spreading code, and
      a spreading code generator,
      a correlation mechanism that correlates said copy of the spreading code with said digital signal, and
      a detection mechanism that detects if a correlation output signal from said correlation mechanism is greater than a predetermined amount so as to signify that said copy of said spreading code is aligned with said signal to within a predetermined chip interval, said chip interval corresponding to a chip of said spreading code; and
   a controller configured to control when power is applied to said radio front end, said controller accounting for a predetermined amount of settling time prior to data acquisition, said controller applying power to the data acquisition section when acquiring said sample, removing power after said first sample is acquired and while said correlation mechanism and said detection mechanism are correlating said sample and determining whether said sample and said spreading code are aligned.

97. The receiver of claim 96, wherein said controller is configured to reapply power to the data acquisition section if said detection mechanism determines that said first sample did not correlate, and said data acquisition mechanism then acquires a second sample.

98. The receiver of claim 96, wherein said signal processing section includes a timer connected to said controller so that if correlation was achieved, the data acquisition section will acquire the other portion of the signal in alignment with the relative positional alignment of the first sample and the spreading code as determined by the correlation mechanism.

99. The receiver of claim 96, wherein said controller is also configured to control power to signal processing section.

100. The receiver of claim 96, wherein:
   said digitizer comprises means for converting said sample into a digital signal;
   said correlation mechanism comprises means for correlating said copy of the spreading code said digital signal;
   said detection mechanism comprises means for detecting if the correlation output signal from said means for correlating is greater than a predetermined amount so as to signify that said copy of said spreading code is aligned with said signal to within a predetermined chip interval, said chip interval corresponding to a chip of said spreading code; and
   said controller comprises means for controlling when power is applied to said radio front end, and for applying power to the data acquisition section when acquiring said sample, removing power after said first sample is acquired and while said means for correlating and said means for detecting are correlating said sample and determining whether said sample and said spreading code are aligned.

101. The receiver of claim 96, wherein at least one of said signal processor and said controller further comprise a computer-readable medium whose contents cause a processor to operate as at least one of said signal processor and said controller.

102. The receiver of claim 96 configured to perform a method comprising the steps of:
   converting said sample into said digital signal;
   correlating said copy of the spreading code with said digital signal;
   detecting if the correlation output signal from said means for correlating is greater than a predetermined amount so as to signify that said copy of said spreading code is aligned with said signal to within a predetermined chip interval, said chip interval corresponding to a chip of said spreading code; and controlling when power is applied to said radio front end, and for applying power to the data acquisition section when acquiring said sample, removing power after said first sample is acquired and while said means for correlating and said means for detecting are correlating said sample and determining whether said sample and said spreading code are aligned.

103. The receiver of claim 96, further comprising:

a combiner that combines one period of a spreading code at 4 samples/chip to a fast Fourier transform, said fast Fourier transform having output points;

a filter that filters output points in a rectangular filter having a bandwidth corresponding to a chip rate of said spreading code and retaining ¼ of the output points centered at 0 Hz, and computing a complex conjugate of a filtered output and saving the complex conjugate as a filtered reference code;

a real-time counter for subsequent signal phase alignment;

an analog to digital converter that digitized a received bandpass signal at 4 samples per chip for a duration of one code period, said bandpass signal having a center frequency approximately equal to a chip rate;

a processor comprising, a fast Fourier transform mechanism that transforms said bandpass signal and produces fast Fourier transform points, a downconversion and channelization mechanism that downconverts said signal and channelizes a frequency uncertainty bandwidth by relabling ¼ of said fast Fourier transform output points centered at a frequency corresponding to an intermediate frequency plus a channel offset frequency as points being centered at 0 Hz, a multiplication mechanism configured to multiply said relabled output points by said saved filtered reference code and obtaining an output data set, a coarse search correlation mechanism that performs a correlation operation on said output data set in one chip steps in one channel by performing an inverse fast Fourier Transform on said output data set; and a repeating mechanisms that applies signals from other channels to said downconversion and channelization mechanism, multiplication mechanism and coarse search correlation mechanism for the other channels;

a low-power, continuous, state-independent clock configured to cause said receiver to enter an idle state so as to draw minimal power while in the idle state and to enter an active state where said receiver performs communication functions, said state-independent clock causing said active and idle states to be synchronized with external events.

104. The receiver of claim 103 further comprising a computer-readable medium whose contents cause said processor to implement said fast Fourier transform mechanism, down conversion and channelization mechanism, multiplication mechanism, coarse search correlation mechanism and repeating mechanisms.

105. The receiver of claim 103, further comprising:

a transmitter configured to transmit a signal and enable said receiver to perform transceive functions, said low-power, continuous, state-independent clock configured to cause said transmitter to enter an idle state so as to draw minimal power while in the idle state and to enter an active state where said transmitter performs communication functions, said state-independent clock causing said active and idle states to be synchronized with external events.

106. The receiver of claim 96, further comprising:

a sampling device and memory configured to sample and store as a signal data record of length N×M a portion of a direct sequence spread spectrum signal, where N is a spreading code length and M is an integer $\geq 1$;

a real-time counter so that another sample of said direct sequence spread spectrum signal may be obtained at a later time, a predetermined number of chip lengths after said sampling step was performed;

a spreading code generator configured to form a coefficient data record of said spreading code, said coefficient data record having a length of N×M;

a processor comprising, a correlation mechanism that sequentially computes correlation sums for at least a portion of all possible phase relationships of the sampled signal data record and the coefficient data record and determining if one of said correlation sums exceeded a predetermined threshold indicative of a coarse search detection event;

an alignment mechanism configured to use said real-time counter to align at least said another sample with said coefficient data if said coarse search event is detected, and align said at least another sample with said coefficient list based on a maximum correlation sum determined in said correlation mechanism; and a low-power, continuous, state-independent clock configured to cause said receiver and transmitter to enter an idle state so as to draw minimal power while in the idle state and to enter an active state where said transceiver performs communication functions, said state-independent clock causing said active and idle states to be synchronized with external events.

107. The receiver of claim 106 wherein said processor comprises a computer-readable medium whose contents causes said processor to implement at least one of said correlation mechanism, said alignment mechanism, and said low-power continuous, state-independent clock.

108. A direct sequence spread spectrum system configured to communicate data from a transmitter to a receiver in a direct sequence spread spectrum on-off-keyed system, comprising:

the transmitter, comprising a mechanism for enabling and disabling a spreading code used to spread the data signal and form the direct sequence spread spectrum on-off-keyed signal; and the receiver comprising, a receiver front-end configured to receive the direct sequence spread spectrum on-off-keyed signal, a sampled limiter coupled to said receiver front-end and configured to produce a sampled signal corresponding to said direct sequence spread spectrum on-off-keyed signal, a correlator that correlates said spreading code with said direct sequence spread spectrum on-off-keyed signal and produces a despread signal, said despread signal being represented as a correlation sum having partial sums, said partial sums corresponding to data elements of said data signal, and a data demodulator that forms an output data stream of data elements, values of respective of said data elements corresponding to respective of said partial sums of said correlation sum.

109. The system of claim 108, wherein said transmitter further comprises:

an output signal port configured to couple the direct sequence spread spectrum on-off- keyed signal to a transmit antenna; and an output power control mechanism configured to control a signal level of said direct sequence spread spectrum on-off-keyed signal, said power control mechanism adjusting said signal level to respective predetermined levels corresponding to respective portions of said signal corresponding to whether said spreading code was enabled or disabled for said respective portions, a difference between said predetermined levels being an amount that meets or exceeds a processing gain associated with said direct sequence spread spectrum on-off-keyed signal.

110. The system of claim 108, wherein said output power control mechanism further comprises means to encode the signal with a synchronization data so as to enable the spreading code to align thereto with no signal output attenuation, and not encoding with the synchronization data attenuates an output signal by at least a process gain of said signal.

111. The system of claim 108, wherein:

the transmitter further comprises,
a memory device coupled to a processing engine that controllably enables and disables the spreading code in the direct sequence spread spectrum on-off-keyed signal.

112. The system of claim 108, further comprising a computer-readable memory in said receiver whose contents causes a processor to implement said correlator.

113. The system of claim 108 configured to implement a method comprising the steps of enabling and disabling a spreading code used to spread the data signal and form the direct sequence spread spectrum on-off-keyed signal;

correlating in a receiver the spreading code with the direct sequence spread spectrum on-off-keyed signal and producing a despread signal; and forming an output data stream of data elements, values of respective of said data elements corresponding to respective of said particular sums of said correlation sum.

114. The system of claim 108, wherein:

said mechanism for enabling and disabling comprises means for enabling and disabling a spreading code;

said receiver front-end comprising means for receiving the direct sequence spread spectrum on-off-keyed signal;

said sample limiter comprising means for producing a sampled signal;

said correlator comprising means for correlating said spreading code with said direct sequence spread spectrum on-off-keyed signal and producing a spreading signal, said spreading signal being represented as a correlation sum having partial sums; and said data demodulator comprising means for forming an output data stream of data elements, values of respective of said data elements corresponding to respective of said partial sums of said correlation sum.

115. A direct sequence spread spectrum system for transmitting a direct sequence spread spectrum signal from a transmitter to a receiver, comprising:

the transmitter, said transmitter being configured to transmit the direct sequence spread spectrum signal in at least one of a plurality of frequencies, comprising, a carrier frequency selection device configured to select said at least one of said plurality of transmitting frequencies, a signal formatting mechanism configured to form said signal, said signal comprising a leader portion followed by a data portion, said leader comprising a code having a predetermined length, said code being repeated a plurality of times in said leader, a length of said leader being transmitted for a duration being at least twice as long as a maximum signal acquisition time required by the receiver to acquire the signal, said data portion being spread by said code; and the receiver that receives said direct sequence spread spectrum signal, comprising, a correlator configured to despread the spread spectrum signal and determine whether said direct sequence spread spectrum signal is present within said maximum signal acquisition time, wherein if said correlator attempts to acquire said transmitted signal based only on a fraction of a beginning portion of said leader, said leader being of sufficient length for said receiver to acquire the direct sequence spread spectrum signal by correlating a second portion of said leader, prior to said data portion of said direct sequence spread spectrum signal.

116. The system of claim 115, wherein:

said transmitter further comprises a computer-readable medium whose contents cause a processor to implement the signal formatting mechanism; and said receiver further comprising a computer-readable medium whose contents cause a processor contained therein to implement said correlator.

117. The system of claim 115, wherein:

said signal formatting mechanism of said transmitter comprises means for forming said signal so as to have said leader portion followed by said data portion; and said correlator of said receiver comprises means for despreading the spread spectrum signal and determining whether said direct sequence spread spectrum is present within said maximum signal acquisition time wherein if said correlator attempts to acquire said transmitted signal based only on a fraction of a beginning portion of said leader, said leader being of sufficient length for said receiver to acquire the direct sequence spread spectrum signal by correlating a second portion of said leader, prior to said data portion of said direct sequence spread spectrum signal.

118. The system of claim 115 configured to implement a process for transmitting and receiving said direct sequence spread spectrum signal comprising the steps of:

forming said signal so as to have a leader portion followed by a data portion, said leader portion comprising a code having a predetermined length, said code being repeated a plurality of times in said leader, a length of said leader being transmitted for a duration being at least twice as long as a maximum signal acquisition time required by the receiver to acquire the signal, said data portion being spread by said code; and despreading in the receiver the spread spectrum signal and determining whether said direct sequence spread spectrum signal is present within said maximum signal acquisition time, wherein if said correlator attempts to acquire said transmitted signal based only on a fraction of said beginning portion of said leader, said leader being of sufficient length for said receiver to acquire the direct sequence spread spectrum signal by correlating a second portion of said leader, prior to said data portion of said direct sequence spread spectrum signal.

119. The system of claim 115, wherein said receiver further comprises:

a frequency diversity frequency selector that selects at least one of said frequencies for receiving said signal and determining whether said signal is acquired;

said correlator comprising, a relative position adjustment mechanism that adjusts a phase of received signal with respect to a locally generated spreading signal, a signal combiner configured to combine the spreading signal with the received signal and produce a mixed signal, a filter that limits a bandwidth of said mixed signal, a power measuring device that measures a power of said mixed signal for respective of phases adjusted by said relative position adjustment mechanism, and that determines a maximum power, an averaging device that determines an average power for each phase position adjusted by said relative position adjustment mechanism, said average power excluding said maximum power and powers measured within one code chip interval of said maximum, and a comparator that compares said maximum with said average power and determines whether acquisition is achieved for the phase position corresponding with said maximum if said maximum exceeds said average by a predetermined amount.

120. receiver of claim 119 wherein:

said correlator is configured to determine whether acquisition is achieved for all frequencies selected by said frequency selector.

121. The system of claim 115, wherein said receiver further comprises:

a plurality of antennas;

a diversity reception control mechanism, comprising, a relative position adjustment mechanism that adjusts a phase of a received signal from one of said plurality of antennas with respect to a locally generated spreading signal, a signal combiner configured to combine the spreading signal with the signal received and produce a mixed signal, a filter that limits a bandwidth of said mixed signal, a power measuring device that measures a power of said mixed signal and for respective phases adjusted by said relative position adjustment mechanism, and that determines a maximum power for said mixed signal, an averaging device that determines an average power for each phase position adjusted by said relative position adjustment mechanism, said average power excluding said maximum power and powers measured within one code chip of said maximum, a comparator that compares said maximum with said average power and determines whether acquisition is achieved for the phase position corresponding with said maximum if said maximum exceeds said average by a predetermined amount, and a selection mechanism for selecting in a predetermined order respective of said plurality of antennas, said selection mechanism coupling an output of a selected antenna to said signal combiner for processing in said signal combiner, filter, power measuring device, averaging device and comparator.

122. A direct sequence spread spectrum communications system comprising:

a transmitter that transmits a direct sequence spread spectrum signal formed by spreading a data signal with a pseudorandom code, said transmitter including a frequency reference that imparts a frequency uncertainty in said direct sequence spread spectrum signal due to a suboptimal frequency accuracy; and a receiver that receives said direct sequence spread spectrum signal, comprising, a timer configured to measure a length of time between when a portion of the direct sequence spread spectrum signal is received and when the receiver determines in a correlation mechanism that the direct sequence spread spectrum signal is acquired so that another portion of the direct sequence spread spectrum signal will be compared in phase with a despreading code used in the correlation mechanism, the correlation mechanism which is configured to determine a cross correlation of the portion of the signal with the pseudorandom code so as to form a cross correlation result in a magnitude array, said pseudorandom code represented by a coefficient data record, a memory configured to hold said magnitude array, a signal acquisition section that uses said timer to acquire another portion of said direct sequence spread spectrum signal to be coincident with the despreading code for cross correlation in said correlation mechanism with the coefficient data record used for the portion of the signal and for producing subsequent magnitude arrays, an averaging mechanism configured to average the magnitude array with the subsequent magnitude arrays to form an average array; and an acquisition detection mechanism that determines if entries in said average array indicate that signal acquisition is achieved.

123. The system of claim 122, further comprising a computer-readable medium whose contents cause a processor to implement at least one of said timer, correlation mechanism, averaging mechanism, and acquisition detection mechanism.

124. The system of claim 122, wherein:

said timer of said receiver comprises means for measuring a length of time;

said correlation mechanism of said receiver comprises means for determining a cross correlation of the portion of the signal with the pseudorandom code;

said signal acquisition section comprises means for acquiring said another portion of said direct sequence spread spectrum signal to be coincident with the spreading code;

said averaging mechanism comprises means for averaging the magnitude array with the subsequent magnitude arrays to form the average array; and said acquisition detection mechanism comprises means for determining if entries in said average array indicate that signal acquisition is achieved.

125. A method for transmitting a direct sequence spread spectrum signal comprising the steps of:

transmitting a direct sequence spread spectrum signal formed by spreading a data signal with a pseudorandom code, said transmitter including a frequency reference that imparts a frequency uncertainty in said direct sequence spread spectrum signal due to a suboptimal frequency accuracy; and receiving said direct sequence spread spectrum signal, comprising, measuring a length of time between when a portion of the direct sequence spread spectrum signal is received and when the receiver determines in a correlation mechanism that the direct sequence spread spectrum signal is acquired so that another portion of the direct sequence spread spectrum signal will be compared in phase with a despreading code used in the correlation mechanism, determining a cross correlation of the portion of the signal with the pseudorandom code so as to form a cross correlation result in a magnitude array, said pseudorandom code represented by a coefficient data record, storing said magnitude array in a memory, acquiring another portion of said direct sequence spread spectrum signal, measuring a time span with a timer so that said another portion of said direct sequence spread spectrum signal will be coincident with the despreading code for cross correlation in said correlation mechanism with the coefficient data record used for the portion of the signal and for producing subsequent magnitude arrays, averaging the magnitude array with the subsequent magnitude arrays to form an average magnitude array, and determining if entries in said average magnitude array indicate that signal acquisition is achieved.

126. A direct sequence spread spectrum communications system comprising:

a transmitter that transmits a direct sequence spread spectrum signal formed by spreading a data signal with a pseudorandom code, said transmitter including a frequency reference that imparts a frequency uncertainty in said direct sequence spread spectrum signal due to a suboptimal frequency accuracy; and a receiver that receives said direct sequence spread spectrum signal, comprising, a timer configured to measure a length of time between when a portion of the direct sequence spread spectrum signal is received and when the receiver determines in a correlation mechanism that the direct sequence spread spectrum signal is acquired so that another portion of the direct sequence spread spectrum signal will be acquired so as to be aligned in phase with a despreading code used in the correlation mechanism, the correlation mechanism which is configured to determine a cross correlation of the portion of the signal with the pseudorandom code and frequency plane so as to form a cross correlation result in a magnitude plane, said pseudorandom code represented by a coefficient data record, a memory configured to hold said magnitude plane, a signal acquisition section that uses said timer to acquire another portion of said direct sequence spread spectrum signal to be coincident with the despreading code for cross correlation in said correlation mechanism with the coefficient data record used for the portion of the signal and for producing subsequent magnitude planes, an averaging mechanism configured to average the magnitude plane with the subsequent magnitude planes to form an average magnitude plane; and an acquisition detection mechanism configured to determine if entries in said average magnitude plane indicate that signal acquisition is achieved.

127. The system of claim 126, further comprising a computer-readable medium whose contents cause a processor to implement at least one of said timer, correlation mechanism, averaging mechanism, and acquisition detection mechanism.

128. The system of claim 126, wherein:

said transmitter comprises means for forming said direct sequence spread spectrum signal;

said timer or said receiver comprise means for measuring the length of time;

the correlation mechanism comprises means for determining said cross correlation;

said signal acquisition section of said receiver comprises means for using said timer to acquire said another portion of said direct sequence spread spectrum signal;

said averaging mechanism comprises means for averaging the magnitude plane with the subsequent magnitude planes to form said average magnitude planes; and said acquisition detection mechanism comprises means for determining if entries in said average magnitude plane indicate that signal acquisition is achieved.

129. A method for transmitting a direct sequence spread spectrum signal comprising the steps of:

transmitting a direct sequence spread spectrum signal formed by spreading a data signal with a pseudorandom code, said transmitter including a frequency reference that imparts a frequency uncertainty in said direct sequence spread spectrum signal due to a suboptimal frequency accuracy; and receiving said direct sequence spread spectrum signal, comprising, measuring a length of time between when a portion of the direct sequence spread spectrum signal is received and when the receiver determines in a correlation mechanism that the direct sequence spread spectrum signal is acquired so that another portion of the direct sequence spread spectrum signal will be compared in phase with a despreading code used in the correlation mechanism, determining a cross correlation of the portion of the signal with the pseudorandom code so as to form a cross correlation result in a magnitude plane, said pseudorandom code represented by a coefficient data record, storing said magnitude plane in a memory, acquiring another portion of said direct sequence spread spectrum signal, measuring an elapsed time frame with a timer so that said another portion of said direct sequence spread spectrum signal will be coincident with the despreading code for cross correlation in said correlation mechanism with the coefficient data record used for the portion of the signal and for producing subsequent magnitude planes, averaging the magnitude plane with the subsequent magnitude planes to form an average magnitude plane; and determining if entries in said average magnitude plane indicate that signal acquisition is achieved.

130. A transmitter in a direct sequence spread spectrum communication system having frequency diversity, comprising:

a signal combiner that combines a data signal with a pseudorandom code that spreads the data signal into the direct sequence spread spectrum signal, said pseudorandom code comprising chips having a duration corresponding to a predetermined chipping rate;

a clock generator that generates a clock signal at a frequency that is a multiple of the chipping rate, said multiple being greater than or equal to 1, wherein said combiner being configured to mix the direct sequence spread spectrum signal with said clock signal to produce a composite signal having two components centered at respective center frequencies that are separated by two times said clock frequency, said composite signal being transmitted to a direct sequence spread spectrum receiver that is configured to receive the composite signal and extract the data signal therefrom.

131. The transmitter of claim 130 further comprising a computer-readable medium whose contents cause a processor to implement said signal combiner.

132. The transmitter of claim 130, wherein:

said signal combiner comprises means for combining the data signal with the pseudorandom code;

said clock generator comprises means for generating the clock signal at the frequency that is the multiple of the chipping rate, said multiple being greater than or equal to 1; and wherein, said means for combining comprises means for mixing the direct sequence spread spectrum signal with the clock signal to produce the composite signal.

133. A method for transmitting in a direct sequence spread spectrum communication system, comprising the steps of:

combining a data signal with a pseudorandom code that spreads the data signal into the direct sequence spread spectrum signal, said pseudorandom code comprising chips having a duration corresponding to a predetermined chipping rate;

generating a clock signal at a frequency that is a multiple of the chipping rate, said multiple being greater than or equal to 1, wherein mixing the direct sequence spread spectrum signal with said clock signal to produce a composite signal having two components centered at respective center frequencies that are separated by two times said clock frequency said composite signal being transmitted to a direct sequence spread spectrum receiver that is configured to receive the composite signal and extract the data signal therefrom.

134. A direct sequence spread spectrum system comprising:

a transmitter configured to transmit a direct sequence spread spectrum signal, comprising, a transmitter frequency reference that produces a frequency with a predetermined accuracy, a spreading code generator that receives said frequency from said transmitter frequency reference and generates said spreading code with a predetermined transmit signal chipping frequency error, said spreading code generator configured to produce a spread data signal by modulating a data signal with said spreading code, said spread data signal having a frequency error component attributable to said predetermined accuracy of the frequency, a radio frequency generator configured to produce a radio frequency signal derived from said frequency from said transmitter frequency reference, said radio frequency signal having a frequency error attributable to said predetermined accuracy of said frequency, and a transmitter signal combiner having a signal input connector configured to receive and combine said radio frequency signal and said spread data signal to produce the direct sequence spread spectrum signal; and a receiver configured to extract said data signal from said direct sequence spread spectrum signal sent from said transmitter, comprising, a frequency downconversion mechanism to lower a frequency of said direct sequence spread spectrum signal, a spreading code generator configured to generate said spreading code, a local time reference that controls said frequency downconversion mechanism and said spreading code generator;

a correlator that determines said frequency error by correlating said direct sequence spread spectrum signal with said spreading code, a code phase prediction mechanism that predicts a drift in a phase of said spreading code relative to said direct sequence spread spectrum signal over a predetermined period of time, and a code phase adjustment mechanism configured to adjust the phase of said spreading code to compensate for the drift in phase predicted in said code phase prediction mechanism, the adjusting mechanism adjusting said phase by fractional chip steps while simultaneously receiving and demodulating the direct sequence spread spectrum signal.

135. The system of claim 134, wherein said receiver comprises a multichannel receiver and said code phase prediction mechanism comprises a mechanism for using a channel index in which said signal is received as the predicted phase drift.

136. The system of claim 134, further comprising:

a receiver frequency reference that produces a frequency with another predetermined accuracy, a code generator being coupled to the receiver frequency reference and configured to generate said spreading code, said spreading code having a chipping frequency error component, and a receiver radio frequenty generator configured to produce a downconversion signal derived from frequency said receiver frequency reference, said downconversion signal having a frequency error attributable to said predetermined accuracy of said frequency from said receiver frequency reference.

137. The system of claim 136, further comprising:

means for using said prediction value to modify the code phase of its local code generator at specific points during a received message to maintain chip phase alignment between transmitter and receiver.

138. The system of claim 134, further comprising a computer-readable medium whose contents cause a processor to implement in said receiver at least one of said frequency down conversion mechanism, said correlator, said code phase prediction mechanism, and said code phase adjustment mechanism.

139. The system of claim 134, wherein:

said frequency downconversion mechanism comprises means for lowering a frequency of the direct sequence spread spectrum signal;

said spreading code generator comprises means for generating said spreading code;

said correlator comprises means for determining said frequency error;

said code phase prediction mechanism comprises means for predicting said drift; and said code phase adjust mechanism comprises means for adjusting in fractional chip steps said phase so as to compensate for the drift in phase.

140. A method for communicating a direct sequence spread spectrum signal, comprising the steps of:

transmitting from a transmitter a direct sequence spread spectrum signal, comprising, generating a transmitter frequency reference with a predetermined accuracy, generating a transmitter spreading code that uses said transmitter frequency, reference with a predetermined transmit signal chipping frequency error, said spreading code configured to produce a spread data signal by modulating a data signal with said spreading code, said spread data signal having a frequency error component attributable to said predetermined accuracy of the frequency, generating a radio frequency signal derived from said transmitter frequency reference, said radio frequency signal having a frequency error attributable to said predetermined accuracy of said frequency, and combining said radio frequency signal and said spread data signal to produce the direct sequence spread spectrum signal; and receiving said energy with a receiver configured to extract said data signal from said direct sequence spread spectrum signal transmitted from said transmitter, comprising, receiving the direct sequence spread spectrum signal, generating a receiver frequency reference with a predetermined accuracy, downconverting the direct sequence spread spectrum signal to produce a reduced frequency direct sequence spread spectrum signal, said downconverting step having a frequency component based on said receiver frequency reference, generating a receiver spreading code that uses said receiver frequency reference, said receiver spreading code producing a narrowband data signal by mixing said reduced frequency data signal with said spreading code, said narrowband data signal having a frequency error component attributable to said predetermined accuracy of the receiver frequency reference, determining the frequency of the received direct sequence spread spectrum signal, determining the frequency difference between the transmitter frequency reference and the receiver frequency reference, predicting a drift in a phase of said receiver spreading code relative to said received direct sequence spread spectrum signal over a predetermined period of time, and adjusting the phase of said receiver spreading code to compensate for the drift in phase predicted in said code phase predicting step, the adjusting step adjusting said phase by fractional chip steps while simultaneously receiving and demodulating the direct sequence spread spectrum signal.

141. A direct sequence spread spectrum communication network comprising:

a transmitter that transmits a direct sequence spread spectrum signal comprising a message;

a processor;

a plurality of receivers connected to one another in a multi-drop network, said processor being connected to the multi-drop network, respective of said receivers comprising a memory, wherein respective of said receivers that receive said direct sequence spread spectrum signal store the message in said memory, said message having a unique identification, respective of said receivers being configured to relay said message to said processor over the multi-drop network according to a signaling protocol, wherein respective of the receivers monitor the multi-drop network for other message traffic and, if message traffic is present, determine if an identification of said message traffic is common with said message stored in said memory, and if said identification is common, eliminating the message in the memory because it is redundant with the message traffic being sent to the processor.

142. The network of claim 141, wherein said receivers further comprise a computer-readable medium whose contents cause a processor to implement the process for monitoring the multi-drop network, and determining if the identification of the message traffic in common with the message stored in memory if the message traffic is present, and if said identification is common, eliminating the message in the memory.

143. The network of claim 141, wherein:

respective of said receivers comprise means for relaying said message to said processor over the multi-drop network;

respective of said receivers comprise means for monitoring the multi-drop network for other message traffic;

respective of said receivers comprise means for determining an identification of said message traffic in common with said message stored in memory if said message traffic is present; and respective of said receivers comprise means for eliminating the message in the memory if said identification is common.

144. A method for reducing message traffic on a multi-drop network comprising the steps of:

transmitting a direct sequence spread spectrum signal comprising a message from a transmitter, said message having a unique identification;

receiving said signal by at least one of a plurality of receivers connected to one another in the multi-drop network, said multi-drop network have a processor connected thereto, respective of said receivers comprising a memory;

relaying the message to said processor over the multi-drop network according to a signaling protocol;

storing said message of said direct sequence spread spectrum signal in said memory; and monitoring with respective of the receivers communications in the multi-drop network for other message traffic and, if the other message traffic is present, determining if an identification of said message traffic is common with said message stored in said memory, and if said identification is common, eliminating the message in the memory because the message is redundant with the message traffic being sent to the processor.

* * * * *